(12) United States Patent
Scadden et al.

(10) Patent No.: US 8,083,416 B2
(45) Date of Patent: Dec. 27, 2011

(54) HYBRID FIBER/COPPER CONNECTOR SYSTEM AND METHOD

(75) Inventors: Jarrod Scadden, Brooklyn Center, MN (US); M'Hamed Anis Khemakhem, Eden Prairie, MN (US); Jeffrey Louis Peters, Eagan, MN (US); Wayne M. Kachmar, North Bennington, VT (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 349 days.

(21) Appl. No.: 12/323,980

(22) Filed: Nov. 26, 2008

(65) Prior Publication Data

US 2009/0269011 A1  Oct. 29, 2009

Related U.S. Application Data

(60) Provisional application No. 61/005,107, filed on Nov. 30, 2007, provisional application No. 61/044,370, filed on Apr. 11, 2008.

(51) Int. Cl.
*G02B 6/36* (2006.01)

(52) U.S. Cl. ............................. 385/75; 385/53; 385/56

(58) Field of Classification Search ..................... None
See application file for complete search history.

(56) References Cited

U.S. PATENT DOCUMENTS

| | | | |
|---|---|---|---|
| 2,962,688 A | 11/1960 | Werner | |
| 4,273,413 A | 6/1981 | Bendiksen et al. | |
| 4,296,992 A | 10/1981 | Gallagher | |
| 4,373,777 A | 2/1983 | Borsuk et al. | |
| 4,449,784 A * | 5/1984 | Basov et al. | 385/75 |
| 4,558,172 A | 12/1985 | Zetena | |
| 4,568,145 A | 2/1986 | Colin et al. | |
| 4,588,256 A | 5/1986 | Onstott et al. | |
| 4,611,887 A | 9/1986 | Glover et al. | |
| 4,669,802 A | 6/1987 | Schaffer | |
| 4,669,820 A | 6/1987 | Ten Berge | |
| 4,728,171 A | 3/1988 | Schofield et al. | |
| 4,746,194 A | 5/1988 | Rasmussen | |
| 4,787,699 A | 11/1988 | Moulin | |
| 4,813,887 A | 3/1989 | Capp | |
| 4,850,671 A | 7/1989 | Finzel | |

(Continued)

FOREIGN PATENT DOCUMENTS

DE  202 02 835 U1  3/2003

(Continued)

OTHER PUBLICATIONS

International Search Report and Written Opinion mailed Mar. 13, 2009.

(Continued)

*Primary Examiner* — Mike Stahl

(74) *Attorney, Agent, or Firm* — Merchant & Gould P.C.

(57) ABSTRACT

A hybrid fiber/copper connector assembly which permits repair of damaged fibers or copper conductors carried by a hybrid fiber/copper cable without requiring replacement of the entire connector assembly or the cable is disclosed. The hybrid fiber/copper connector assembly disclosed also allows individual hybrid fiber/copper connectors of the assembly to be converted from one gender to a different gender. The hybrid fiber/copper connectors of the assembly include removable keying members mountable to housings of the connectors. The removable keying members allow gender conversion and proper mating and orientation. The hybrid fiber/copper connector assembly also allows the individual connectors of the assembly to be converted from being hybrid fiber/copper connectors to being only fiber connectors or only copper connectors.

11 Claims, 94 Drawing Sheets

U.S. PATENT DOCUMENTS

| | | | |
|---|---|---|---|
| 4,984,865 A | 1/1991 | Lee et al. | |
| 5,109,452 A | 4/1992 | Selvin et al. | |
| RE34,005 E | 7/1992 | Levinson et al. | |
| 5,129,842 A | 7/1992 | Morgan | |
| 5,151,961 A | 9/1992 | Hvezda et al. | |
| 5,166,995 A * | 11/1992 | Briggs et al. | 385/58 |
| 5,242,315 A | 9/1993 | O'Dea | |
| RE34,955 E | 5/1995 | Anton et al. | |
| 5,418,876 A | 5/1995 | Lee | |
| 5,446,819 A | 8/1995 | Foster et al. | |
| 5,469,521 A | 11/1995 | Coutts et al. | |
| 5,611,017 A | 3/1997 | Lee et al. | |
| 5,620,339 A | 4/1997 | Gray et al. | |
| 5,631,986 A | 5/1997 | Frey et al. | |
| 5,647,043 A | 7/1997 | Anderson et al. | |
| 5,745,622 A | 4/1998 | Birnbaum et al. | |
| 5,806,175 A | 9/1998 | Underwood | |
| 5,883,995 A | 3/1999 | Lu | |
| 5,893,777 A | 4/1999 | Kantor | |
| 5,982,971 A | 11/1999 | Amirkalali | |
| 6,054,007 A | 4/2000 | Boyd et al. | |
| 6,079,880 A | 6/2000 | Blom | |
| 6,109,963 A | 8/2000 | Follingstad et al. | |
| 6,115,159 A | 9/2000 | Baker | |
| 6,142,676 A | 11/2000 | Lu | |
| 6,179,658 B1 | 1/2001 | Gunay et al. | |
| 6,231,380 B1 | 5/2001 | Cabalka et al. | |
| 6,234,683 B1 | 5/2001 | Waldron et al. | |
| 6,254,278 B1 | 7/2001 | Andrews et al. | |
| 6,325,670 B2 | 12/2001 | Murayama | |
| 6,341,898 B1 | 1/2002 | Matsushita | |
| 6,357,931 B1 | 3/2002 | Shirakawa et al. | |
| 6,432,511 B1 | 8/2002 | Davis et al. | |
| 6,475,009 B2 | 11/2002 | Below et al. | |
| 6,478,625 B2 | 11/2002 | Tolmie et al. | |
| 6,513,989 B1 | 2/2003 | Bleck et al. | |
| 6,575,786 B1 | 6/2003 | Khemakhem et al. | |
| 6,579,014 B2 | 6/2003 | Melton et al. | |
| 6,612,857 B2 | 9/2003 | Tolmie | |
| 6,648,520 B2 * | 11/2003 | McDonald et al. | 385/78 |
| 6,719,461 B2 | 4/2004 | Cull | |
| 6,733,185 B2 | 5/2004 | Zhao et al. | |
| 6,739,759 B1 | 5/2004 | Seeley | |
| 6,782,182 B2 | 8/2004 | Dautartas et al. | |
| 6,811,323 B2 * | 11/2004 | Murray et al. | 385/80 |
| 6,819,858 B2 | 11/2004 | Steinberg et al. | |
| 6,846,988 B2 | 1/2005 | Khemakhem et al. | |
| 6,848,837 B2 | 2/2005 | Gilligan | |
| 6,856,748 B1 | 2/2005 | Elkins et al. | |
| 6,893,591 B2 | 5/2005 | Davis et al. | |
| 6,945,706 B2 | 9/2005 | Gimbel et al. | |
| 6,962,445 B2 | 11/2005 | Zimmel et al. | |
| 7,111,990 B2 | 9/2006 | Melton et al. | |
| 7,147,384 B2 | 12/2006 | Hardcastle et al. | |
| 7,393,144 B2 | 7/2008 | Khemakhem et al. | |
| 7,481,585 B2 | 1/2009 | Scadden et al. | |
| 7,490,994 B2 * | 2/2009 | Scadden et al. | 385/62 |
| 7,534,050 B2 | 5/2009 | Kachmar | |
| 2001/0026661 A1 * | 10/2001 | de Jong et al. | 385/56 |
| 2001/0033730 A1 | 10/2001 | Fentress | |
| 2002/0067894 A1 | 6/2002 | Scanzillo | |
| 2002/0154868 A1 | 10/2002 | Kraus et al. | |
| 2003/0063868 A1 | 4/2003 | Fentress | |
| 2004/0038588 A1 * | 2/2004 | Bernardi et al. | 439/587 |
| 2004/0052472 A1 | 3/2004 | Roth et al. | |
| 2005/0135755 A1 | 6/2005 | Kiani et al. | |
| 2005/0213899 A1 | 9/2005 | Hurley et al. | |
| 2005/0276559 A1 | 12/2005 | Bianchi | |
| 2005/0281509 A1 | 12/2005 | Cox et al. | |
| 2006/0056769 A1 | 3/2006 | Khemakhem et al. | |
| 2006/0233496 A1 | 10/2006 | Khemakhem et al. | |
| 2007/0058907 A1 | 3/2007 | Mynott et al. | |
| 2008/0124030 A1 * | 5/2008 | Scadden et al. | 385/62 |

FOREIGN PATENT DOCUMENTS

| | | |
|---|---|---|
| EP | 0 204 581 A2 | 12/1986 |
| EP | 0 479 415 A2 | 4/1992 |
| EP | 0 689 070 A1 | 12/1995 |
| EP | 0 803 749 A1 | 10/1997 |
| EP | 0 810 455 A1 | 12/1997 |
| EP | 0 847 107 A1 | 6/1998 |
| EP | 0 916 974 A2 | 5/1999 |
| EP | 0 996 011 A1 | 4/2000 |
| EP | 0 996 012 A1 | 4/2000 |
| EP | 1 221 630 A2 | 7/2002 |
| GB | 2 154 333 A | 9/1985 |
| JP | 59-177513 | 10/1984 |
| JP | 61-284710 | 12/1986 |
| JP | 4040402 | 2/1992 |
| WO | WO 86/00147 | 1/1986 |
| WO | WO 97/23797 | 7/1997 |
| WO | WO 2006/039084 A1 | 4/2006 |
| WO | WO 2008/067341 A3 | 6/2008 |
| WO | WO 2008/067342 A3 | 6/2008 |
| WO | WO 2008/128078 A1 | 10/2008 |

OTHER PUBLICATIONS

Lemo 3K.93C Series Connector Brochure, undated, 22 pages.

Lemo® USA, Inc., LEMO's Audio Video Connectors—Coax, Triax, Fiber Optic and Hybrid Applications, 2003, pp. 1-51.

Telecast Fiber Systems, Inc., Cobra™, Triax-to-Fiber Camera Interface—Now for High Definition and High Speed Cameras, 2003, pp. 1-2.

Telecast Fiber Systems, Inc., SHED™, SMPTE Hybrid Elimination Devices, 2003, pp. 1-2.

\* cited by examiner

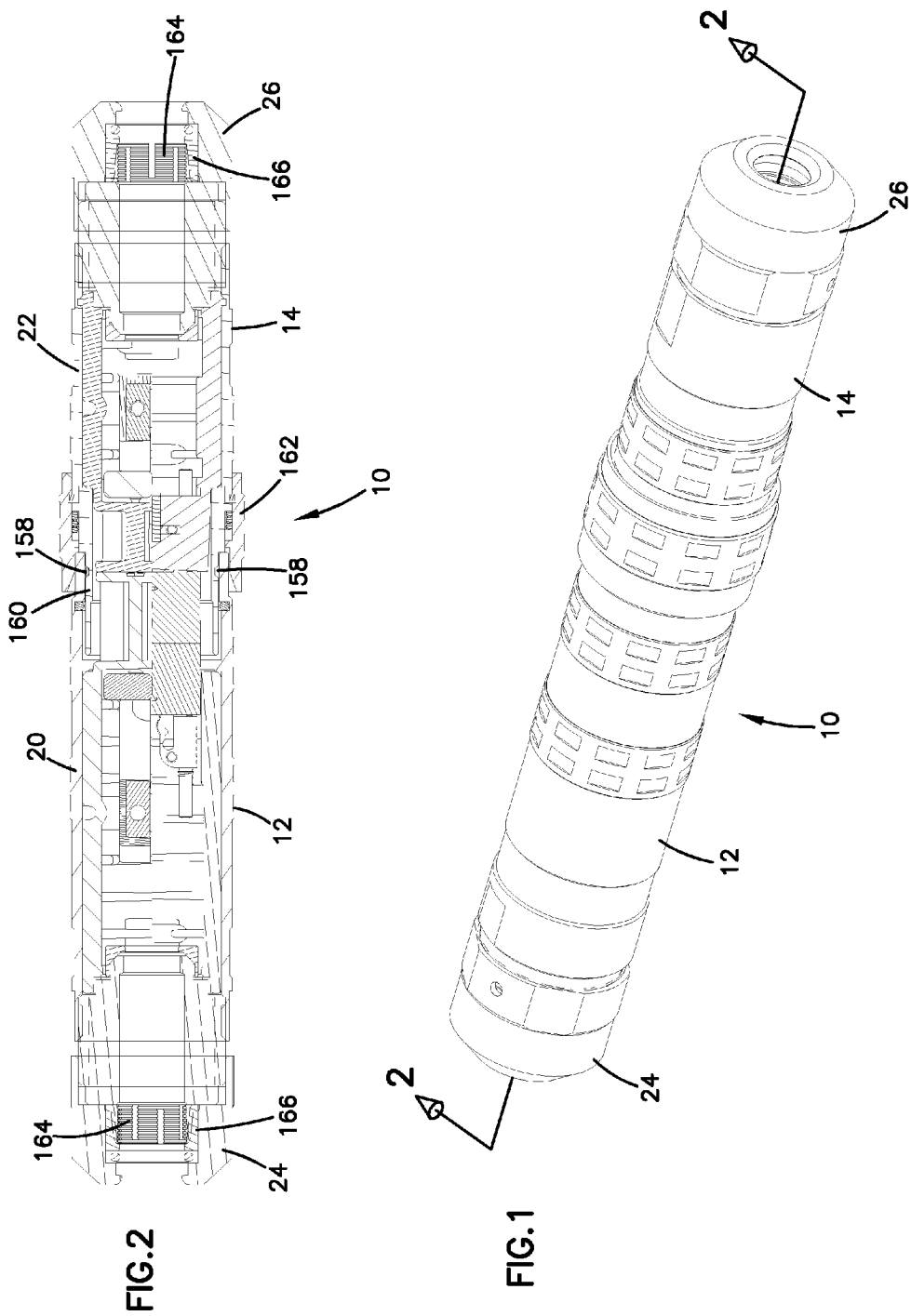

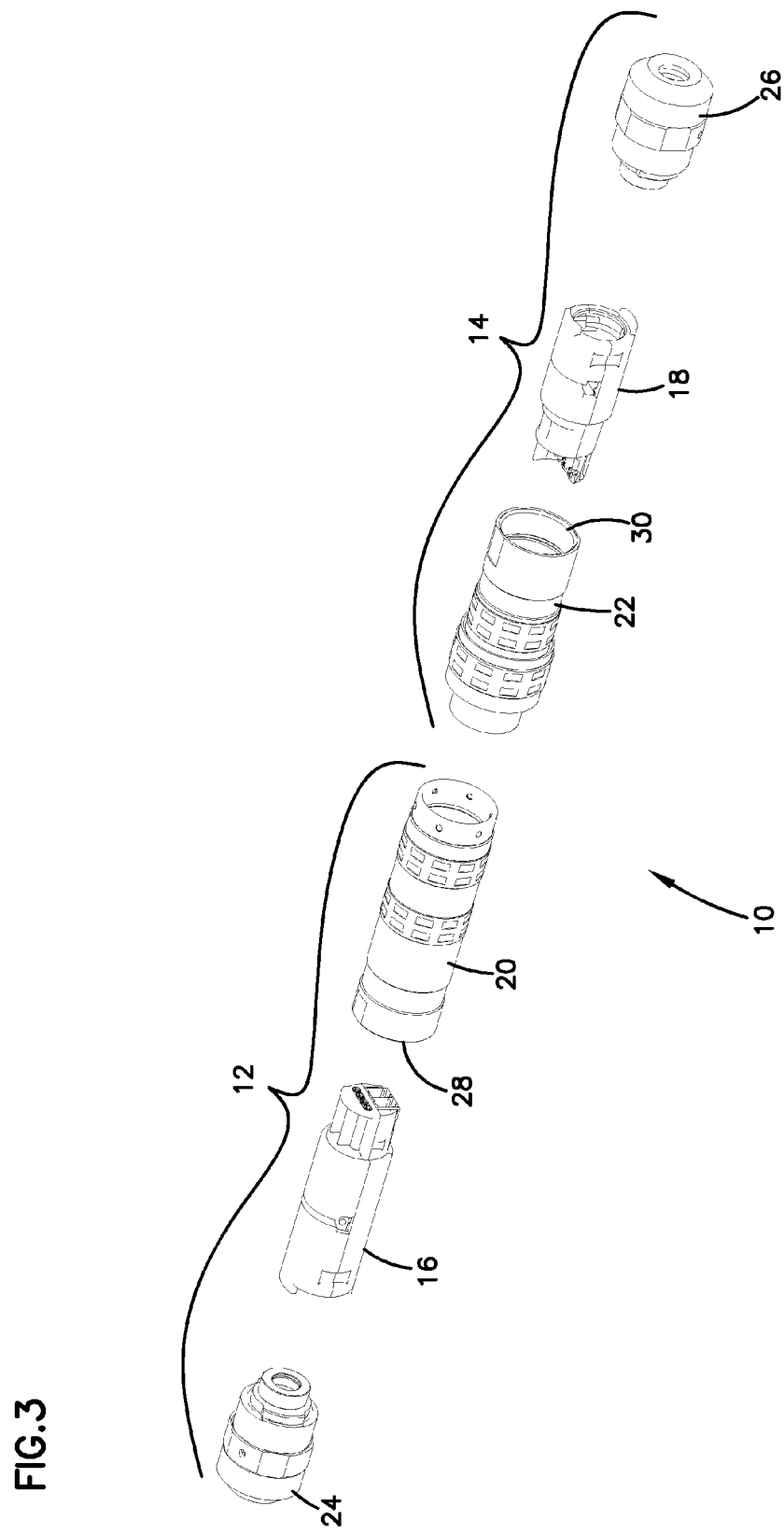

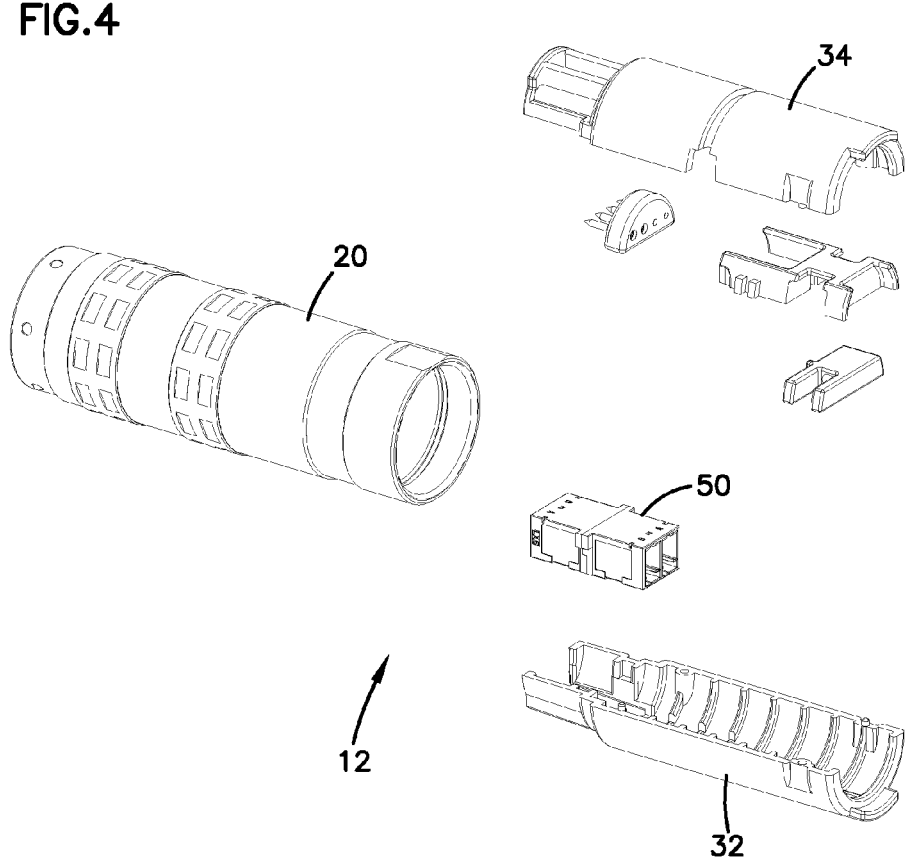

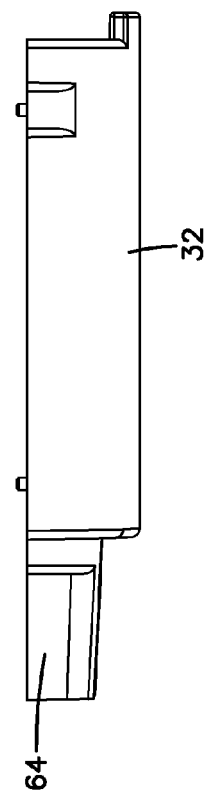
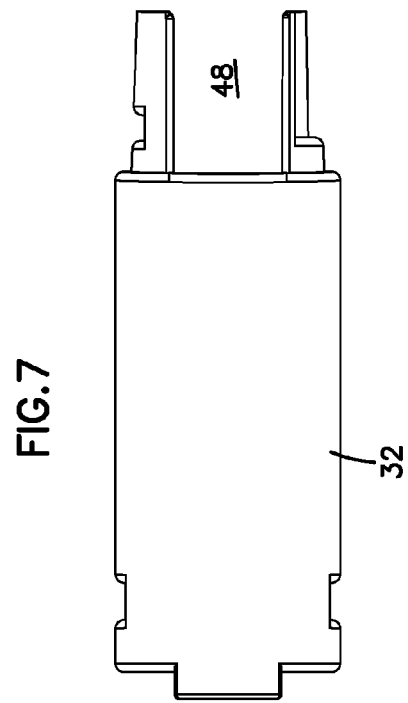
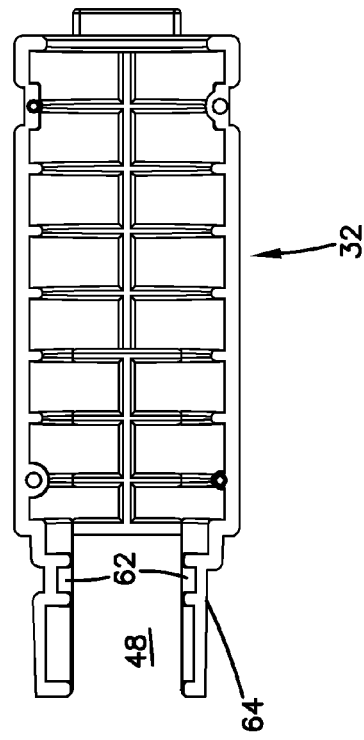
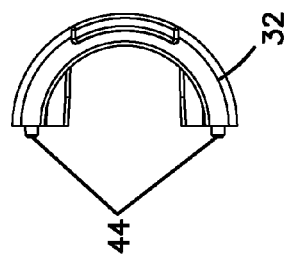

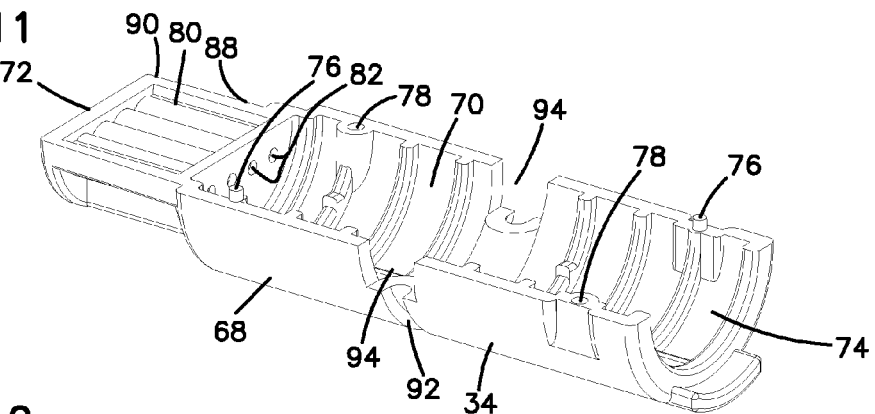
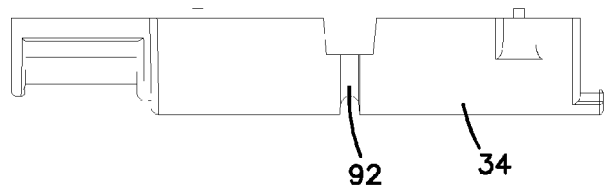
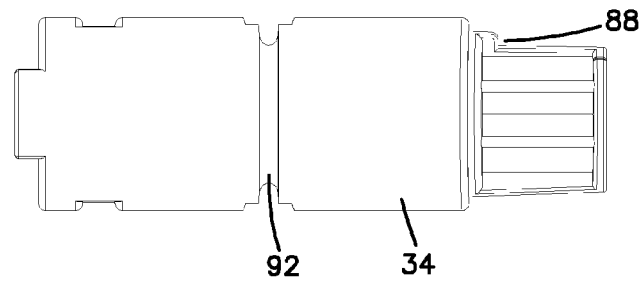
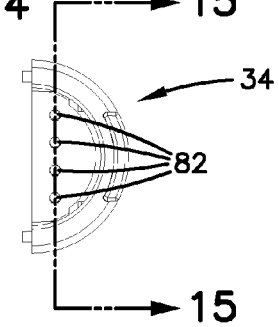
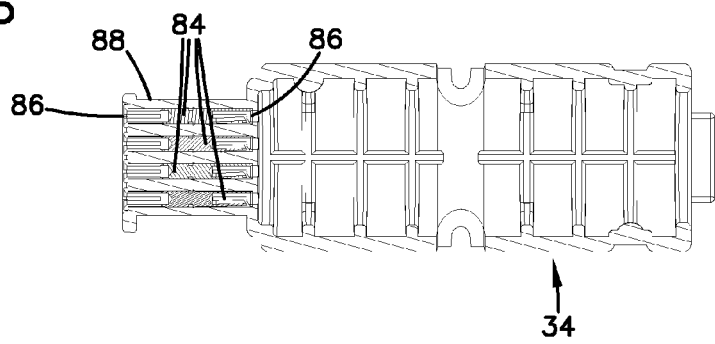

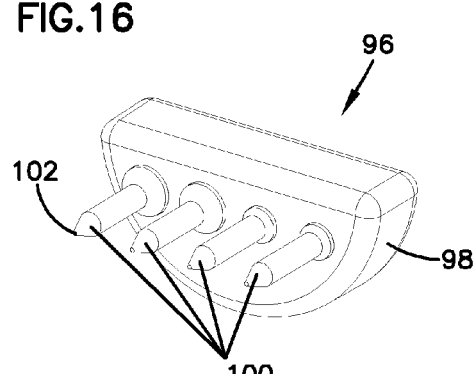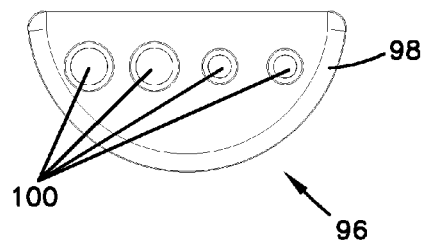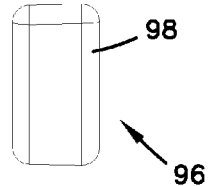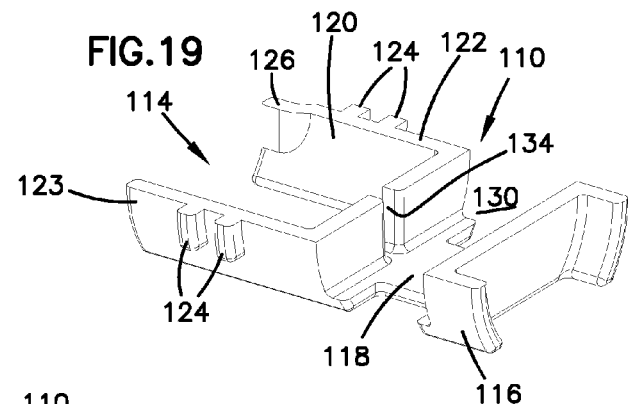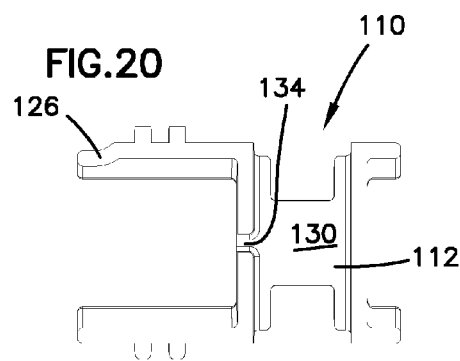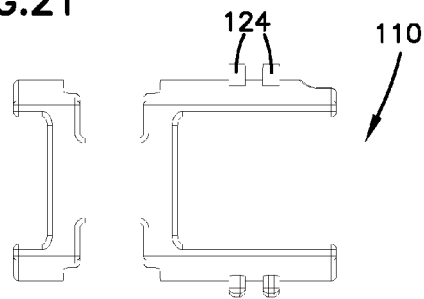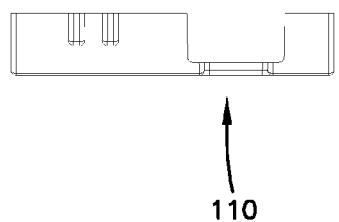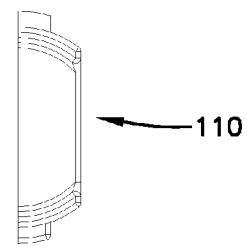

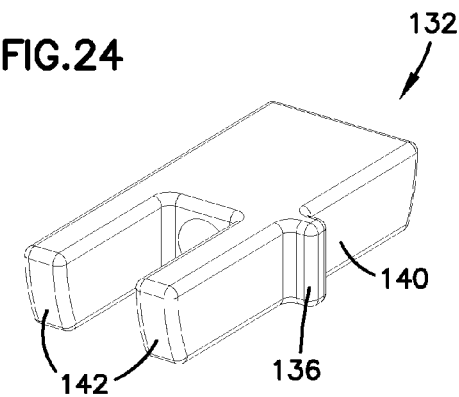
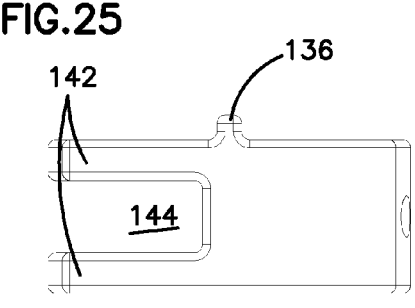
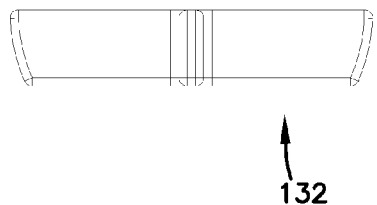
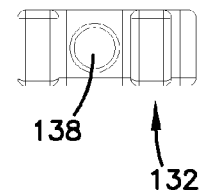
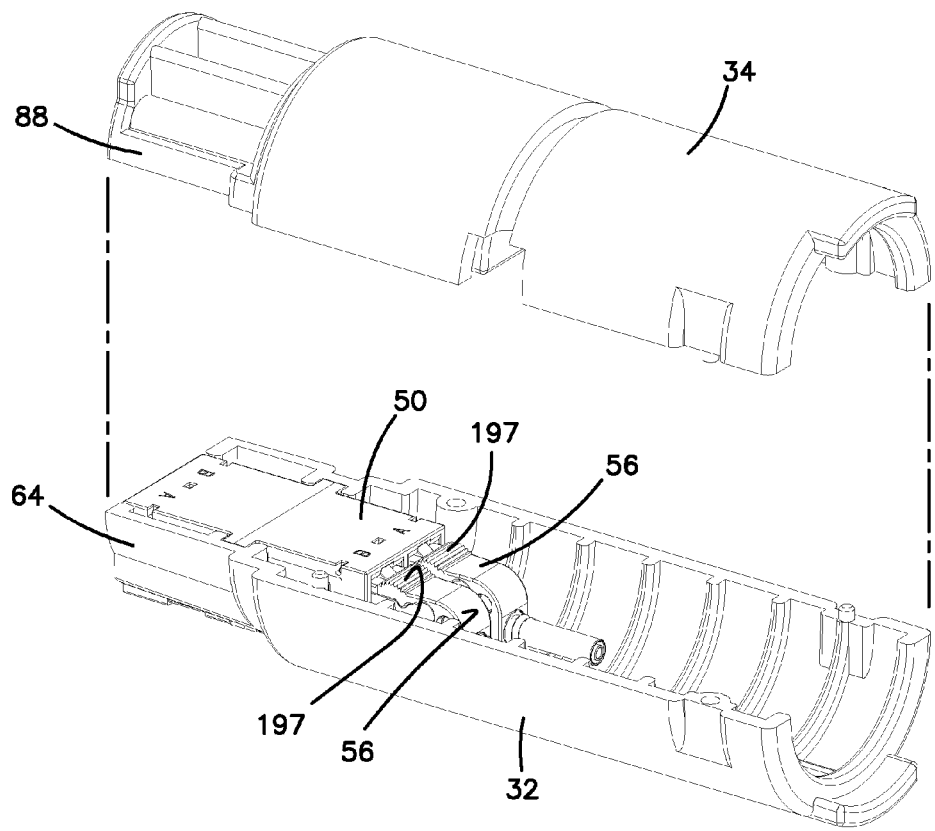

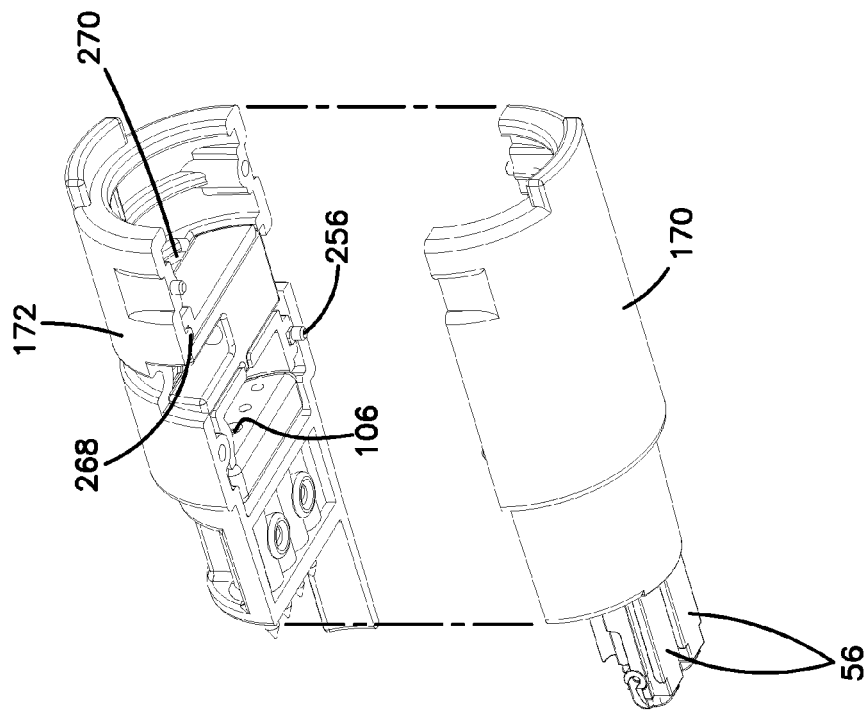
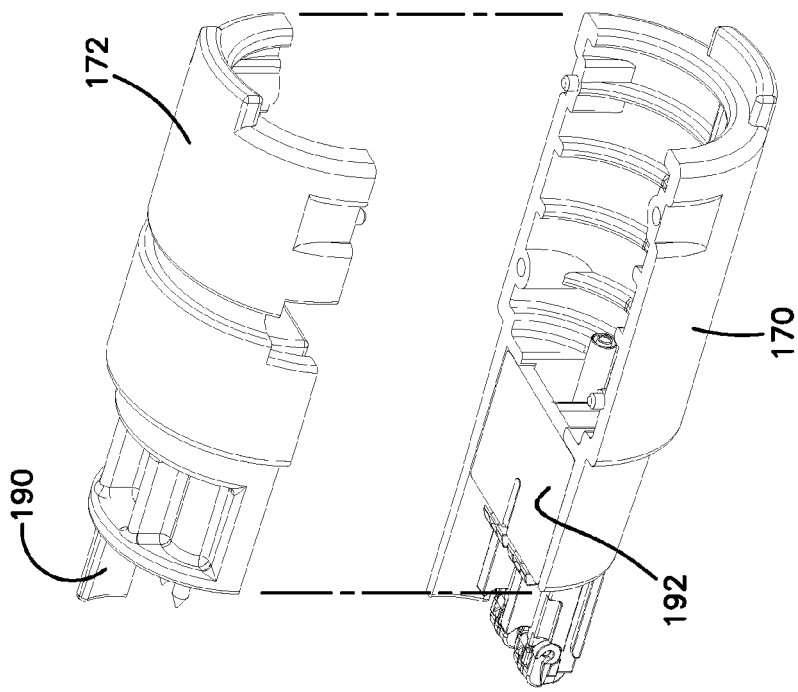

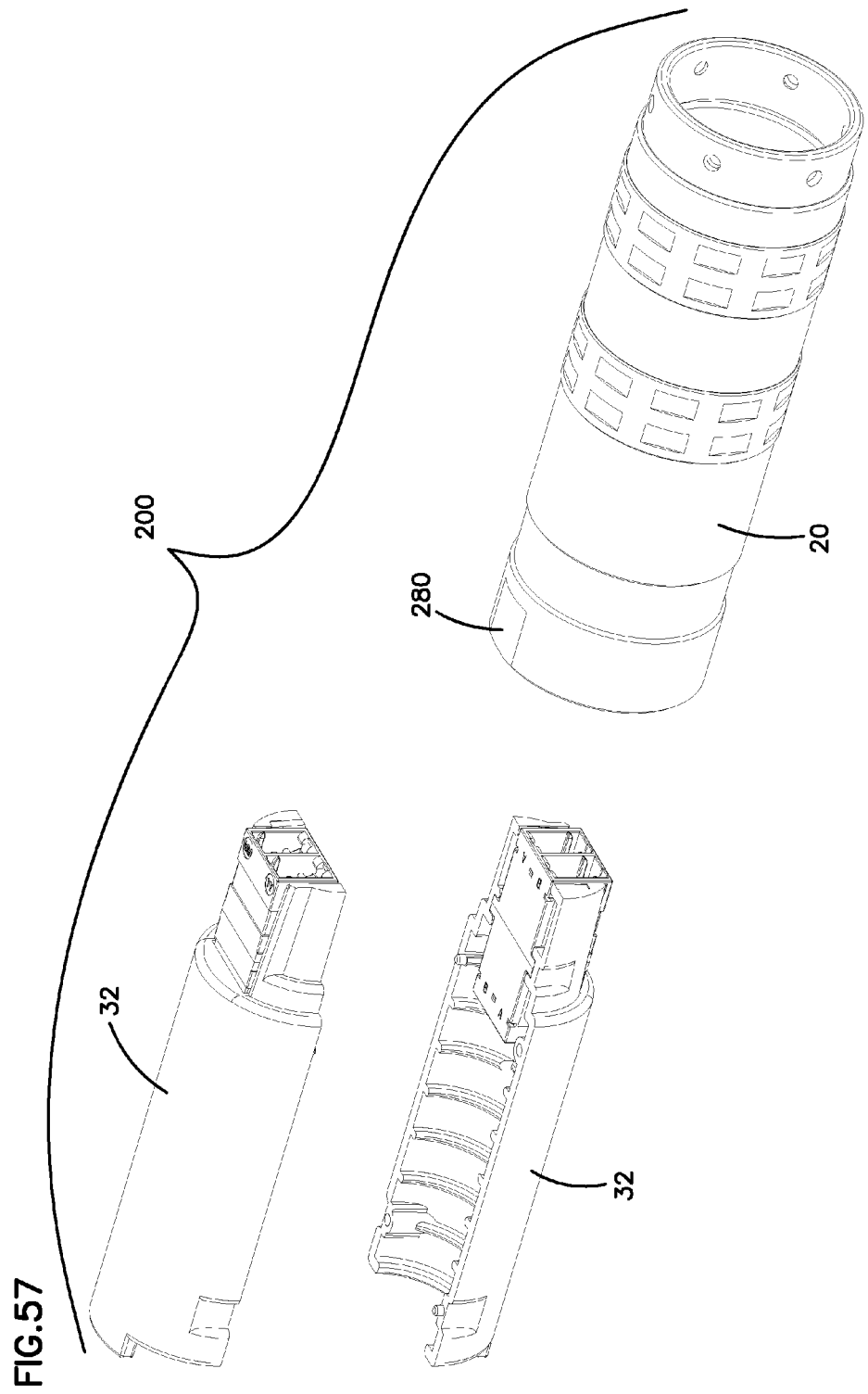

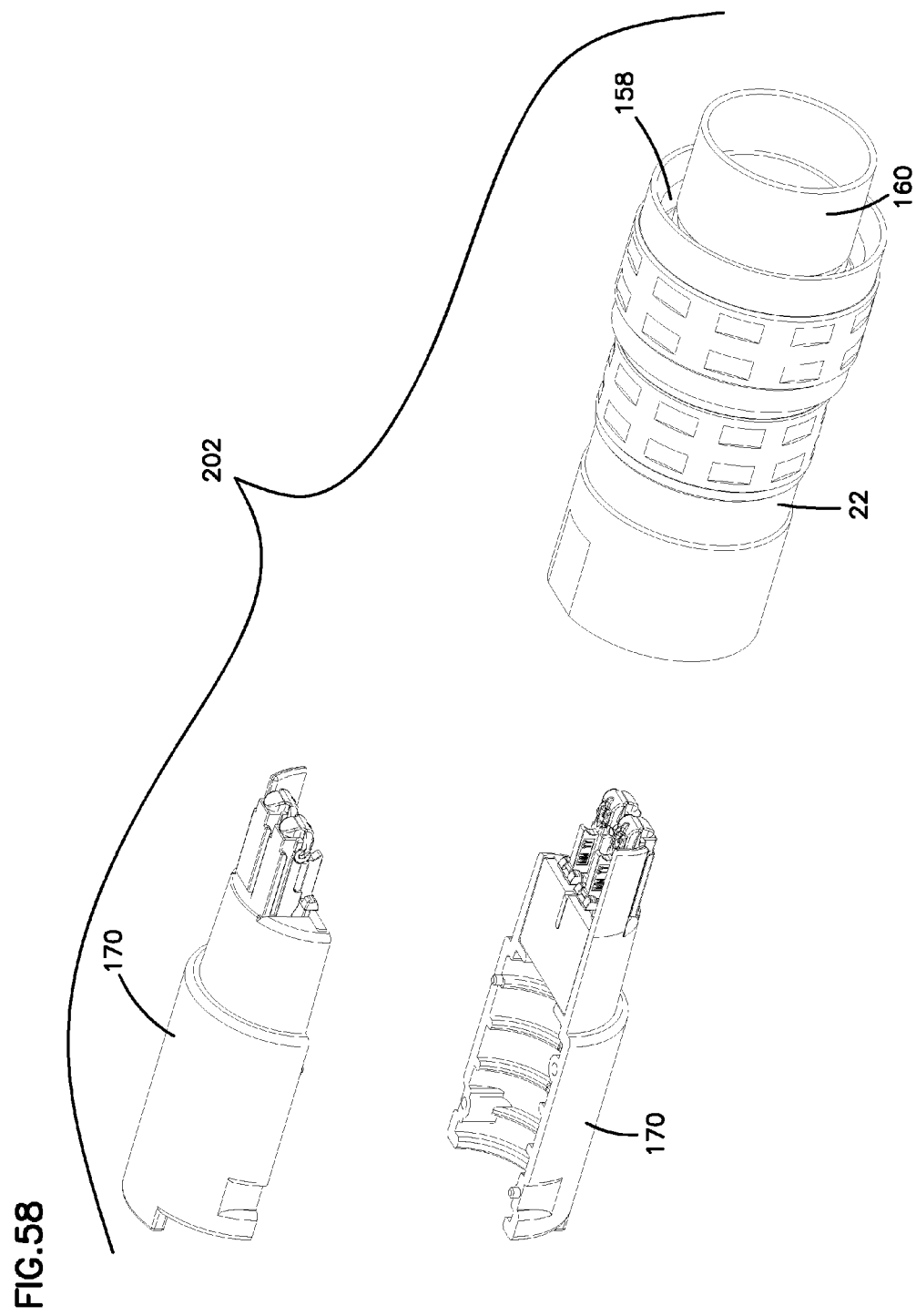

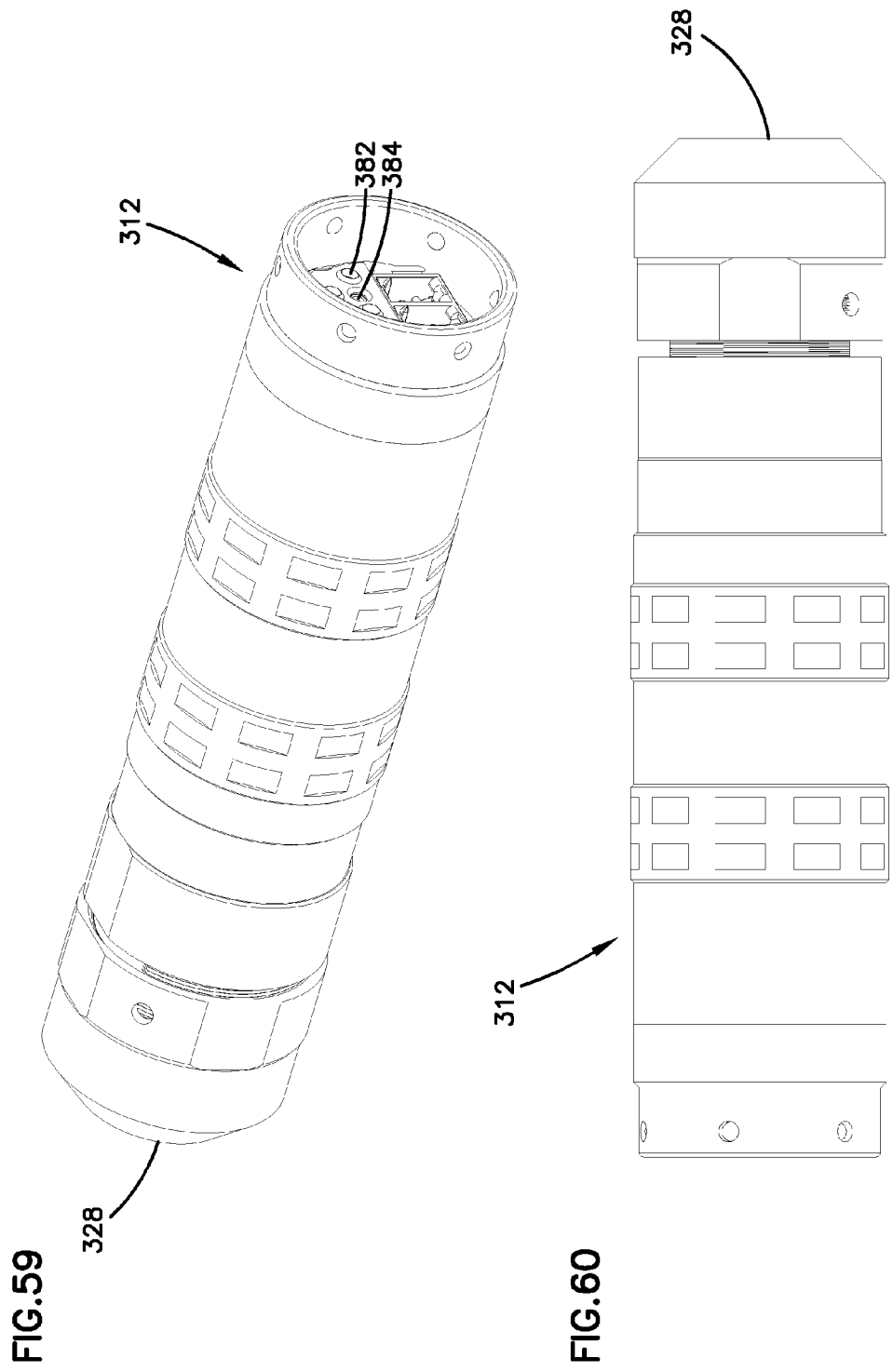

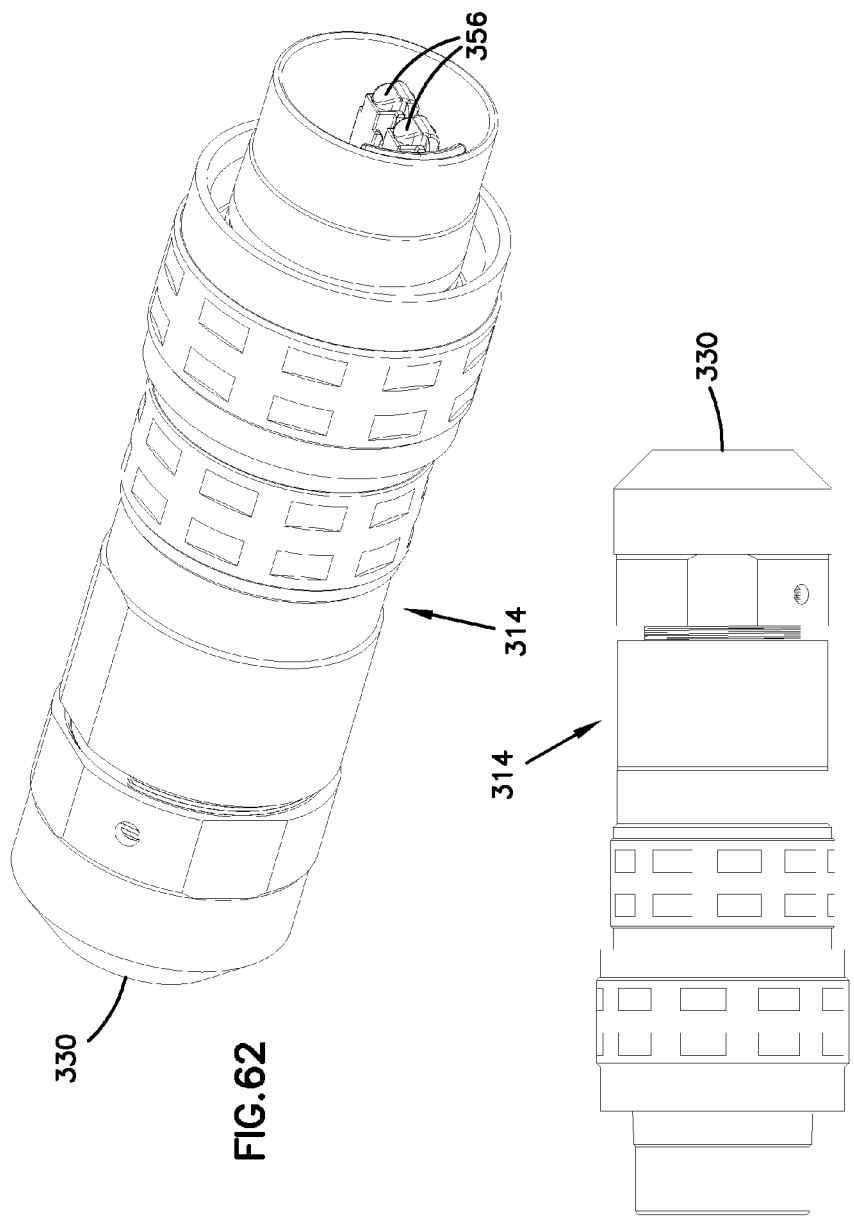

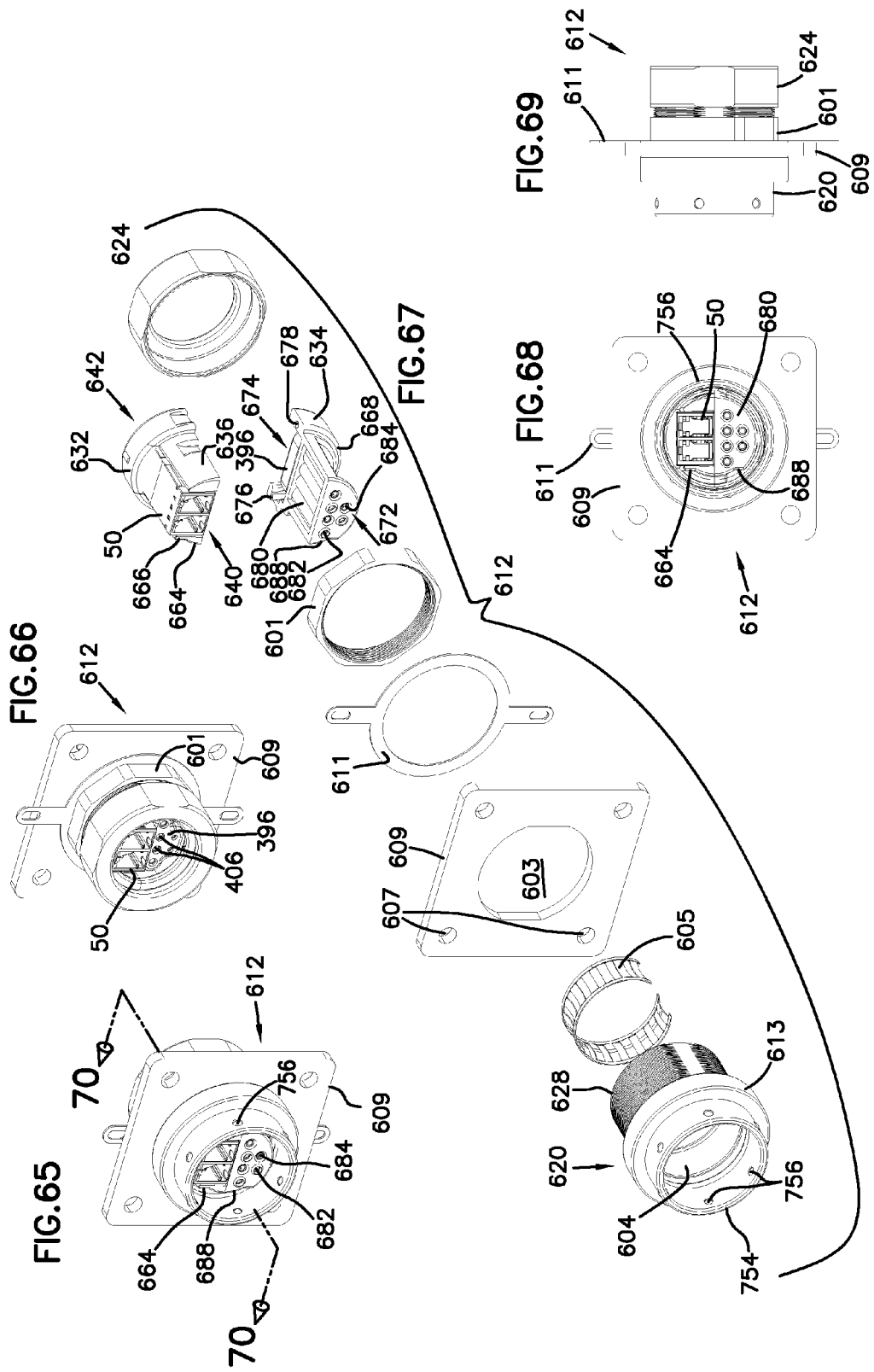

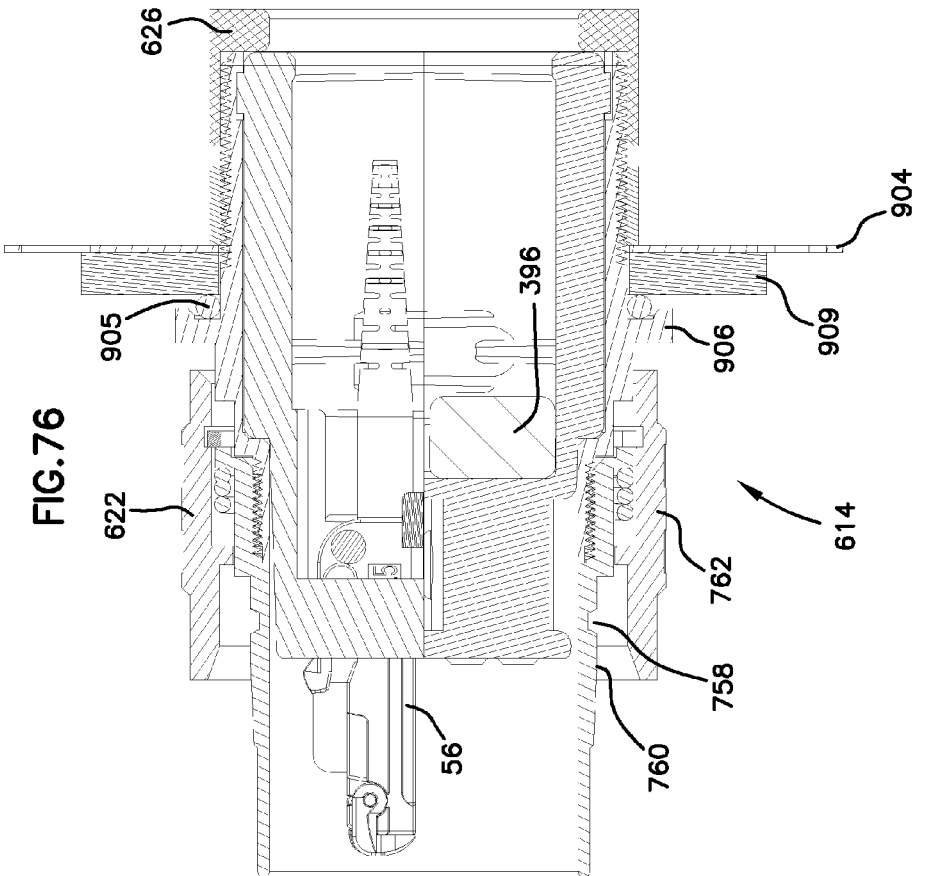
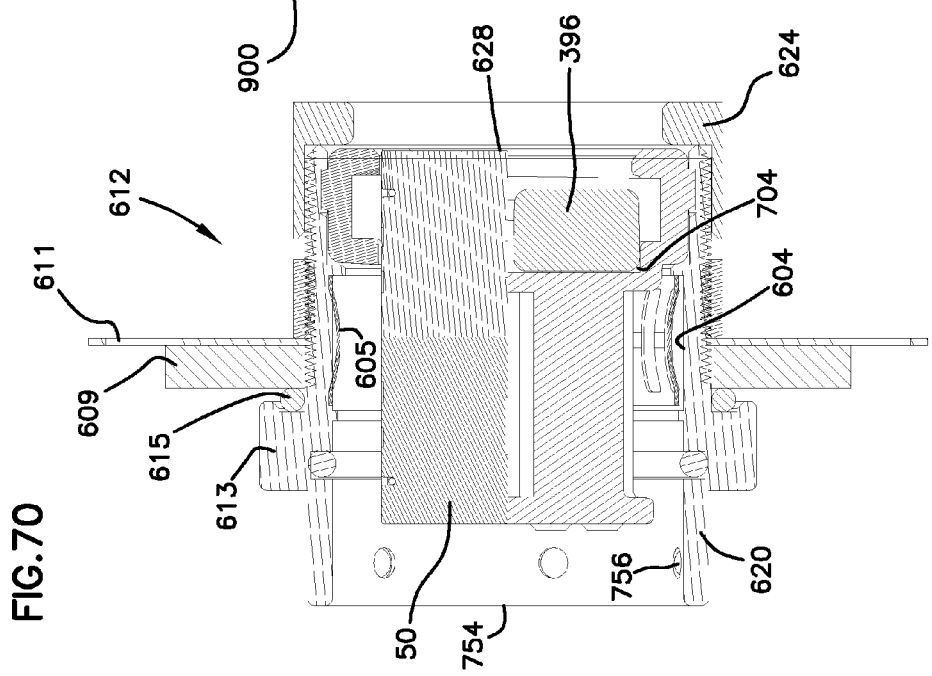

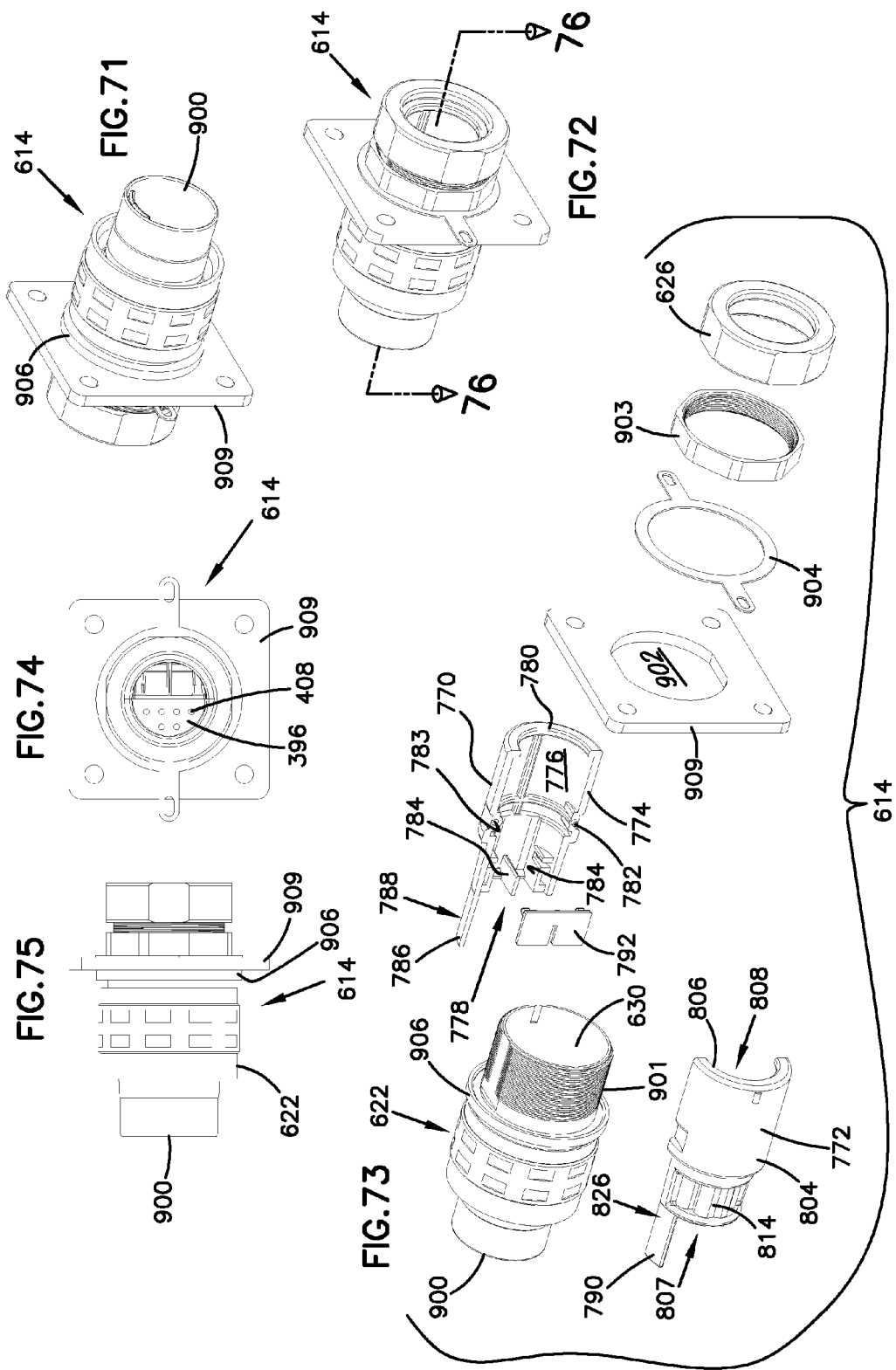

| RELATIVE TO KEY SLOT 'A' | | |
|---|---|---|
| PLUG FIBER POSITION | | |
| 1 | FIBER 1 | BLUE |
| 2 | FIBER 2 | YELLOW |
| 3 | FIBER 3 | BLUE |
| 4 | FIBER 4 | YELOW |

| RELATIVE TO KEY SLOT 'A' | | |
|---|---|---|
| JACK FIBER POSITION | | |
| 1 | FIBER 1 | BLUE |
| 2 | FIBER 2 | YELLOW |
| 3 | FIBER 3 | BLUE |
| 4 | FIBER 4 | YELLOW |

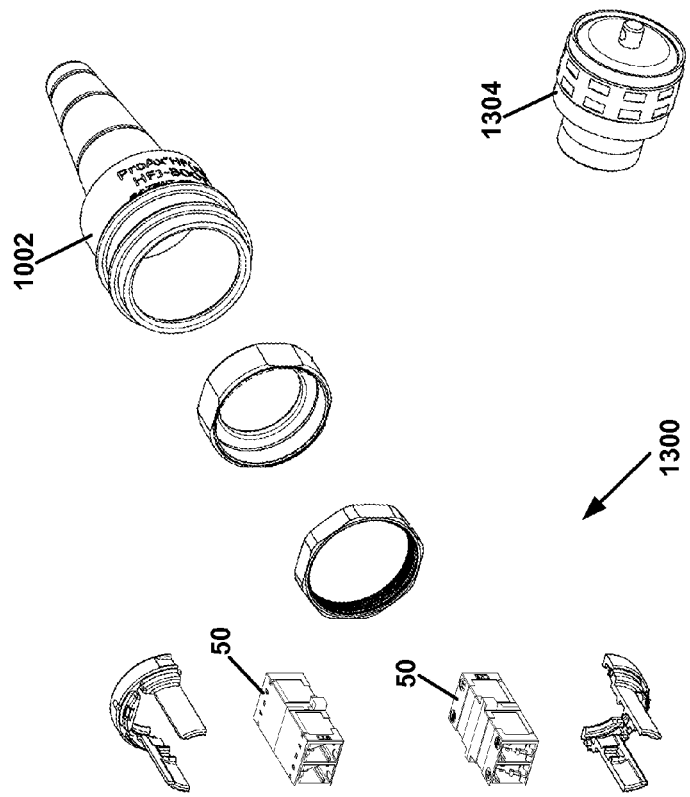
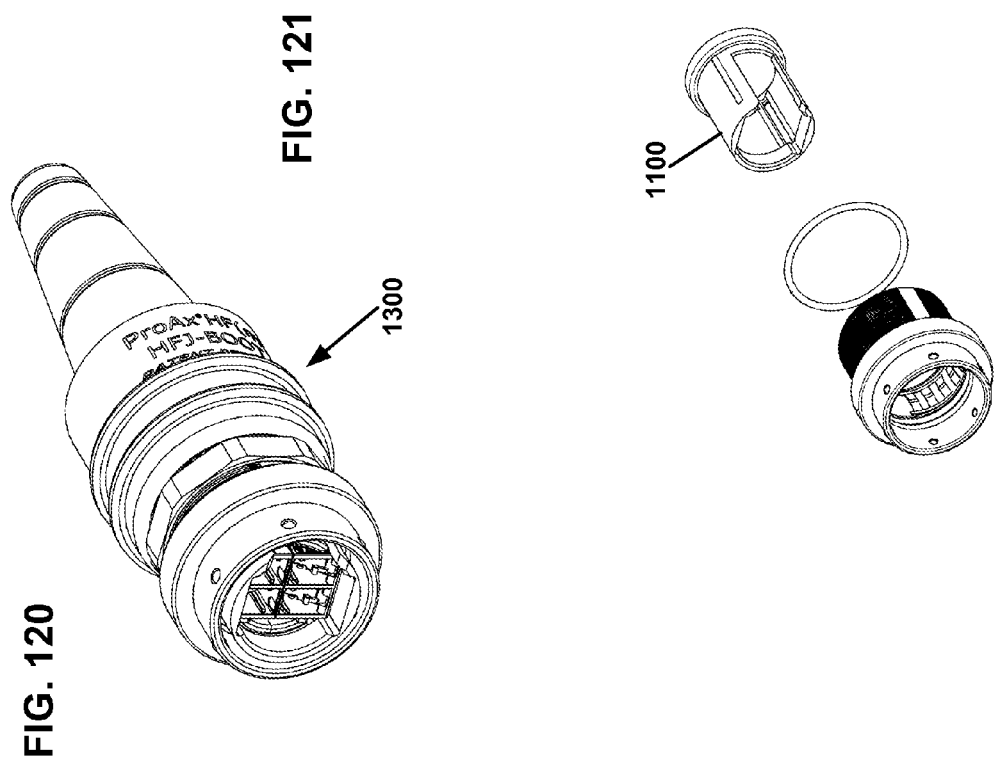
FIG. 121
FIG. 120

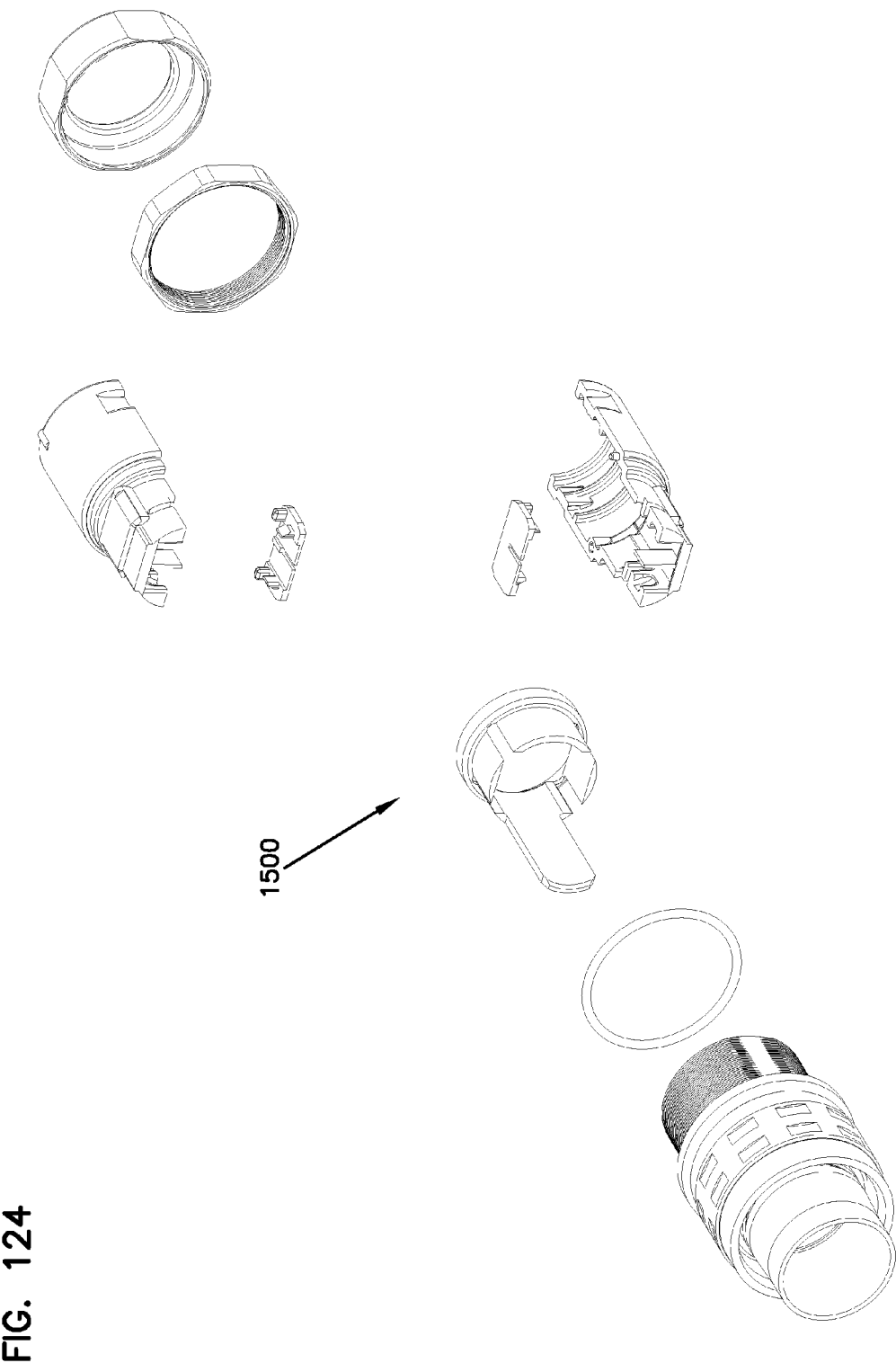

HYBRID FIBER/COPPER CONNECTOR SYSTEM AND METHOD

CROSS REFERENCE TO RELATED APPLICATION(S)

This application claims priority to provisional application Ser. No. 61/005,107, filed Nov. 30, 2007 and provisional application Ser. No. 61/044,370, filed Apr. 11, 2008, which applications are incorporated herein by reference in their entireties. This application is also related to non-provisional application Ser. No. 11/606,793, filed Nov. 29, 2006 and non-provisional application Ser. No. 11/787,197, filed Apr. 13, 2007, which applications are also incorporated herein by reference in their entireties.

TECHNICAL FIELD

The present invention relates generally to connectors for communications cable. More specifically, the present invention relates to hybrid fiber/copper connector systems and methods.

BACKGROUND

It is known to provide portable cameras and other data or image gathering devices with cable to provide power to the device and to carry data to and from the device. As these devices have increased in image or data gathering capacity, greater demand for bandwidth to carry data to and from the devices has arisen. One way of providing this increased bandwidth is to use optical fiber for carrying data to and from the devices.

However, optical fiber may not be able to provide an adequate power supply for the devices, so it is still desirable to have copper or other metallic wires extending to the devices. Hybrid cables including both copper wires and optical fiber within a single cable have been used to meet the power and data transfer needs of these devices. Since the techniques and devices for terminating and connectorizing copper and fiber cables are quite different, new connectors or methods of connecting such hybrid cables to each have been developed. These known connectors do allow interconnection of cables and devices but require that the entire connector be replaced if any one element of the cable or connector are damaged. Common hybrid cables may include two or more optical fibers and one or more pairs of copper wires. If any of these wires or optical fibers, or the termination of these wires or optical fibers are damaged, the entire connector must be replaced and all of the wires and fibers re-terminated.

Improvements to hybrid connectors are desirable.

SUMMARY

The present invention relates generally to a hybrid fiber/copper connector assembly. The present invention also relates to a hybrid fiber/copper connector assembly which permits repair of damaged fibers or copper conductors carried by a hybrid cable without requiring replacement of the entire hybrid fiber/copper connector assembly or the cable. The present invention also relates to connectors for hybrid fiber/copper cables. The present invention further relates to a method of repairing a hybrid fiber/copper cable and connector.

Another aspect of the present invention relates to a hybrid fiber/copper connector assembly provided in the form of a kit that allows conversion of a hybrid fiber/copper connector from one gender to a different gender.

Another aspect of the present invention relates to a hybrid fiber/copper connector assembly that allows the hybrid fiber/copper connectors of the assembly to be converted from being hybrid connectors to being only fiber connectors or only copper connectors.

Another aspect of the present invention relates to a hybrid fiber/copper connector assembly that includes fiber connectors that may either be terminated at the factory by fusion-splicing or field terminable/repairable by chemical-splicing.

Another aspect of the present invention relates to a hybrid fiber/copper connector assembly or a quad fiber optic connector assembly that utilizes different removable keying members for each of the connectors for proper keying and mating.

BRIEF DESCRIPTION OF THE DRAWINGS

The accompanying drawings, which are incorporated in and constitute a part of the specification, illustrate several aspects of the present invention and together with the description, serve to explain the principles of the invention. A brief description of the drawings is as follows:

FIG. 1 is a perspective view of a hybrid fiber/copper connector assembly having features that are examples of inventive aspects in accordance with the principles of the present disclosure, the hybrid fiber/copper connector assembly shown in a fully assembled configuration;

FIG. 2 is a cross-sectional view taken along line 2-2 of FIG. 1;

FIG. 3 is an exploded perspective view of the hybrid fiber/copper connector assembly of FIG. 1;

FIG. 4 is an exploded perspective view of the first hybrid fiber/copper connector of the hybrid fiber/copper connector assembly of FIGS. 1-3;

FIG. 6 is a top view of the first inner housing half of FIG. 5;

FIG. 7 is a bottom view of the first inner housing half of FIG. 5;

FIG. 8 is a side view of the first inner housing half of FIG. 5;

FIG. 9 is a rear end view of the first inner housing half of FIG. 5;

FIG. 11 is a perspective view of the second inner housing half of the first hybrid fiber/copper connector of FIG. 4;

FIG. 12 is a side view of the second inner housing half of FIG. 11;

FIG. 13 is a bottom view of the second inner housing half of FIG. 11;

FIG. 14 is a rear end view of the second inner housing half of FIG. 11;

FIG. 15 is a cross-sectional view of the second inner housing half taken along line 15-15 of FIG. 14;

FIG. 16 is a perspective view of the conductor mount of the first hybrid fiber/copper connector of FIG. 4, the conductor mount configured to be placed within the second inner housing half of FIG. 11;

FIG. 17 is a front view of the conductor mount of FIG. 16;

FIG. 18 is a side view of the conductor mount of FIG. 16 shown with the electrical conductors removed;

FIG. 19 is a perspective view of the conductor mount retainer of the first hybrid fiber/copper connector of FIG. 4, the conductor mount retainer configured to be placed within the second inner housing half of FIG. 11;

FIG. 20 is a top view of the conductor mount retainer of FIG. 19;

FIG. 21 is a bottom view of the conductor mount retainer of FIG. 19;

FIG. 22 is a side view of the conductor mount retainer of FIG. 19;

FIG. 23 is a rear end view of the conductor mount retainer of FIG. 19;

FIG. 24 is a perspective view of the strength member clamp of the first hybrid fiber/copper connector of FIG. 4, the strength member clamp configured to be placed within the second inner housing half of FIG. 11;

FIG. 25 is a top view of the strength member clamp of FIG. 24;

FIG. 26 is a front end view of the strength member clamp of FIG. 24;

FIG. 27 is a side view of the strength member clamp of FIG. 24;

FIG. 28 illustrates a top perspective view of the first inner housing half and the second inner housing half of the first hybrid fiber/copper connector of FIG. 4 in a partially assembled configuration, the first inner housing half and the second inner housing half configured to be removably mounted together to form an inner connector assembly of the first hybrid fiber/copper connector of FIG. 4;

FIG. 52 illustrates a top perspective view of the first inner housing half and the second inner housing half of the second hybrid fiber/copper connector of FIG. 33 in a partially assembled configuration, the first inner housing half and the second inner housing half configured to be removably mounted together to form an inner connector assembly of the second hybrid fiber/copper connector of FIG. 33;

FIG. 53 illustrates a bottom perspective view of the first inner housing half and the second inner housing half of the second hybrid fiber/copper connector of FIG. 33 in a partially assembled configuration;

FIG. 57 illustrates a first quad fiber connector to be assembled by mounting together two of the first inner housing halves of FIG. 5;

FIG. 58 illustrates a second quad fiber connector to be assembled by mounting together two of the first inner housing halves of FIG. 34, the second quad fiber connector configured to mate with the first quad fiber connector of FIG. 57;

FIG. 59 is a perspective view of a second embodiment of a first hybrid fiber/copper connector that is configured to be a part of an assembly similar to the hybrid fiber/copper connector assembly of FIGS. 1-3;

FIG. 60 is a side view of the second embodiment of the first hybrid fiber/copper connector of FIG. 59;

FIG. 62 is a perspective view of a second embodiment of a second hybrid fiber/copper connector that is configured to mate with the second embodiment of the first hybrid fiber/copper connector of FIGS. 59-61 to form an assembly similar to the hybrid fiber/copper connector assembly of FIGS. 1-3;

FIG. 63 is a side view of the second embodiment of the second hybrid fiber/copper connector of FIG. 62;

FIG. 65 is a front perspective view of a bulkhead female hybrid fiber/copper connector having features that are examples of inventive aspects in accordance with the principles of the present disclosure;

FIG. 66 is a rear perspective view of the bulkhead female hybrid fiber/copper connector of FIG. 65;

FIG. 67 is an exploded perspective view of the bulkhead female hybrid fiber/copper connector of FIG. 65;

FIG. 68 is a front view of the bulkhead female hybrid fiber/copper connector of FIG. 65;

FIG. 69 is a side view of the bulkhead female hybrid fiber/copper connector of FIG. 65;

FIG. 70 is a cross-sectional view taken along line 70-70 of FIG. 65;

FIG. 71 is a front perspective view of a bulkhead male hybrid fiber/copper connector having features that are examples of inventive aspects in accordance with the principles of the present disclosure;

FIG. 72 is a rear perspective view of the bulkhead male hybrid fiber/copper connector of FIG. 71;

FIG. 73 is an exploded perspective view of the bulkhead male hybrid fiber/copper connector of FIG. 71;

FIG. 74 is a rear view of the bulkhead male hybrid fiber/copper connector of FIG. 71;

FIG. 75 is a side view of the bulkhead male hybrid fiber/copper connector of FIG. 70;

FIG. 76 is a cross-sectional view taken along line 76-76 of FIG. 72;

FIG. 112 is a perspective view of an O-ring configured to be placed around a cable to be terminated to the endcap of FIGS. 109-110;

FIG. 113 is a perspective view of a washer configured to be placed after the O-ring of FIG. 112 on the cable in the termination assembly;

FIG. 114 is a perspective view of a collet configured to be crushed around the cable to terminate the cable to the endcap of FIGS. 109-110;

FIG. 115 is a perspective view of a braid spacer configured to be slid over the collet of FIG. 114 to crush the collet against the cable;

FIG. 116 is a perspective view of a first braid clamp half configured to form a braid clamp that pushes against the braid spacer within the interior of the endcap of FIGS. 109-110;

FIG. 117 is a perspective view of a second braid clamp half configured to mate with the first braid clamp half of FIG. 116 to form the braid clamp;

FIG. 118 is a perspective view of a strength member clamp bar configured for use with the third embodiment of the hybrid fiber/copper connectors or with the quad fiber connectors;

FIG. 119 is a perspective view of a strength member crimping structure in the form of a crimp ball for clamping a strength member of a cable to the strength member clamp bar shown in FIG. 118;

FIG. 120 is a front perspective view of a bulkhead female quad fiber connector having features that are examples of inventive aspects in accordance with the principles of the present disclosure;

FIG. 121 is an exploded perspective view of the bulkhead female quad fiber connector of FIG. 120;

FIG. 122 is a perspective view of the second inner housing half of a female hybrid fiber/copper connector having features similar to that of the hybrid connector of FIG. 78, the illustrated second inner housing half being of a female hybrid connector of the bulkhead type that is configured to be mounted to a panel with features similar to those shown in FIG. 121;

FIG. 123 is a perspective view of the second inner housing half of a male hybrid fiber/copper connector having features similar to that of the hybrid connector of FIG. 91, the illustrated second inner housing half being of a male hybrid connector of the bulkhead type that is configured to be mounted to a panel with features similar to those shown in FIG. 121;

Figure 125:
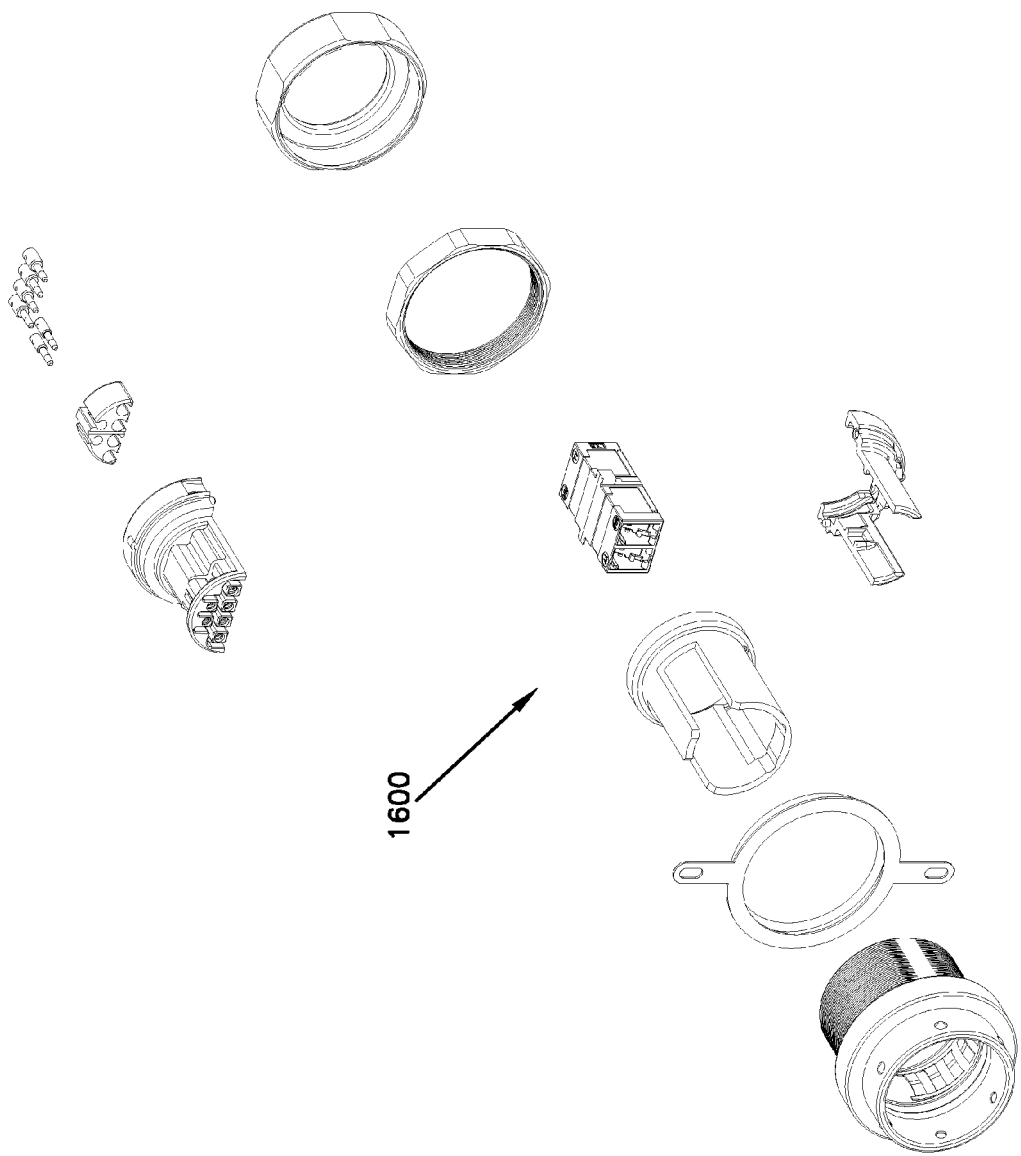
Figure 126:
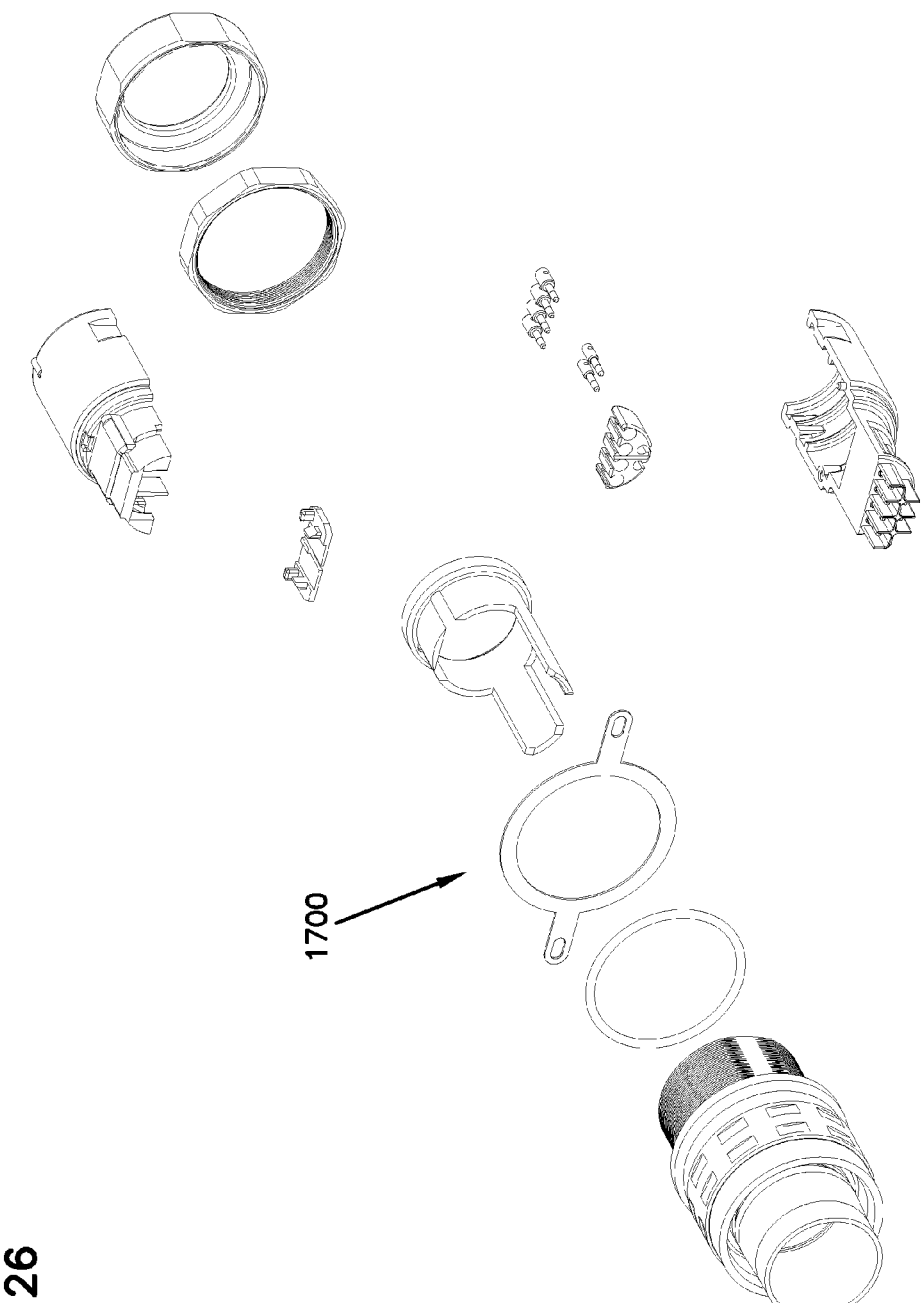
Figure 127:
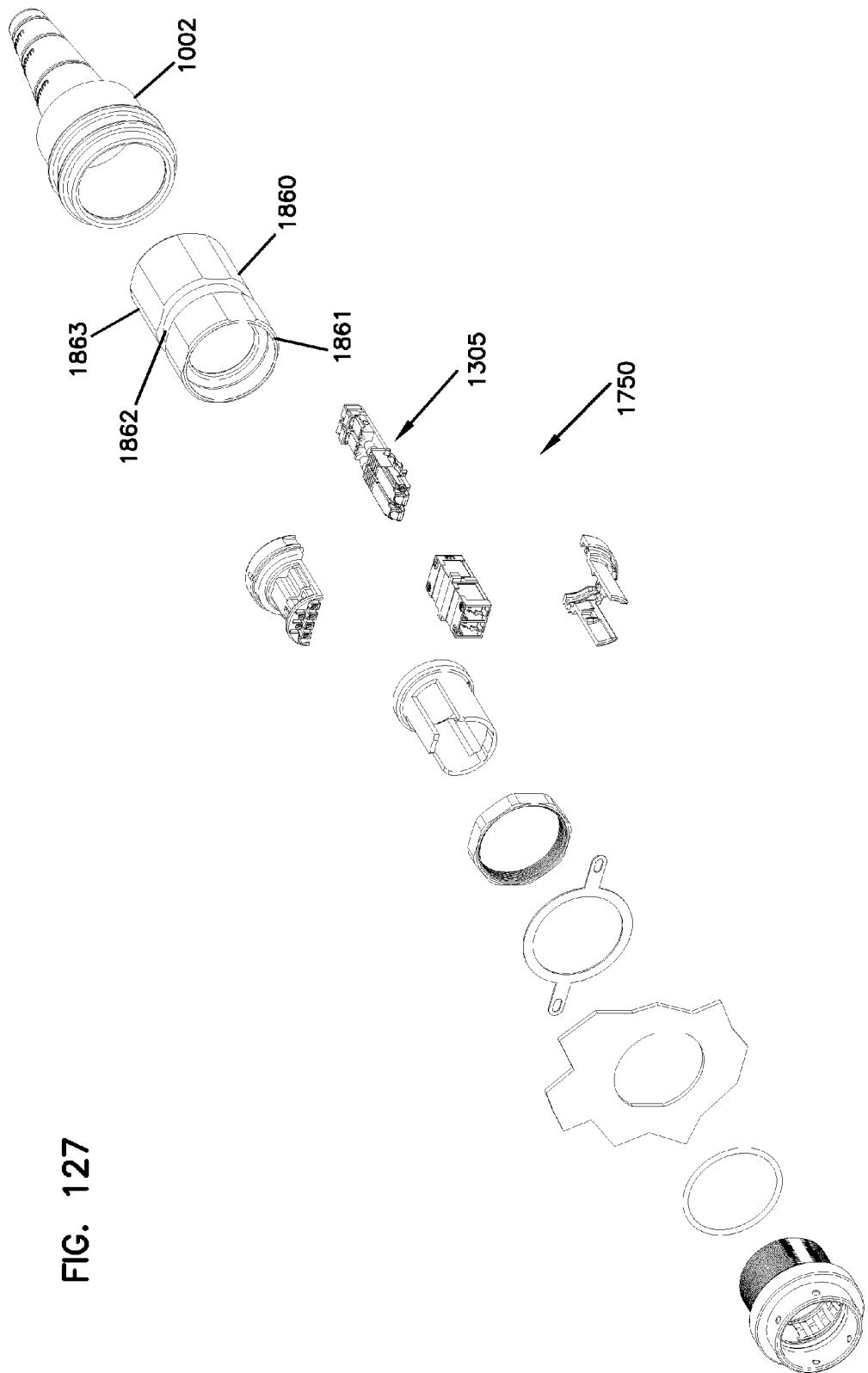
Figure 128:
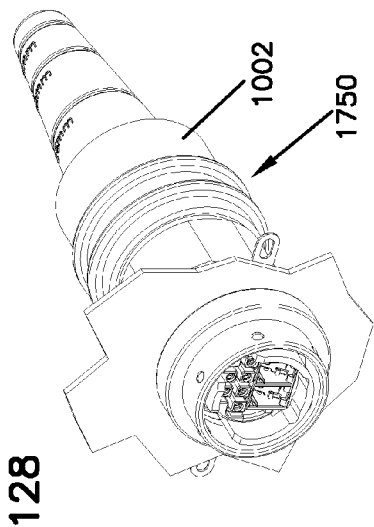
Figure 129:
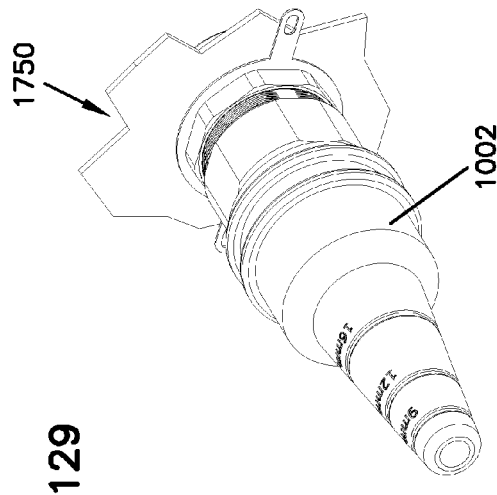
Figure 130:
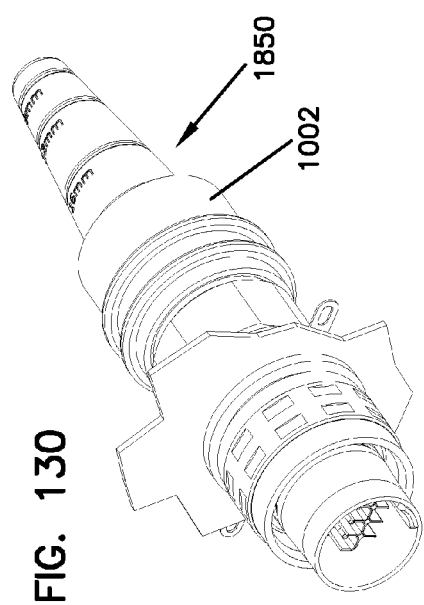
Figure 131:
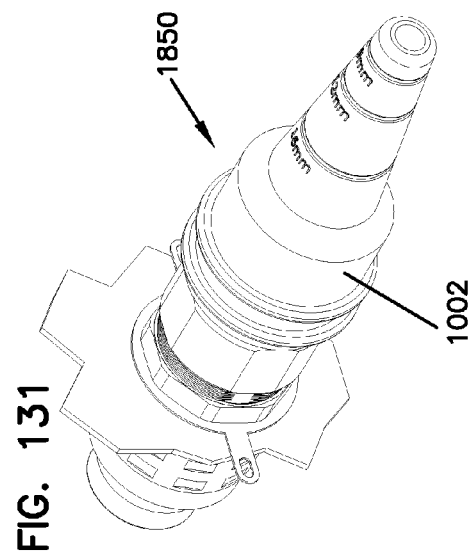
Figure 132:
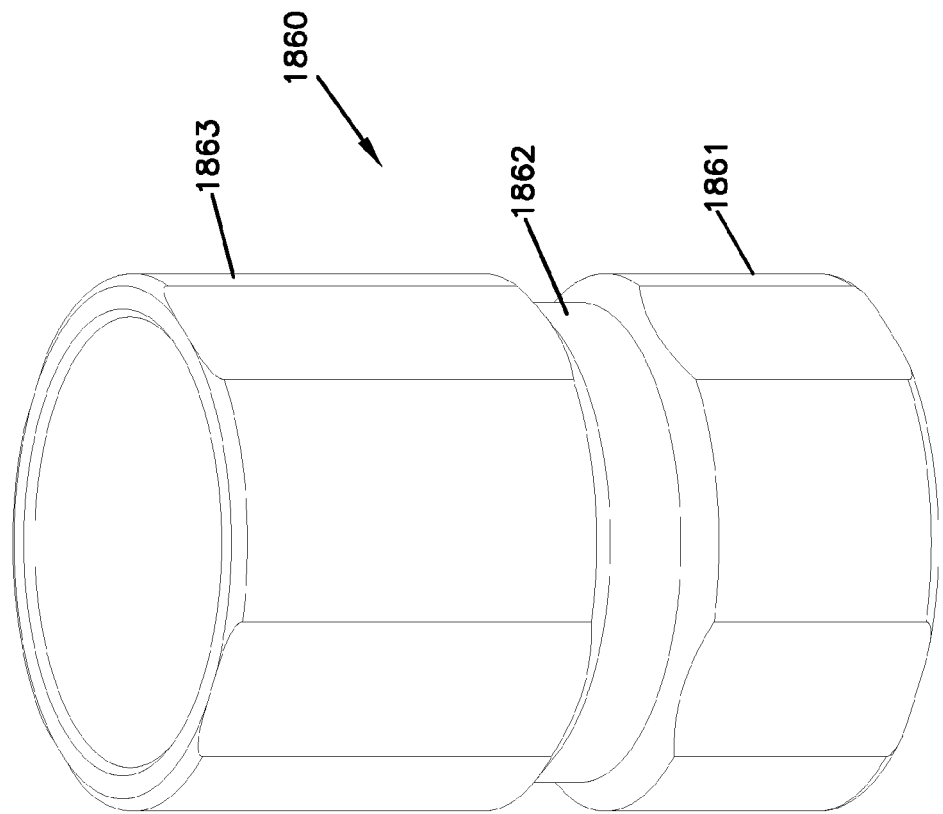
Figure 135:
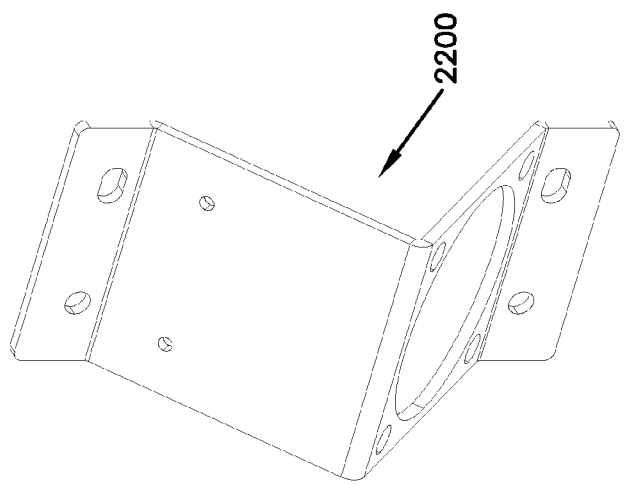
Figure 134:
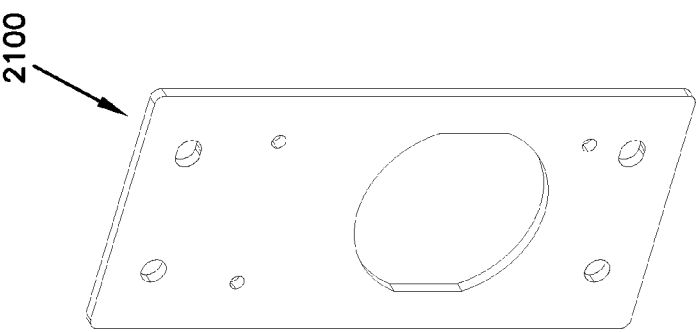
Figure 133:
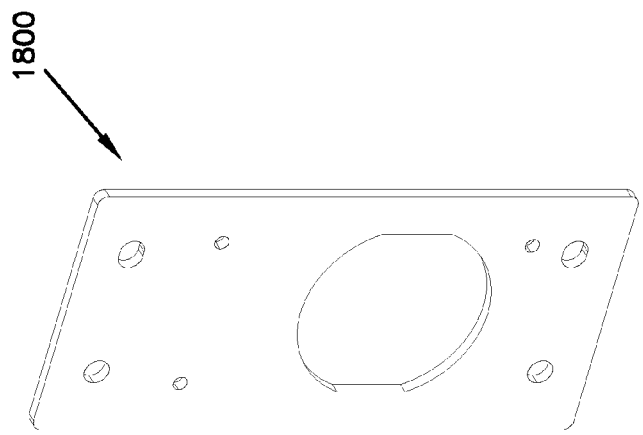
Figure 137:
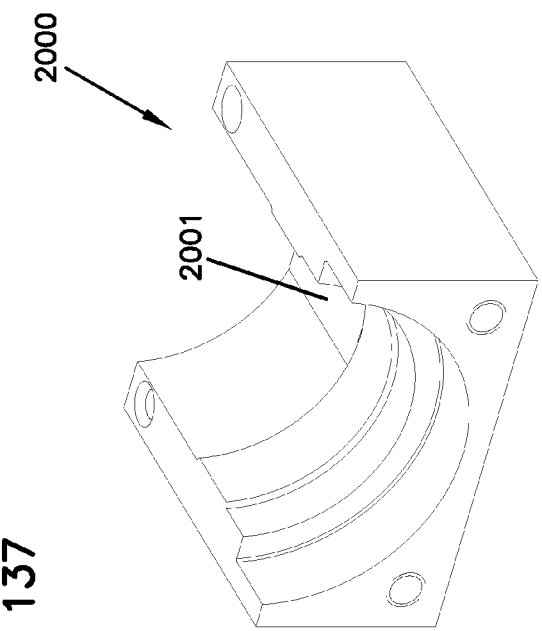
Figure 136:
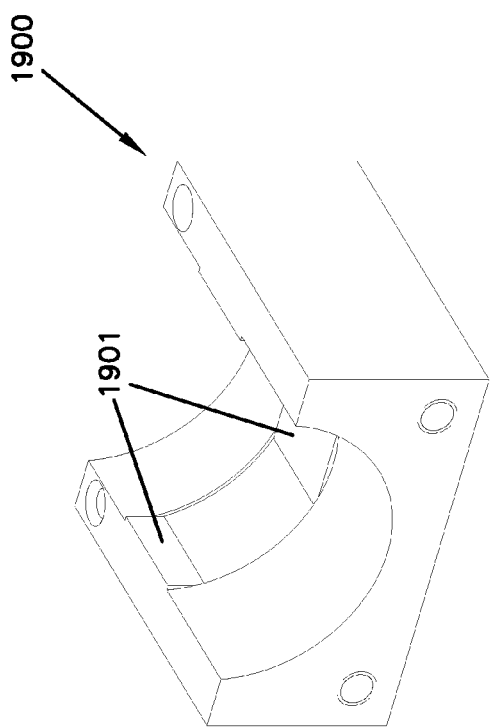
Figure 138:
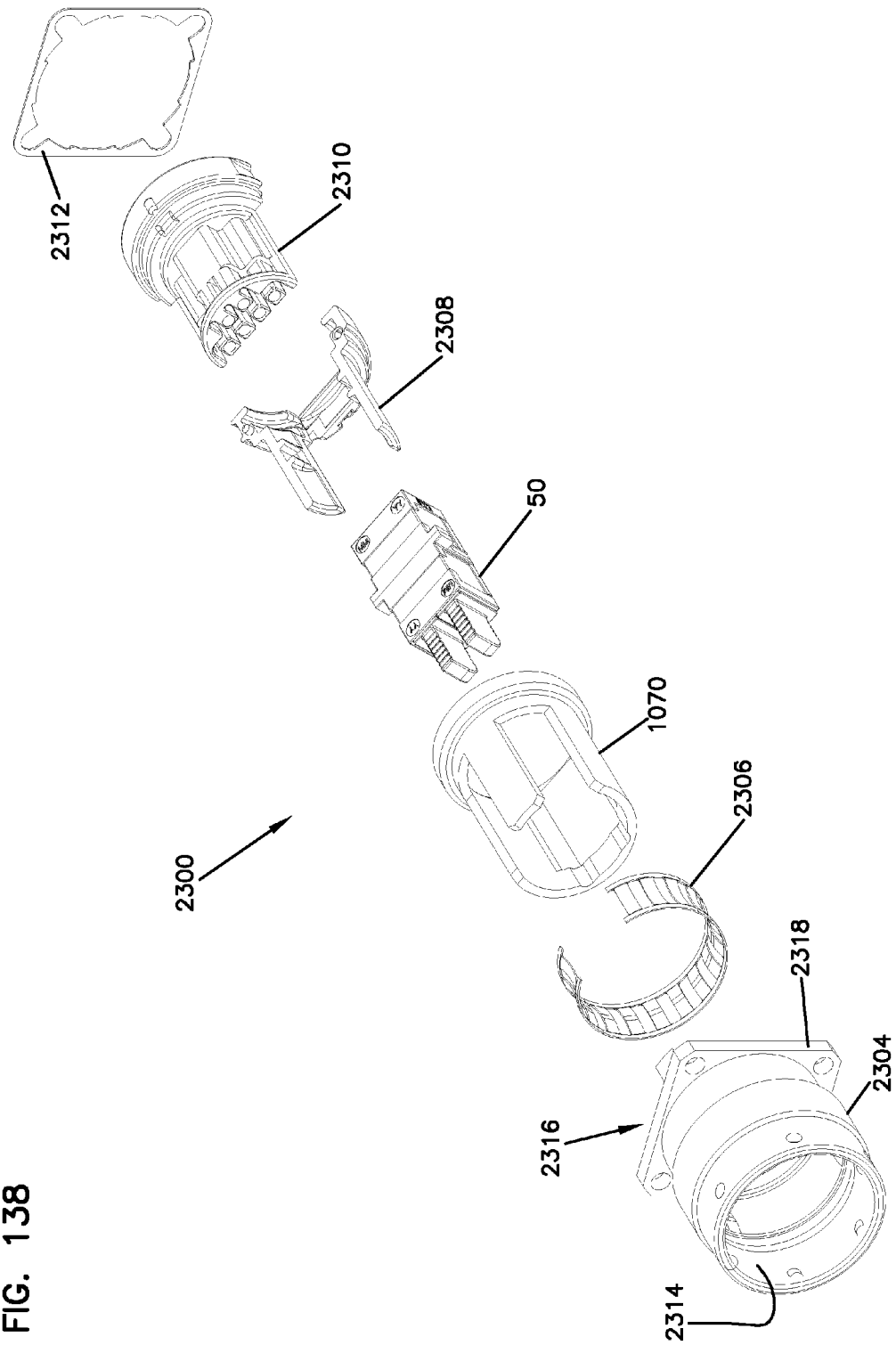
Figure 139:
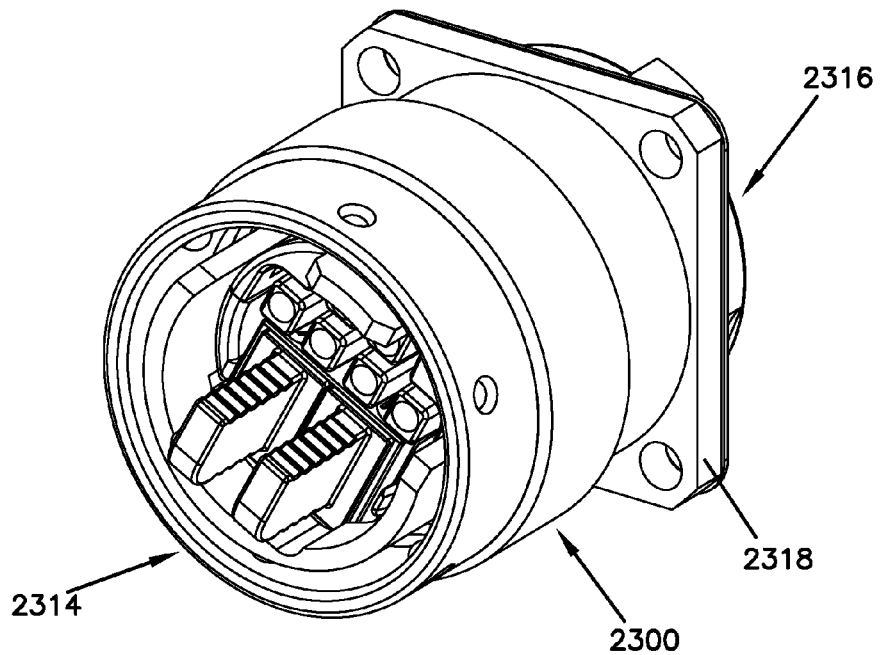
Figure 140:
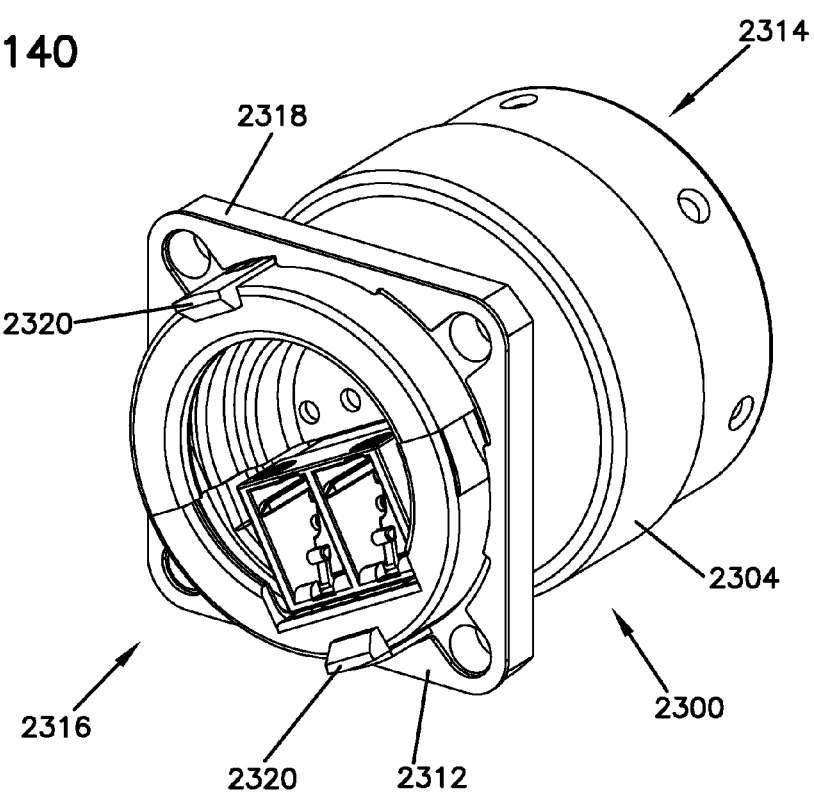
Figure 141:
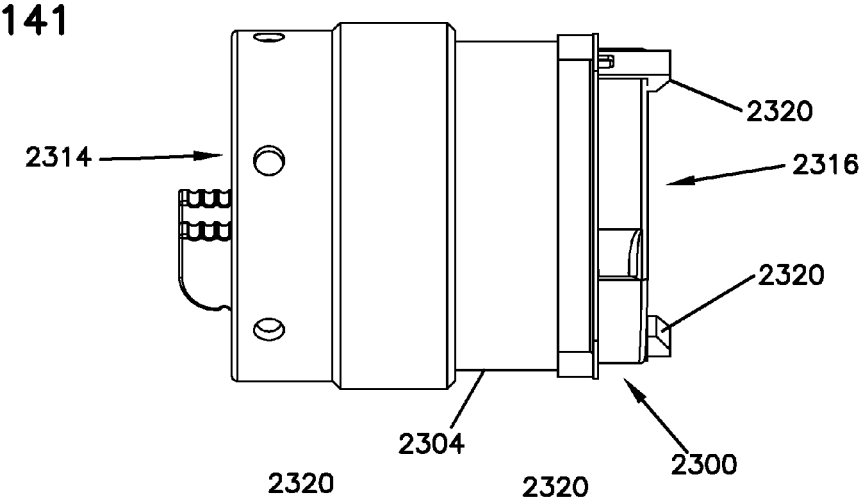
Figure 142:
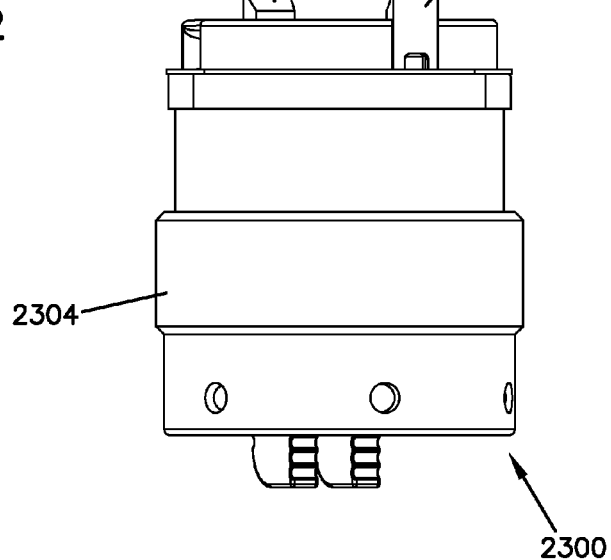
Figure 143:
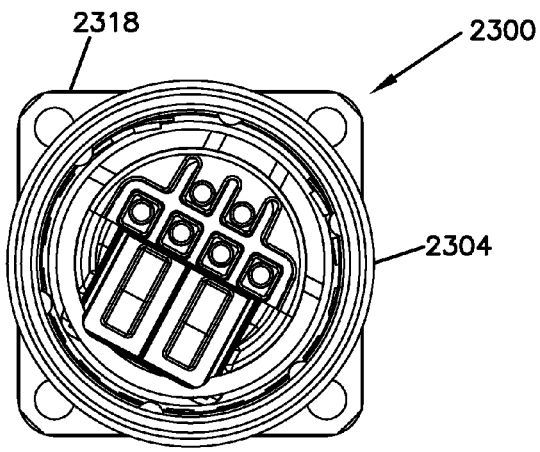
Figure 144:
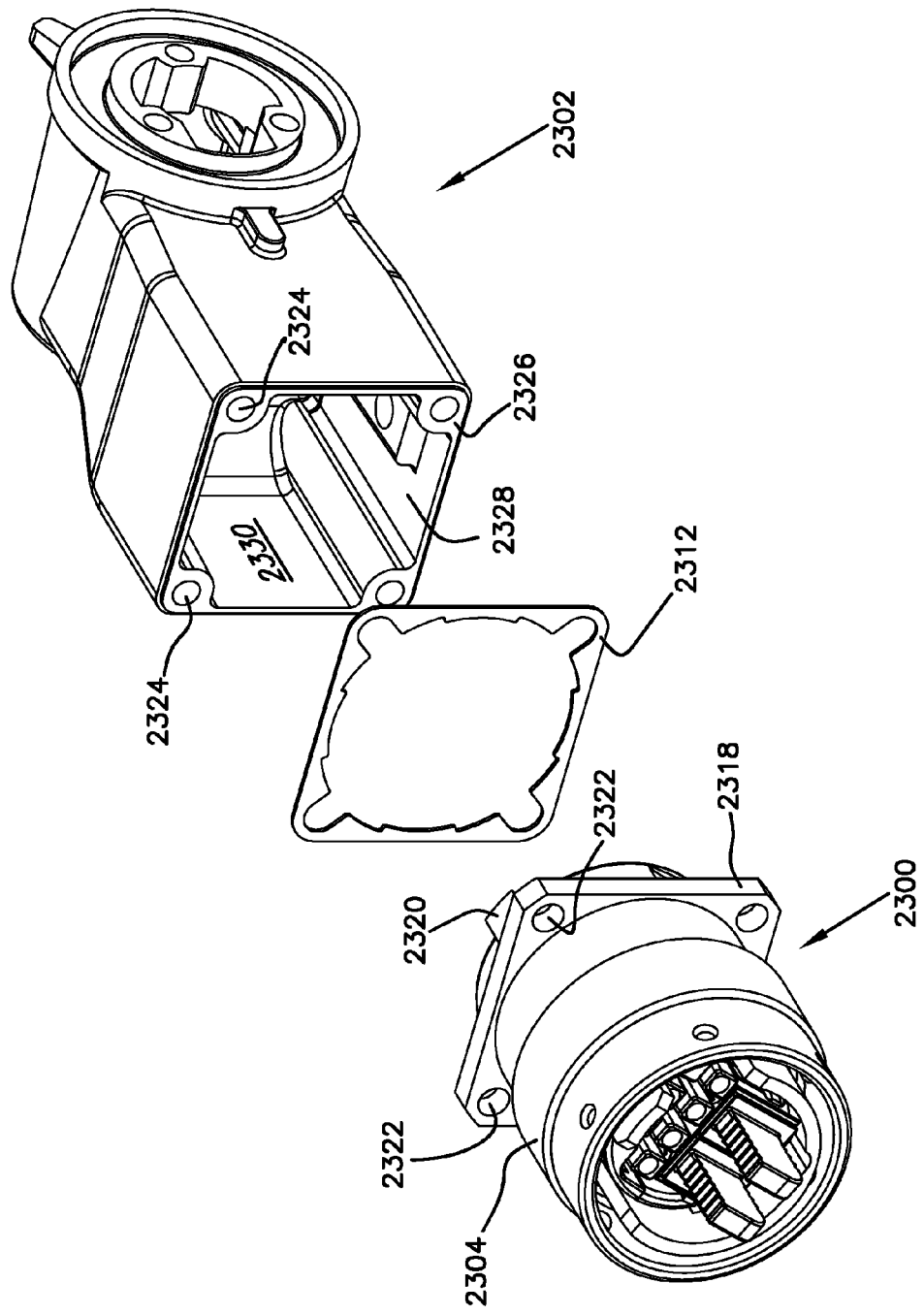
Figure 145:
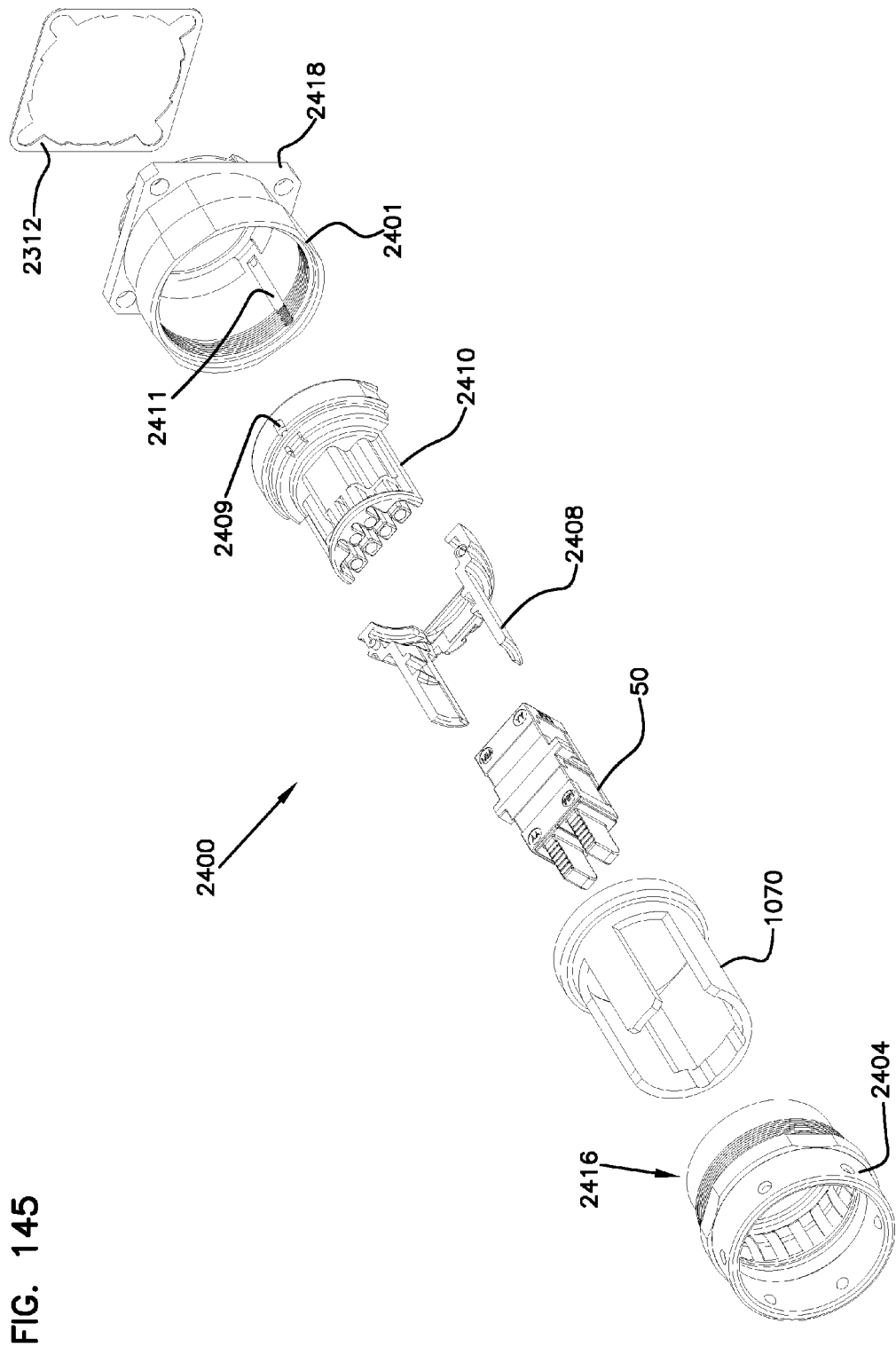
Figure 146:
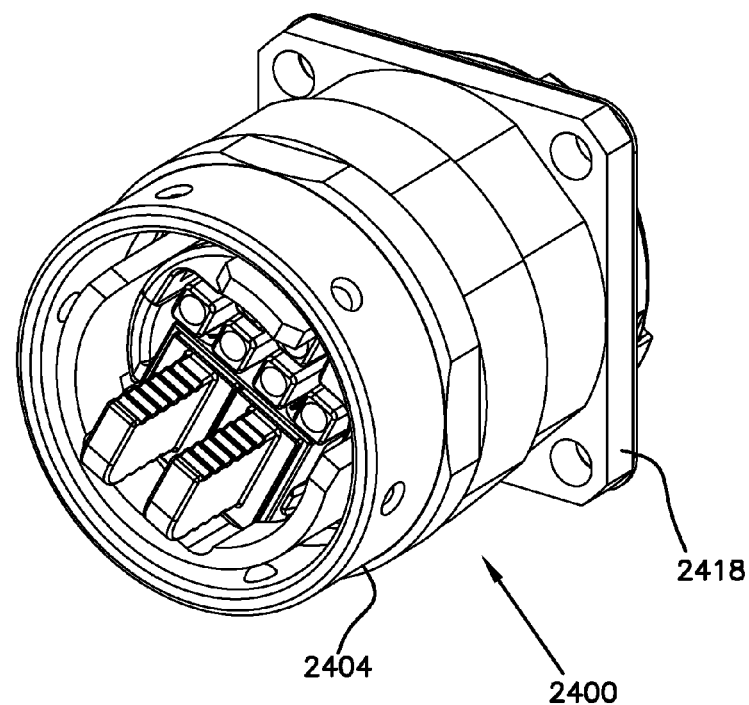
Figure 147:
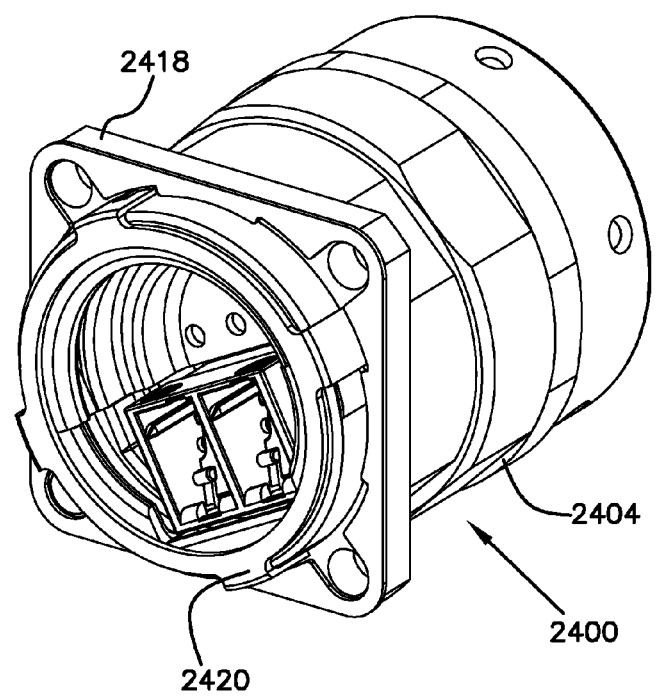
Figure 148:
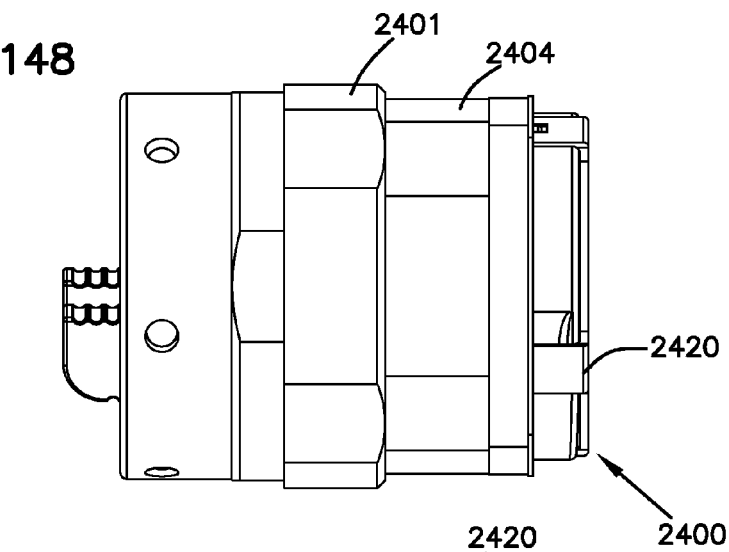
Figure 149:
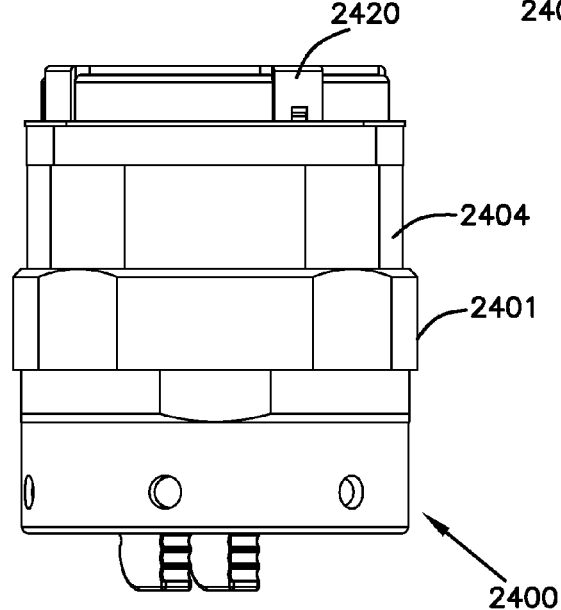
Figure 150:
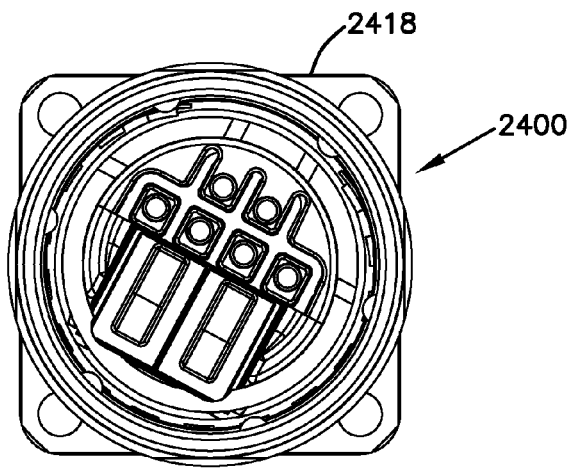
Figure 151:
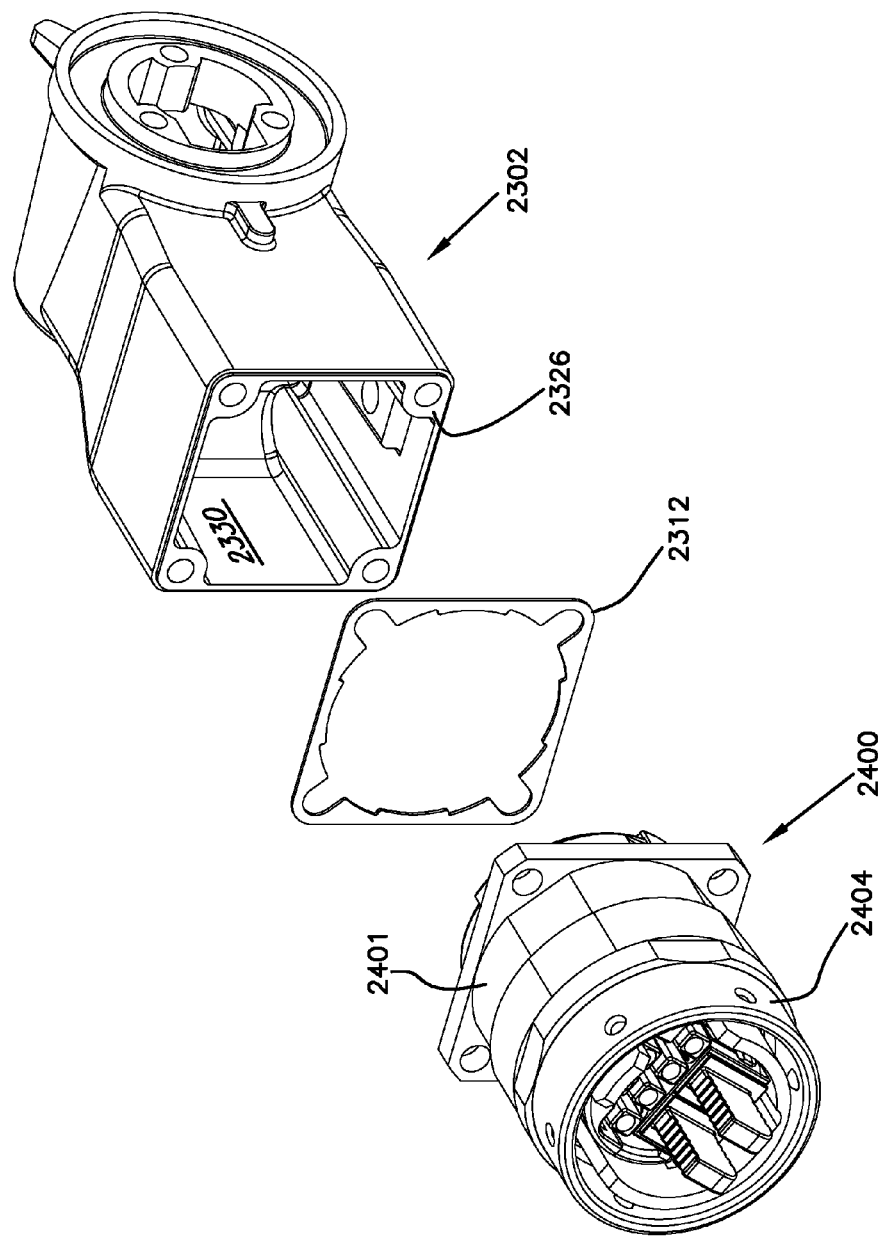
Figure 152:
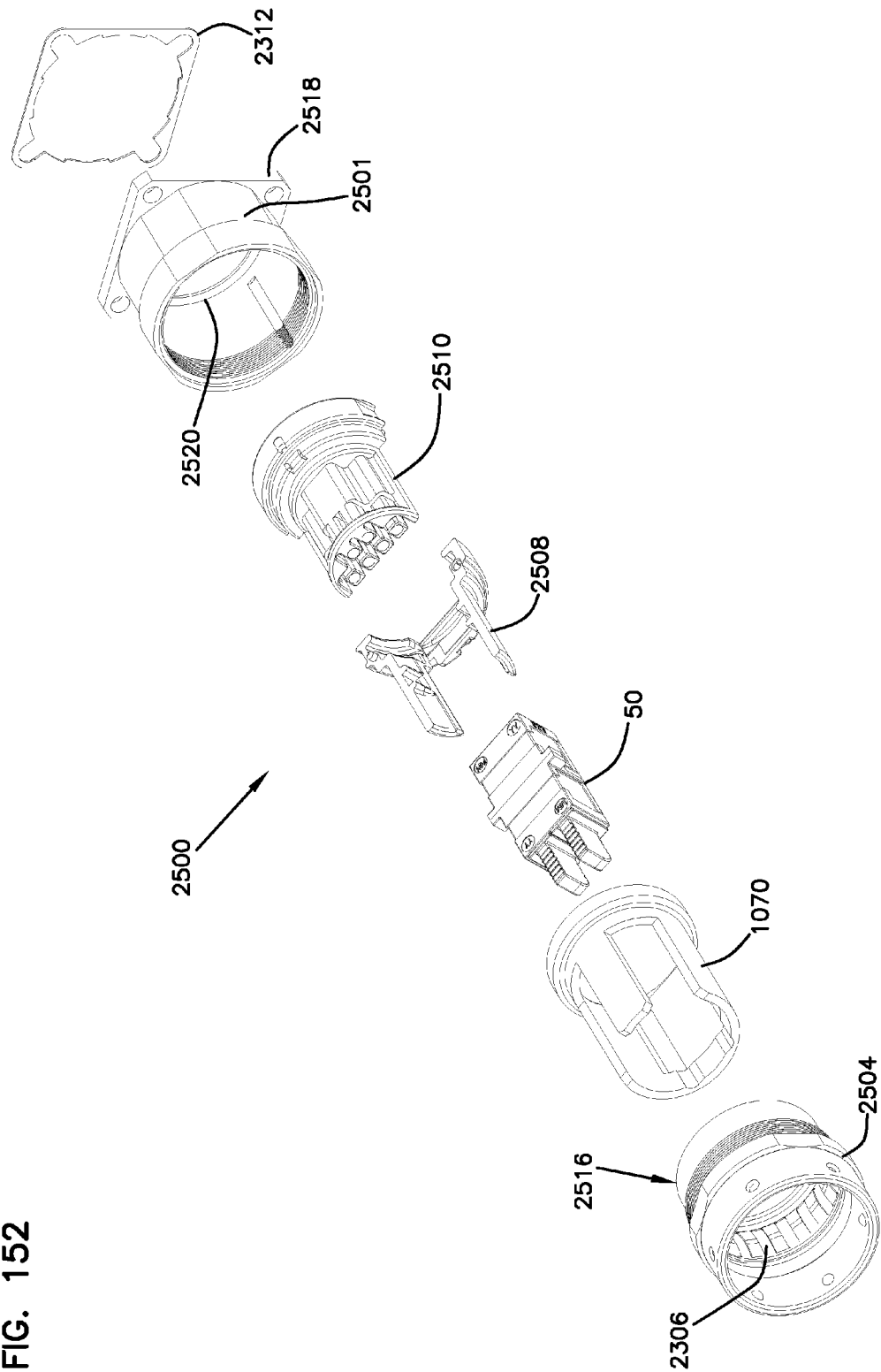
Figure 153:
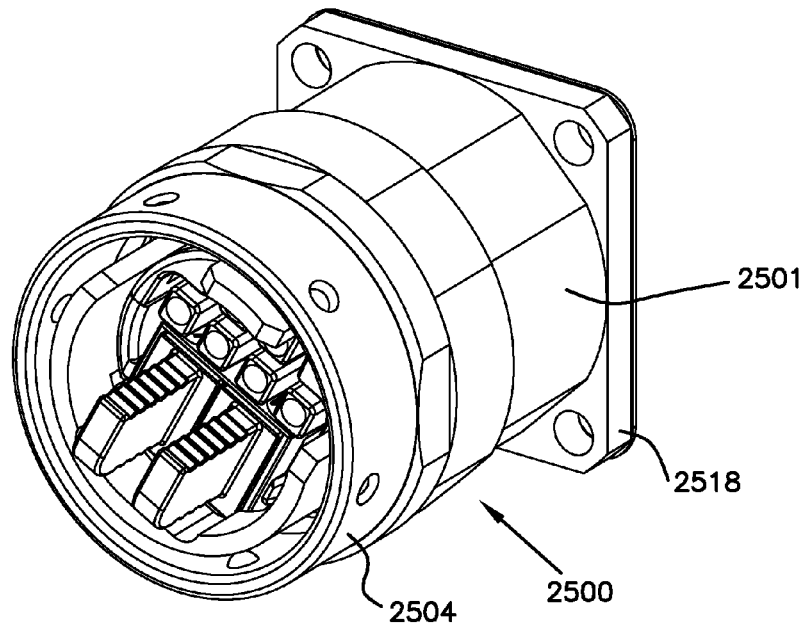
Figure 154:
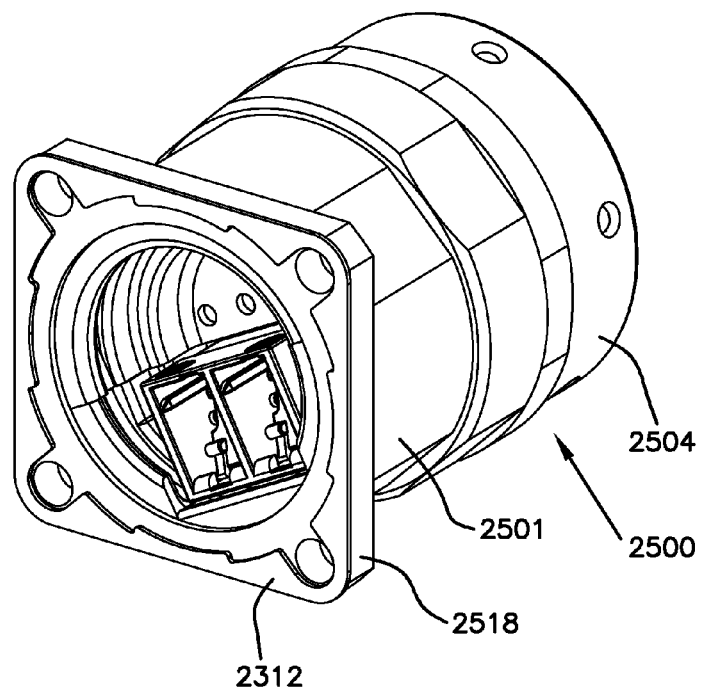
Figure 155:
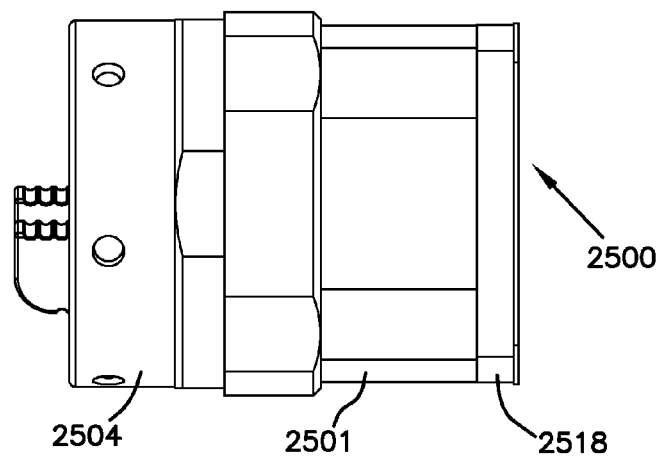
Figure 156:
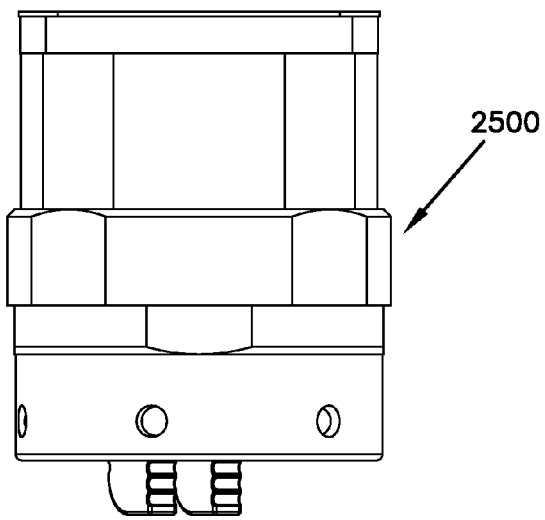
Figure 157:
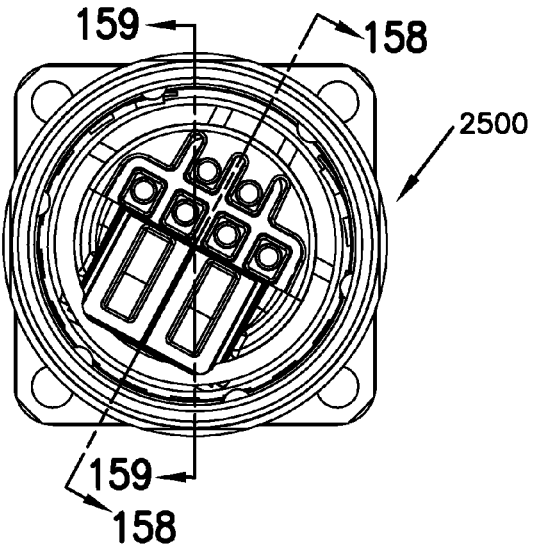
Figure 158:
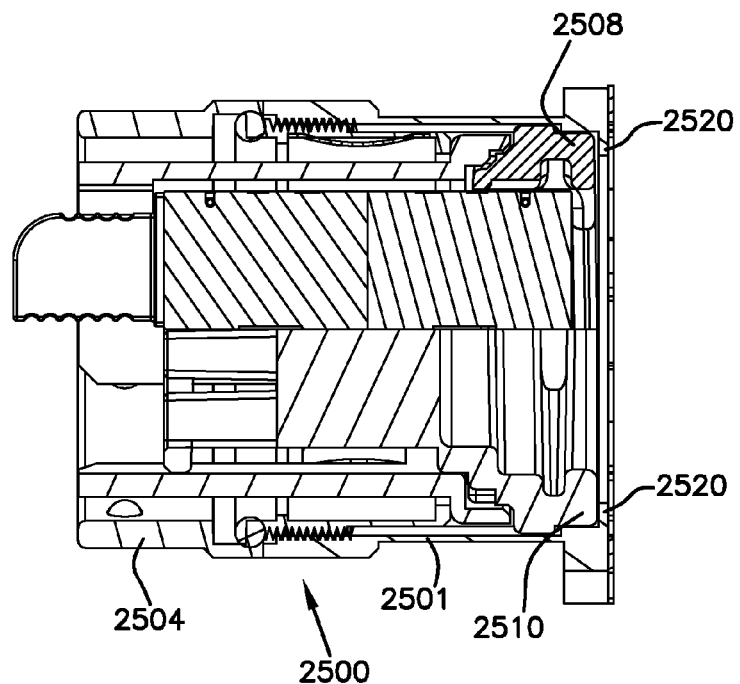
Figure 159:
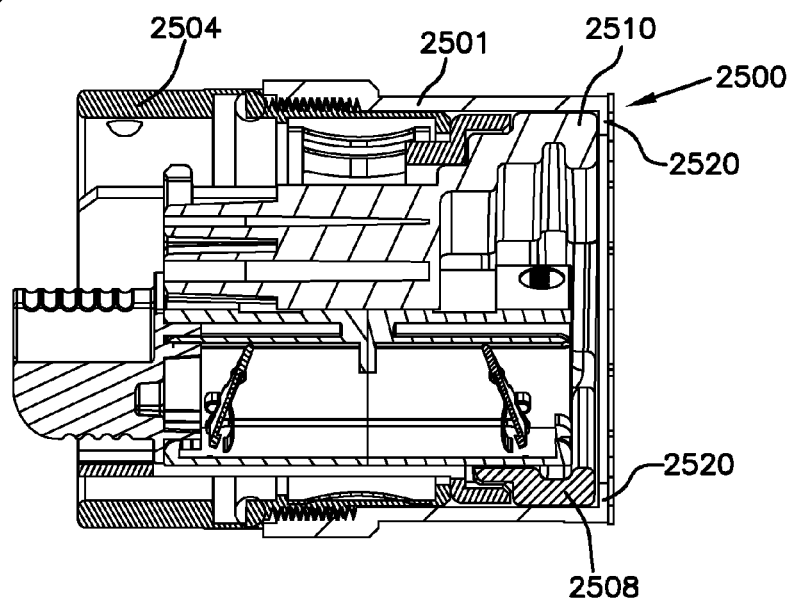
Figure 160:
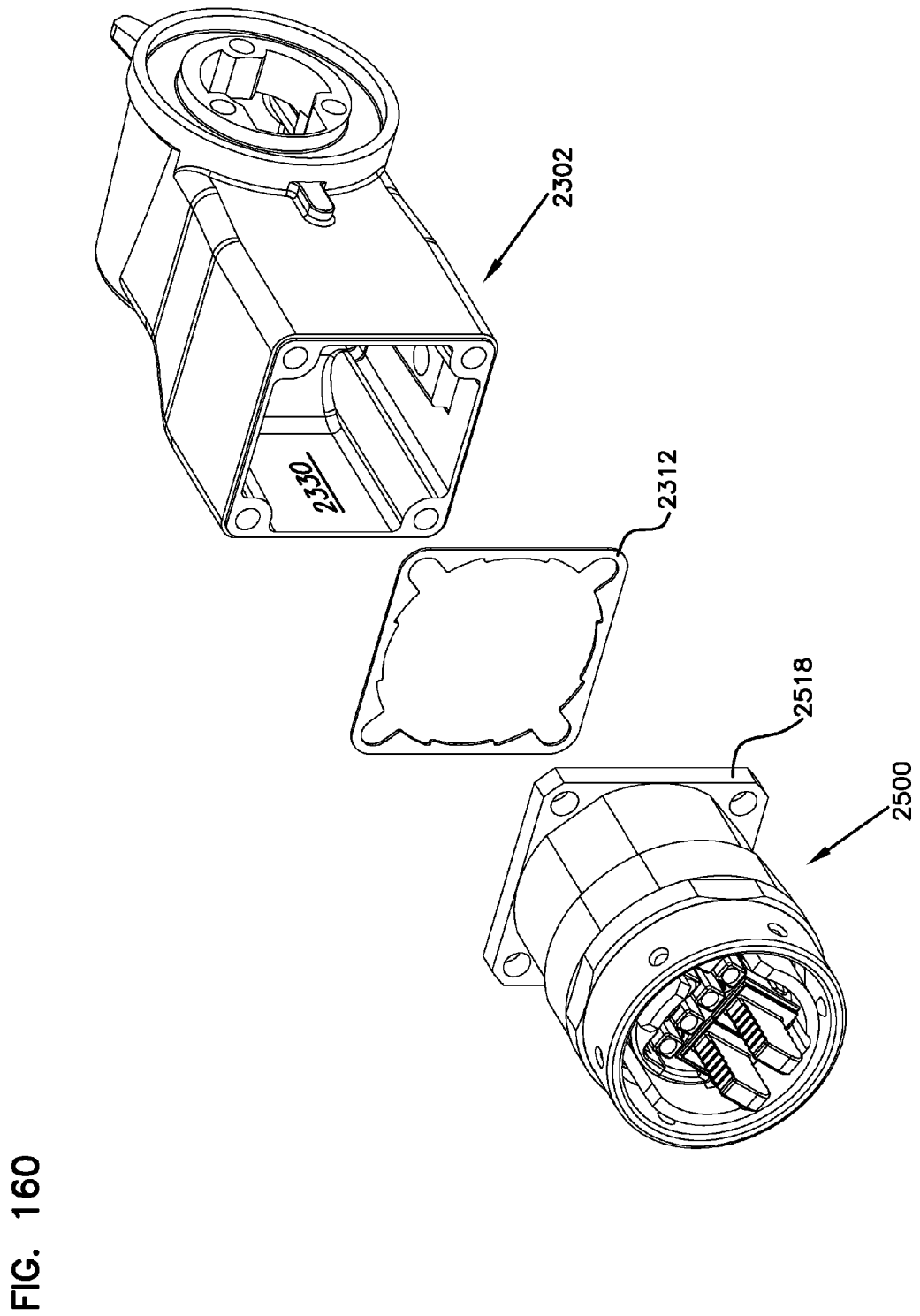
Figure 161:
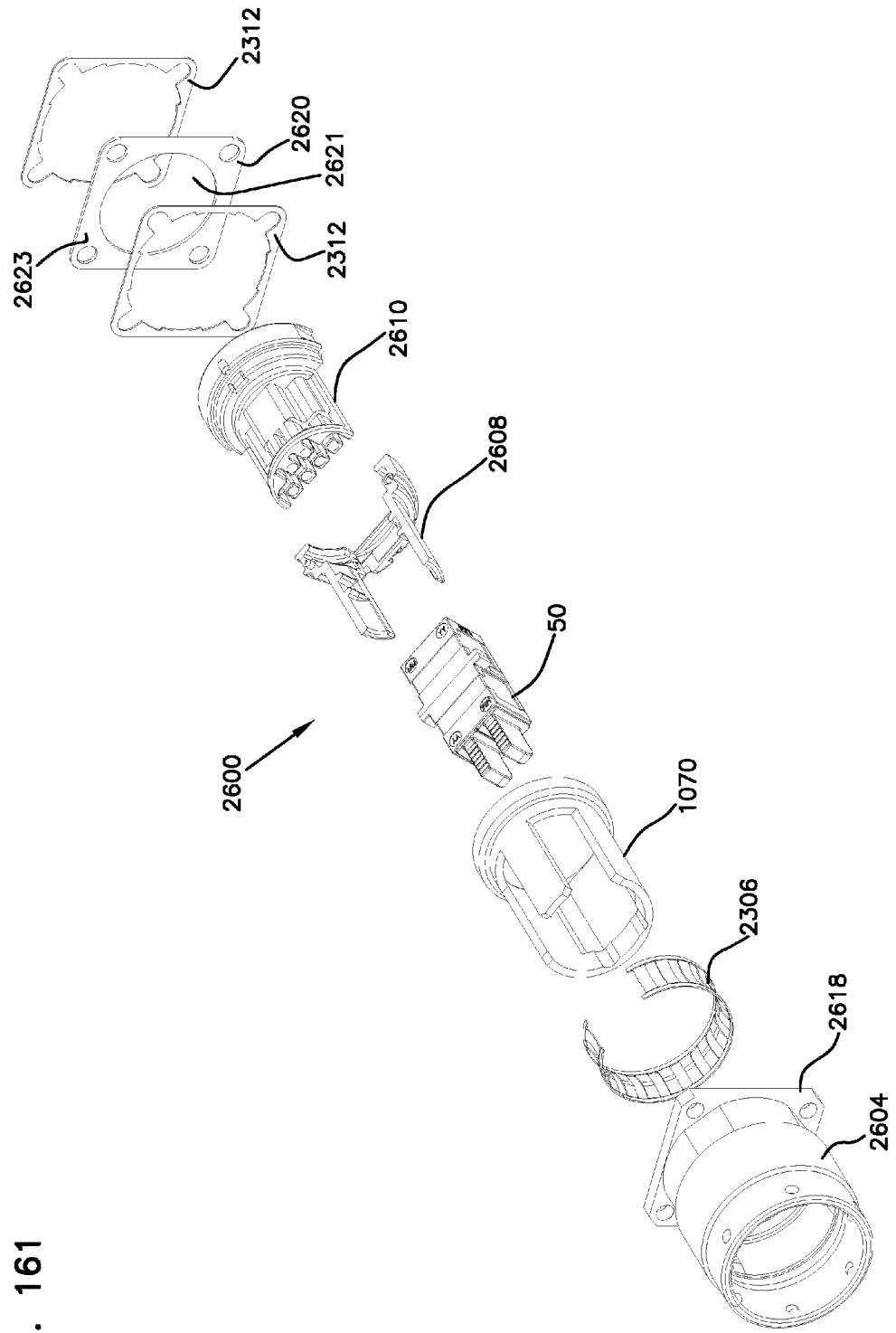
Figure 162:
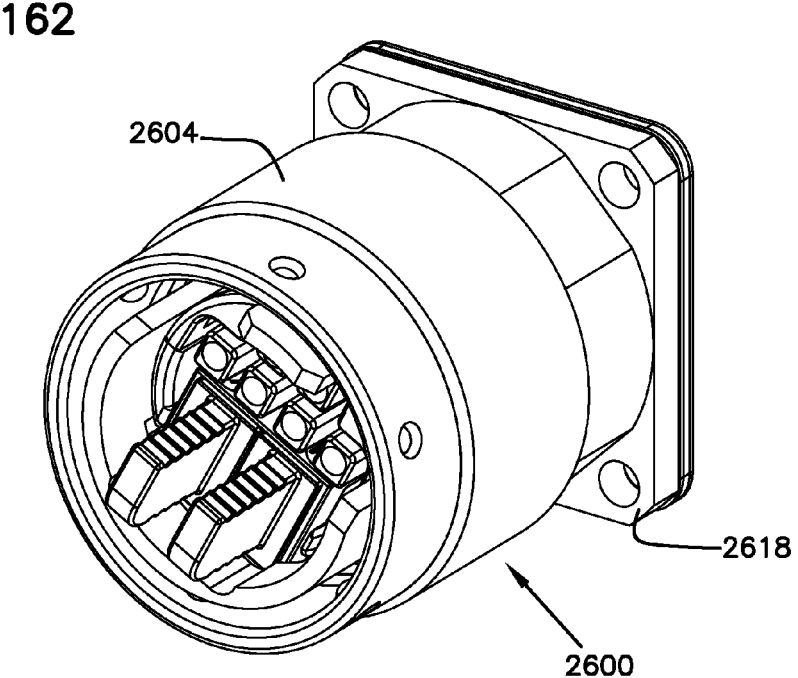
Figure 163:
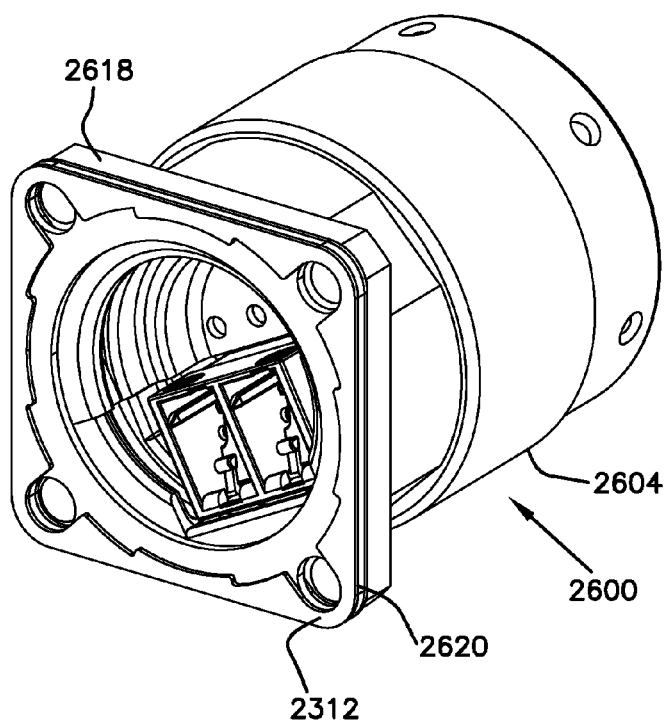
Figure 164:
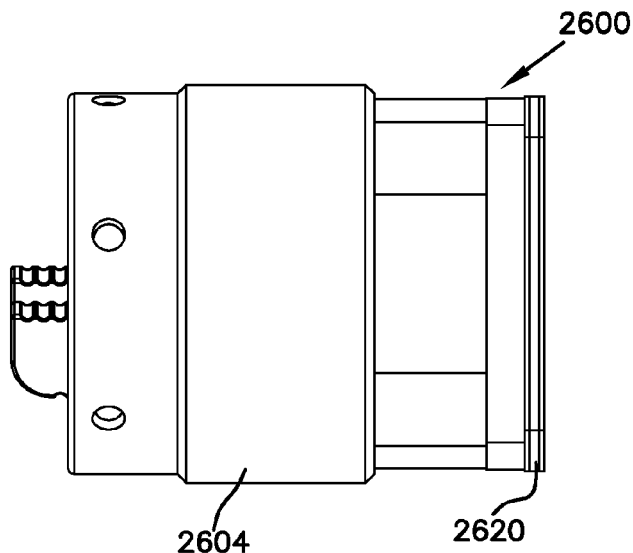
Figure 165:
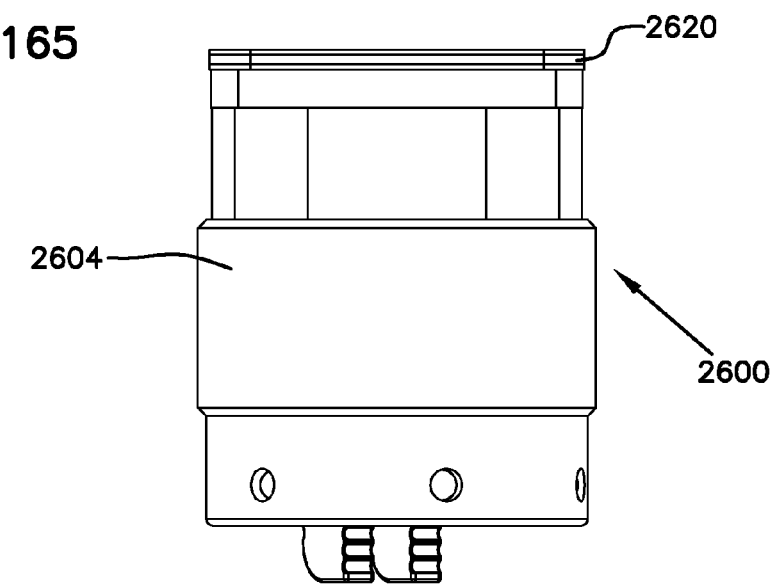
Figure 166:
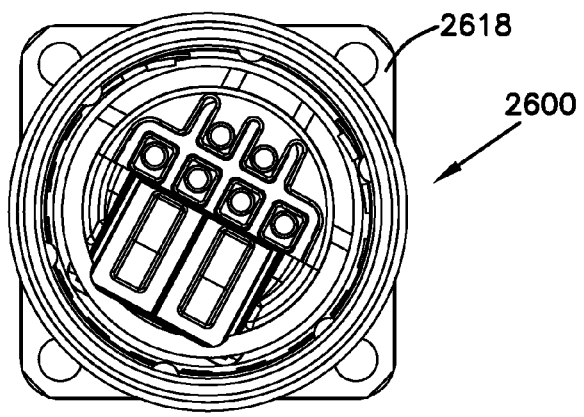
Figure 167:
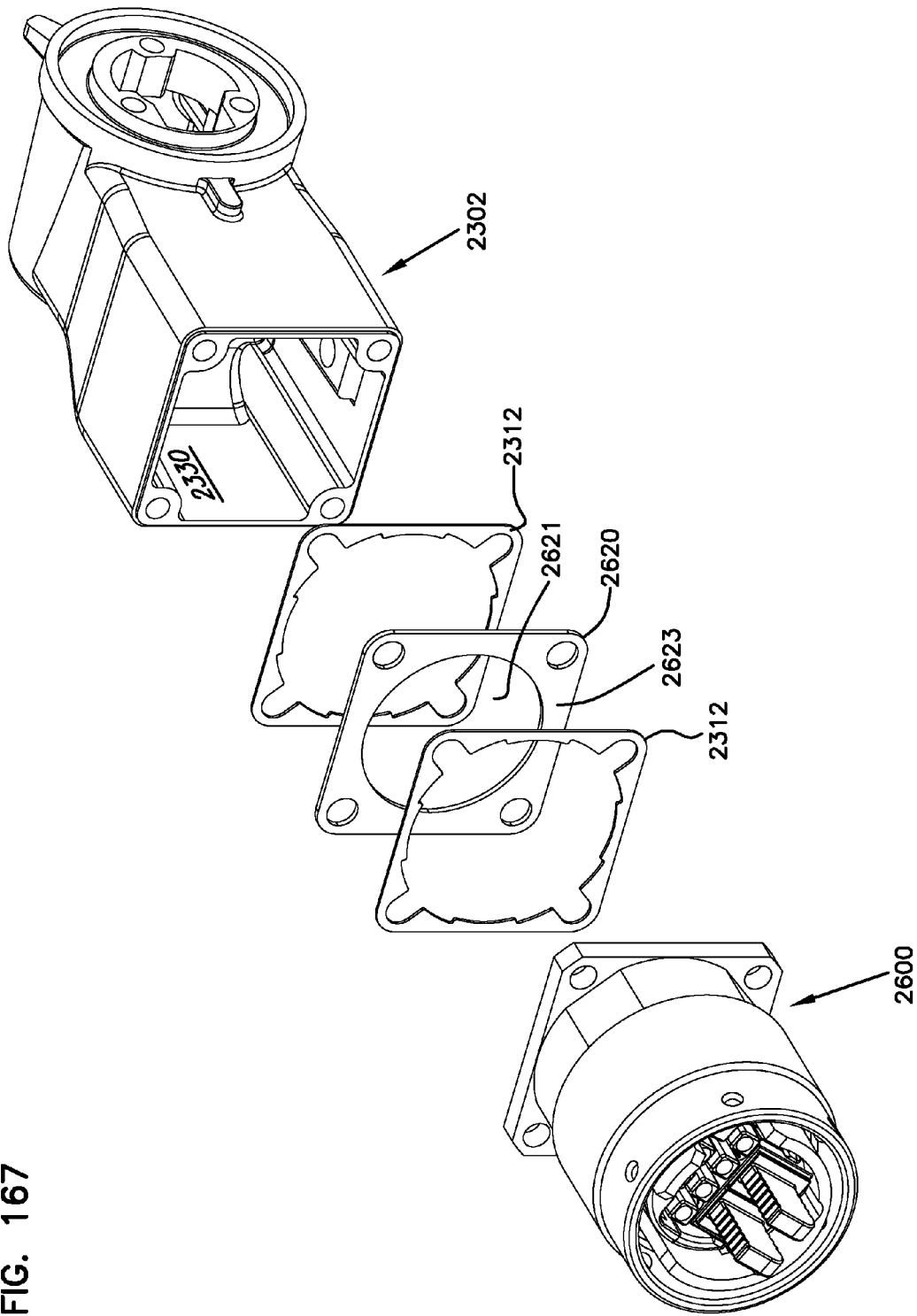

FIG. 124 is an exploded front perspective view of a bulkhead male quad fiber connector having features that are examples of inventive aspects in accordance with the principles of the present disclosure;

FIG. 125 is an exploded front perspective view of a bulkhead female hybrid fiber/copper connector having features that are examples of inventive aspects in accordance with the principles of the present disclosure;

FIG. 126 is an exploded front perspective view of a bulkhead male hybrid fiber/copper connector having features that are examples of inventive aspects in accordance with the principles of the present disclosure;

FIG. 127 is an exploded front perspective view of a bulkhead female hybrid fiber/copper connector utilizing a pair of field terminable fiber optic connector assemblies, the bulkhead female hybrid fiber/copper connector having features that are examples of inventive aspects in accordance with the principles of the present disclosure;

FIG. 128 illustrates a front perspective view of the bulkhead female hybrid fiber/copper connector of FIG. 127 in a fully assembled configuration;

FIG. 129 illustrates a rear perspective view of the bulkhead female hybrid fiber/copper connector of FIG. 127 in a fully assembled configuration;

FIG. 130 is a front perspective view of a bulkhead male hybrid fiber/copper connector utilizing a pair of field terminable fiber optic connector assemblies, the bulkhead male hybrid fiber/copper connector having features that are examples of inventive aspects in accordance with the principles of the present disclosure;

FIG. 131 illustrates a rear perspective view of the bulkhead male hybrid fiber/copper connector of FIG. 130;

FIG. 132 is a perspective view of an end cap configured for use with the bulkhead male and female connectors utilizing field terminable fiber optic connector assemblies;

FIG. 133 is an example of a flat mounting plate or panel for mounting a hybrid or quad connector of the bulkhead type, examples of which have been illustrated in FIGS. 65-76 and 120-132;

FIG. 134 is an example of a flat mounting plate or panel for mounting a hybrid or quad connector, examples of which have been illustrated in FIGS. 77-119;

FIG. 135 is an example of an angled mounting plate or panel for mounting a hybrid or quad connector, examples of which have been illustrated in FIGS. 77-119;

FIG. 136 illustrates a yoke half configured for use with a female hybrid or quad connector for mounting the female connector to a plate or a panel, examples of the female hybrid or quad connector have been illustrated in FIGS. 77-80, 85, 88, 89, and 98-101;

FIG. 137 illustrates a yoke half configured for use with a male hybrid or quad connector for mounting the male connector to a plate or a panel, examples of the male hybrid or quad connector have been illustrated in FIGS. 90-97 and 102-108;

FIG. 138 is an exploded front perspective view of another embodiment of a bulkhead female hybrid fiber/copper connector having features that are examples of inventive aspects in accordance with the principles of the present disclosure;

FIG. 139 illustrates a front perspective view of the bulkhead female hybrid fiber/copper connector of FIG. 138 in a fully assembled configuration;

FIG. 140 illustrates a rear perspective view of the bulkhead female hybrid fiber/copper connector of FIG. 138 in a fully assembled configuration;

FIG. 141 illustrates a right side view of the bulkhead female hybrid fiber/copper connector of FIG. 138 in a fully assembled configuration;

FIG. 142 illustrates a top view of the bulkhead female hybrid fiber/copper connector of FIG. 138 in a fully assembled configuration;

FIG. 143 illustrates a front view of the bulkhead female hybrid fiber/copper connector of FIG. 138 in a fully assembled configuration;

FIG. 144 illustrates the bulkhead female hybrid fiber/copper connector of FIG. 138 exploded off an example bulkhead in the form of a camera mount;

FIG. 145 is an exploded front perspective view of another embodiment of a bulkhead female hybrid fiber/copper connector having features that are examples of inventive aspects in accordance with the principles of the present disclosure;

FIG. 146 illustrates a front perspective view of the bulkhead female hybrid fiber/copper connector of FIG. 145 in a fully assembled configuration;

FIG. 147 illustrates a rear perspective view of the bulkhead female hybrid fiber/copper connector of FIG. 145 in a fully assembled configuration;

FIG. 148 illustrates a right side view of the bulkhead female hybrid fiber/copper connector of FIG. 145 in a fully assembled configuration;

FIG. 149 illustrates a top view of the bulkhead female hybrid fiber/copper connector of FIG. 145 in a fully assembled configuration;

FIG. 150 illustrates a front view of the bulkhead female hybrid fiber/copper connector of FIG. 145 in a fully assembled configuration;

FIG. 151 illustrates the bulkhead female hybrid fiber/copper connector of FIG. 145 exploded off an example bulkhead in the form of a camera mount;

FIG. 152 is an exploded front perspective view of another embodiment of a bulkhead female hybrid fiber/copper connector having features that are examples of inventive aspects in accordance with the principles of the present disclosure;

FIG. 153 illustrates a front perspective view of the bulkhead female hybrid fiber/copper connector of FIG. 152 in a fully assembled configuration;

FIG. 154 illustrates a rear perspective view of the bulkhead female hybrid fiber/copper connector of FIG. 152 in a fully assembled configuration;

FIG. 155 illustrates a right side view of the bulkhead female hybrid fiber/copper connector of FIG. 152 in a fully assembled configuration;

FIG. 156 illustrates a top view of the bulkhead female hybrid fiber/copper connector of FIG. 152 in a fully assembled configuration;

FIG. 157 illustrates a front view of the bulkhead female hybrid fiber/copper connector of FIG. 152 in a fully assembled configuration;

FIG. 158 is a cross-sectional view taken along line 158-158 of FIG. 157;

FIG. 159 is a cross-sectional view taken along line 159-159 of FIG. 157;

FIG. 160 illustrates the bulkhead female hybrid fiber/copper connector of FIG. 152 exploded off an example bulkhead in the form of a camera mount;

FIG. 161 is an exploded front perspective view of yet another embodiment of a bulkhead female hybrid fiber/copper connector having features that are examples of inventive aspects in accordance with the principles of the present disclosure;

FIG. 162 illustrates a front perspective view of the bulkhead female hybrid fiber/copper connector of FIG. 161 in a fully assembled configuration;

FIG. 163 illustrates a rear perspective view of the bulkhead female hybrid fiber/copper connector of FIG. 161 in a fully assembled configuration;

FIG. 164 illustrates a right side view of the bulkhead female hybrid fiber/copper connector of FIG. 161 in a fully assembled configuration;

FIG. 165 illustrates a top view of the bulkhead female hybrid fiber/copper connector of FIG. 161 in a fully assembled configuration;

FIG. 166 illustrates a front view of the bulkhead female hybrid fiber/copper connector of FIG. 161 in a fully assembled configuration; and FIG. 167 illustrates the bulkhead female hybrid fiber/copper connector of FIG. 161 exploded off an example bulkhead in the form of a camera mount.

DETAILED DESCRIPTION

Reference will now be made in detail to the exemplary aspects of the present invention that are illustrated in the accompanying drawings. Wherever possible, the same reference numbers will be used throughout the drawings to refer to the same or like parts.

The present disclosure relates to a hybrid fiber/copper connector assembly. Aspects of the hybrid fiber/copper connector assembly include each connector having fiber and copper connecting components to connect two hybrid fiber/copper cables.

One preferred embodiment of a connector assembly permits repair of damaged fibers or copper conductors carried by a hybrid fiber/copper cable without requiring replacement of the entire connector assembly or the cable. Aspects of the present disclosure also allow the hybrid fiber/copper connectors of the assembly to be converted from one gender to a different gender. Further aspects of the present disclosure allow the hybrid fiber/copper connectors of the assembly to be converted from being hybrid connectors to being only fiber connectors or only copper connectors.

Referring to FIGS. 1-3, a hybrid fiber/copper connector assembly 10 having features that are examples of inventive aspects in accordance with the principles of the present disclosure is illustrated. The hybrid fiber/copper connector assembly includes a first hybrid fiber/copper connector 12 and a second hybrid fiber/copper connector 14 adapted to mate with the first hybrid fiber/copper connector 12. The first hybrid fiber/copper connector 12 may also be referred to herein as a female gender hybrid fiber/copper connector and the second hybrid fiber/copper connector 14 may be referred to herein as a male gender hybrid fiber/copper connector.

Each of the first and second hybrid fiber/copper connectors 12, 14 includes an inner connector assembly that is received within an outer housing. The inner connector assembly 16 of the first hybrid fiber/copper connector 12 is terminated to a segment of hybrid fiber/copper cable carrying both optical fibers and copper wires. Similarly, the inner connector assembly 18 of the second hybrid fiber/copper connector 14 is terminated to a segment of hybrid fiber/copper cable carrying both optical fibers and copper wires. Once terminated, inner connector assemblies 16, 18 are placed within the outer housings 20, 22 of the hybrid fiber/copper connectors 12, 14.

Before termination to the first and second hybrid fiber/copper connectors 12, 14, each cable segment is inserted through an end cap/cable clamp 24, 26, respectively, that is threadably mounted to the outer housings 20, 22. The end caps 24, 26 are configured to clamp the hybrid fiber/copper cable segments to their respective hybrid fiber/copper connectors 12, 14 and provide a weather tight seal at the cable receiving ends 28, 30, respectively, of the first and second hybrid fiber/copper connectors 12, 14. Once the end caps 24, 26 have been threaded and the hybrid cable segments connected to the respective hybrid connectors 12, 14, the first and the second hybrid fiber/copper connectors 12, 14 can, then, be mated to each other to establish both optical and electrical connection between the two hybrid cable segments. The outer housings 20, 22 of the two connectors 12, 14 cooperate to form a secure and generally weather-tight cover about the connections of the fiber strands and copper conductors within the two connectors 12, 14.

A hybrid fiber/copper cable might be used in broadcast communications. For example, such a cable might be used to connect a camera to a production facility, such as at a sporting event or other entertainment venue. Certain known prior art assemblies for connecting segments of broadcast cable might require the use of a new assembly in case of failure of any single component within the assembly. Alternatively, the failure of any of the contacts within either connector of a known assembly might necessitate the retermination of one of the cable segments.

As will be described in further detail below, the hybrid fiber/copper connector assembly 10 of the present disclosure is configured to permit repair or replacement of damaged components of the assembly. Reference herein will also be made to certain examples of hybrid fiber/copper connector assemblies that facilitate repair or replacement of damaged components of the assembly without requiring the use of a new assembly that are disclosed in U.S. Pat. No. 7,213,975 and U.S. Patent Application Publication No. 2006/0233496 A1 (now U.S. Pat. No. 7,393,144), the entire disclosures of which are incorporated herein by reference.

U.S. Pat. No. 7,213,975 and U.S. Patent Application Publication No. 2006/0233496 A1 (now U.S. Pat. No. 7,393,144) illustrate a schematic cross-section of a hybrid fiber/copper communications cable that may be suitable for use with the hybrid fiber/copper connector assembly 10 of the present disclosure. The hybrid cable, illustrated in FIG. 4 of U.S. Pat. No. 7,213,975 and U.S. Patent Application Publication No. 2006/0233496 A1 (now U.S. Pat. No. 7,393,144), includes a pair of jacketed optical fibers and four jacketed copper wires, extending adjacent a linearly extending strength member. This is one example configuration of a hybrid cable that might be suitable for use with the hybrid connector assembly 10 of the present disclosure. Other configurations of hybrid cables are also known, with more or fewer optical fibers and/or copper wires, which may also be used with the hybrid fiber/copper connector assembly 10 of the present disclosure.

When used in the broadcast camera environment described above, one of the optical fibers may be used to transmit video and related audio signals to the camera and the second optical fiber may be used to transmit video and audio captured by the camera to the production facility or some other location. One pair of copper conductors may be used to provide power to operate the camera, while the other pair of copper conductors may be used to provide communications between the production facility and the camera operator. The number of fiber strands and copper conductors extending within the hybrid cable may be varied as required to support the desired usage and communication bandwidth of the camera.

According to another aspect of the disclosure, the hybrid fiber/copper connector assembly 10 of the present disclosure is configured to allow the first and second hybrid fiber/copper connectors 12, 14 of the assembly 10 to be converted from one gender to a different gender. As such, if an existing segment of a hybrid fiber/copper cable segment is terminated, for example, to a first hybrid fiber/copper connector 12 (i.e., a female gender connector) and an available second segment of a hybrid cable is also terminated to a first hybrid fiber/copper connector 12 (i.e., a female gender connector), the first hybrid fiber/copper connector 12 may be disassembled and converted into a second hybrid fiber/copper connector 14 (i.e., a male gender connector), without retermination of the cable segment. The converted male gender hybrid fiber/copper connector 14 can, then, be mated to the female gender hybrid fiber/copper connector 12.

Furthermore, according to another aspect of the disclosure, the modular configuration of the hybrid fiber/copper connector assembly 10 of the present disclosure allows both the first and the second hybrid fiber/copper connectors 12, 14 of the assembly 10 to be converted from being hybrid connectors to being fiber-only connectors (e.g., quad fiber connectors) or copper-only connectors (e.g., having eight copper conductors).

Referring now to FIG. 4, an exploded view of the first, female gender, hybrid fiber/copper connector 12 is illustrated. The first hybrid fiber/copper connector 12 includes a first inner housing half 32 and a second inner housing half 34. The first and the second inner housing halves 32, 34 detachably mate together to form an inner connector assembly 16 of the first hybrid fiber/copper connector 12. Once the first and the second inner housing halves 32, 34 are terminated to a hybrid cable and joined together, they are inserted into an outer housing 20 of the first hybrid fiber/copper connector 12. As shown in FIGS. 1 and 2, and as discussed above, before the hybrid cable segments are terminated to the inner connector assemblies 16, 18 of the first and second hybrid fiber/copper connectors 12, 14, the hybrid cable segments are inserted through end caps 24, 26. The end caps 24, 26 are, then, threaded onto the outer housings 20, 22 to clamp the hybrid cables and to seal it against the outer housings 20, 22.

Referring back to FIG. 4, the first inner housing half 32 is configured to hold the fiber components of the connector 12 while the second inner housing half 34 is configured to hold the electrical/copper components of the connector 12.

Now referring to FIGS. 5-9, the first inner housing half 32 of the first hybrid fiber/copper connector 12 is illustrated. The first inner housing half 32 includes an elongated body 36 defining an interior 38. The body 36 includes a mating end 40 and a cable receiving end 42. The first inner housing half 32 defines a pair of alignment pins 44 and a pair of pin openings 46 for cooperatively mating with the second inner housing half 34 (see second inner housing half 34 in FIGS. 11-15). Adjacent the mating end 40 of the first inner housing half 32 is a pocket 48 configured to carry a fiber optic adapter 50.

Figure 5:
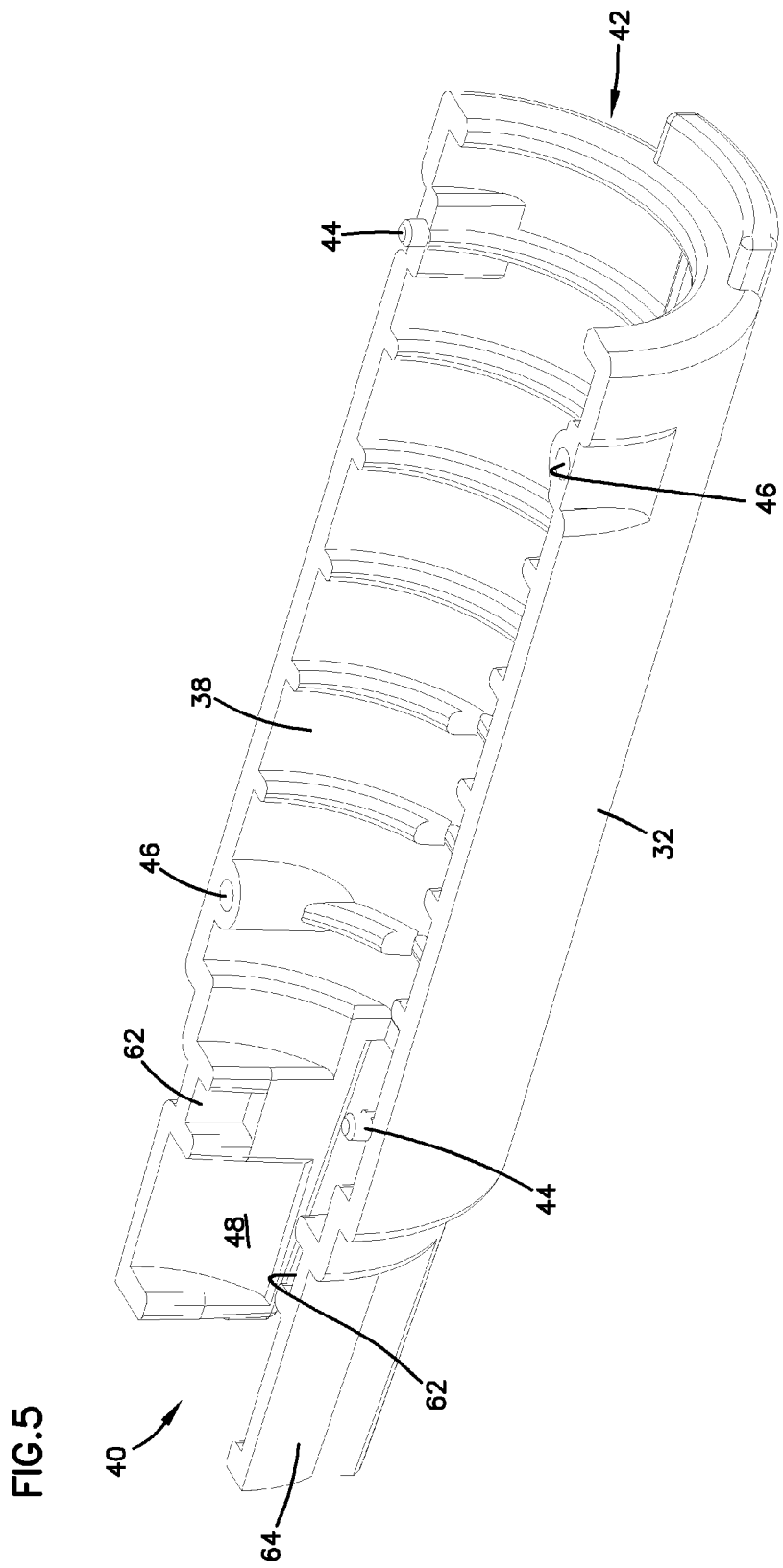
FIG. 5 is a perspective view of the first inner housing half of the first hybrid fiber/copper connector of FIG. 4.
Figure 10:
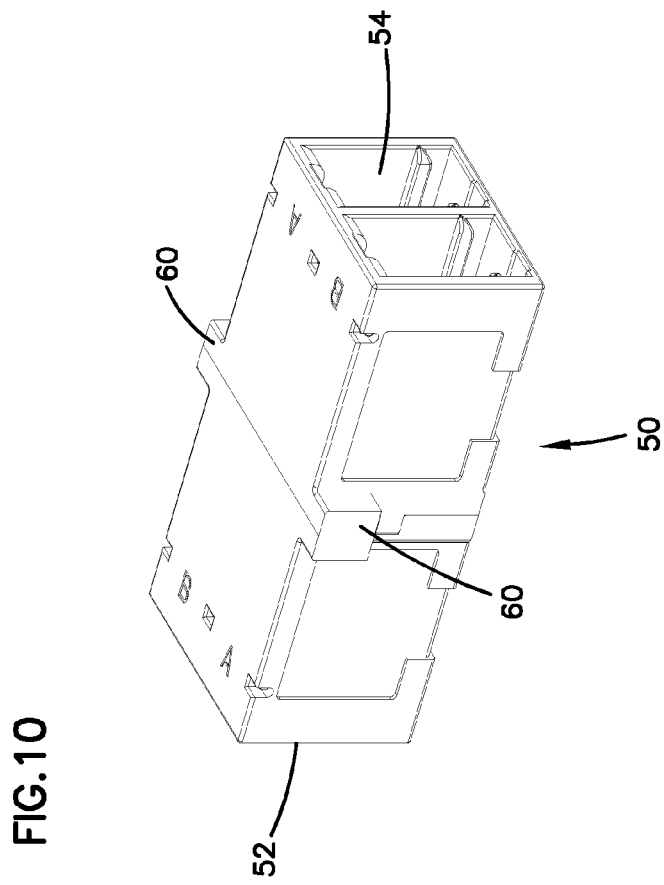
FIG. 10 is a perspective view of the fiber optic adapter of the first hybrid fiber/copper connector of FIG. 4, the fiber optic adapter configured to be placed within the first inner housing half of FIG. 5.
Figure 10A:
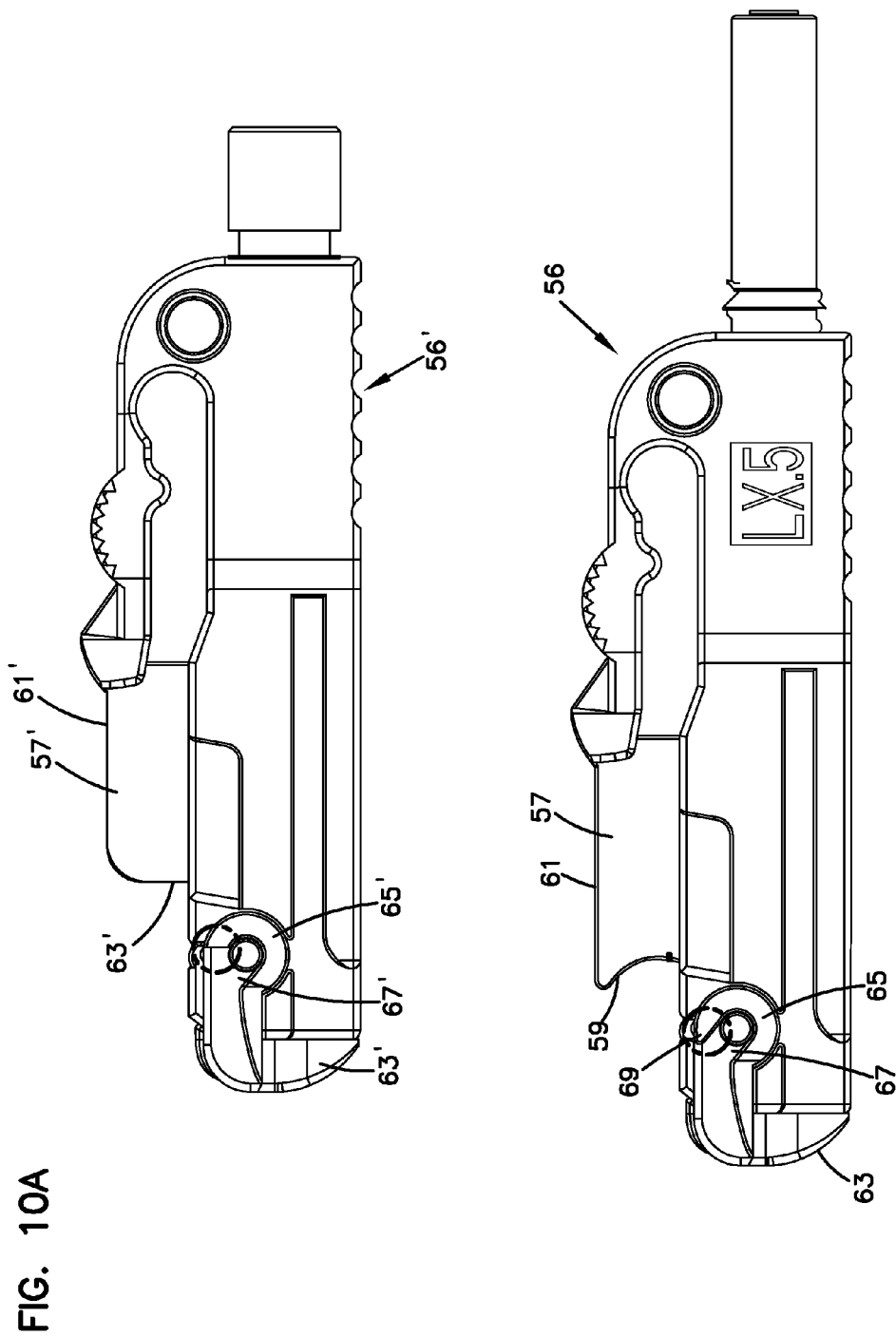
FIG. 10A is a diagrammatic view illustrating side views of two alternative versions of a fiber optic connector that is configured to be inserted into the fiber optic adapter of FIG. 10.

An adapter 50 configured to be placed within the first inner housing 32 is shown in FIG. 10. As depicted, the fiber optic adapter 50 is a duplex adapter including a front end 52 and a rear end 54. Two fiber optic connectors mounted into the front end 52 of the fiber optic adapter 50 optically mate with two fiber optic connectors mounted into the rear end 54 of the fiber optic adapter 50. As shown in FIGS. 10A and 28, the fiber optic connectors that are received within the fiber optic adapter 50 may be LX.5 format connectors 56 or BX5 format connectors 56'. As depicted, the adapter 50 is configured to receive and optically connect two pairs of LX.5 or BX5 connectors. LX.5 and BX5 connectors and mating adapters are available from ADC Telecommunications, Inc. Other connector and adapter formats can also be used. BX5 connectors 56' are compatible with adapters 50 that are configured to receive and mate LX.5 connectors 56.

Figure 31:
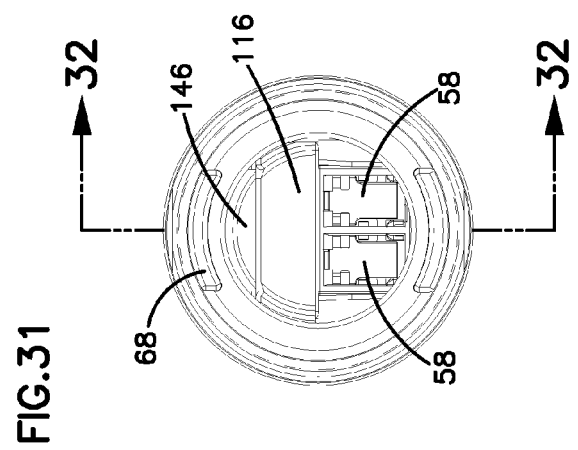
FIG. 31 illustrates a rear end view of the first hybrid fiber/copper connector of FIG. 4, the first hybrid fiber/copper connector shown in a fully assembled configuration.

As shown in the end view in FIG. 31, the fiber optic adapter 50 includes shutters 58 adjacent the front and rear ends 52, 54 that pivot between an open position and a closed position. The shutters 58 are sized such that in the closed position, the shutters 58 block direct visual inspection through an open front end 52 or an open rear end 54. As a result, in an event a fiber optic connector 56/56' is connected to one end of the fiber optic adapter 50, the closed shutter 58 on the opposite end prevents a technician from looking directly at light on the opposite end of the fiber optic adapter 50. Further details of the fiber optic adapter 50 and the LX.5 format fiber optic connectors 56 that are configured to be inserted into the adapter 50 are described in U.S. Pat. Nos. 5,883,995 and 6,142,676, the entire disclosures of which are incorporated herein by reference.

FIG. 10A illustrates the differences between the LX.5 format and the BX5 format fiber optic connectors. They are both configured to be inserted and mate within adapters 50. A BX5 format connector 56' is similar to an LX.5 format connector 56 in almost every aspect except for two. The portion 57' of the BX5 connector that is configured to contact a shutter 58 of an adapter 50 does not have a forwardly protruding cam surface such as the cam surface 59 found in the LX.5 format connector. The portion 57' of the BX5 format connector 56' that is configured to contact a shutter 58 has a horizontal top face 61' that gradually curves down to a vertically disposed front face 63' that does not include a forwardly protruding cam surface 59 as in the LX.5 version of the connector. In certain applications, the gradual transition from the top face to the front face of portion 57' and the lack of the forwardly protruding surface 59 provides less wear and tear on the shutters 58 of the adapters when BX5 connectors are repeatedly inserted into adapters 50. However, both formats of connectors can be used in accordance with the disclosure.

Also, in the BX5 connector, the portion of the front cover 63' that forms the hinge structure is slightly varied. The portion 65' of the pivotal cover 63' that forms the slot 67' that accepts the hinge pin is shaped differently than the portion 65 found in the LX.5 connector. The upper end of the portion 65' in the BX5 connector does not come to a point as it does in portion 65 of the LX.5 connector. In the LX.5 connector 56, the portion 65 comes to an upper point 69 in defining the hinge slot 67. The point 69 is removed in the BX5 version of the connector. This feature may improve the pivotal function of the front cover 63'. As discussed above, even though the BX5 version of the connector may provide certain advantages, either version 56 or 56' of the connector may be used with the hybrid or quad connectors discussed in the present disclosure satisfactorily.

In mounting the fiber optic adapter 50 within a hybrid or quad connectors described herein, the fiber optic adapter 50 includes a pair of flanges 60 on the sides of the adapter 50. The flanges 60 are received within, for example, recesses 62 defined in the first inner housing half 32.

Referring back to FIGS. 5-9, the mating end 40 of the body 36 of the first inner housing half 32, includes an exterior recessed portion 64 defined on a first side 66 of the body 36. The recessed portion 64 is configured to act as a keying feature when the second hybrid fiber/copper connector 14 is mated to the first hybrid fiber/copper connector 12, as will be discussed in further detail below. In this manner, the correct orientation of the mating ends of the first and second connectors 12, 14 are obtained when the two hybrid connectors 12, 14 are mated.

FIGS. 11-15 illustrate the second inner housing half 34 of the first, female gender, hybrid fiber/copper connector 12. The second inner housing half 34 is configured to house the copper components of the first hybrid fiber/copper connector 12. As shown, the second inner housing half 34 includes an elongated body 68 defining an interior 70. The body 68 includes a mating end 72 and a cable receiving end 74.

The second inner housing half 34 includes a pair of alignment pins 76 and a pair of pin openings 78 for cooperatively mating with the corresponding pins 44 and openings 46 of the first inner housing half 32.

The second inner housing half 34 includes an integrally formed conductor pin support 80 adjacent the mating end 72. The conductor pin support 80 defines four channels 82. The channels 82 include therein four conductive pins 84. The conductive pins 84 are shown in the cross-sectional view in FIG. 15 which is taken along line 15-15 of FIG. 14. As depicted, each of the four conductive pins 84 includes two female ends 86. The conductive pins 84 are generally permanently mounted within the pin support 80 and form a part of the second inner housing half 34.

As in the first inner housing half 32, the second inner housing half 34 defines an exterior recessed portion 88 on a first side 90 of the pin support 80. The recess 88 is configured align with the recess 64 of the first inner housing half 32 when the two housing halves 32, 34 are joined to define a big recess. The big recess acts as a keying feature when the first hybrid fiber/copper connector 12 is mated to the second hybrid fiber/copper connector 14 such that the correct orientation of the mating ends of the first and second connectors 12, 14 are obtained.

The body 68 of the second inner housing half 34 includes an exterior circumferential groove 92. The body 68 also defines opposing slots 94 positioned at each end of the circumferential groove 92. The circumferential groove 92 and the slots 94 accommodate a strength member that might be a part of a hybrid cable.

Figure 29:
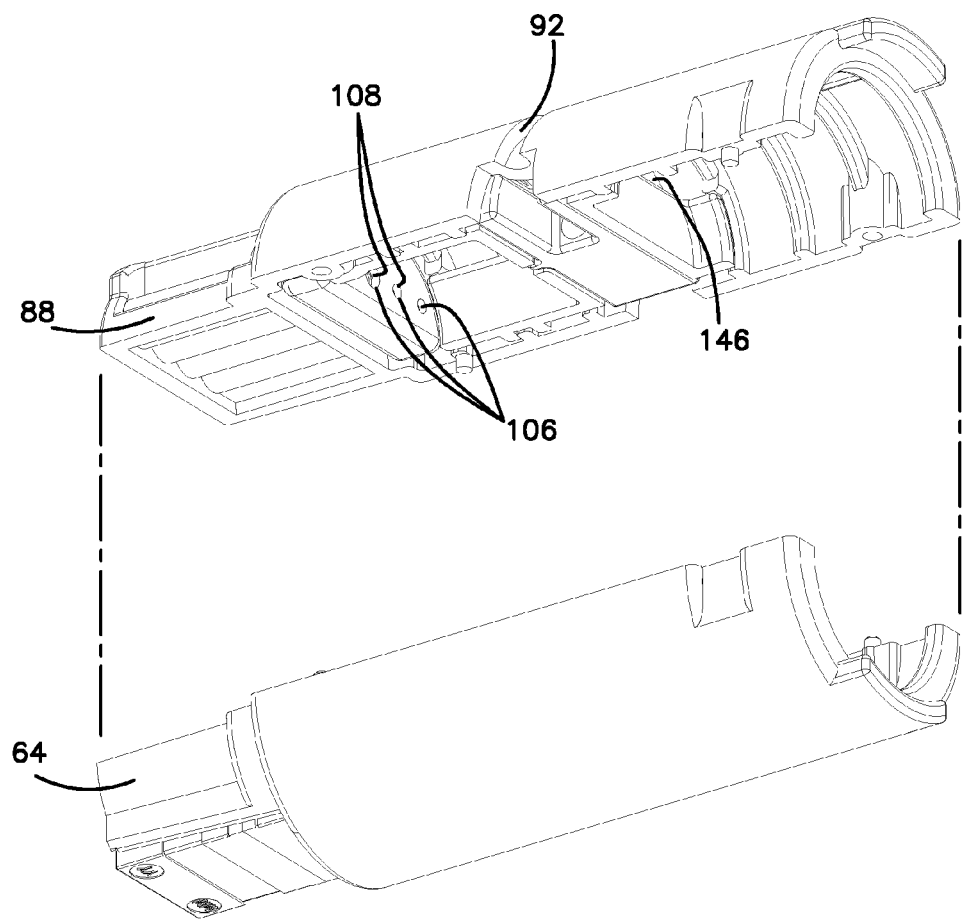
FIG. 29 illustrates a bottom perspective view of the first inner housing half and the second inner housing half of the first hybrid fiber/copper connector of FIG. 4 in a partially assembled configuration.

The interior 70 of the second inner housing half 34 is configured to receive a conductor mount 96. The conductor mount 96 is shown in FIGS. 16-18. The conductor mount 96 includes a generally hemispherical body 98 configured to match the curved shape of the interior 70 of the second inner housing half 34. The conductor mount 96, as depicted, includes four forwardly protruding conductive pins 100. The forward ends 102 of the conductive pins 100 are adapted to be inserted within the channels 82 defined by the pin support 80 at the mating end 72 of the second inner housing half 34. As shown in FIG. 29, the conductor mount 96 is removably inserted into a recess 104 in the interior 70 of the body 68 and slid forwardly toward the pin support 80. The conductor mount 96 is slid until the conductive pins 100 physically and electrically mate with the rear female ends 86 of the conductive pins 84 in the channels 82 of the pin support 80.

The rear ends 106 of the conductive pins 100 are exposed through openings 108 defined on the conductor mount 96. The rear ends 106 of the conductive pins 100 are terminated to copper wires of a hybrid fiber/copper cable. Since the conductor mount 96 is a removable piece, the conductor mount 96 can be removed from the second inner housing half 34 of the first hybrid fiber/copper connector 12 (i.e., female gender connector) and reinserted into the second inner housing of the second hybrid fiber/copper connector 14 (i.e., male gender connector) as part of the conversion of the genders of the hybrid connectors 12, 14.

The conductor mount 96 is retained within the second inner housing half 34 by a conductor mount retainer 110 shown in FIGS. 19-23. As shown, the conductor mount retainer 110 includes an elongated body 112 with a front portion 114, a rear portion 116 and a middle portion 118. The front portion 114 defines a U-shaped body 120 with a pair of forwardly extending legs 122, 123. Each leg 122, 123 defines a pair of flanges 124 on the sides of the legs 122, 123. When the conductor mount retainer 110 is placed into the second inner housing half 34, a rib defined in the interior 70 of the second inner housing half 34 is received between the flanges 124. The rib and the flanges 124 help hold the conductor mount retainer 110 within the second inner housing half 34 with a friction fit.

The first leg 122 also defines a curved portion 126. The curved portion 126 accommodates an alignment pin opening 78 defined in the second inner housing half 34 when the conductor mount retainer 110 is slidably inserted into the body 68 of the second inner housing half 34.

The middle portion 118 of the conductor mount retainer 110 includes a recess 130 for receiving a strength member clamp 132. The strength member clamp 132 is illustrated in FIGS. 24-27. The middle portion 118 of the conductor mount retainer 110 defines a slot 134 for receiving a tab 136 of the strength member clamp 132 for properly orientating the clamp 132. The strength member clamp 132 defines a throughhole 138 extending laterally through its body 140. The strength member clamp 132 defines a pair of laterally extending arms 142 that define a pocket 144 therebetween. The strength member clamp 132 is shown inserted into the recess 130 of the middle portion 118 of the conductor mount retainer 110 in FIG. 29.

Referring back to FIGS. 24-27, a strength member of a cable is to be received from the cable receiving end 28 of the first hybrid fiber/copper connector 12. The strength member is inserted through an opening 146 created between the body 68 of the second inner housing half 34 and the rear portion 116 of the conductor mount retainer 110. The strength member is, then, to be guided downwardly between the arms 142 of the strength member clamp 132 and then upwardly and around the circumferential groove 92. Once the strength member has been wrapped around the circumferential groove 92, it is received into the throughhole 138 of the strength member clamp 132 at the opposite side of the arms 142. The strength member, then, comes out of the throughhole 138 between the arms 142 and is crimped at this location. The crimped end of the strength member is held in the pocket 144 defined between the arms 142. According to one embodiment, the strength member clamp 132 depicted herein is rated to hold 100 lbs. of force.

Figure 33:
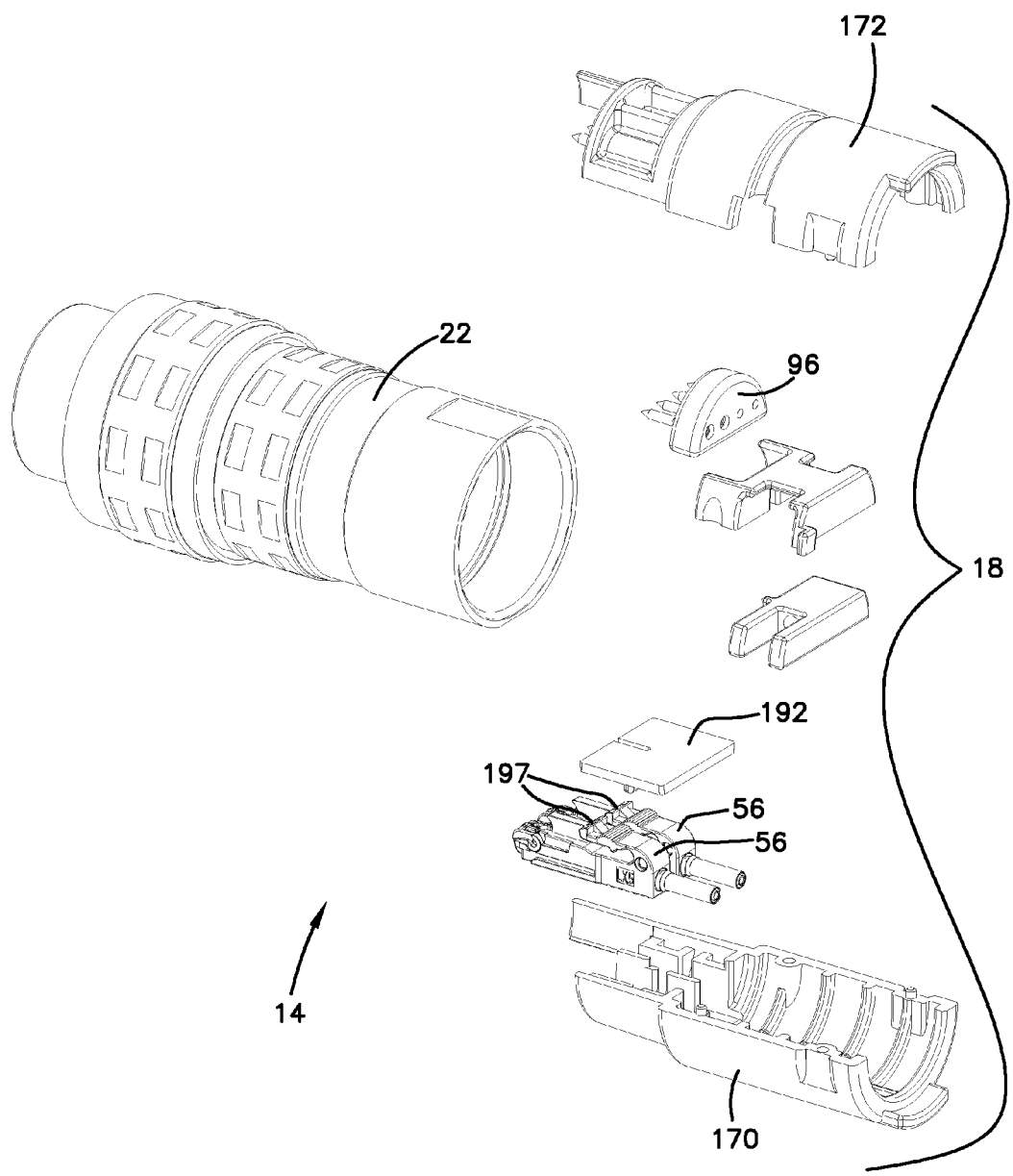
FIG. 33 is an exploded perspective view of the second hybrid fiber/copper connector of the hybrid fiber/copper connector assembly of FIGS. 1-3.
Figure 34:
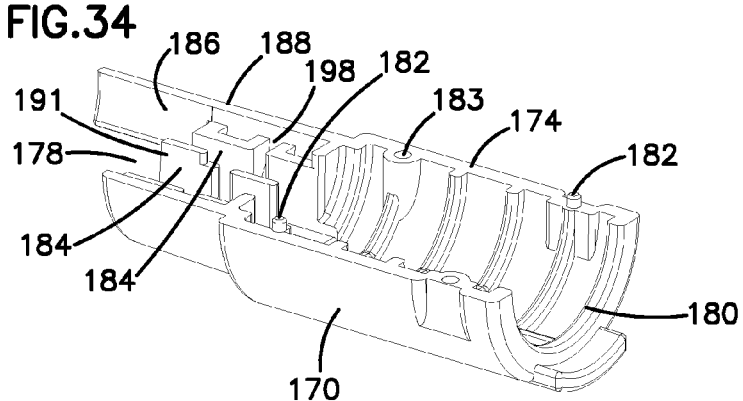
FIG. 34 is a perspective view of the first inner housing half of the second hybrid fiber/copper connector of FIG. 33.
Figure 35:
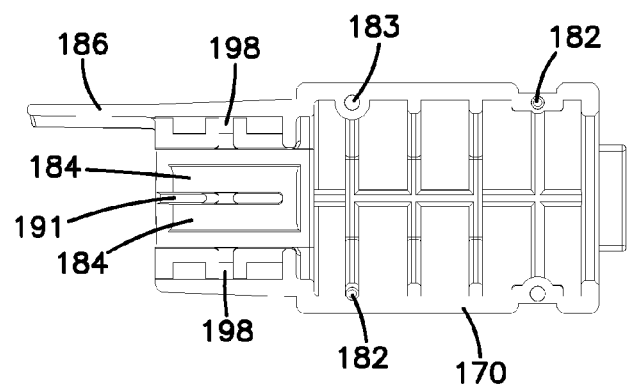
FIG. 35 is a top view of the first inner housing half of FIG. 34.
Figure 36:
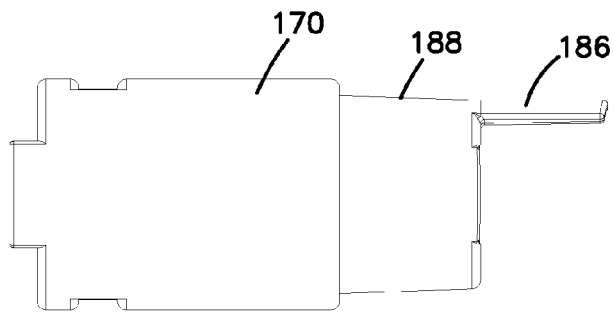
FIG. 36 is a bottom view of the first inner housing half of FIG. 34.
Figure 37:
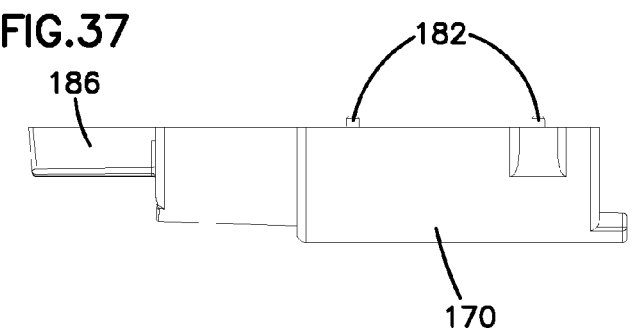
FIG. 37 is a side view of the first inner housing half of FIG. 34.
Figure 38:
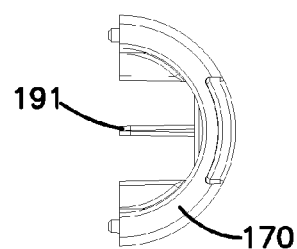
FIG. 38 is a rear end view of the first inner housing half of FIG. 34.
Figure 39:
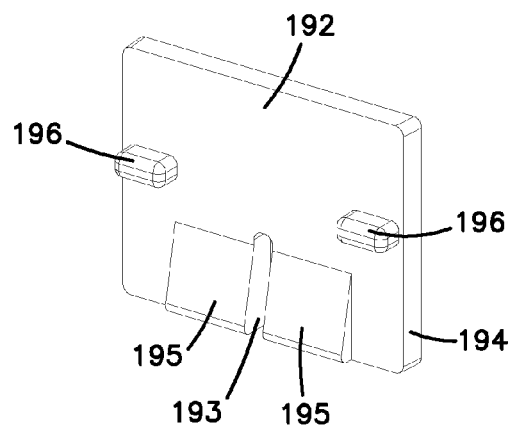
FIG. 39 is a perspective view of the fiber optic connector retainer of the second hybrid fiber/copper connector of FIG. 33, the fiber optic connector retainer configured to be placed within the first inner housing half of FIG. 34.
Figure 40:
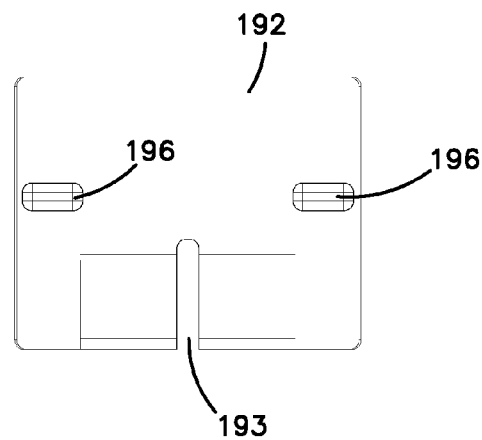
FIG. 40 is a bottom view of the fiber optic connector retainer of FIG. 39.
Figure 41:
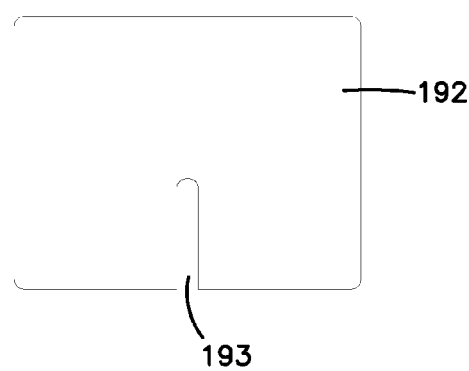
FIG. 41 is a top view of the fiber optic connector retainer of FIG. 39.
Figure 42:
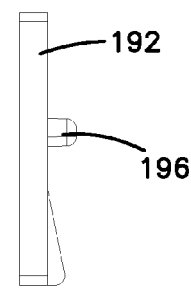
FIG. 42 is a side view of the fiber optic connector retainer of FIG. 39.
Figure 43:
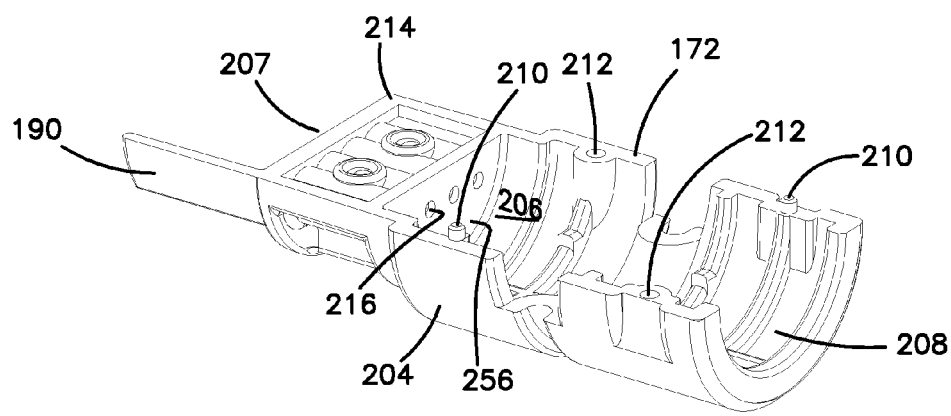
FIG. 43 is a perspective view of the second inner housing half of the second hybrid fiber/copper connector of FIG. 33.
Figure 44:
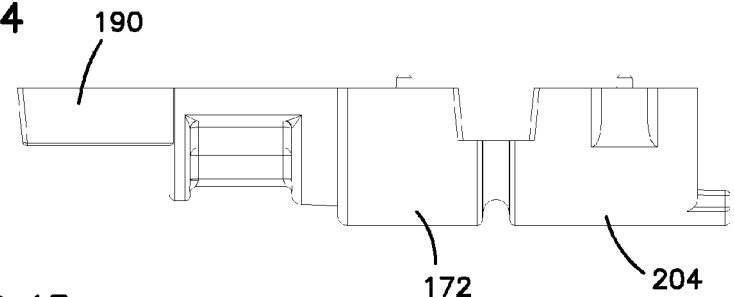
FIG. 44 is a side view of the second inner housing half of FIG. 43.
Figure 45:
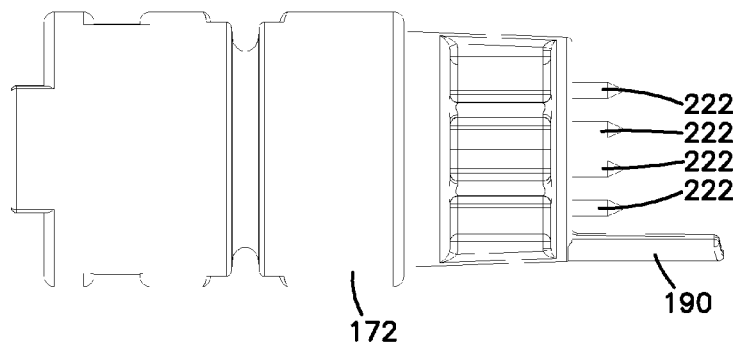
FIG. 45 is a bottom view of the second inner housing half of FIG. 43.
Figure 47:
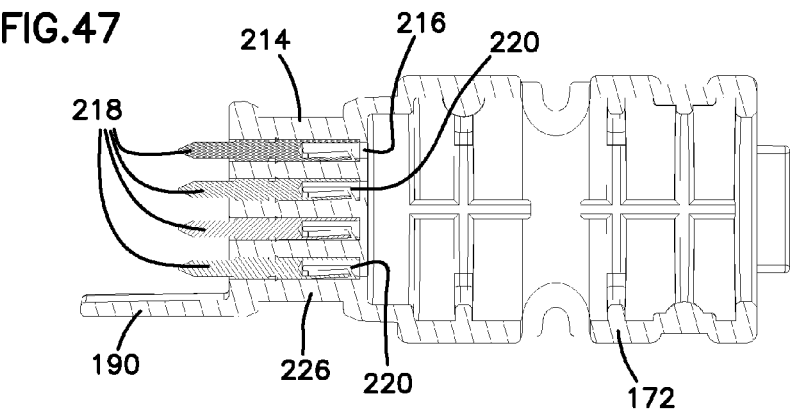
FIG. 47 is a cross-sectional view of the second inner housing half taken along line 47-47 of FIG. 46.
Figure 46:
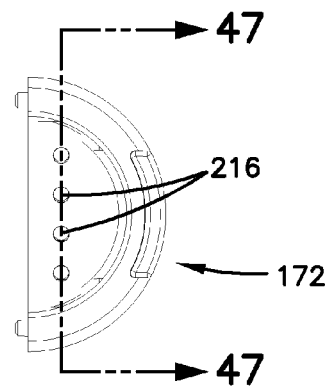
FIG. 46 is a rear end view of the second inner housing half of FIG. 43.
Figure 48:
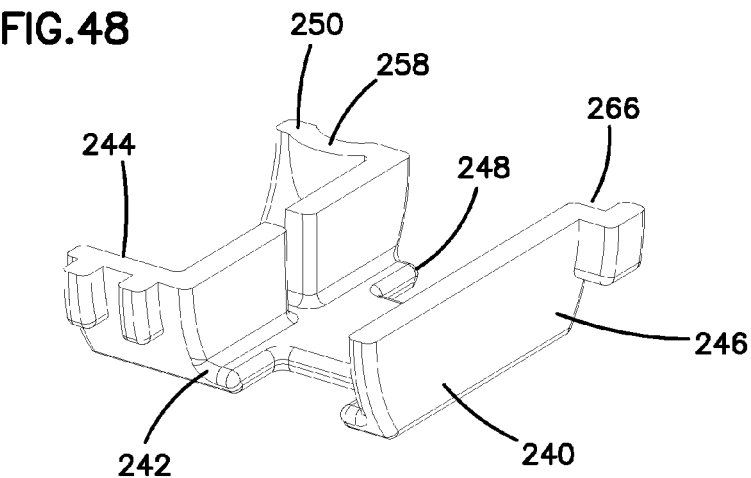
FIG. 48 is a perspective view of the conductor mount retainer of the second hybrid fiber/copper connector of FIG. 33, the conductor mount retainer configured to be placed within the second inner housing half of FIG. 43.

In FIGS. 28-29, the first and second inner housing halves 32, 34 are shown with the interior components inserted into the housing halves 32, 34. As shown, the fiber optic adapter 50 in the first inner housing half 32 receives a pair of fiber optic connectors 56/56' which may be terminated to the optical fibers of a hybrid fiber/copper cable. The interior 38 of the body 36 of the first inner housing half 32 may accommodate optical slack storage. During a gender conversion, these fiber optic connectors 56/56', just like the conductor mount 96 of the second inner housing half 34, may be removed from the fiber optic adapter 50 and from the first inner housing half 32 and remounted within a first housing half of the second hybrid fiber/copper connector 14 (i.e., male gender connector), to convert the gender of the hybrid fiber/copper connector. Such a male gender connector 14 having two male inner housing halves are shown in FIG. 33. The fiber optic connectors 56/56' and the fiber optic adapters 50 depicted in the present disclosure are described in further detail in U.S. Pat. No. 5,883,995, the entire disclosure of which has been incorporated herein by reference.

Figure 30:
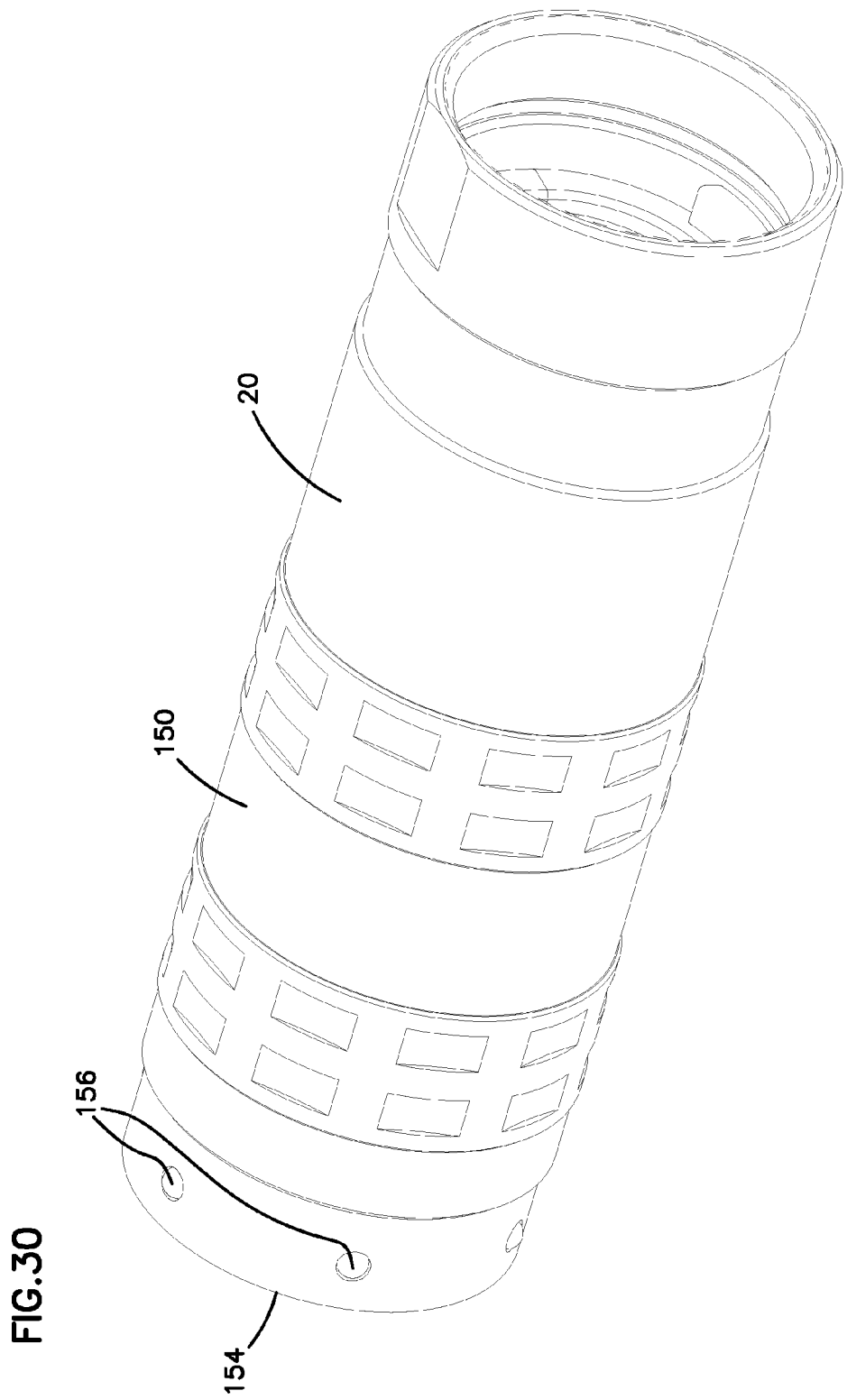
FIG. 30 illustrates an outer housing of the first hybrid fiber/copper connector of FIG. 4, the outer housing configured to receive the first and second inner housing halves of FIGS. 28-29.
Figure 32:
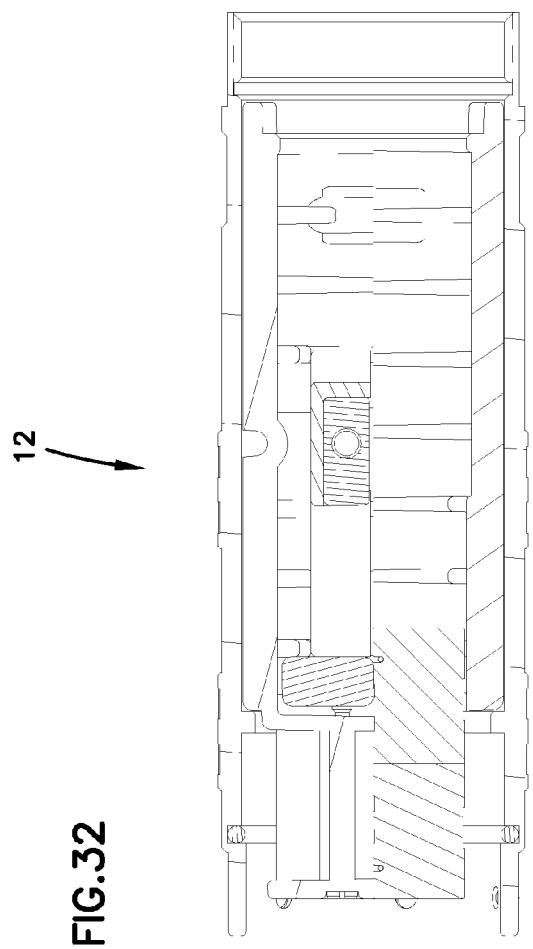
FIG. 32 is a cross-sectional view taken along line 32-32 of FIG. 31.

FIG. 30 illustrates the outer housing 20 of the first hybrid fiber/copper connector 12. As discussed before, once the first and the second housing halves 32, 34 are joined, the inner connector assembly 16 is slidable inserted into the outer housing 20 from a cable receiving end 28. FIGS. 31-32 show the first and second inner housing halves 32, 34 of the first hybrid fiber/copper connector 12 placed into the outer housing 20 of the first hybrid fiber/copper connector 12.

The outer circumferential wall 150 of the outer housing 20 includes gripping features 152. The mating end 154 of the outer housing 20 includes a plurality of circumferentially arranged ball bearings 156. The ball bearings 156 at the mating end 154 are configured to engage a circumferential recess 158 defined on an intermediate circumferential wall 160 of the outer housing 22 of the second hybrid fiber/copper connector 14. When the outer housings 20, 22 of the two hybrid connectors 12, 14 are coupled, a sliding ring 162 of the outer housing 22 of the second hybrid fiber/copper connector 14 is slid over the mating end 154 and the ball bearings 156 of the outer housing 20 of the first hybrid connector 12 to hold the two hybrid fiber/copper connectors 12, 14 in a mated configuration. The sliding locking ring 162 of the outer housing 22 of the second hybrid fiber/copper connector 14 and the recess 158 for receiving the ball bearings 156 is illustrated in FIGS. 1-3 and 54. In FIGS. 1 and 2, the sliding ring 162 is shown as having been slid over the ball bearings 156 of the outer housing 20 of the first hybrid fiber/copper connector 12. The sliding ring 162 is spring biased toward a locking position to hold the ball bearings 156 against the recess 158 on the intermediate circumferential wall 160 of the outer housing 22 of the second hybrid fiber/copper connector 14.

As discussed previously, before a hybrid cable segment is to be terminated to the inner connector assembly 16 of the first hybrid fiber/copper connector 12, the hybrid cable segment is inserted through an end cap cable clamp 24. The end cap 24 is threadingly mated to the cable receiving end 28 of the outer housing 20 of the first hybrid fiber/copper connector 12. As the end cap 24 is threaded, a collet 164 within the end cap 24 is compressed by a tapered rear seal member 166. Please refer to FIG. 2 for a cross-sectional view of the end cap 24 and the collet 164. As the collet 164 is compressed radially inwardly, it seals the cable jacket to the outer housing 20 of the first hybrid fiber/copper connector 12. A similar cable clamp and operation thereof is described in further detail in U.S. Pat. Nos. 6,575,786 and 6,846,988, the entire disclosures of which have been incorporated herein by reference.

Referring now to FIG. 33, an exploded view of the second, male gender, hybrid fiber/copper connector 14 is illustrated. The second hybrid fiber/copper connector 14 includes a first inner housing half 170 and a second inner housing half 172. The first and the second inner housing halves 170, 172 detachably mate together to form the inner connector assembly 18 of the second hybrid fiber/copper connector 14. Once the first and the second inner housing halves 170, 172 are mated and terminated to a hybrid cable, they are inserted into an outer housing 22 of the second hybrid fiber/copper connector 14.

As in the first hybrid fiber/copper connector 12, the first inner housing half 170 is configured to hold the fiber components of the connector 14 while the second inner housing half 172 is configured to hold the electrical/copper components of the connector 14.

Now referring to FIGS. 34-38, the first inner housing half 170 of the male hybrid fiber/copper connector 14 is illustrated. The first inner housing half 170 includes an elongated body 174 defining an interior 176 including a mating end 178 and a cable receiving end 180. The first inner housing half 170 defines a pair of alignment pins 182 and a pair of pin openings 183 for cooperatively mating with the second inner housing half 172.

Adjacent the mating end 178 of the first inner housing half 170 are a pair of longitudinal slots 184 configured to hold a pair of fiber optic connectors 56/56'. The fiber optic connectors 56/56' are inserted in a side-by-side orientation, extending out forwardly from the mating end 178 of the first inner housing half 170. The longitudinal slots 184 are configured to align the fiber optic connectors 56/56' with the fiber optic adapter 50 of the first hybrid connector 12 when the two hybrid connectors 12, 14 are mated. The interior 176 of the body 174 of the first inner housing half 170 may accommodate optical slack storage.

The first inner housing half 170 defines a forwardly protruding tab 186 at the mating end 178 of the first inner housing half 170. The tab 186 is located on a first side 188 of the body 174. The tab 186 is configured to mate with the recess 64 defined on the body 36 of the first inner housing half 32 of the female hybrid fiber/copper connector 12 to act as a keying feature when the second hybrid fiber/copper connector 14 is mated to the first hybrid fiber/copper connector 12. In this manner, the correct orientation of the mating ends of the first and second connectors 12, 14 are obtained when the two hybrid connectors 12, 14 are mated. As will be discussed below, the second inner housing half 172 of the male hybrid fiber/copper connector 14 also includes a forwardly extending tab 190 that aligns with the tab 186 of the first inner housing half 170. The two tabs 186, 190 together form a large tab that engages the large recess defined on the combined inner housings 32, 34 of the female hybrid connector 12. The two tabs 186, 190 also act to protect the fiber optic connectors 56/56' as the tabs 186, 190 extend alongside of the fiber optic connectors 56/56'.

A connector retainer 192 configured to be placed over the fiber optic connectors 56/56' is shown in FIGS. 39-42. The connector retainer 192 includes a generally flat body 194 that is adapted to lie flush with the upper face of the first inner housing half 170. It should be noted that all of the components of the inner housing halves 32, 34, 170, 172 are configured to lie flush with the upper faces of the inner housing halves 32, 34, 170, 172 so that different inner housing halves such as two first inner housing halves 32, 170 (of either the first or the second hybrid fiber/copper connector) or two second inner housing halves 34, 172 (of either the first or the second hybrid fiber/copper connector) can be mated to form different kinds of connectors. Two such examples have been shown in FIGS. 57 and 58, wherein two first inner housing halves 32 of a female hybrid fiber/copper connector 12 have been joined to form the female end of a quad fiber optic connector 200 and two first inner housing halves 170 of a male hybrid fiber/copper connector 14 have been mated to form the male end of a quad fiber optic connector 202 that is to mate with the female quad fiber connector 200. Other combination configurations are certainly possible since all of the inner components are mounted flush with the upper faces of the inner housing halves 32, 34, 170, 172.

Still referring to FIGS. 39-42, the connector retainer 192, as depicted, includes a pair of downwardly extending tabs 196 that are received into recesses 198 formed on the first inner housing half 170 to frictionally hold the connector retainer 192. The connector retainer 192 includes a longitudinal slot 193 at the front end for accommodating a separator wall 191 that separates the two fiber optic connectors 56/56'. The longitudinal slot 193 allows the connector retainer 192 to lie flush with the inner housing half upper face.

Underneath the connector retainer 192, on each side of the longitudinal slot 193, is a pair of ramped tabs 195. The ramped tabs 195 are configured to hold down the cantilever snap fit structures 197 of the fiber optic connectors 56/56' such that the fiber optic connectors 56/56' do not lock into the fiber optic adapters 50 when the male and female hybrid connectors 12, 14 are mated. Please refer to U.S. Pat. No. 5,883,995, the entire disclosure of which has been incorporated herein by reference, for further description of an LX.5 version of a fiber optic connector 56 and the interlocking mechanism of the fiber optic connector 56 and the fiber optic adapter 50. As discussed above, other types of fiber optic connectors such as a BX5 connector 56' may also be used.

The fiber optic connectors 56/56' that are inserted directly into the first inner housing half 170 of the male hybrid fiber/copper connector 14 or that are connected to the fiber optic adapter 50 within the first inner housing half 32 of the female hybrid fiber/copper connector 12 are terminated to the optical fibers of a hybrid fiber/copper cable segment. In certain embodiments, the optical fibers of the cable segment may be terminated to the ferrules of the fiber optic connectors 56/56' as known in the art.

In other embodiments, the fiber optic connectors 56/56' may be field-terminable. As such, the fiber optic connectors 56/56' may be provided with a preterminated fiber stub that can be heat-spliced in the field using a V-groove for aligning the fiber stub from the connector 56/56' and the optical fiber coming from the hybrid cable. In certain other embodiments, the fiber optic connectors 56/56' may be provided as part of an insert that includes the V-groove, wherein optical fibers coming from the hybrid cable may be spliced to the fiber stubs in the field utilizing the V-groove for alignment. An example field termination method is described in further detail in U.S. Pat. No. 6,811,323, the entire disclosure of which is incorporated herein by reference. Although heated epoxy may be used, other known techniques for field-splicing the optical fiber ends can be utilized.

FIGS. 43-47 illustrate the second inner housing half 172 of the second hybrid fiber/copper connector 14. The second inner housing half 172 is configured to house the copper components of the second, male, hybrid fiber/copper connector 14. As shown, the second inner housing half 172 includes an elongated body 204 defining an interior 206. The body 204 includes a mating end 207 and a cable receiving end 208. Similar to the first inner housing half 170, the second inner housing half 172 includes a pair of alignment pins 210 and a pair of pin openings 212 for cooperatively mating with the corresponding pins 182 and openings 183 of the first inner housing half 170.

Adjacent the mating end 207 of the second inner housing half 172 is an integrally formed conductor pin support 214. The conductor pin support 214 defines four channels 216 for nesting four conductive pins 218. The conductive pins 218 are shown in the cross-sectional view in FIG. 47 which is taken along line 47-47 of FIG. 46. As depicted, each of the four conductive pins 218 includes a female end 220 and a forwardly protruding male end 222. The conductive pins 218 are generally permanently mounted within the pin support 214 and form a part of the second inner housing half 172.

As in the first inner housing half 170, at the mating end 206 of the second inner housing half 172, there is a tab 190 protruding forwardly defined on a first side 226 of the body 204. The tab 190 is configured to mate with the recess 88 defined on the body 68 of the second inner housing half 34 of the female hybrid fiber/copper connector 12 to act as a keying feature when the second hybrid fiber/copper connector 14 is mated to the first hybrid fiber/copper connector 12. In this manner, the correct orientation of the mating ends of the first and second connectors 12, 14 are obtained when the two hybrid connectors 12, 14 are mated. The tab 190 aligns with the tab 186 of the first inner housing half 170 to form a large tab. The large tab engages the large recess defined on the combined inner housings of the female hybrid fiber/copper connector 12. As discussed above, the two tabs 186, 190 also act to protect the fiber optic connectors 56/56' as the tabs 186, 190 extend alongside of the fiber optic connectors 56/56'.

It should also be noted that, if two first inner housing halves 170 or if two second inner housing halves 172 of a male hybrid fiber/copper connector 14 are mated to form, for example, a quad fiber optic connector 202, the tabs 186 will be positioned diagonally from each other and not aligned vertically with each other. Please see FIG. 58. This provides a keying feature for mating with, for example, a connector formed from two first inner housing halves 32 or two second inner housing halves 34 of a female hybrid fiber/copper connector 12. Please see FIG. 57. The recesses 64 on the female hybrid fiber/copper connector 12 also become positioned diagonally such that the tabs 186 of a quad male 202 can only be mated with the recesses 64 of another mating quad female connector 200. Please see FIGS. 57 and 58 for the keying feature.

Still referring to FIGS. 43-47, the body 204 of the second inner housing half 172 includes an exterior circumferential groove 230. The body 204 also defines opposing slots 232 positioned at each end of the circumferential groove 230. The circumferential groove 230 and the slots 232, as discussed above, accommodate a strength member that might be a part of a hybrid cable terminated to the male hybrid connector 14.

Figure 49:
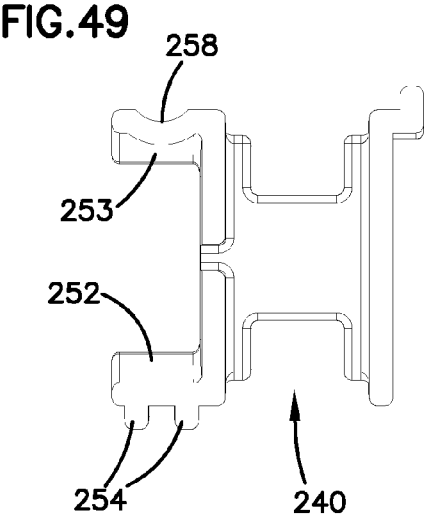
FIG. 49 is a top view of the conductor mount retainer of FIG. 48.
Figure 50:
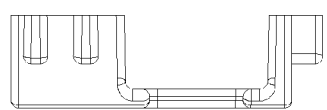
FIG. 50 is a side view of the conductor mount retainer of FIG. 48.
Figure 51:
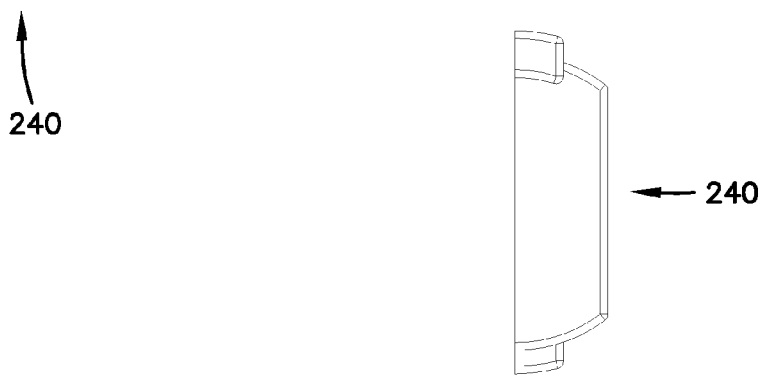
FIG. 51 is a rear end view of the conductor mount retainer of FIG. 48.

The interior 206 of the second inner housing half 172 is configured to receive a conductor mount that is identical to the conductor mount 96 shown in FIGS. 16-18. The forward ends 102 of the conductive pins 100 are adapted to be inserted within the channels 216 defined by the pin support 214 at the mating end 207 of the second inner housing half 172. As shown in FIG. 49, the conductor mount 96 is inserted into a recess 234 in the interior 206 of the body 204 and slid forwardly toward the pin support 214 until the conductive pins 100 physically and electrically mate with the female ends 220 of the conductive pins 218 that are in the channels 216 of the pin support 214. The male ends 222 of the conductive pins 218 protrude out for electrically mating with the female ends 86 of the conductive pins 84 of the female hybrid fiber/copper connector 12.

As in the female hybrid fiber/copper connector 12, the rear ends 106 of the conductive pins 100 are exposed through openings 108 defined on the conductor mount 96. The rear ends 106 of the conductive pins 100 are terminated to copper wires of a hybrid fiber/copper cable, just as in the female hybrid fiber/copper connector 12. And, since the conductor mount 96 can be removed from the second inner housing half 172 of the second hybrid fiber/copper connector 14 (i.e., male gender connector) and reinserted into the second inner housing half 34 of the first hybrid fiber/copper connector 12 (i.e., female gender connector), the gender of the hybrid connector 14 can be converted.

The conductor mount 96 is retained within the second inner housing half 172 by a conductor mount retainer 240 shown in FIGS. 48-51. The conductor mount retainer 240 is similar to the conductor mount retainer 110 of FIGS. 19-23. However, the conductor mount retainer 240 is shaped for insertion into the male gender hybrid fiber/copper connector 14. As shown, the conductor mount retainer 240 includes an elongated body 242 with a front portion 244, a rear portion 246 and a middle portion 248. The front portion 244 defines a U-shaped body 250 with a pair of forwardly extending legs 252, 253. The first leg 252 defines a pair of flanges 254 on the side of the leg 252. The flanges 252 are configured to receive a rib 256 on the interior 207 of the second inner housing half 172 for holding the conductor mount retainer 240 with a friction fit within the body 204. The second leg 253 defines a curved portion 258 for accommodating the alignment pin opening 212 defined in the second inner housing half 172.

The middle portion 248 of the conductor mount retainer 240 includes a recess 260 for receiving a strength member clamp. The strength member clamp used in the male hybrid fiber/copper connector 14 is the same clamp 132 illustrated in FIGS. 24-27. The middle portion 248 of the conductor mount retainer 240 defines a slot 262 for receiving the tab 136 of the strength member clamp 132 for proper orientation of the clamp 132. As shown in FIG. 53, the strength member clamp 132 is inserted into the recess 260 of the middle portion 248 of the conductor mount retainer 240 so as to lie flush with the upper face of the second inner housing half 172.

As shown in FIG. 53, along with a tab 264 at the rear portion of the conductor mount retainer 240, the strength member clamp 132 defines a recess 266 for receiving a second rib 268 located in the interior 207 of the body 204 of the second inner housing half 172.

As in the female hybrid fiber/copper connector 12, the strength member is inserted through an opening 270 created between the body 204 of the second inner housing half 172 and the rear portion of the conductor mount retainer 240. The strength member is, then, guided downwardly between the arms 142 of the strength member clamp 132 and then upwardly and around the circumferential groove. Once the strength member has wrapped around the circumferential groove 230, it is received into the throughhole 138 of the strength member clamp 132 at the opposite side of the arms 142 and comes out of the throughhole 138 of the strength member clamp 132. It is crimped in the pocket 144 defined between the arms 142.

In FIGS. 52 and 53, the first and second inner housing halves 170, 172 are shown with the interior components inserted into the first and second inner housing halves 170, 172. As shown, the first inner housing half 170 receives a pair of fiber optic connectors 56/56' which may be terminated to the optical fibers of a hybrid fiber/copper cable. These fiber optic connectors 56/56' are retained by the connector retainer 192 and the cantilever snap fit structures 197 are held down to prevent locking of the fiber optic connectors 56/56' within the fiber optic adapter 50 of the female hybrid fiber/copper connector 12. These fiber optic connectors 56/56', just like the conductor mount 96 of the second inner housing half 172, may be removed from the first inner housing half 170 of the male hybrid fiber/copper connector 14 and remounted within a first housing half 32 of a female hybrid fiber/copper connector 12 (to the fiber optic adapters therein), to convert the gender of the hybrid fiber/copper connector 14. Such a female gender connector 12 and the two inner housing halves are shown in FIG. 4.

Figure 54:
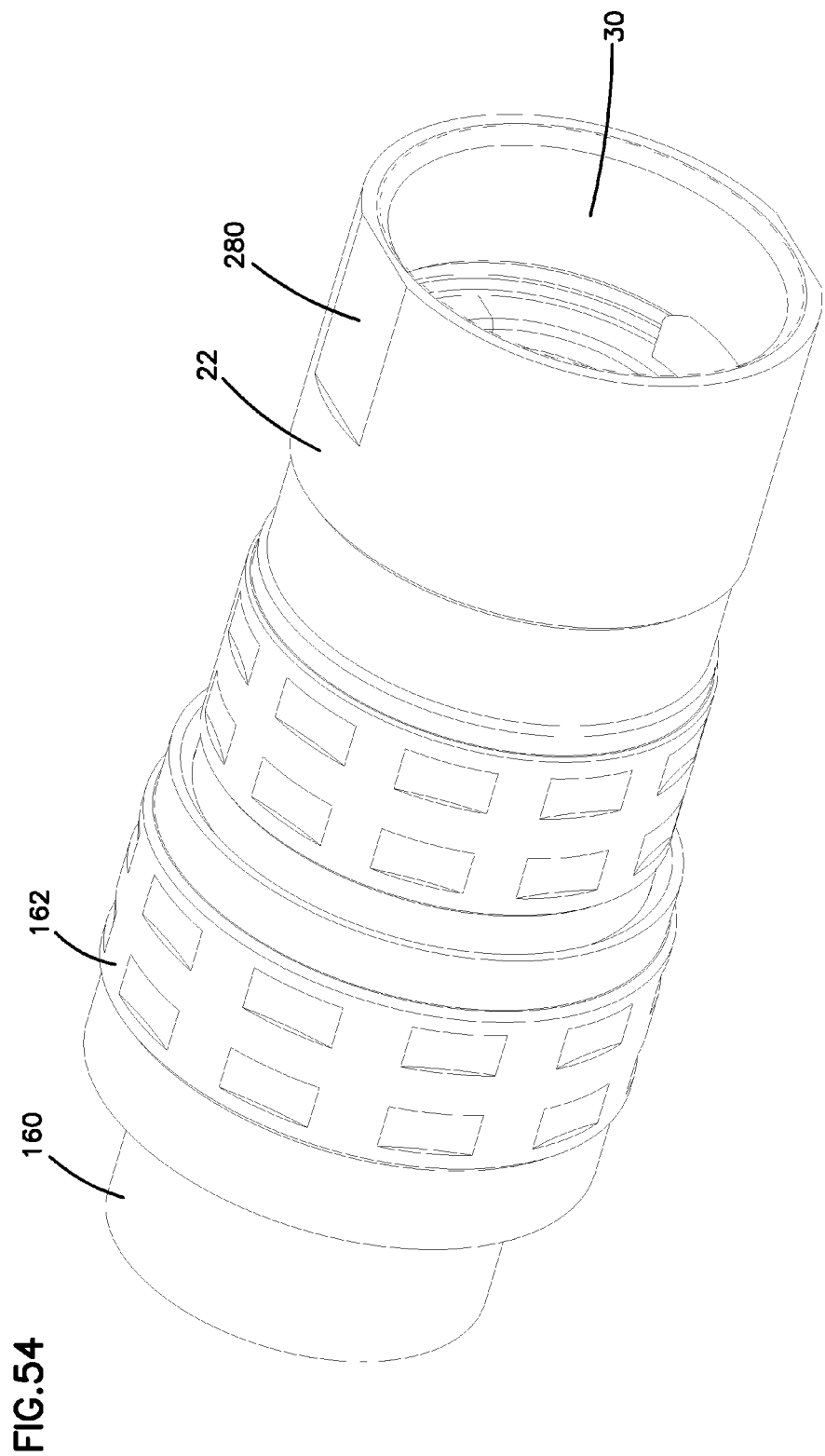
FIG. 54 illustrates an outer housing of the second hybrid fiber/copper connector of FIG. 33, the outer housing configured to receive the first and second inner housing halves of FIGS. 52-53.
Figure 55:
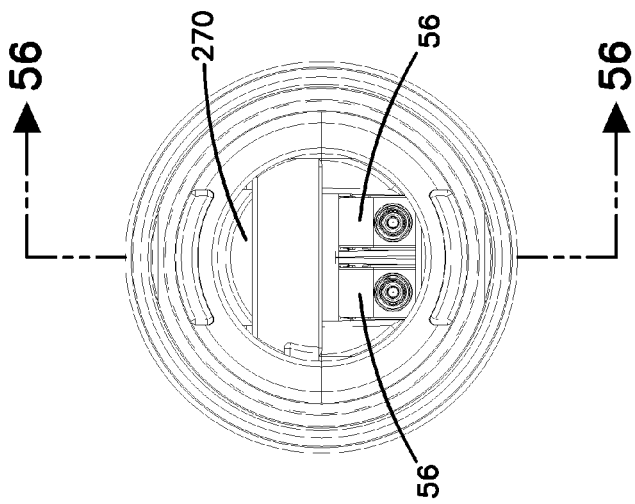
FIG. 55 illustrates a rear end view of the second hybrid fiber/copper connector of FIG. 33, the second hybrid fiber/copper connector shown in a fully assembled configuration.
Figure 56:
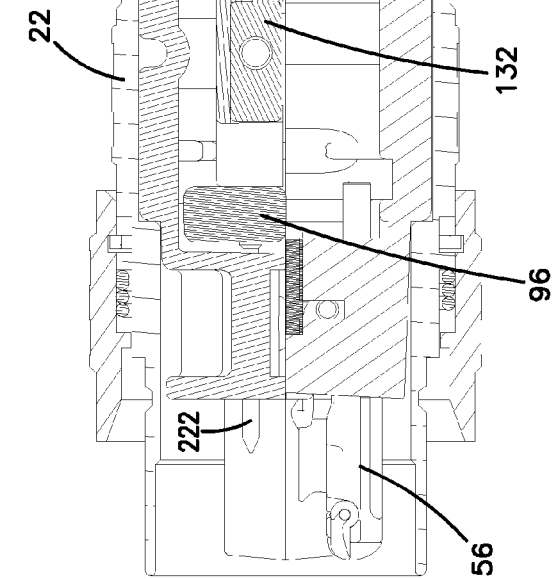
FIG. 56 is a cross-sectional view taken along line 56-56 of FIG. 55.

FIG. 54 illustrates the outer housing 22 of the second hybrid fiber/copper connector 14. As discussed before, once the first and the second housing halves 170, 172 are joined, the inner connector assembly 18 is slidably inserted into the outer housing 22 from a cable receiving end 30. FIGS. 55-56 show the first and second inner housing halves 170, 172 of the second hybrid fiber/copper connector 14 placed into the outer housing 22 of the second hybrid fiber/copper connector 14.

When the outer housings 20, 22 of the two hybrid connectors are coupled, a sliding ring 162 of the outer housing 22 of the second hybrid fiber/copper connector 14 is slid over the mating end 154 and the ball bearings 156 of the outer housing 20 of the first hybrid connector 12 to hold the two hybrid fiber/copper connectors 12, 14 in a mated configuration. The sliding locking ring 162 of the outer housing 22 of the second hybrid fiber/copper connector 14 and the recess 158 for receiving the ball bearings 156 is illustrated in FIGS. 1-3 and 54. In FIGS. 1 and 2, the sliding ring 162 is shown as having been slid over the ball bearings 156 of the outer housing 20 of the first hybrid fiber/copper connector 12. The sliding ring 162 is spring biased toward a locking position to hold the ball bearings 156 against the recess 158 on the intermediate circumferential wall 160 of the outer housing 22 of the second hybrid fiber/copper connector 14.

As discussed previously for the female hybrid fiber/copper connector 12, before the hybrid cable is to be terminated to the inner connector assembly 18 of the second hybrid fiber/copper connector 14, the hybrid cable is inserted through an end cap cable clamp 26. As depicted, the cable clamps 24, 26 and the cable receiving ends 28, 30 of the outer housings 20, 22 of the hybrid connectors include wrench flat portion with a plurality of opposing wrench flats 280 to aid the assembly of cable clamps 24, 26 to outer the housings 20, 22. As shown on FIGS. 2-3, 30, and 54, the cable receiving ends 28, 30 of the outer housings 20, 22 may be threaded to receive and engage the cable clamps 24, 26.

In another embodiment of the hybrid fiber/copper connector assembly, instead of being provided to connect two cable segments, the first hybrid fiber/copper connector 12 or the second hybrid fiber/copper connector 14 can be provided as part of a bulkhead configuration such as seen in FIGS. 8-11 of U.S. Pat. No. 7,213,975 and U.S. Patent Application Publication No. 2006/0233496 A1, the entire disclosures of which have been incorporated herein by reference.

In one embodiment of a bulkhead version of the hybrid fiber/copper connector assembly, the outer housings of the first and second hybrid fiber/copper connectors may be provided with mounting flanges such as shown in FIGS. 8-11 of U.S. Pat. No. 7,213,975 and U.S. Patent Application Publication No. 2006/0233496 A1, for mounting the hybrid fiber/copper connectors to a bulkhead. Openings defined through the flanges receive removable fasteners such as screws which engage fastener openings of the bulkhead.

The bulkhead may form part of any equipment, such as a camera, an enclosure, a cabinet, a panel, etc. Cables from within, for example, a camera or any other equipment, of which the bulkhead may form part of, enter into the cable receiving end of the hybrid fiber/copper connectors. The hybrid cable, which will have terminated thereto fiber optic connectors 56/56' and a conductor mount 96, is coupled to the inner housing halves of the hybrid fiber/copper connectors as described above for the first and second hybrid fiber/copper connectors 12, 14. It should be noted that the connector protruding out from the bulkhead may be a female hybrid fiber/copper connector such as connector 12 or it may be a male hybrid fiber/copper connector such as connector 14. One embodiment of a bulkhead female hybrid fiber/copper connector is shown in FIGS. 65-70 and one embodiment of a bulkhead male hybrid fiber/copper connector is shown in FIGS. 71-76.

When a female hybrid fiber/copper connector is used with the bulkhead, the fiber optic connectors 56/56' terminated to a hybrid cable coming from within the bulkhead equipment may be connected to the fiber optic adapters 50 inside the first inner housing half of the first hybrid fiber/copper connector. The conductor mount 96 that is terminated to the hybrid cable coming from within the bulkhead equipment may be directly inserted into the second inner housing half of the female hybrid fiber/copper connector and mate with the pins 84 within the pin support 80.

In assembling the bulkhead versions, the same steps can be followed as described above for the non bulkhead versions of the female hybrid fiber/copper connector 12. Once assembled, the female bulkhead hybrid fiber/copper connector will be ready to mate with a male hybrid fiber/copper connector 14 such as shown in FIG. 33 of the present disclosure.

If a male hybrid fiber/copper connector is used with the bulkhead, the fiber optic connectors 56/56' terminated to a hybrid cable coming from within the bulkhead equipment are directly inserted into the first inner housing half of the second (i.e., male) hybrid fiber/copper connector. The conductor mount 96 that is terminated to the hybrid cable coming from within the bulkhead equipment is directly inserted into the second inner housing half of the female hybrid fiber/copper connector and mates with the pins 218 within the pin support 214.

In assembling the bulkhead version, the same steps can be followed as described above for the non bulkhead versions of the male hybrid fiber/copper connector 14. Once assembled, the male bulkhead hybrid fiber/copper connector will be ready to mate with a female hybrid fiber/copper connector 12 such as shown in FIG. 4 of the present disclosure.

Since both hybrid connectors 12, 14 are constructed in modular form with removable portions, repair or replacement of a damaged component is achieved. It is known for one or more information carrying elements within a hybrid cable or the connectors terminating these elements (such as fiber optic connectors and pin conductors) to be damaged, necessitating repair or replacement of the hybrid fiber/copper connector assembly. While replacement is possible and is the common response to damage, this solution requires a camera operator to carry an entire spare assembly. Alternatively, to repair a damaged termination, either connector of cable segment could be removed and that cable segment could be reterminated. However, retermination is time consuming and is difficult to accomplish in the field, where the damage is likely to occur while using the camera. Assembly of the present invention is constructed to permit individual elements of cable or terminations of these elements to be replaced in the field by a camera operator with simple tools and does not require that the camera operator carry an extensive array of replacement items.

For example, if one of the fiber strands within cable in cable segment becomes damaged, and the camera operator can identify the damaged strand, the camera operator may loosen the cable clamp, remove the first and second inner housing halves 32, 34 from the outer housing 20 of, for example, the first hybrid fiber/copper connector 12. With interior of the inner connector assembly 16 exposed, the fiber connector 56/56' terminating the damaged fiber may be removed from adapter 50 within the first inner housing half 32 and moved to one side. A replacement fiber segment, such as a patch cord including ends terminated with fiber optic connectors 56/56' may be used.

A similar process may be followed to replace a damaged copper pin conductor.

Figure 61:
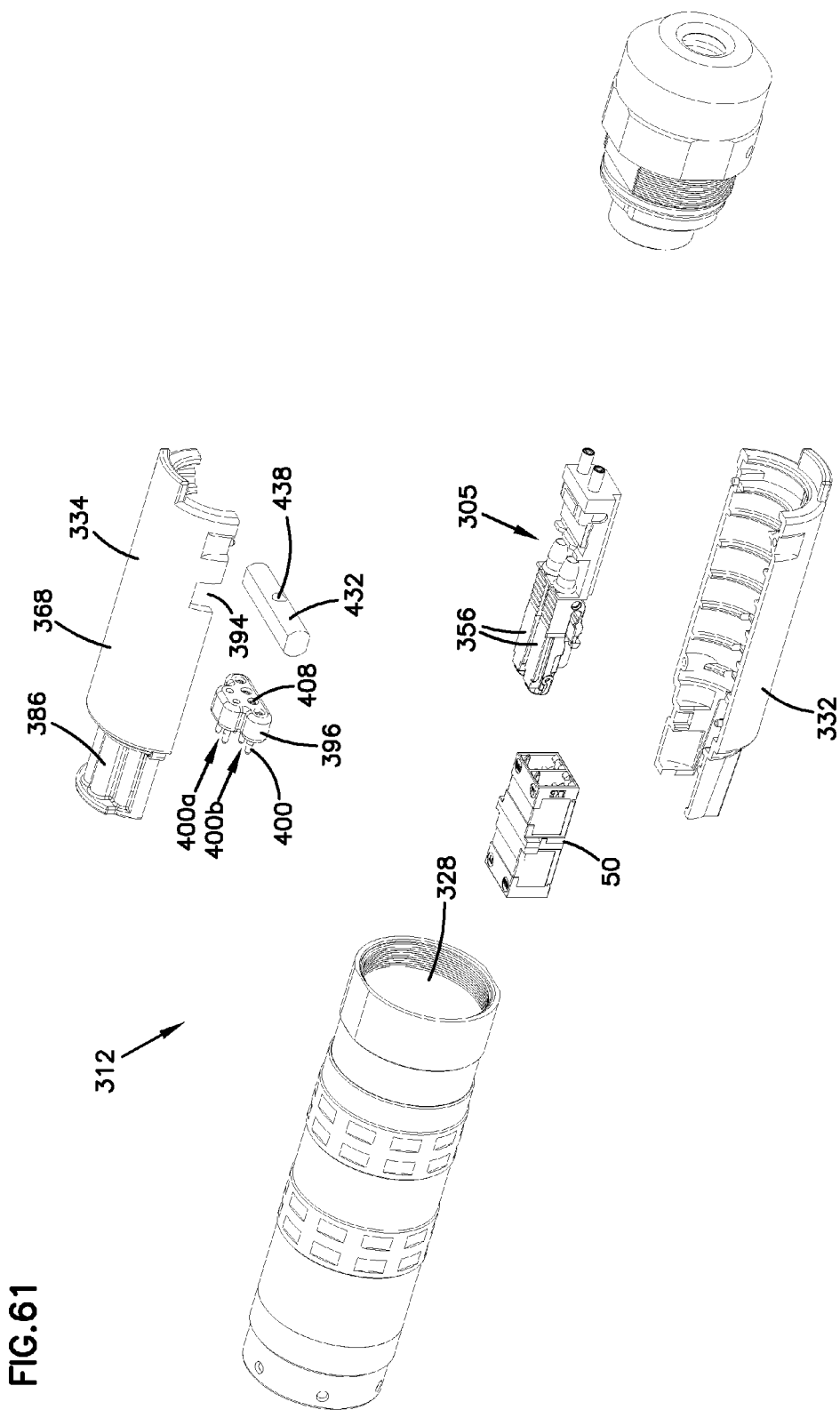
FIG. 61 is an exploded perspective view of the second embodiment of the first hybrid fiber/copper connector of FIG. 59.

Referring now to FIGS. 59-61, a second embodiment of a first (i.e., female gender) hybrid fiber/copper connector 312 that is configured to be a part of an assembly similar to the hybrid fiber/copper connector assembly 10 of FIGS. 1-3 is shown. The second embodiment of the female hybrid fiber/copper connector 312 is similar in configuration to the first embodiment of the first hybrid fiber/copper connector 12 shown in FIG. 4, except for a number of differences that will be discussed below.

As discussed previously, in certain embodiments, the fiber optic connectors 56/56' that are used with the different male and female hybrid fiber/copper connectors may be field terminable. Referring to FIG. 61, the second embodiment of the female hybrid fiber/copper connector 312 is shown with one example of a field terminable fiber optic connector assembly 305. The field terminable fiber optic assembly 305 shown in FIG. 61 is described in further detail in U.S. patent application Ser. No. 11/735,267, entitled "FIELD TERMINABLE FIBER OPTIC CONNECTOR ASSEMBLY", filed Apr. 13, 2007, the entire disclosure of which is incorporated herein by reference. As noted above, a field terminable fiber optic connector assembly may also be used with the first embodiment of the female hybrid fiber/copper connector 12.

The field terminable fiber optic connector assembly 305 is formed as an insert that may be inserted into the first inner housing half 332 of the female hybrid fiber/copper connector 312. The first inner housing half 332 of the second embodiment of the female hybrid fiber/copper connector 312 has been specifically configured to receive the field terminable fiber optic connector assembly 305 shown. The fiber optic connectors 356 of the field terminable fiber optic connector assembly 305 are configured to mate with the fiber optic adapter 50 located within the first inner housing half 332.

As discussed previously, a field terminable fiber optic connector assembly allows a damaged fiber to be repaired in the field using heat splicing.

It should be noted that the second embodiment of the female hybrid fiber/copper connector 312 is not limited to use with the field terminable fiber optic connector assembly 305 shown in FIG. 61 and that it can also house fiber optic connectors whose ferrules have been preterminated to optical fibers of a cable at the factory setting, such as the fiber optic connectors 56/56' shown in FIG. 28.

As discussed above, the second embodiment of the female hybrid fiber/copper connector 312 includes a number of differences from the first embodiment 12. One difference lies in the configuration of the strength member clamp. The body 368 of the second inner housing half 334 of the second embodiment of the female hybrid fiber/copper connector 312 includes a slot 394 for receiving a strength member clamp bar 432. The bar 432 includes a throughhole 438 that is configured to receive a strength member of a cable. Once the strength member of a cable is received from a cable receiving end 328 of the female hybrid fiber/copper connector 312, the strength member is inserted through the hole 438 of the bar 432 and is crimped at opposite side of the hole 438. Once the strength member is inserted through the hole 438, the strength member may be crimped to the bar in a number of different ways including crimping a crimp ball (e.g., made out of stainless steel in one embodiment) to the end of the strength member that is larger than the hole 438 of the bar 432. In this manner, removal of the strength member from the bar 432 is prevented. In certain embodiments, the bar 432 may be made from metallic materials and may provide a grounding path to the strength member. In one embodiment, the bar 432 is made from stainless steel. According to one embodiment, the strength member clamp bar 432 depicted herein is rated to hold 225 lbs. of force for about 5 minutes.

Another difference between the second embodiment of the female hybrid fiber/copper connector 312 and the first embodiment 12 lies in the configuration of the conductor mount 396. The conductor mount 396 includes six forwardly protruding conductive pins 400. The lower layer of conductive pins 400b may be power pins and the upper layer 400a of conductive pins may be communications pins. As discussed above, when used in a broadcast camera environment, one of the optical fibers of the hybrid connector may be used to transmit video and related audio signals to the camera and the second optical fiber may be used to transmit video and audio captured by the camera to the production facility or some other location. Four of the copper conductors may be used to provide power to operate the camera, while the other two of copper conductors may be used to provide communications between the production facility and the camera operator. The number of fiber strands and copper conductors extending within the hybrid cable may be varied as required to support the desired usage and communication bandwidth of the camera and the hybrid connectors disclosed herein may be configured accordingly.

The second inner housing half 334 of the second embodiment of the female hybrid fiber/copper connector 312 includes an integrally formed conductor pin support 380 that is configured to mate with the conductor mount 396. The conductor pin support 380 defines six channels 382 which include six conductive pins 384 within the channels 382. The forward ends of the conductive pins 400 of the conductor mount 396 are adapted to be inserted into the channels 382 defined by the pin support 380. The conductor mount 396 is removably inserted into the body 368 of the second inner housing half 334 of the second embodiment of the female hybrid fiber/copper connector 312 and slid forwardly toward the pin support 380 until electrical connection is established. Unlike the first embodiment of the female hybrid fiber/copper connector 12, the second embodiment 312 does not include a conductor mount retainer 110. The conductor mount 396 is held within the body 368 of the second inner housing half 334 by friction.

The rear ends of the conductive pins are exposed through openings 408 defined on the conductor mount 396. The rear ends of the conductive pins 400 are terminated to copper wires of a hybrid fiber/copper cable. Since the conductor mount 396 is a removable piece, the conductor mount 396 can be removed from the second inner housing half 334 of the first hybrid fiber/copper connector 312 (i.e., female gender connector) and reinserted into the second inner housing of the second hybrid fiber/copper connector (i.e., male gender connector) 314 as part of the conversion of the genders of the hybrid connectors 312, 314.

Figure 64:
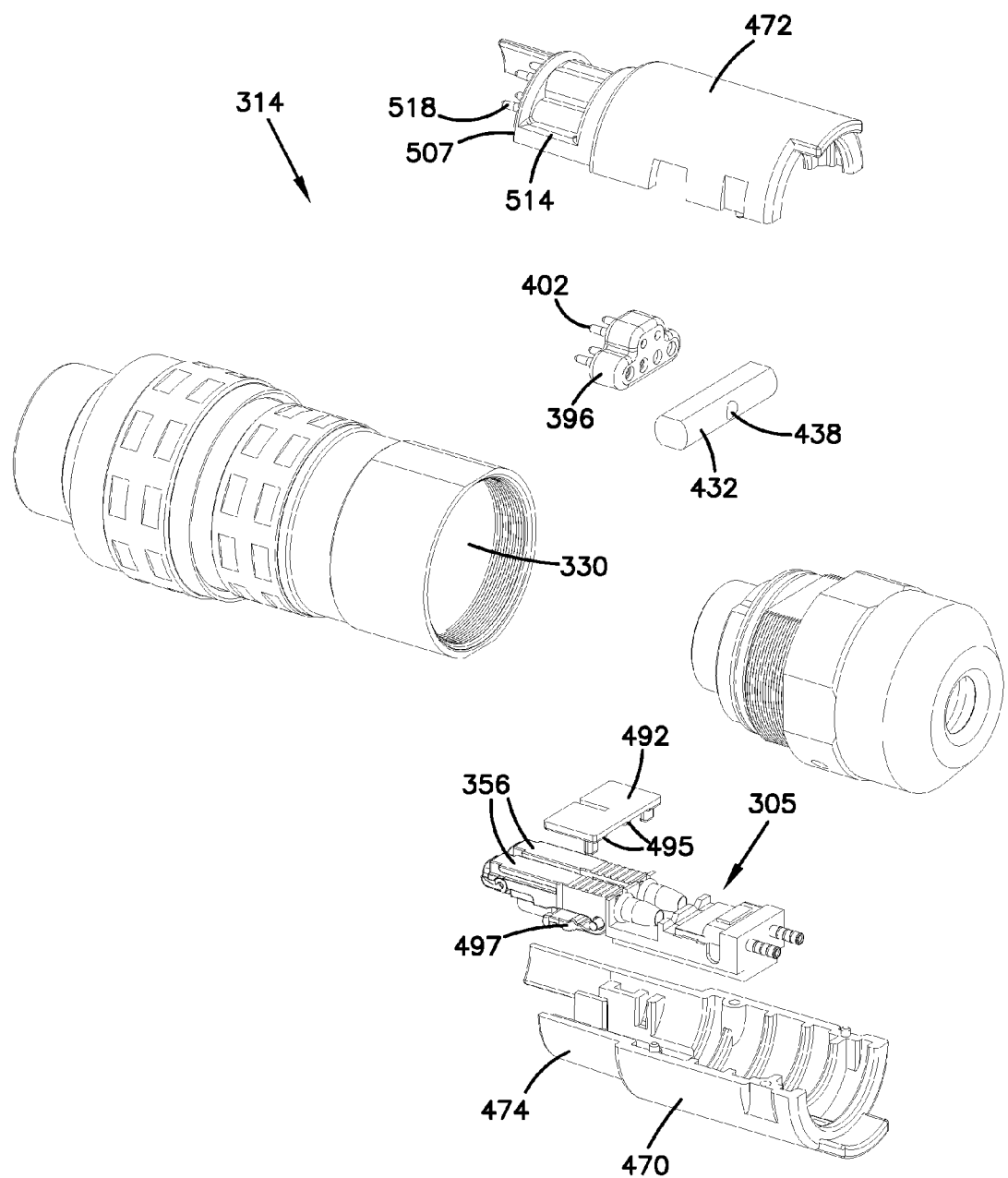
FIG. 64 is an exploded perspective view of the second embodiment of the second hybrid fiber/copper connector of FIG. 62.

Referring now to FIGS. 62-64, the second embodiment of a second (i.e., male gender) hybrid fiber/copper connector 314 that is configured to mate with the second embodiment of the female hybrid fiber/copper connector 312 of FIGS. 59-61 to form an assembly similar to the hybrid fiber/copper connector assembly 10 of FIGS. 1-3 is shown. The second embodiment of the male hybrid fiber/copper connector 314 is similar in configuration to the first embodiment of the male hybrid fiber/copper connector 14 shown in FIG. 33, except for a number of differences.

In FIG. 64, the second embodiment of the male hybrid fiber/copper connector 314 is shown with the field terminable fiber optic connector assembly 305, discussed in further detail in U.S. patent application Ser. No. 11/735,267, entitled "FIELD TERMINABLE FIBER OPTIC CONNECTOR ASSEMBLY", filed Apr. 13, 2007, the entire disclosure of which is incorporated herein by reference.

As noted above, a field terminable fiber optic connector assembly may also be used with the first embodiment of the male hybrid fiber/copper connector 14.

The field terminable fiber optic connector assembly 305 is formed as an insert that may be inserted into the first inner housing half 470 of the male hybrid fiber/copper connector 314. The first inner housing half 470 of the second embodiment of the male hybrid fiber/copper connector 314 has been specifically configured to receive the field terminable fiber optic connector assembly 305 shown. A connector retainer 492 is placed over the fiber optic connectors 356 once the field terminable fiber optic connector assembly 305 is placed within the first inner housing half 470, as shown in FIG. 64. When the second embodiment of the male hybrid fiber/copper connector 314 is mated to the second embodiment of the female hybrid fiber/copper connector 312 shown in FIGS. 59-61, the fiber optic connectors 356 of the field terminable fiber optic connector assembly 305 mate with the fiber optic adapter 50 located within the first inner housing half 332 of the female hybrid fiber/copper connector 312.

It should be noted that the second embodiment of the male hybrid fiber/copper connector 314 is not limited to use with the field terminable fiber optic connector assembly 305 shown in FIG. 64 and that it can also house fiber optic connectors whose ferrules have been preterminated to optical fibers of a cable at the factory setting, such as the fiber optic connectors 56/56' shown in FIG. 33.

As shown in FIG. 64, the fiber optic connectors 356 are mounted within the first inner housing half 470 of the second embodiment of the male hybrid fiber/copper connector 314 in an upside down orientation as compared to the first embodiment 14. However, as in the first embodiment 14, the connector retainer 492 of the second embodiment 314 also includes ramped tabs 495 underneath thereof. The ramped tabs 495 press against the bottom side of the fiber optic connectors 356 and cause the cantilever snap fit structures 497 at the opposite side to be flexed against the body 474 of the first inner housing half 470. In this manner, when the fiber optic connectors 356 of the field terminable fiber optic connector assembly 305 are coupled to a fiber optic adapter 50 (e.g., of the female hybrid fiber/copper connector), the fiber optic connectors 356 do not lock into the fiber optic adapter 50.

As discussed above, the second embodiment of the male hybrid fiber/copper connector 314 includes a number of differences from the first embodiment 14.

Referring to FIG. 64, as in the female counterpart, one difference lies in the configuration of the strength member. The strength member clamp in the form of a bar 432 with a hole 438 is used. As in the female counterpart, once the strength member of a cable is received from a cable receiving end 330 of the male hybrid fiber/copper connector 314, the strength member is inserted through the hole 438 of the bar 432 and is crimped at opposite side of the hole 438 with a crimp ball (e.g., made out of stainless steel).

Still referring to FIG. 64, the second inner housing half 472 of the second embodiment of the male hybrid fiber/copper connector 314 is configured to receive a conductor mount that is identical to the conductor mount 396 shown in FIG. 61. Thus, the integrally formed pin support 514 adjacent the mating end 507 of the second inner housing half 472 is configured to receive the forward ends 402 of the six conductive pins 400 of the conductor mount 396. The six conductive pins 400 of the conductor mount 396 establish an electrical connection with the conductive pins 518 within the conductor pin support 514. Each of the conductive pins 518 includes a female end and forwardly protruding male end and are generally permanently mounted within the pin support 514.

Again, as in the second embodiment of the female hybrid fiber/copper connector 312, the second embodiment of the male hybrid fiber/copper connector 314 does not include a conductor mount retainer. The conductor mount 396 is held within the body 504 of the second inner housing half 472 by friction.

Since the conductor mount 396 is a removable piece, the conductor mount 396 can be removed from the second inner housing half 472 of the male hybrid fiber/copper connector 314 and reinserted into the second inner housing 334 of the female hybrid fiber/copper connector 312 as part of the conversion of the genders of the hybrid connectors 312, 314.

As noted previously, instead of being provided to connect two cable segments, the female hybrid fiber/copper connector or the male hybrid fiber/copper connector can be provided as part of a bulkhead configuration such as seen in FIGS. 8-11 of U.S. Pat. No. 7,213,975 and U.S. Patent Application Publication No. 2006/0233496 A1, the entire disclosures of which have been incorporated herein by reference.

The bulkhead may form part of any equipment, such as a camera, an enclosure, a cabinet, a panel, etc. Cables from within, for example, a camera or any other equipment, of which the bulkhead may form part of, enter into the cable receiving end of the hybrid fiber/copper connectors. The hybrid cable, which will have terminated thereto fiber optic connectors and a conductor mount, is coupled to the inner housing halves of the hybrid fiber/copper connectors as described above for the first and second hybrid fiber/copper connectors. It should be noted that the connector protruding out from the bulkhead may be a female hybrid fiber/copper connector or it may be a male hybrid fiber/copper connector.

Referring to FIGS. 65-70, one embodiment of a bulkhead female hybrid fiber/copper connector 612 is shown. The bulkhead female hybrid connector 612 includes a bulkhead mounting panel 609, an outer housing 620, a first inner housing half 632, and a second inner housing half 634. The first inner housing half 632 is configured to hold the fiber components of the bulkhead female connector 612 while the second inner housing half 634 is configured to hold the electrical/copper components of the bulkhead female connector 612. The first and the second inner housing halves 632, 634 detachably mate together and are inserted into the outer housing 620 of the bulkhead female hybrid fiber/copper connector 612. After insertion, the outer housing 620 is fastened to the bulkhead mounting panel 609. The bulkhead mounting panel 609 includes fastener holes 607 for mounting to a bulkhead.

As shown in FIG. 67, the outer housing 620 includes a mating end 754 and a cable receiving end 628. A grounding spring 605 is inserted into the outer housing 620. The grounding spring 605 is configured to make contact with the outer housing 22 of a male hybrid fiber/copper connector 14 for grounding the entire hybrid assembly. As shown in the cross-sectional view in FIG. 70, the grounding spring 605 is inserted within a circumferential recess 604 of the interior of the outer housing 620. The interior surface of the grounding spring 605 makes contact with the exterior surface of the intermediate circumferential wall 160 of the outer housing 22 of a male hybrid connector 14 for establishing a grounding pathway between the two outer housings 620, 22.

After the first and second inner housing halves 632, 634 are inserted into the outer housing 620 from the cable receiving end 628, the cable receiving end 628 is inserted through an opening 603 in the panel 609 and fastened to the panel 609 with a nut 601. A grounding ring 611 is captured between the nut 601 and the panel 609 as the outer housing 620 is fastened to the panel 609. The outer housing 620 includes a circumferential flange portion 613 that is configured to capture an o-ring 615 against the panel 609 for providing a watertight seal. The o-ring 615 is shown in the cross-sectional view in FIG. 70.

As shown in FIG. 67, the cable receiving end 628 of the outer housing 620 and the opening 603 of the panel 609 may include intermating flats for keying purposes.

The mating end 754 of the outer housing 620 is preferably configured to mate with the outer housing 22 of the male hybrid fiber/copper connector 14 shown in FIG. 54. As such, the mating end 754 of the outer housing 620 includes a plurality of circumferentially arranged ball bearings 756 that are configured to engage a circumferential recess 158 defined on an intermediate circumferential wall 160 of the outer housing 22 of the male hybrid fiber/copper connector 14. When the outer housing 620 of the bulkhead female hybrid connector 612 is coupled to the outer housing 22 of the male hybrid connector 14, the sliding ring 162 of the outer housing 22 of the male hybrid fiber/copper connector 14 is slid over the mating end 754 and the ball bearings 756 of the outer housing 620 of the bulkhead female hybrid connector 612 to hold the two hybrid fiber/copper connectors in a mated configuration. The sliding locking ring 162 of the outer housing 22 of the male hybrid fiber/copper connector 14 and the recess 158 for receiving the ball bearings 756 is illustrated in FIGS. 1-3 and 54. The sliding ring 162 is spring biased toward a locking position to hold the ball bearings 756 against the recess 158 on the intermediate circumferential wall 160 of the outer housing 22 of the male hybrid fiber/copper connector 14.

The cable receiving end 628 of the bulkhead female hybrid connector 612 is configured to threadingly receive an end cap 624. A hybrid cable segment that includes preterminated fiber optic connectors and also copper conductors may be inserted through the end cap 624 to mate with the fiber and copper components of the bulkhead female hybrid connector 612, as will be discussed below.

Still referring to FIG. 67, the first inner housing half 632 of the bulkhead female hybrid fiber/copper connector 612 includes a body 636 with a fiber optic adapter 50 removably mounted to the body 636. The fiber optic adapter 50 may be mounted to the body 636 in the same manner as in the first inner housing half 32 of the female hybrid connector 12 of FIGS. 4-9. The fiber optic adapter 50 mounted to the first housing half 632 is illustrated in FIG. 10. As depicted, the fiber optic adapter 50 is a duplex adapter including a front end and a rear end. Two fiber optic connectors mounted into the front end of the fiber optic adapter 50 can optically mate with two fiber optic connectors mounted into the rear end of the fiber optic adapter 50. As depicted, the adapter 50 is configured to receive and optically connect two pairs of LX.5 type connectors. Other connector and adapter formats can also be used.

Still referring to FIG. 67, the body 636 includes a mating end 640 and a cable receiving end 642. The first inner housing half 632 defines alignment features for cooperatively mating with the second inner housing half 634 of the bulkhead female hybrid connector 612. The mating end 640 of the body 636 of the first inner housing half 632 includes an exterior recessed portion 664 defined on a first side 666 of the body 636. The recessed portion 664 is configured to act as a keying feature when a male hybrid fiber/copper connector 14 is mated to the bulkhead female hybrid fiber/copper connector 612. In this manner, the correct orientation of the mating ends of the bulkhead female and the male hybrid connectors 612, 14 are obtained when the two hybrid connectors are mated.

The second inner housing half 634 is configured to house the copper components of the bulkhead female hybrid fiber/copper connector 612. The second inner housing half 634 includes a body 668 with a mating end 672 and a cable receiving end 674. The second inner housing half 634 includes an alignment pin 676 and a pin opening 678 for cooperatively mating with a corresponding pin and opening of the first inner housing half 632.

The second inner housing half 634 includes an integrally formed conductor pin support 680 adjacent the mating end 672. The conductor pin support 680 defines six channels 682. The channels 682 include therein six conductive pins 684. Each of the six conductive pins 684 includes two female ends. The conductive pins 684 are generally permanently mounted within the pin support 680 and form a part of the second inner housing half 634.

As in the first inner housing half 632, the second inner housing half 634 defines an exterior recessed portion 688 on a first side 690 of the pin support 680. The recess 688 is configured align with the recess 664 of the first inner housing half 632 when the two housing halves 632, 634 are joined to define a big recess. The big recess acts as a keying feature when the bulkhead female hybrid fiber/copper connector 612 is mated to a male hybrid fiber/copper connector 14 such that the correct orientation of the mating ends of the two hybrid connectors are obtained.

The cable receiving end of the body 674 of the second inner housing half 634 is configured to receive a removable conductor mount. The conductor mount is identical to the conductor mount 396 shown in FIGS. 61 and 64. The conductor mount 396 includes six forwardly protruding conductive pins 400. The forward ends of the conductive pins 400 are adapted to be inserted within the channels 682 defined by the pin support 680 at the mating end 672 of the second inner housing half 634. The conductor mount 396 is removably inserted into a recess 704 in the interior 670 of the body 668 and slid forwardly toward the pin support 680. The conductor mount 396 is slid until the conductive pins 400 physically and electrically mate with the rear female ends of the conductive pins 684 in the channels 682 of the pin support 680.

Referring to FIG. 66, the rear ends 406 of the conductive pins 400 are exposed through openings 408 defined on the conductor mount 396. The rear ends 406 of the conductive pins 400 may be terminated to copper wires of a hybrid fiber/copper cable. Since the conductor mount 396 is a removable piece, the conductor mount 396 can be removed from the second inner housing half 634 of the bulkhead female hybrid fiber/copper connector 612 and reinserted into a second inner housing 772 of a bulkhead male hybrid fiber/copper connector 614, as will be discussed further below. In this manner, the gender of a bulkhead hybrid connector may be changed.

In FIGS. 65, 66, and 68-70, the bulkhead female hybrid connector 612 is shown in an assembled configuration. The fiber optic adapter 50 in the first inner housing half 632 is configured to receive a pair of fiber optic connectors 56/56' which may be terminated to the optical fibers of a hybrid fiber/copper cable. During a gender conversion, the fiber optic connectors 56/56', just like the conductor mount 396 of the second inner housing half 634, may be removed from the fiber optic adapter 50 and from the first inner housing half 632 and remounted within a first housing half of a bulkhead male hybrid fiber/copper connector 614, to convert the gender of the bulkhead hybrid fiber/copper connector. An example of such a male gender bulkhead connector 614 having two male inner housing halves is shown in FIGS. 71-76.

The second, male gender, bulkhead hybrid fiber/copper connector 614 is illustrated in an exploded configuration in FIG. 73. The bulkhead male hybrid fiber/copper connector 614 includes a bulkhead mounting panel 909, an outer housing 622, a first inner housing half 770, and a second inner housing half 772. As in the female counterpart, the first inner housing half 770 is configured to hold the fiber components of the bulkhead male connector 614 while the second inner housing half 772 is configured to hold the electrical/copper components of the bulkhead male connector 614. The first and the second inner housing halves 770, 772 detachably mate together and are inserted into the outer housing 622 of the bulkhead male hybrid fiber/copper connector 614. After insertion, the outer housing 622 is fastened to the panel 909.

As shown in FIG. 73, the outer housing 622 includes a mating end 900 and a cable receiving end 630. The cable receiving end 630 includes threads 901. After the first and second inner housing halves 770, 772 are inserted into the outer housing 622 from the cable receiving end 630, the cable receiving end 630 is inserted through an opening 902 in the panel 909 and fastened to the panel 909 with a nut 903. A grounding ring 904 is captured between the nut 903 and the panel 909 as the outer housing 622 is fastened to the panel 909. An o-ring 905 is captured between a circumferential flange portion 906 of the outer housing 622 and the panel 909 for providing a watertight seal. The o-ring 905 is shown in the cross-sectional view in FIG. 76. An end cap 626 is threadingly mated to the cable receiving end 630 of the outer housing 622 of the bulkhead male hybrid fiber/copper connector 614.

As shown in FIG. 73, the cable receiving end 630 of the outer housing 622 and the opening 902 of the panel 909 may include intermating flats for keying purposes.

The mating end 900 of the outer housing 622 is configured to mate with the outer housing 20 of the female hybrid fiber/copper connector 12 shown in FIG. 30. Referring to FIG. 76, when the outer housing 20 of the female hybrid fiber/copper connector 12 is coupled to the outer housing 622 of the bulkhead male hybrid connector 614, a sliding ring 762 of the outer housing 622 of the bulkhead male hybrid fiber/copper connector 614 is slid over the mating end 154 and the ball bearings 156 of the outer housing 20 of the female hybrid connector 12 to hold the two hybrid fiber/copper connectors in a mated configuration. The sliding ring 762 is spring biased toward a locking position to hold the ball bearings 156 against a recess 758 on an intermediate circumferential wall 760 of the outer housing 622 of the bulkhead male hybrid fiber/copper connector 614.

Now referring to FIG. 73, as in the bulkhead female hybrid fiber/copper connector 612, the first inner housing half 770 of the bulkhead male hybrid connector 614 is configured to hold the fiber components of the connector while the second inner housing half 772 is configured to hold the electrical/copper components of the connector. The first inner housing half 770 includes an elongated body 774 defining an interior 776 including a mating end 778 and a cable receiving end 780.

The first inner housing half 770 defines an alignment pin 782 and a pin opening 783 for cooperatively mating with the second inner housing half 772.

Adjacent the mating end 778 of the first inner housing half 770 are a pair of longitudinal slots 784 configured to hold a pair of fiber optic connectors 56/56'. The fiber optic connectors 56/56' are shown in FIG. 76. It should be noted that the first inner housing half 770 may receive either factory preterminated fiber optic connectors or may be configured to receive an insert in the form of a field terminable fiber optic connector assembly, as shown in FIG. 64. In the depicted embodiment, the first inner housing half 770 is configured to receive factory preterminated fiber optic connectors 56/56'. The fiber optic connectors 56/56' are inserted in a side-by-side orientation, extending out forwardly from the mating end 778 of the first inner housing half 770. The longitudinal slots 784 are configured to align the fiber optic connectors 56/56' with a fiber optic adapter 50 of a female hybrid connector 12 when the two hybrid connectors are mated.

Still referring to FIG. 73, the first inner housing half 770 defines a forwardly protruding tab 786 at the mating end 778 of the first inner housing half 770. The tab 786 is located on a first side 788 of the body 774. The tab 786 is configured to mate with the recess 64 defined on the body 36 of the first inner housing half 32 of a female hybrid fiber/copper connector 12 to act as a keying feature when the bulkhead male hybrid fiber/copper connector 614 is mated to a female hybrid fiber/copper connector 12. In this manner, the correct orientation of the mating ends are obtained when the two hybrid connectors are mated. As will be discussed below, the second inner housing half 772 of the bulkhead male hybrid fiber/copper connector 614 also includes a forwardly extending tab 790 that aligns with the tab 786 of the first inner housing half 770. The two tabs 786, 790 together form a large tab that engages the large recess defined on the combined inner housings 32, 34 of a female hybrid connector 12. The two tabs 786, 790 also act to protect the fiber optic connectors 56/56' as the tabs 786, 790 extend alongside of the fiber optic connectors 56/56'.

A connector retainer 792 configured to be placed over the fiber optic connectors 56/56' is shown in FIG. 73. The connector retainer 792 is similar in configuration to the connector retainer shown in FIGS. 33, 39-42, and 64 and performs the same function.

As noted above, the fiber optic connectors 56/56' that are inserted directly into the first inner housing half 770 of the bulkhead male hybrid fiber/copper connector 614 or that are connected to the fiber optic adapter 50 within the first inner housing half 632 of the bulkhead female hybrid fiber/copper connector 612 are terminated to the optical fibers of a hybrid fiber/copper cable segment. In certain embodiments, the optical fibers of the cable segment may be terminated to the ferrules of the fiber optic connectors as known in the art and in other embodiments, the fiber optic connectors may be field-terminable.

Referring back to FIG. 73, the second inner housing half 772 includes an elongated body 804 defining an interior 806. The body 804 includes a mating end 807 and a cable receiving end 808. Similar to the first inner housing half 770, the second inner housing half 772 includes an alignment pin and a pin opening for cooperatively mating with the corresponding pin 782 and opening 783 of the first inner housing half 770.

Adjacent the mating end 807 of the second inner housing half 772 is an integrally formed conductor pin support 814. The conductor pin support 814 defines six channels for nesting six conductive pins. Each of the six conductive pins includes a female end and a forwardly protruding male end.

The conductive pins are generally permanently mounted within the pin support 814 and form a part of the second inner housing half 772.

As in the first inner housing half 770, at the mating end 807 of the second inner housing half 772, there is a tab 790 protruding forwardly defined on a first side 826 of the body 804. The tab 790 is configured to mate with the recess 88 defined on the body 68 of the second inner housing half 34 of a female hybrid fiber/copper connector 12 to act as a keying feature when the bulkhead male hybrid fiber/copper connector 614 is mated to a female hybrid fiber/copper connector 12. In this manner, the correct orientation of the mating ends are obtained when the two hybrid connectors are mated. The tab 790 aligns with the tab 786 of the first inner housing half to form a large tab. The large tab engages the large recess defined on the combined inner housings of a female hybrid fiber/copper connector 12. As discussed above, the two tabs 786, 790 also act to protect the fiber optic connectors 56/56' as the tabs extend 786, 790 alongside of the fiber optic connectors 56/56'.

The interior 806 of the second inner housing half 772 is configured to receive a conductor mount that is identical to the conductor mount 396 shown in FIGS. 61 and 64. The forward ends 402 of the conductive pins 400 are adapted to be inserted within the channels defined by the pin support 814 at the mating end 807 of the second inner housing half 772. The conductor mount 396 is inserted into a recess in the interior 806 of the body 804 and slid forwardly toward the pin support 814 until the conductive pins 400 physically and electrically mate with the female ends of the conductive pins that are in the channels of the pin support 814. The male ends of the conductive pins protrude out for electrically mating with the female ends 86 of the conductive pins 84 of a female hybrid fiber/copper connector 12.

As in the bulkhead female hybrid fiber/copper connector 612, the rear ends 406 of the conductive pins 400 are exposed through openings 408 defined on the conductor mount 396. The rear ends 406 of the conductive pins 400 are terminated to copper wires of a hybrid fiber/copper cable, just as in the bulkhead female hybrid fiber/copper connector 612. And, since the conductor mount 396 can be removed from the second inner housing half 772 of the bulkhead male hybrid fiber/copper connector 614 and reinserted into the second inner housing half 634 of a bulkhead female hybrid fiber/copper connector 612, the gender of the bulkhead hybrid connector can be converted.

The first inner housing half 770 is configured to receive a pair of fiber optic connectors 56/56' which may be terminated to the optical fibers of a hybrid fiber/copper cable. The fiber optic connectors 56/56' are retained by the connector retainer 792 and the cantilever snap fit structures are pressed against the body of the first inner housing half 770 to prevent locking of the fiber optic connectors 56/56' within the fiber optic adapter 50 of a female hybrid fiber/copper connector 12. The fiber optic connectors (whether be factory terminated fiber optic connectors or fiber optic connectors that are part of a field terminable fiber optic connector assembly), just like the conductor mount 396 of the second inner housing half 772, may be removed from the first inner housing half 770 of the bulkhead male hybrid fiber/copper connector 614 and remounted within a first housing half 632 of a bulkhead female hybrid fiber/copper connector 612 (to the fiber optic adapter therein), to convert the gender of the bulkhead hybrid fiber/copper connector.

Figure 77:
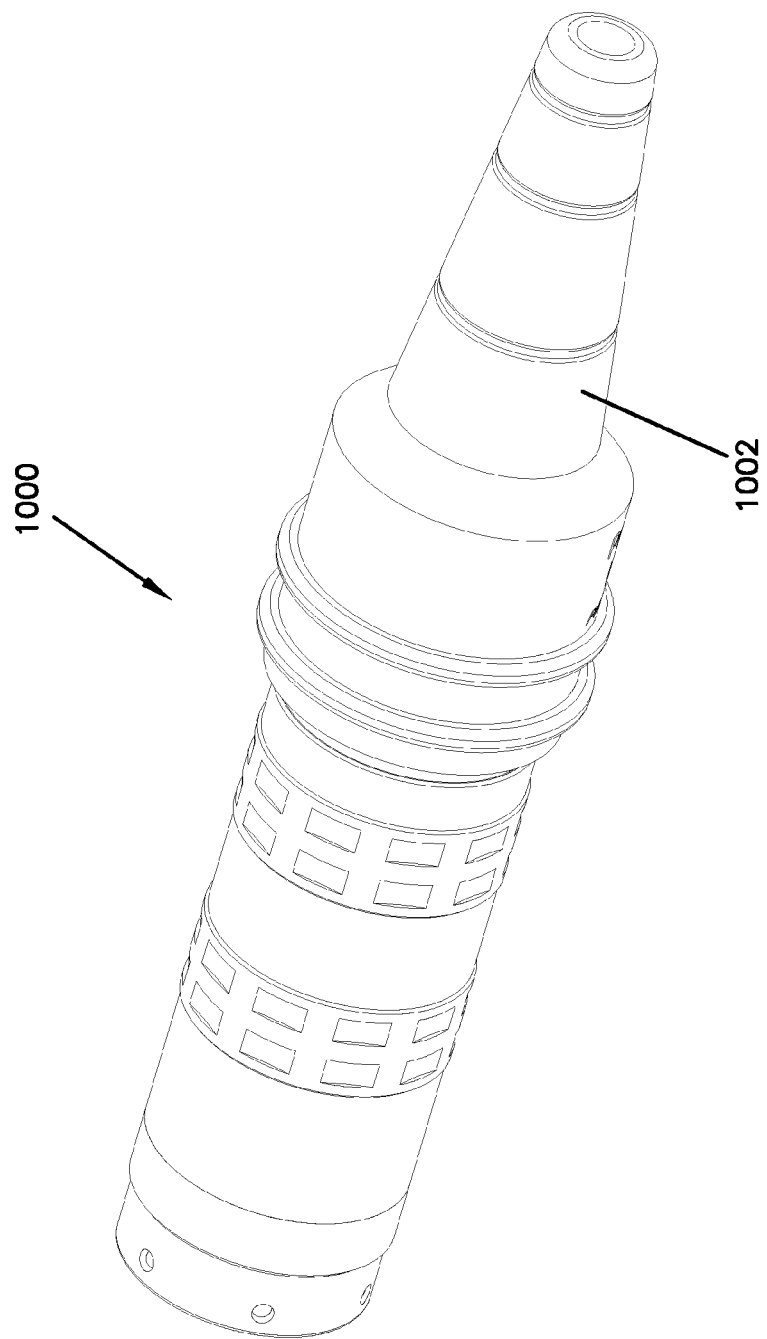
FIG. 77 is a perspective view of a third embodiment of a first hybrid fiber/copper connector that is configured to be a part of an assembly similar to the hybrid fiber/copper connector assembly of FIGS. 1-3.
Figure 78:
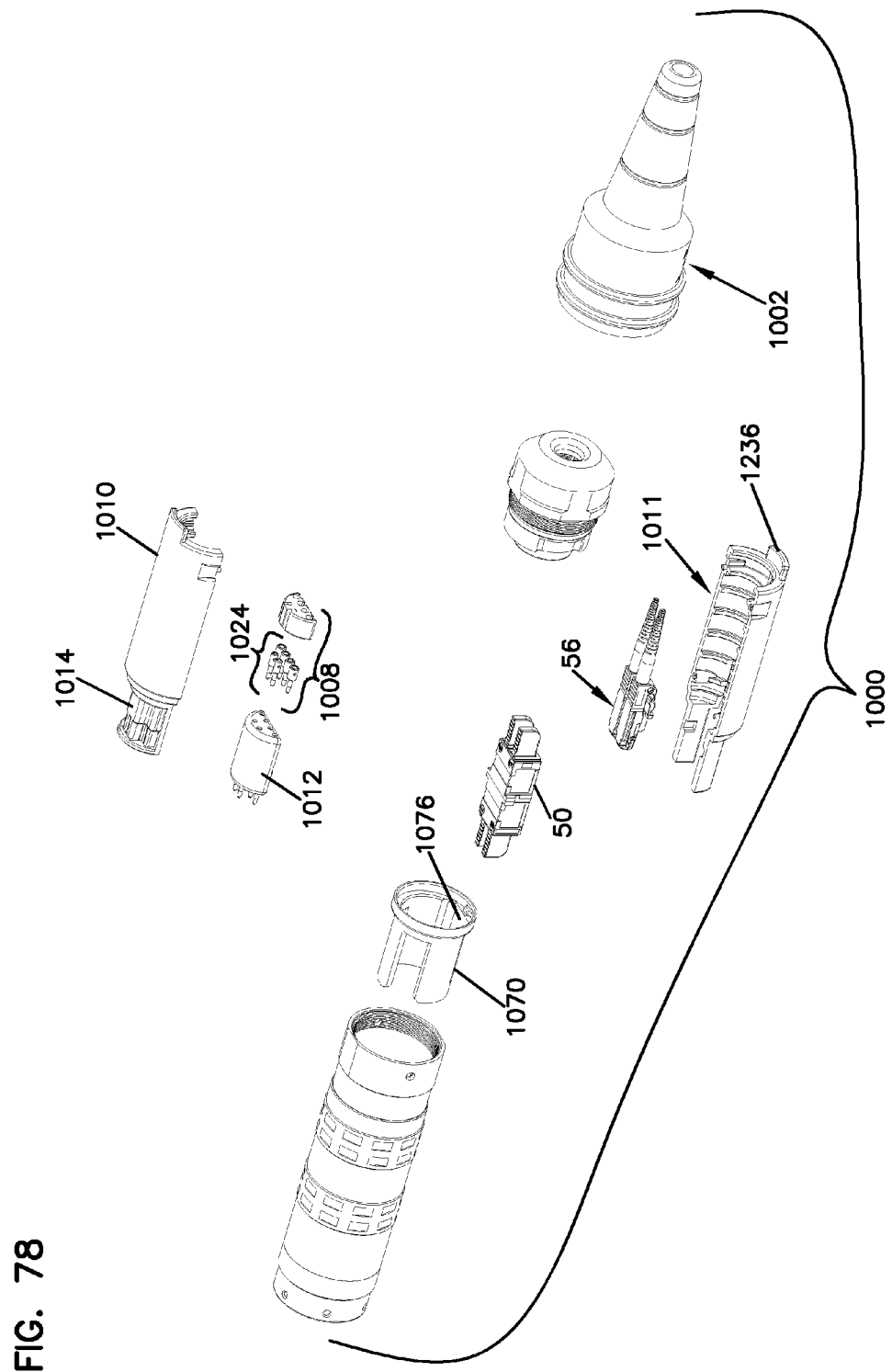
FIG. 78 is an exploded perspective view of the third embodiment of the first hybrid fiber/copper connector of FIG. 77.

Referring now to FIGS. 77-78, a third embodiment of a first (i.e., female gender) hybrid fiber/copper connector 1000 that is configured to be a part of an assembly similar to the hybrid fiber/copper connector assembly 10 of FIGS. 1-3 is shown. The third embodiment of the female hybrid fiber/copper connector 1000 is similar in configuration to the first and second embodiments of the first hybrid fiber/copper connectors 12 and 312, respectively, except for a number of differences that will be discussed below.

For example, the third embodiment of the female hybrid fiber/copper connector 1000 includes a strain relief boot 1002 that mounts to an endcap 1004 of the female hybrid fiber/copper connector 1000. It should be noted that the strain relief boot 1002 may be used on the male hybrid fiber/copper connector 1006 shown in FIGS. 90-91, as well as on other connectors of the third embodiment such as the female and male quad fiber connectors, as will be discussed in further detail below.

Another difference of the third embodiment of the female hybrid fiber/copper connector 1000 lies in the configuration of the conductor mount 1008 that is removably mounted within the second inner housing half 1010. The female hybrid fiber/copper connector 1000 includes the removably mounted conductor mount 1008 and also an additional removable copper connection adapter 1012. The removable copper connection adapter 1012 is shown in greater detail in FIG. 86. The removably mounted conductor mount 1008 is shown in greater detail in FIG. 87.

Figure 85:
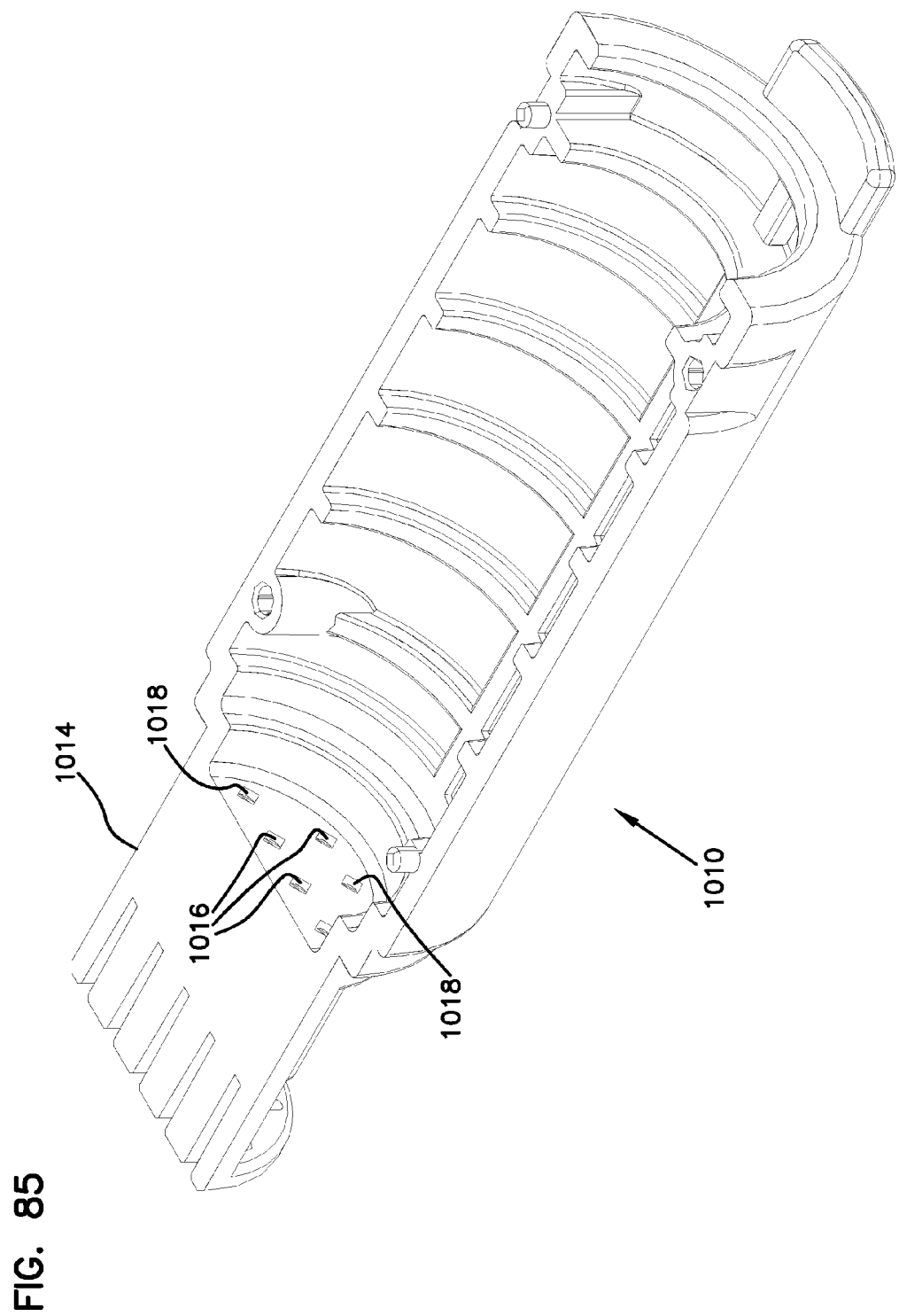
FIG. 85 is a perspective view of the second inner housing half of the third embodiment of the first hybrid fiber/copper connector of FIG. 78.

As noted above, the removably mounted conductor mount 1008 is mounted within the second inner housing half 1010 of the third embodiment of the female hybrid fiber/copper connector 1000 of FIG. 85. The second inner housing half 1010 includes an integrally formed conductor pin support 1014 adjacent the mating end of the connector 1000. The conductor pin support 1014 defines six channels 1016. The channels 1016 include therein six conductive pins 1018. Each of the conductive pins 1018 includes two female ends 1020. The conductive pins 1018 are generally permanently mounted within the pin support 1014 and form a part of the second inner housing half 1010.

As shown in FIG. 78, the removably mounted conductor mount 1008 mates with the copper connection adapter 1012 after it has been slidably inserted into the second inner housing half 1010. The copper connection adapter 1012 includes protruding pins 1022 that mate with the integral conductor pin support 1014 of the second inner housing half 1010.

Figure 87:
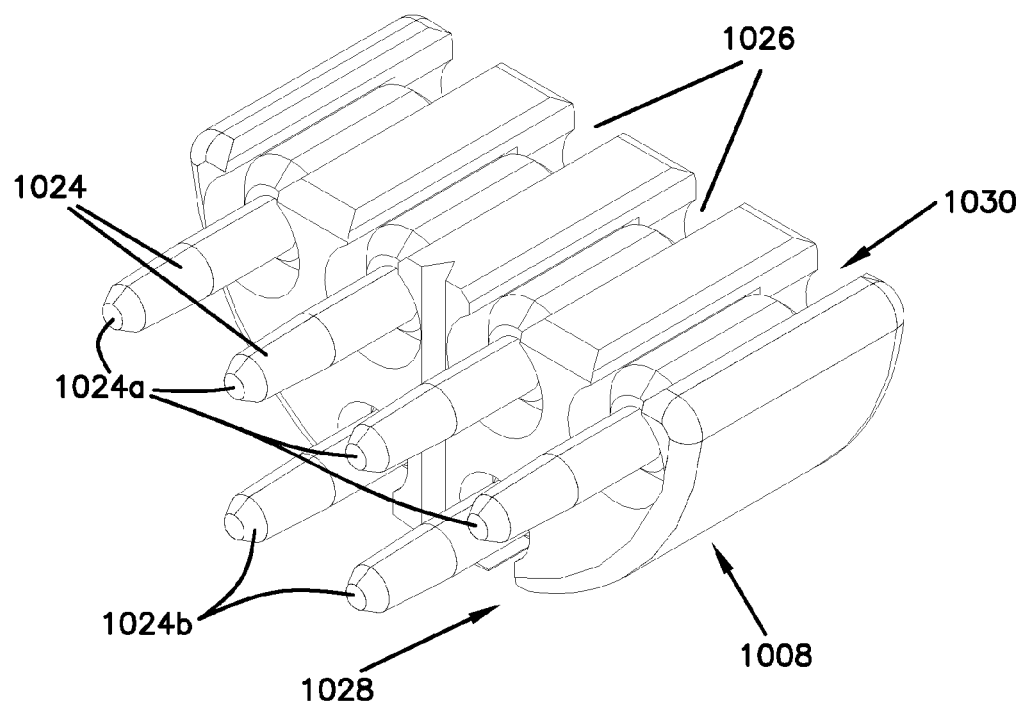
FIG. 87 is a perspective view of a removable conductor mount configured for use with the hybrid connectors of the third embodiment of the hybrid fiber/copper connector assembly.

As shown in FIGS. 78 and 87, the removably mounted conductor mount 1008 of the third embodiment includes individually removable conductive pins 1024. The pins 1024 are slidable into channels 1026 formed within the conductor mount 1008. As shown in FIG. 87, once the pins 1024 are crimped to electrical wires of a cable, they can be slid into the channels 1026 of the conductor mount 1008 in a direction going from the front 1028 to the back 1030 of the conductor mount 1008 to capture the pins 1024 within the channels 1026. The pins 1024 can be removed in the opposite direction. As in the second embodiment of the connector assembly, the six forwardly protruding conductive pins include a lower layer of pins 1024b and an upper layer of pins 1024a. The lower layer of conductive pins 1024b may be power pins and the upper layer of conductive pins 1024a may be communications pins.

The conductive pins 1024 are made removable so that if one desires to change the gender of the female hybrid fiber/copper connector 1000 to a male hybrid connector 1006, the individual conductive pins 1024 can be rearranged to provide for the correct arrangement for relaying the correct electrical signals.

Figure 79:
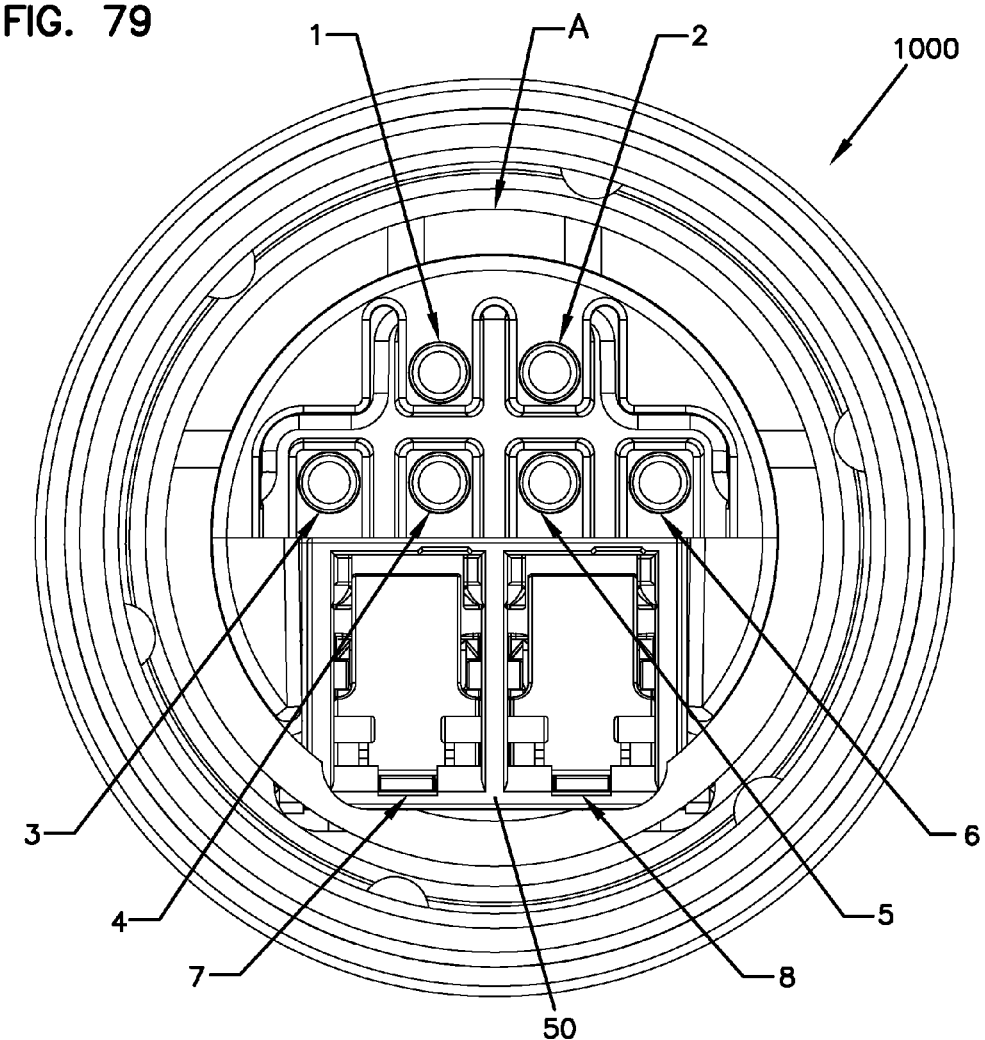
FIG. 79 is a diagram illustrating an end view of the third embodiment of the first hybrid fiber/copper connector of FIG. 77, showing the individual fiber and copper connections of the hybrid connector and a table listing each of the individual fiber and copper connections.
Figure 80:
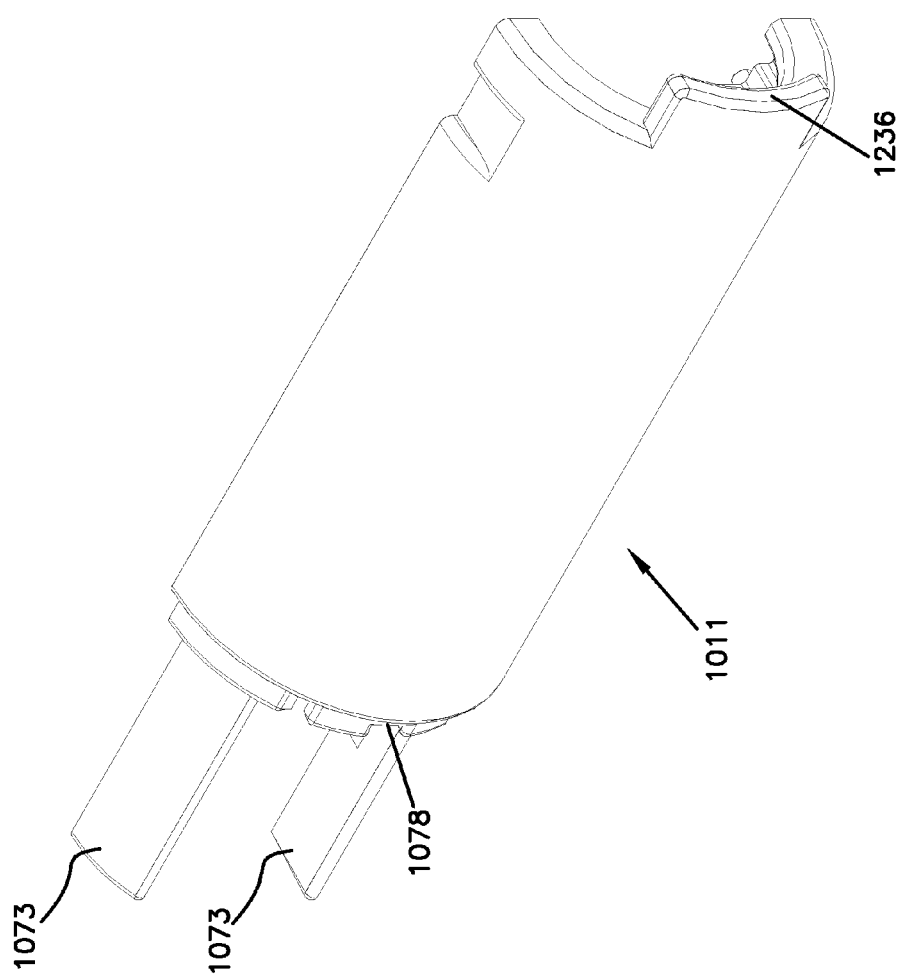
FIG. 80 is a perspective view of the first inner housing half of the third embodiment of the first hybrid fiber/copper connector of FIG. 78.

FIG. 79 shows a diagram illustrating the individual copper and fiber connections of the female hybrid connector 1000.

Figure 92:
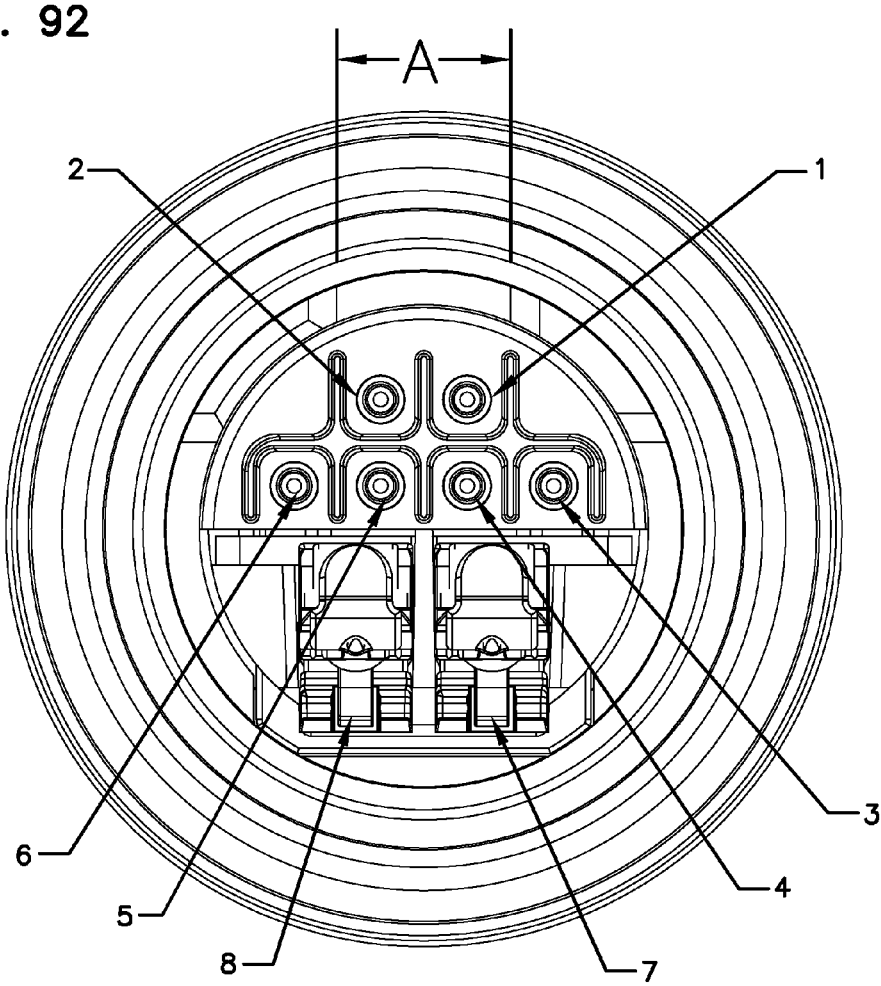
FIG. 92 is a diagram illustrating an end view of the third embodiment of the second hybrid fiber/copper connector of FIG. 90, showing the individual fiber and copper connections of the hybrid connector and a table listing each of the individual fiber and copper connections.
Figure 93:
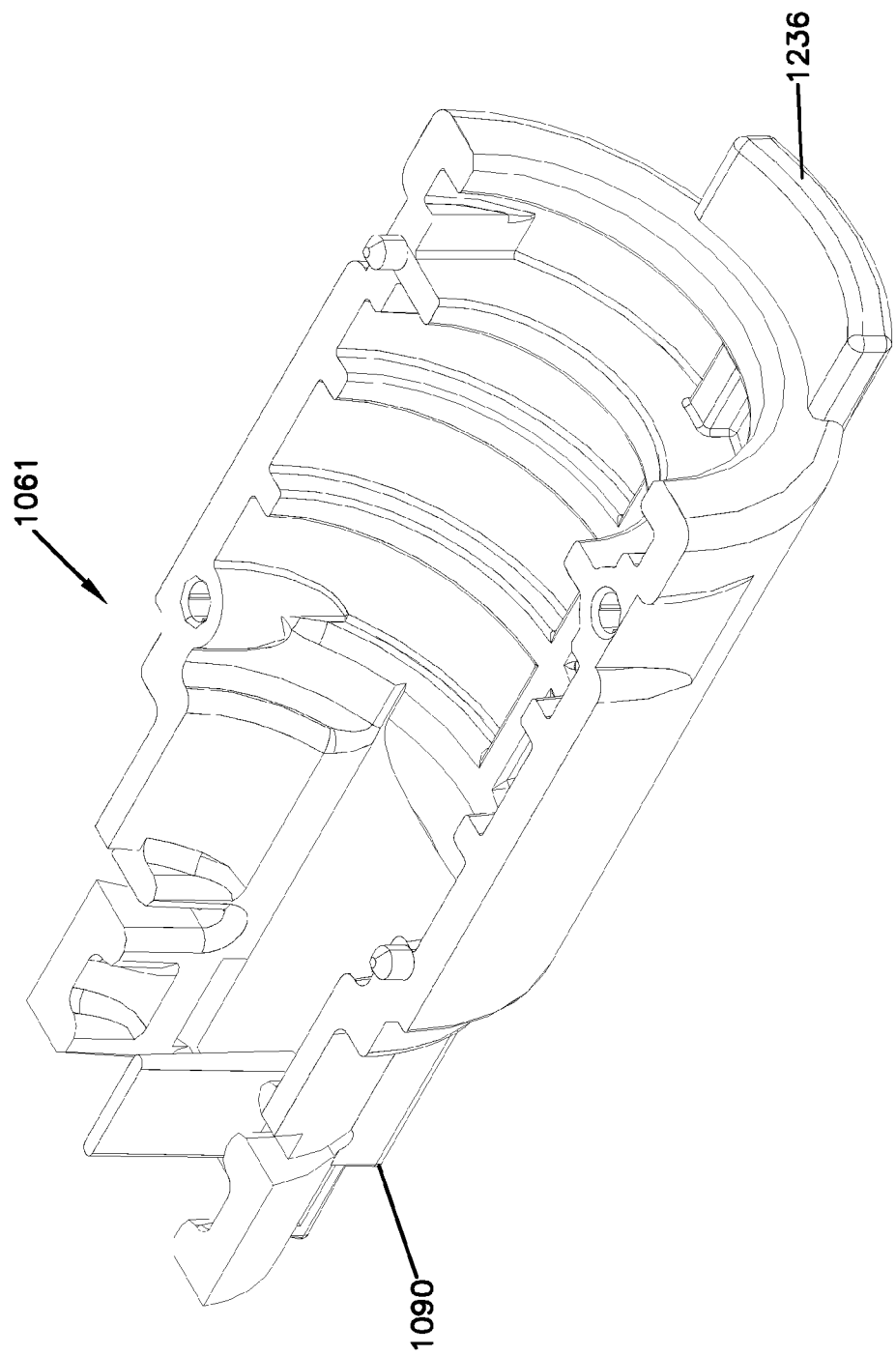
FIG. 93 is a perspective view of the first inner housing half of the third embodiment of the second hybrid fiber/copper connector of FIG. 91.

As shown, the pin designated with the number "1" carries an auxiliary signal, the pin designated with the number "2" carries an auxiliary signal, the pin designated with the number "3" carries a primary power signal, the pin designated with the number "4" carries a secondary power signal, the pin designated with the number "5" carries a secondary power signal, and the pin designated with the number "6" carries a primary power signal. When changing the gender of the hybrid connector from a female to a male gender, it is important to convert the arrangement of the conductive pins to the correct arrangement of a male gender connector to relay the electric signals accurately. For example, in FIG. 92, the correct arrangement for a male hybrid connector 1006 is shown. As shown, in the upper layer, the placement of the "1" pin and the "2" pin has to be reversed. The placement of the lower layer of pins also has to be changed as indicated in FIG. 92. Thus, by providing individually removably mounted conductive pins 1024, the correct arrangement can be maintained when the genders of the hybrid connectors are changed.

The same concept also applies to the fiber signals carried by the fiber optic connectors 56/56' as shown in FIGS. 79 and 92. If a hybrid connector is changed from a male to a female gender, the positions of the fiber optic connectors 56/56' within the first inner housing half will have to be switched to relay the correct signal. As shown in FIG. 79, the optical fiber designated with the number "7" and the optical fiber designated with the number "8" are reversed as shown in FIG. 92 when changing the genders.

It should be noted that changing the positions of the copper pins and the optical fibers (i.e., fiber optic connectors) is necessary if only one connector is going through a gender conversion. However, if a female hybrid connector 1000 is being converted into a male connector 1006 and also a male connector 1006 is being converted to a female connector 1000 for mating with the converted male connector 1006, then the positions of the copper pins and the optical fibers do not have to be changed. The configuration of the removably mounted copper pins 1024 and the fiber optic connectors 56/56' is advantageous if only one connector end needs to be converted to a different gender.

Figure 81:
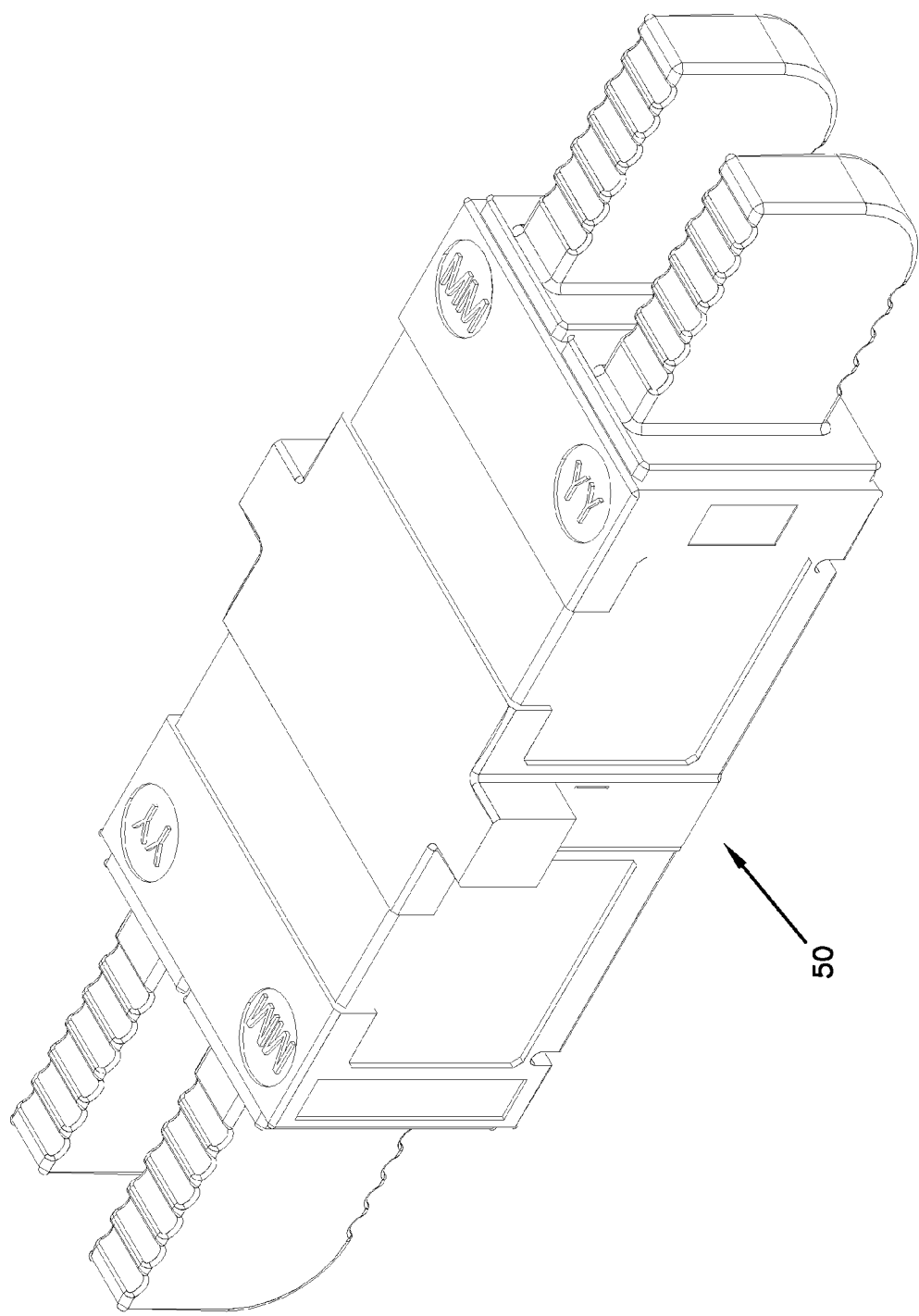
FIG. 81 is a perspective view of the fiber optic adapter that can be used with the third embodiment of the first hybrid fiber/copper connector of FIG. 78, the fiber optic adapter configured to be placed within the first inner housing half of FIG. 80, the fiber optic adapter shown with dust plugs plugged in both ends.

It should be noted that the same concept described above of switching fiber optic connector positions applies also to quad fiber connectors. For example, if a male quad fiber connector needs to be converted to a female quad fiber connector, the positions of the fiber optic connectors 56/56' have to be switched when taken out of the fiber optic adapters 50 or put into the fiber optic adapters 50. Please see FIG. 81 for a fiber optic adapter 50. The fiber optic adapter 50 in FIG. 81 is shown with dust plugs plugged in both ends.

Figure 98:
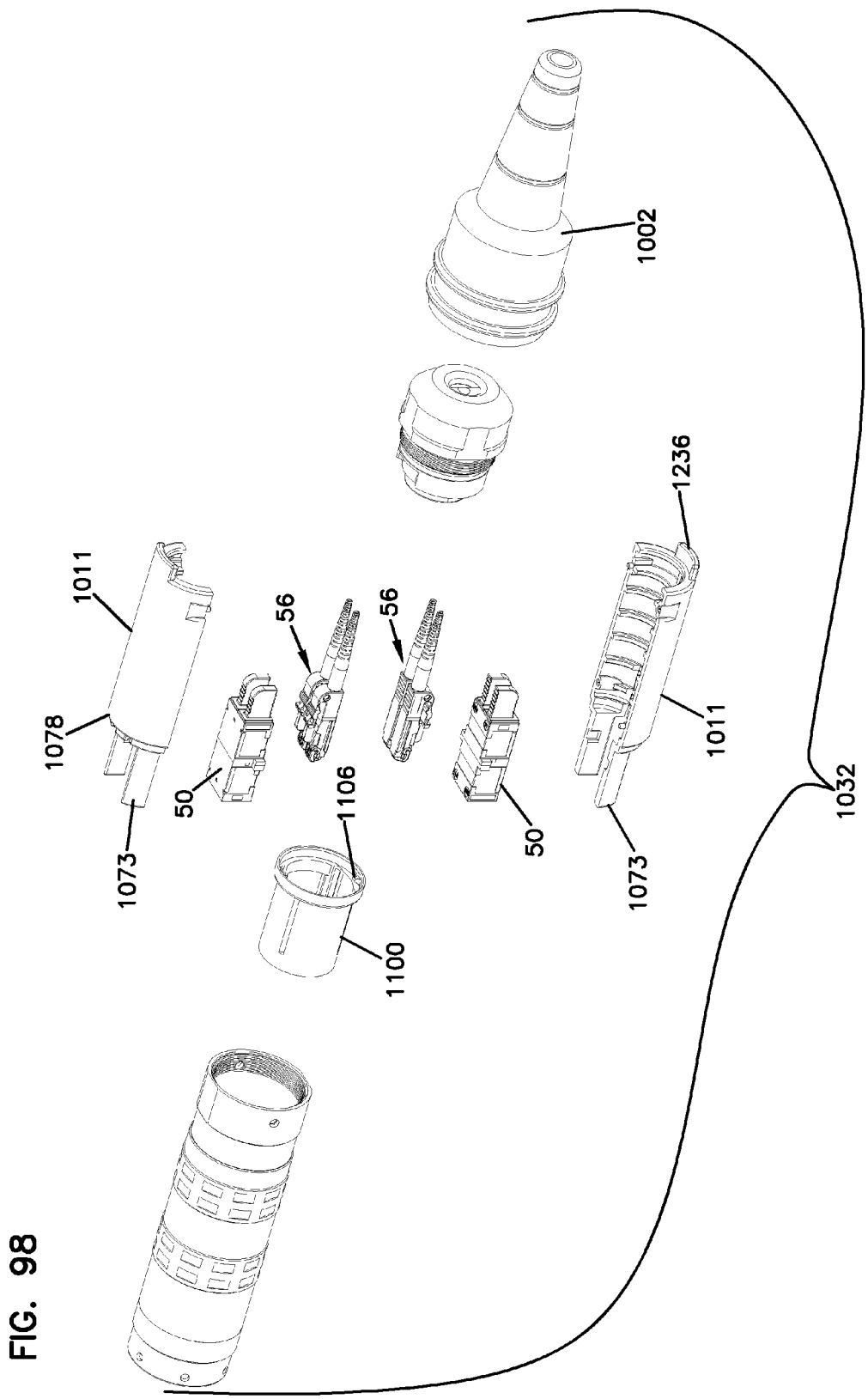
FIG. 98 illustrates an exploded view of another embodiment of a first quad fiber connector to be assembled by mounting together two of the first inner housing halves of FIG. 80.
Figure 100:
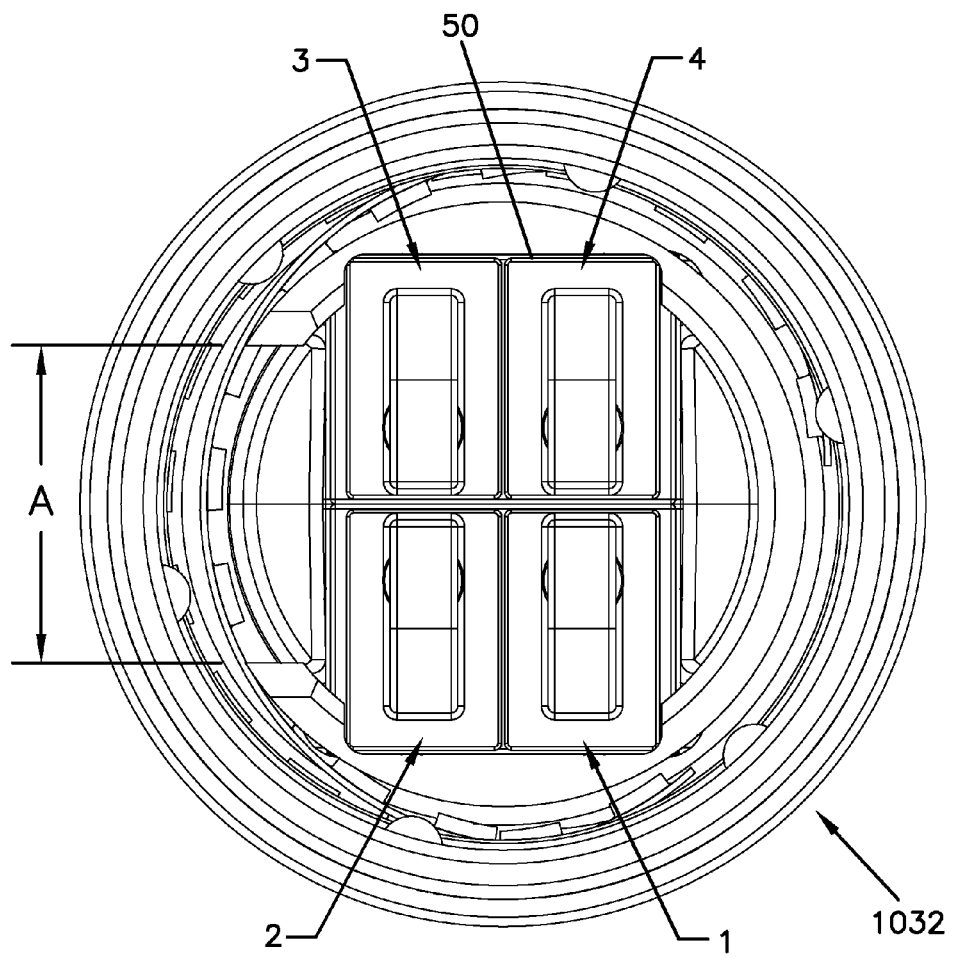
FIG. 100 is a diagram illustrating an end view of the first quad fiber connector of FIG. 98, showing the individual fiber connections of the quad connector and a table listing each of the individual fiber connections.

FIG. 100 shows a diagram illustrating an end view of a female quad fiber connector 1032 of FIG. 98, showing the individual fiber connections of the quad connector 1032 and a table listing each of the individual fiber connections.

Figure 102:
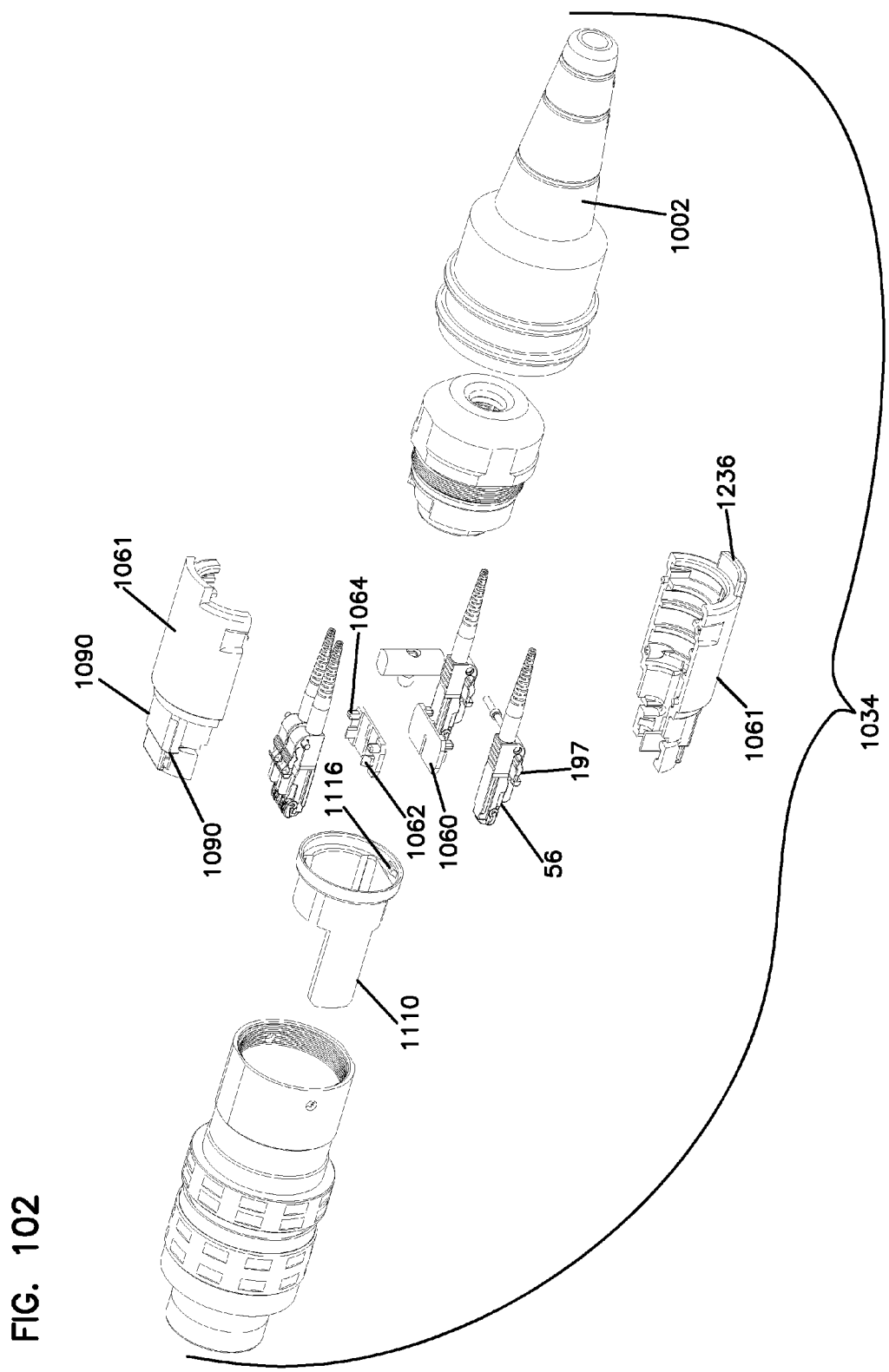
FIG. 102 illustrates an exploded view of another embodiment of a second quad fiber connector to be assembled by mounting together two of the first inner housing halves of FIG. 93, the second quad fiber connector configured to mate with the first quad fiber connector of FIG. 98.
Figure 103:
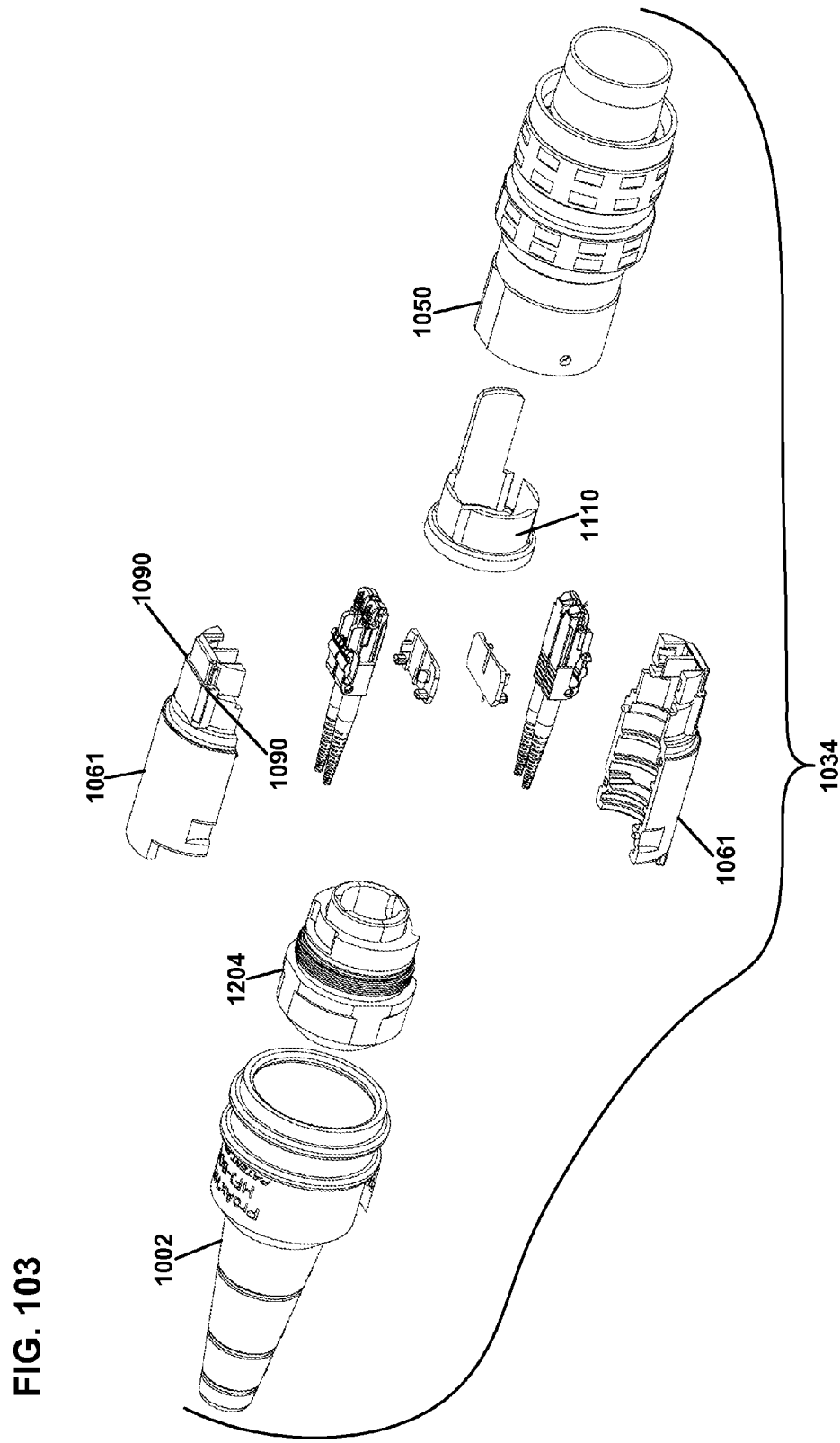
FIG. 103 illustrates another exploded view of the second quad fiber connector of FIG. 102.
Figure 104:
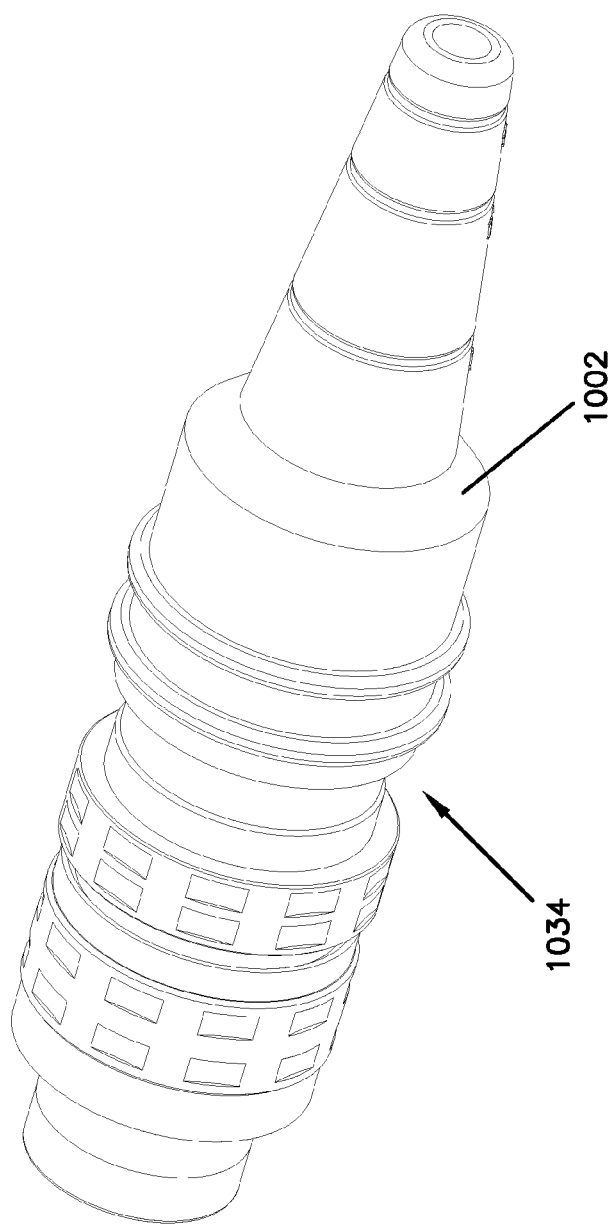
FIG. 104 illustrates a fully assembled configuration of the second quad fiber connector of FIGS. 102-103.
Figure 105:
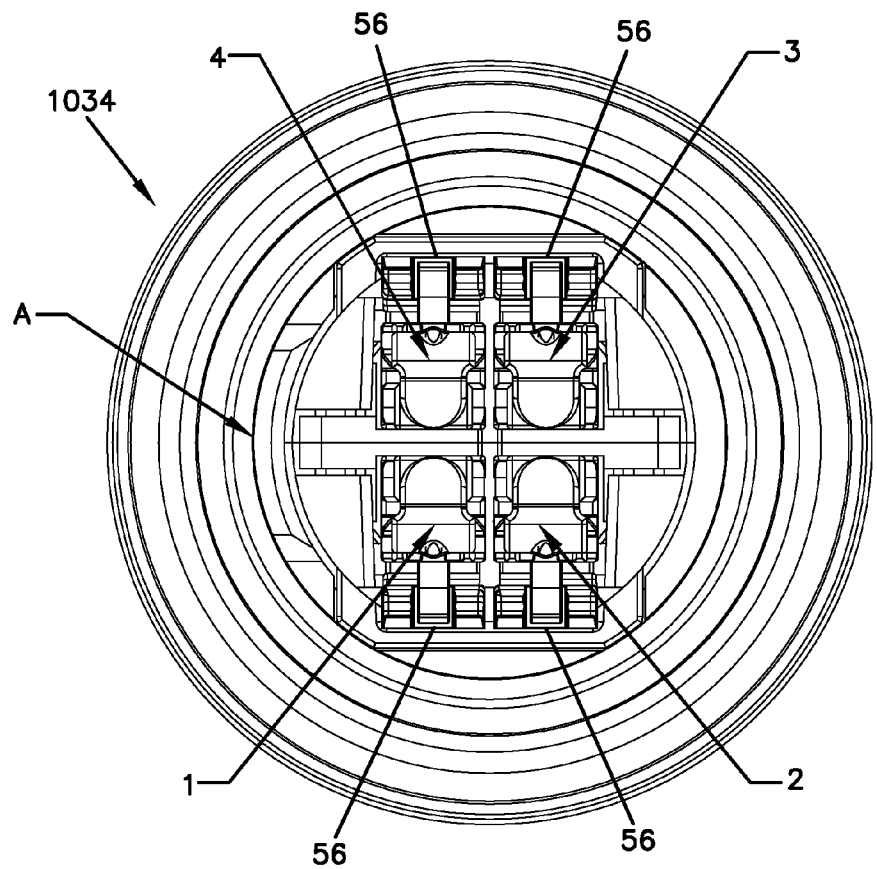
FIG. 105 is a diagram illustrating an end view of the second quad fiber connector of FIGS. 102-103, showing the individual fiber connections of the quad connector and a table listing each of the individual fiber connections.

FIG. 105 shows a diagram illustrating an end view of a male quad fiber connector 1034 of FIGS. 102-103, showing the individual fiber connections of the quad connector 1034 and a table listing each of the individual fiber connections.

When converting from a male quad fiber connector 1034 to a female quad fiber connector 1032 or vice versa, the orientations shown in FIGS. 100 and 105 should be followed for placement of the connectors 56/56'.

Figure 82:
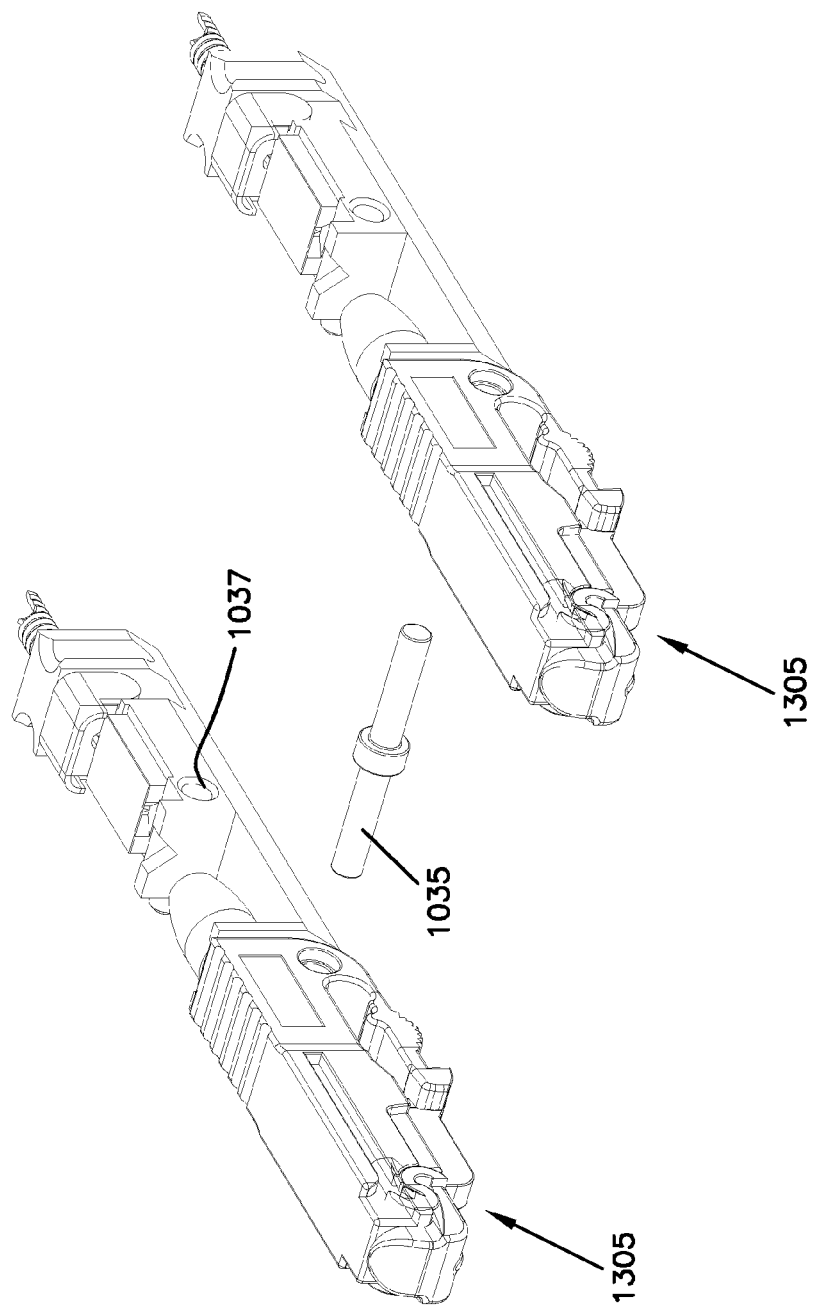
FIG. 82 is a perspective view illustrating a pair of field terminable fiber optic connector assemblies that can be used with the third embodiment of the hybrid fiber/copper connector assembly.
Figure 82A:
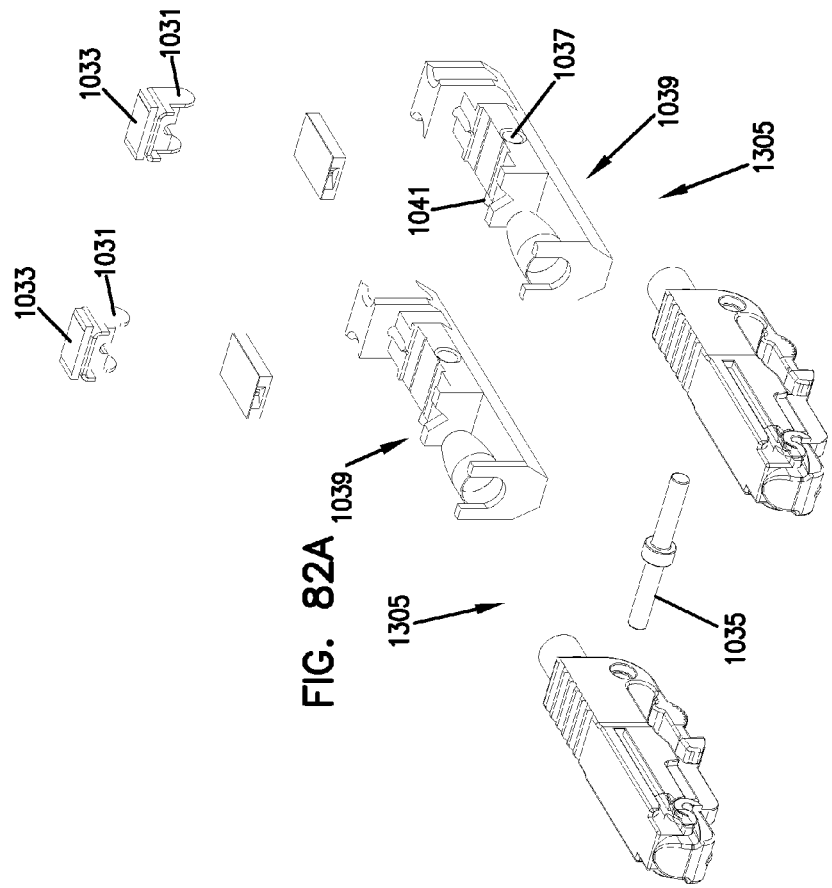
FIG. 82A is an exploded perspective view of the pair of field terminable fiber optic connector assemblies of FIG. 82.
Figure 83A:
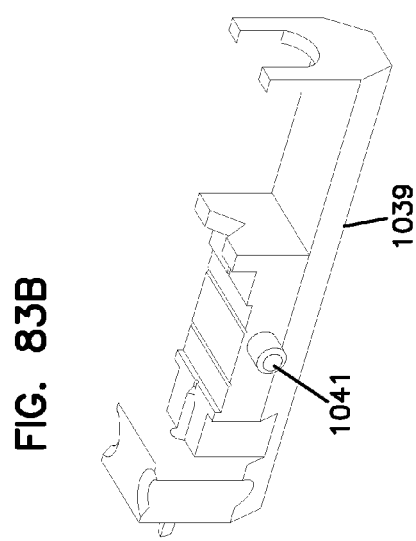
FIG. 83A illustrates a rear perspective view of the carrier of the field terminable fiber optic connector assembly of FIG. 83.
Figure 83B:
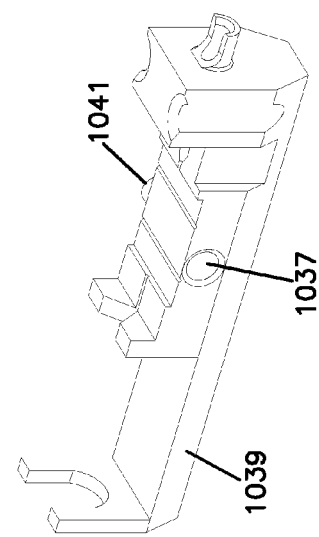
FIG. 83B is a front perspective view of the carrier of FIG. 83A.
Figure 83:
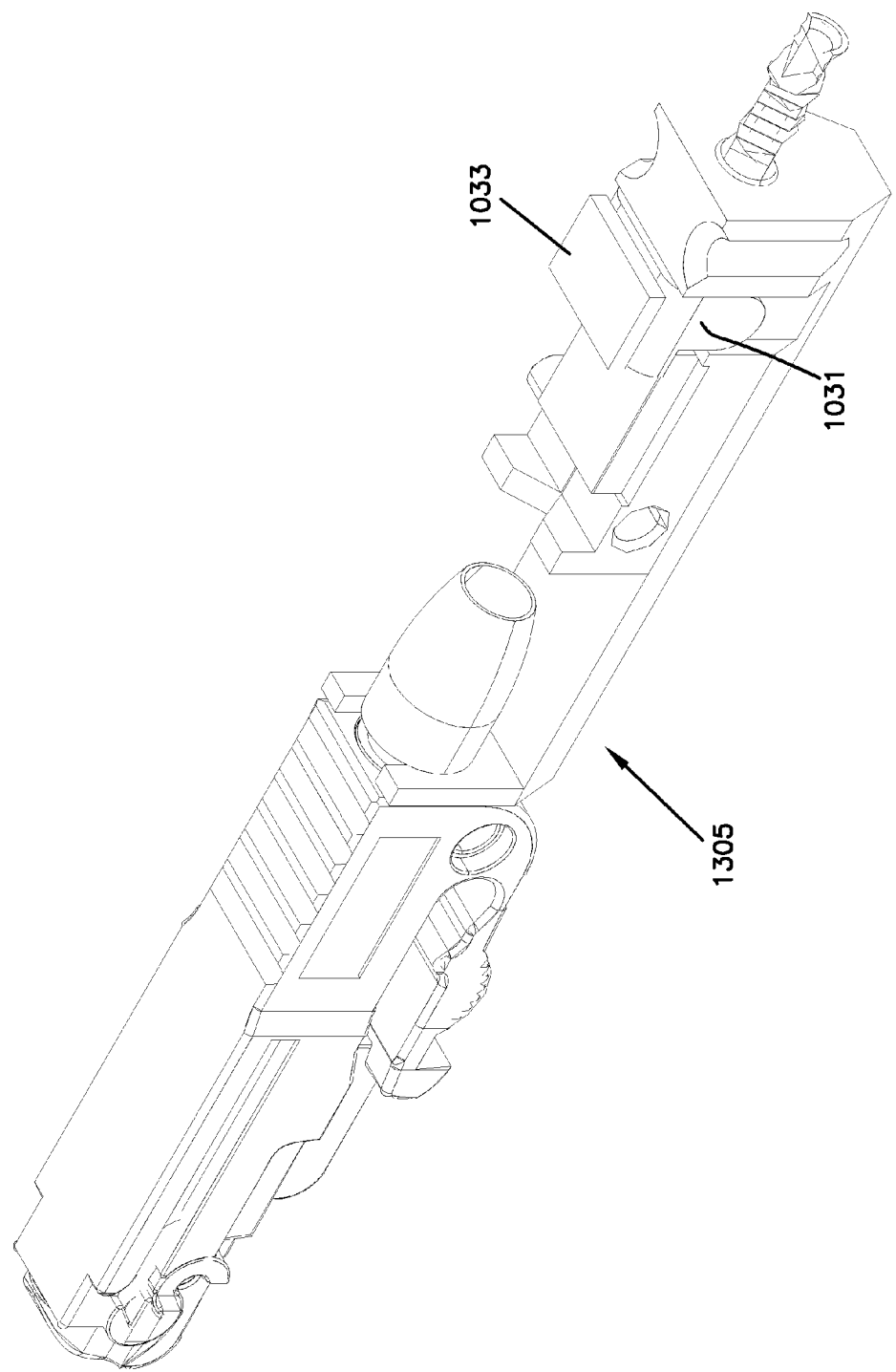
FIG. 83 is a perspective view illustrating one of the field terminable fiber optic connector assemblies of FIG. 82 in greater detail.
Figure 84:
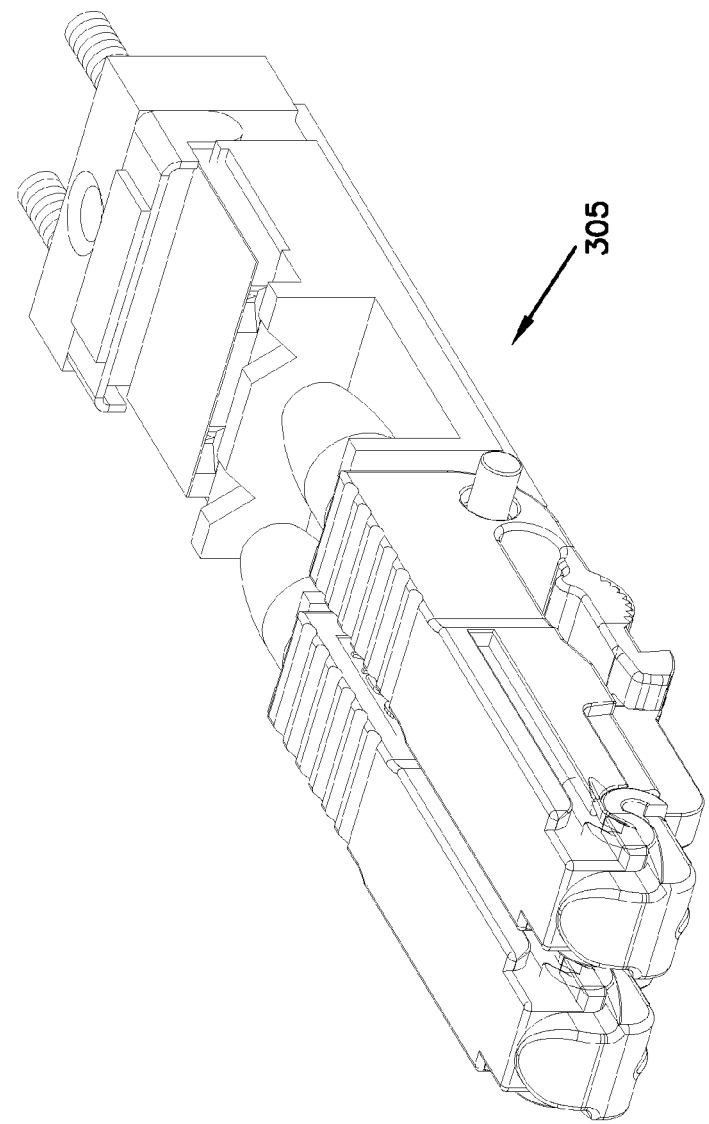
FIG. 84 is a perspective view illustrating a dual field terminable fiber optic connector assembly that can be used with the third embodiment of the hybrid fiber/copper connector assembly.

Now referring to FIGS. 82-84, as described previously, the fiber optic connectors within the first inner housing half of either the male hybrid connector 1006 or the female hybrid connector 1000 may be terminated at the factory setting by fusion splicing or may be field-terminable using chemical splicing. FIG. 84 illustrates a duplex field terminable fiber optic assembly 305. If one or two of the fiber optic connectors within a first inner housing half is damaged, a duplex field terminable fiber optic assembly 305 as shown in FIG. 84 may be used to replace the fiber optic connectors 56/56' with the field terminable assembly 305. However, if the gender of one of the hybrid connectors or quad connectors needs to be changed, as discussed above, the position of the two fiber optic connectors have to be switched. For this purpose, two separable simplex field terminable fiber optic assemblies 1305 may be provided, as shown in FIGS. 82 and 82A.

As shown in FIGS. 82 and 82A, the simplex field terminable fiber optic assemblies 1305 may be joined together with at least one removable joint pin 1035 that is used to connect the fiber optic connectors of the assemblies. The carriers 1039 of the field terminable fiber optic assemblies on which the individual features of the assemblies are mounted on may also include a hole 1037 on one side and an integrally molded pin 1041 on the opposing side so that two carriers may be joined together (FIGS. 83A and 83B illustrate the carrier 1039 of the field terminable fiber optic connector assembly 1305 in isolation). Since each carrier 1039 includes a hole 1037 and a molded pin 1041 on opposite, alternating sides, a carrier can be joined to another carrier at either side thereof. This provides the advantage of being able to separate the individual field terminable fiber optic assemblies 1305 and swap them side by side. As discussed above, if the gender of one of the hybrid connectors or quad connectors needs to be changed, the position of the two fiber optic connectors have to be switched, which can be accomplished with the individually separable simplex field terminable fiber optic assemblies 1305. The joint between the carriers 1039 toward the rear of the assemblies 1305 also prevents any lateral movement or rocking of the assemblies 1305 with respect to each other.

An individual simplex field terminable fiber optic assembly 1305 is shown in greater detail in FIGS. 83, 83A, and 83B. As shown, each simplex field terminable fiber optic assembly 1305 includes its own glue pallet 1033 and resistor 1031 to create the desired heat for melting the glue pallet 1033. Features of the field terminable fiber optic assembly such as the fiber optic connector, the glue pellet 1033 and the resistor 1031 are all carried by the carrier 1039 as a package that is removably insertable within a housing half of a connector. In the field terminable fiber optic assembly, a chemical splice is performed in the field where an index matching gel may be used to align the fibers for fusion. Please refer to U.S. patent application Ser. No. 11/735,267, entitled "FIELD TERMINABLE FIBER OPTIC CONNECTOR ASSEMBLY", filed Apr. 13, 2007, for further discussion on the use of the field terminable fiber optic assembly, which application has been incorporated herein by reference in its entirety.

Figure 90:
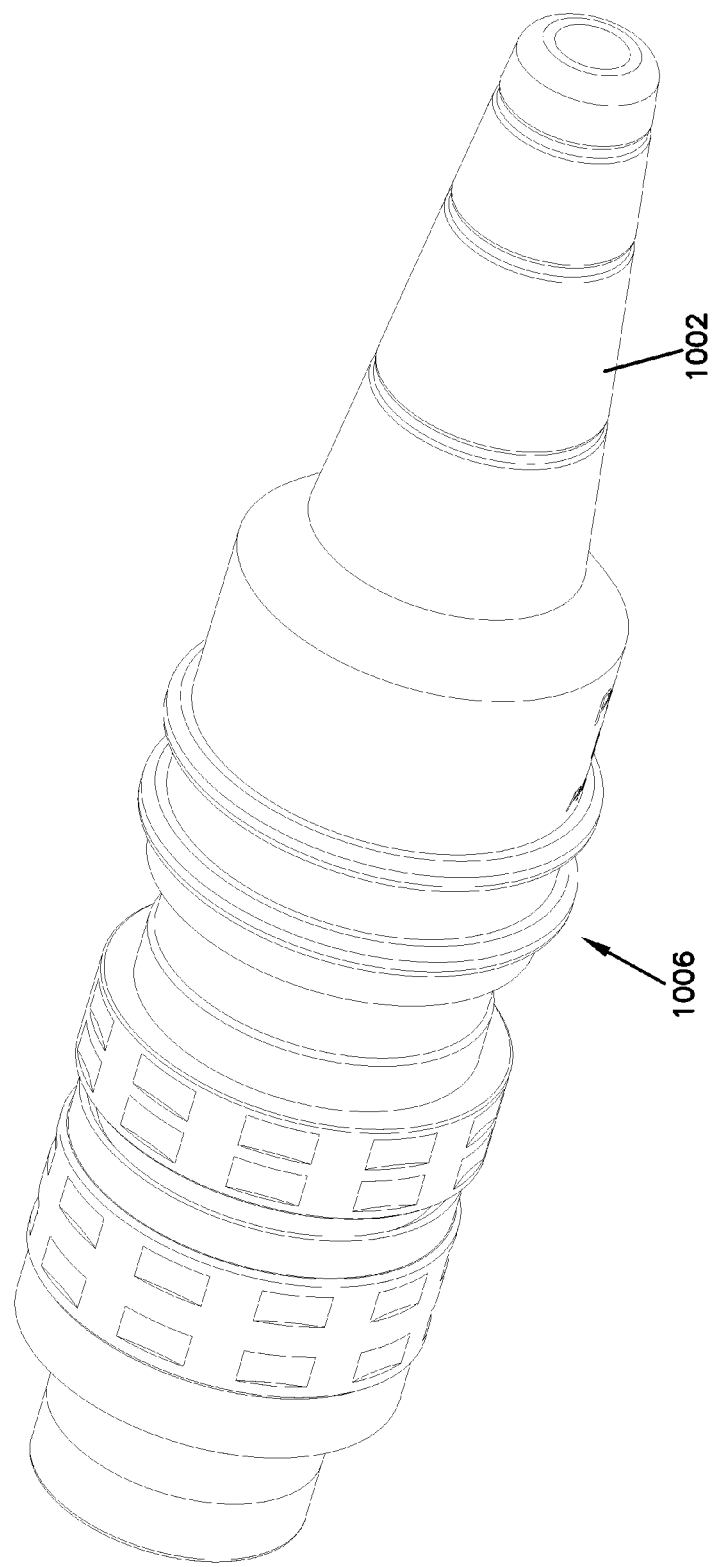
FIG. 90 is a perspective view of a third embodiment of a second hybrid fiber/copper connector that is configured to mate with the third embodiment of the first hybrid fiber/copper connector of FIG. 77.
Figure 91:
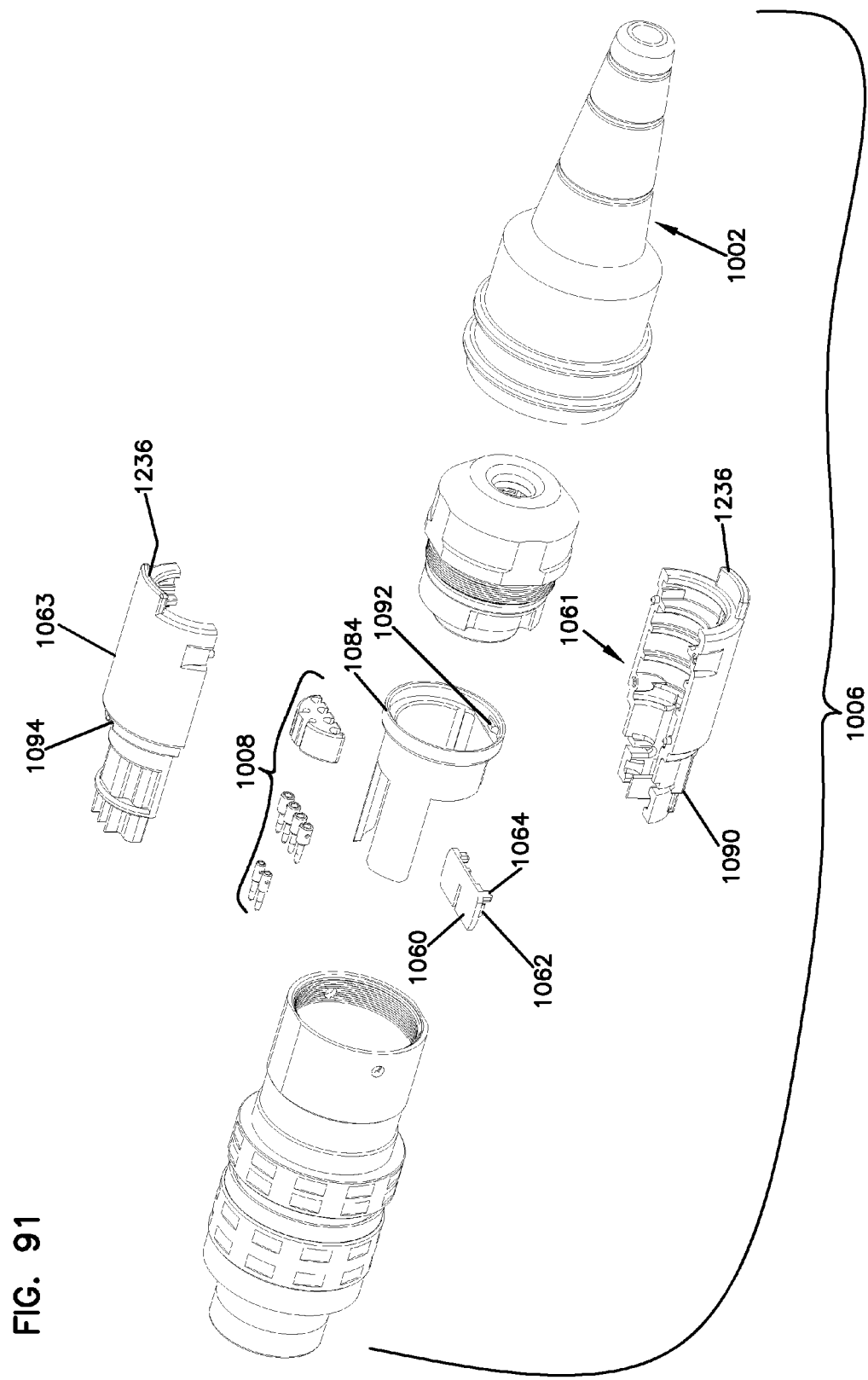
FIG. 91 is an exploded perspective view of the third embodiment of the second hybrid fiber/copper connector of FIG. 90.

Referring now to FIGS. 90-91, the third embodiment of the second (i.e., male gender) hybrid fiber/copper connector 1006 that is configured to mate with the third embodiment of the female hybrid fiber/copper connector 1000 of FIGS. 77-78 to form an assembly similar to the hybrid fiber/copper connector assembly 10 of FIGS. 1-3 is shown. The third embodiment of the male hybrid fiber/copper connector 1006 is similar in configuration to the first and second embodiments of the male hybrid fiber/copper connectors 14 and 314, respectively, except for a number of differences.

Figure 95A:
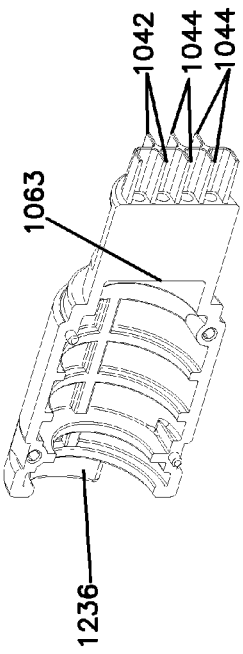
FIG. 95A is another perspective view of the second inner housing half of FIG. 95, the second inner housing half shown without the stationarily mounted conductor pins.
Figure 86:
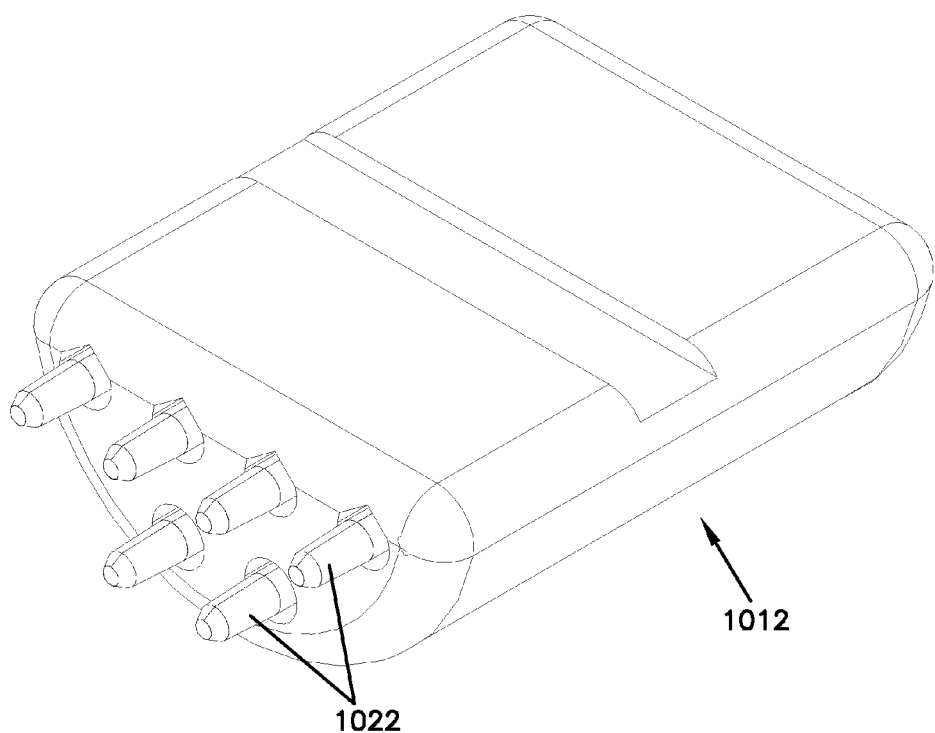
FIG. 86 is a perspective view of a removable copper connection adapter configured for use with the third embodiment of the first hybrid fiber/copper connector of FIG. 78, the removable copper connection adapter configured to be placed within the second inner housing half shown in FIGS. 85 and 85A.
Figure 95:
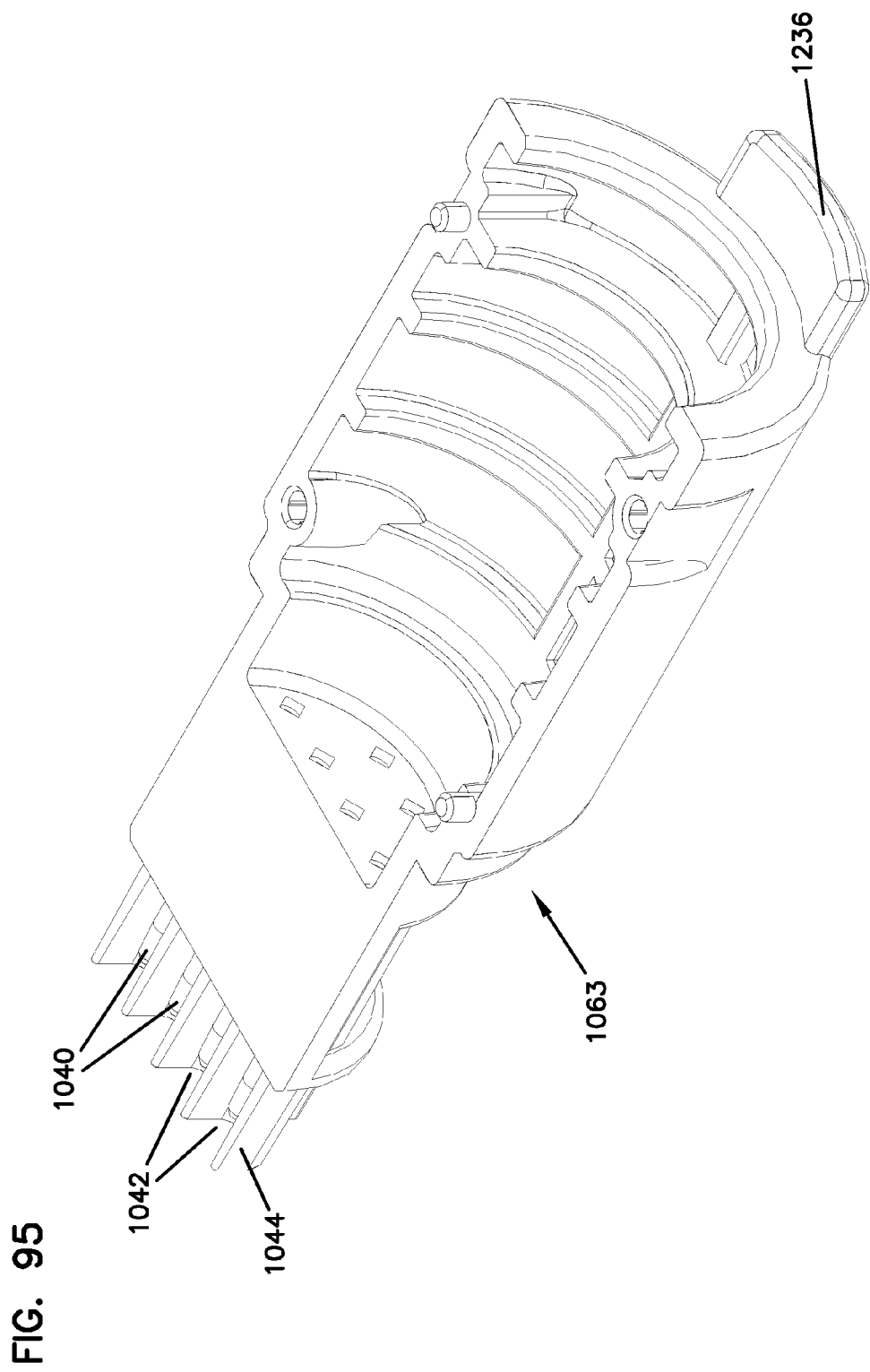
FIG. 95 is a perspective view of the second inner housing half of the third embodiment of the second hybrid fiber/copper connector of FIG. 91.

For example, the second inner housing 1063 of the male hybrid connector 1006 includes certain differences from the previous embodiments. In the third embodiment, as shown in FIGS. 95 and 95A, the forwardly protruding permanently mounted conductive pins 1040 are nested within cavities 1042 formed by walls 1044. As such, accidental contact with the conductive pins 1040 may be limited. The walls 1044 forming the cavities 1042 fit within slots 1046 formed in the integral conductor pin support 1014 of the second inner housing half 1010 of the female hybrid connector 1000 (as shown in FIG. 85) to provide for a robust fit between the copper connections.

Another difference in the third embodiment of the male hybrid connector 1006 lies in the configuration of the outer housing 1050. In the third embodiment, the diameter of the outer surface portion 1051 of the housing 1050 that includes the gripping features 1052 adjacent the sliding ring 1054 has been enlarged to be similar in size to the sliding ring 1054. As such, if a person is trying to connect the male outer housing 1050 to a female outer housing, the fingers of the person first meet the non-slidable enlarged grip portion 1051 before hitting the slidable ring 1054. In this manner, the fingers do not interfere with the operation of the sliding ring 1054. If a person is trying to make the connection in the dark in low visibility, for example, without the enlarged grip portion 1051, the tendency of a person's fingers is to first go for the enlarged sliding ring 1054. And when the male connector 1006 is pushed towards a female connector 1000, the fingers may prevent the sliding ring 1054 from moving backward toward the cable entry end and locking with the female connector 1000. By enlarging the diameter of a grip portion 1051 that is positioned before the slidable ring 1054, the fingers meet the enlarged portion 1051 first and use that portion to push the connector 1006 toward a female connector 1000. Thus, interference with the movement of the sliding ring 1054 is limited in this manner.

Figure 94:
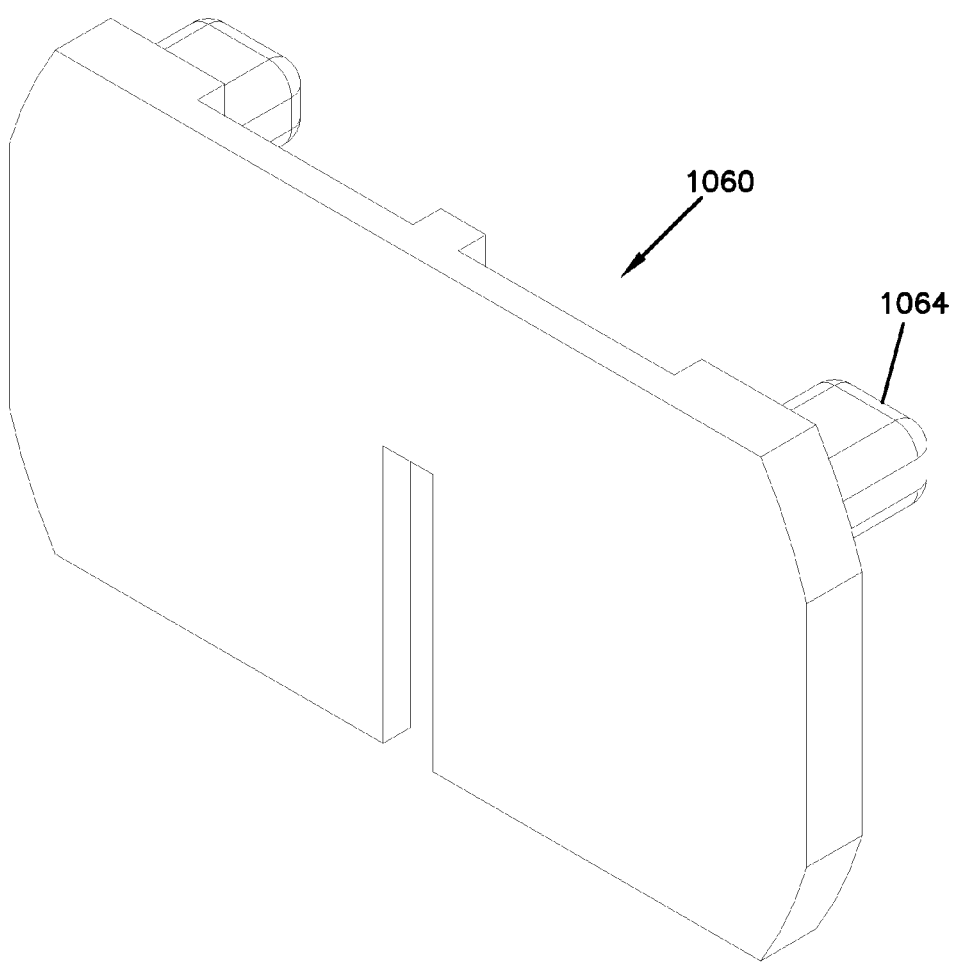
FIG. 94 is a perspective view of the fiber optic connector retainer configured for use with the third embodiment of the second hybrid fiber/copper connector of FIG. 91, the fiber optic connector retainer configured to be placed within the first inner housing half of FIG. 93.

Another difference in the third embodiment of the male hybrid connector 1006 lies in the configuration of the fiber optic connector retainer 1060. FIGS. 91 and 94 illustrate the fiber optic connector retainer 1060 configured for use with the third embodiment of the second hybrid fiber/copper connector 1006. The fiber optic connector retainer 1060 is configured to be placed within the first inner housing half 1061 of FIG. 93 to hold down the cantilever snap fit structures 197 of the fiber optic connectors 56/56' such that the fiber optic connectors 56/56' do not lock into the fiber optic adapters 50 when the male and female hybrid connectors 1006, 1000 are mated. The fiber optic connector retainer 1060 is similar in construction to the earlier versions except that it includes a second pair of downwardly extending tabs 1062 in addition to the first pair of downwardly extending tabs 1064. The second pair of downwardly extending tabs 1062 are configured to abut against the sides of the fiber optic connector housings to keep the fiber optic connectors 56/56' from moving laterally. See FIGS. 102 and 103 also for the fiber optic connector retainer 1060.

As discussed above, a female hybrid fiber/copper connector 1000 can be converted to a male hybrid connector 1006 by removing the conductor mount 1008 from a second inner housing half 1010 of a female hybrid connector and removing the fiber optic connectors (whether factory-terminated or field-terminable) from the adapter 50 located in the first inner housing half 1011 of the female hybrid connector 1000 and placing these components into the first and second inner housing halves 1061, 1063 of a male hybrid connector 1006, as discussed in the previous embodiments. As discussed above, if only one end of the hybrid assembly is being converted, it is important to individually remove the conductive pins 1024 from the conductor mount 1008 and change the positions thereof. The same concept applies to switching the positions of the fiber optic connectors when moving them from one first inner housing to another first inner housing, as discussed previously.

As discussed previously, since all of the components of the inner housing halves are configured to lie flush with the upper faces of the inner housing halves, different inner housing halves such as two first inner housing halves (of either the female or the male hybrid fiber/copper connector) can be mated to form different kinds of quad fiber optic connectors. If needed, quad electrical connectors may be formed also using two second inner housing halves (of either the female or the male connectors).

Figure 99:
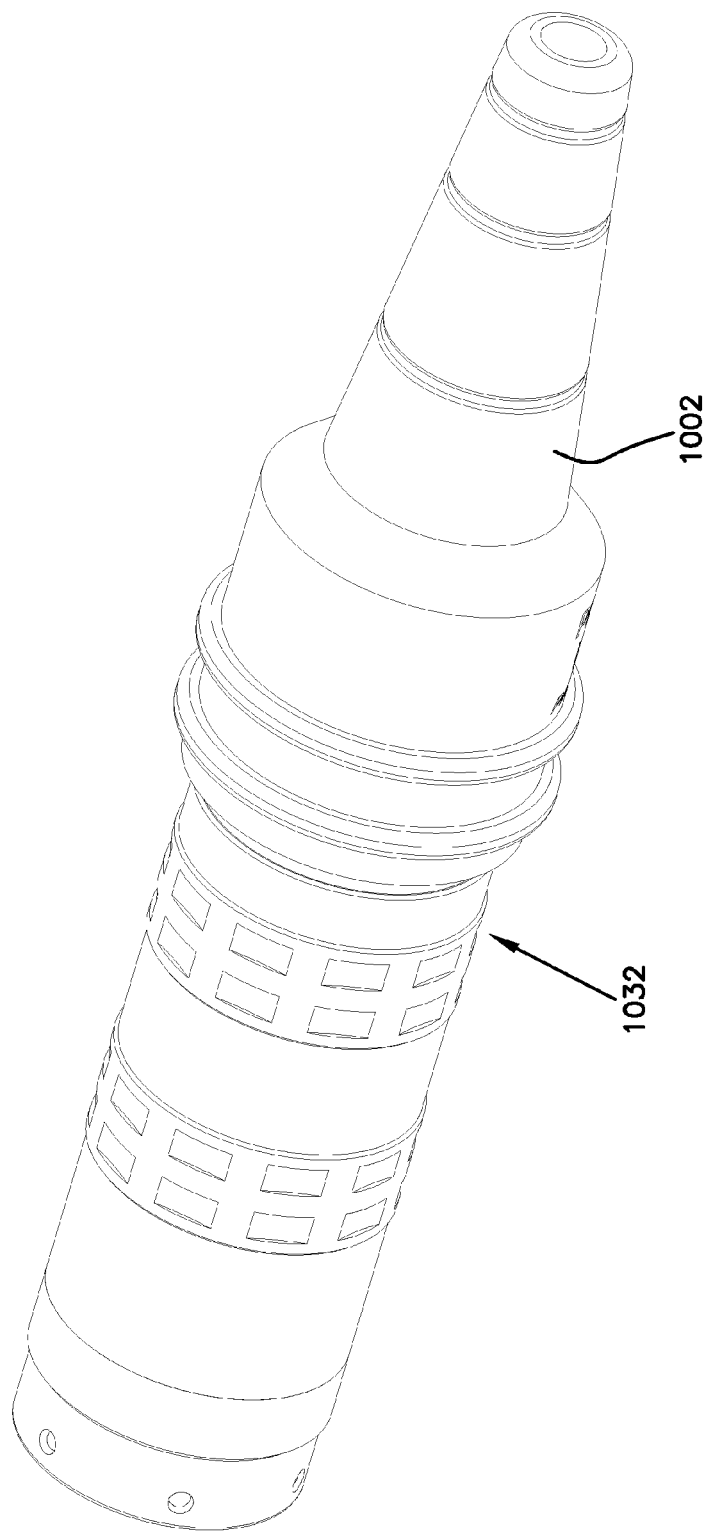
FIG. 99 illustrates a fully assembled configuration of the first quad fiber connector of FIG. 98.

For example, in FIGS. 98-100, the female quad fiber connector 1032 is shown. In the connector 1032 of FIGS. 98-100, two first inner housing halves 1011 of the third embodiment of the female hybrid fiber/copper connector 1000 have been joined to form the female end of the quad fiber connector 1032.

Referring to FIGS. 102-105, the male quad fiber connector 1034 is shown. In the connector of FIGS. 102-105, two first inner housing halves 1061 of the third embodiment of the male hybrid fiber/copper connector 1006 have been joined to form the male end of the quad fiber connector 1034. The male quad fiber connector 1034 is configured to mate with the female quad fiber connector 1032 of FIGS. 98-100.

One difference between the third embodiment of the hybrid and quad connector assemblies and the earlier ones described previously is the way the connectors are keyed for correctly aligning the individual connectors.

In the third embodiment, each of the different configurations of the connectors (e.g., female hybrid fiber/copper connector 1000, male hybrid fiber/copper connector 1006, female quad fiber connector 1032, and male quad fiber connector 1034) has a different removably mounted keying member associated with it. As will be discussed below, instead of utilizing an integral extension or an integral depression on the first and second inner housing halves of each of the male and female connectors, removable keys may be used to provide for alignment. Such keys may be metal, providing a robust connection, whereas the individual first and second inner housing halves may be manufactured of polymeric material.

Figure 88:
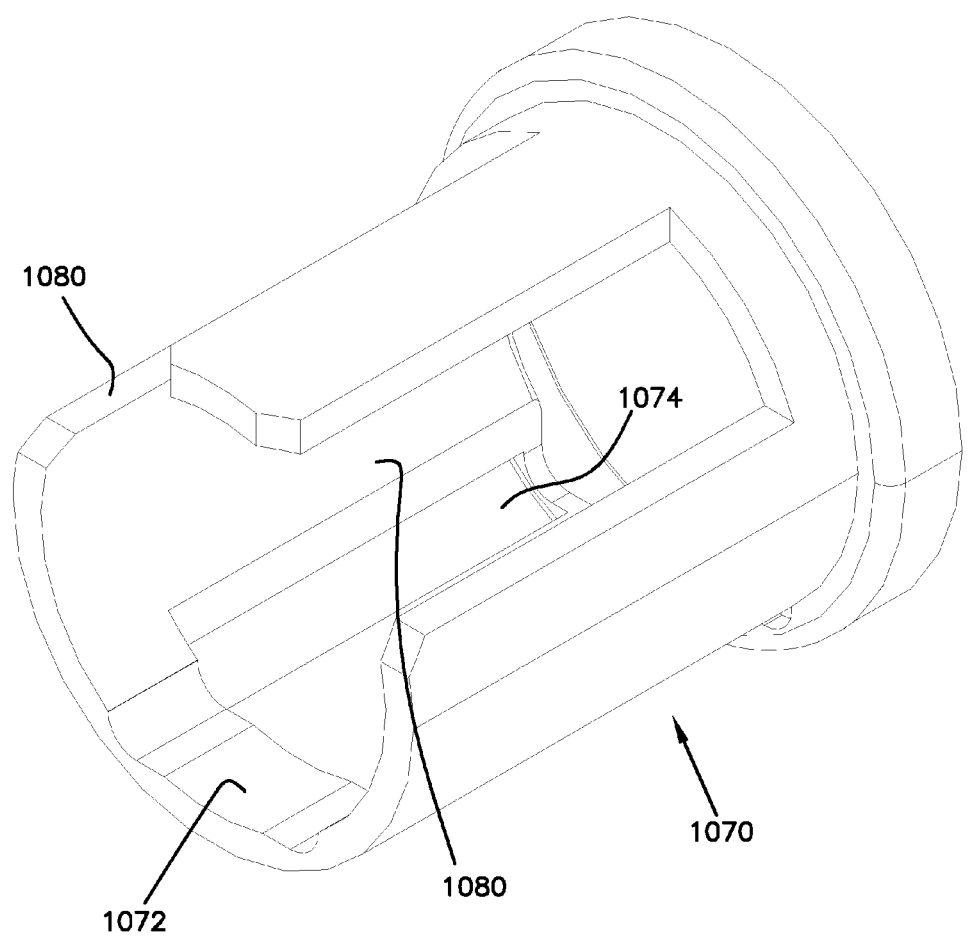
FIG. 88 is a perspective view of a key member configured for use with the third embodiment of the first hybrid fiber/copper connector of FIG. 78, the key member configured to be placed around the first and second inner housing halves shown in FIGS. 80 and 85, respectively, once the inner housing halves are assembled.
Figure 89:
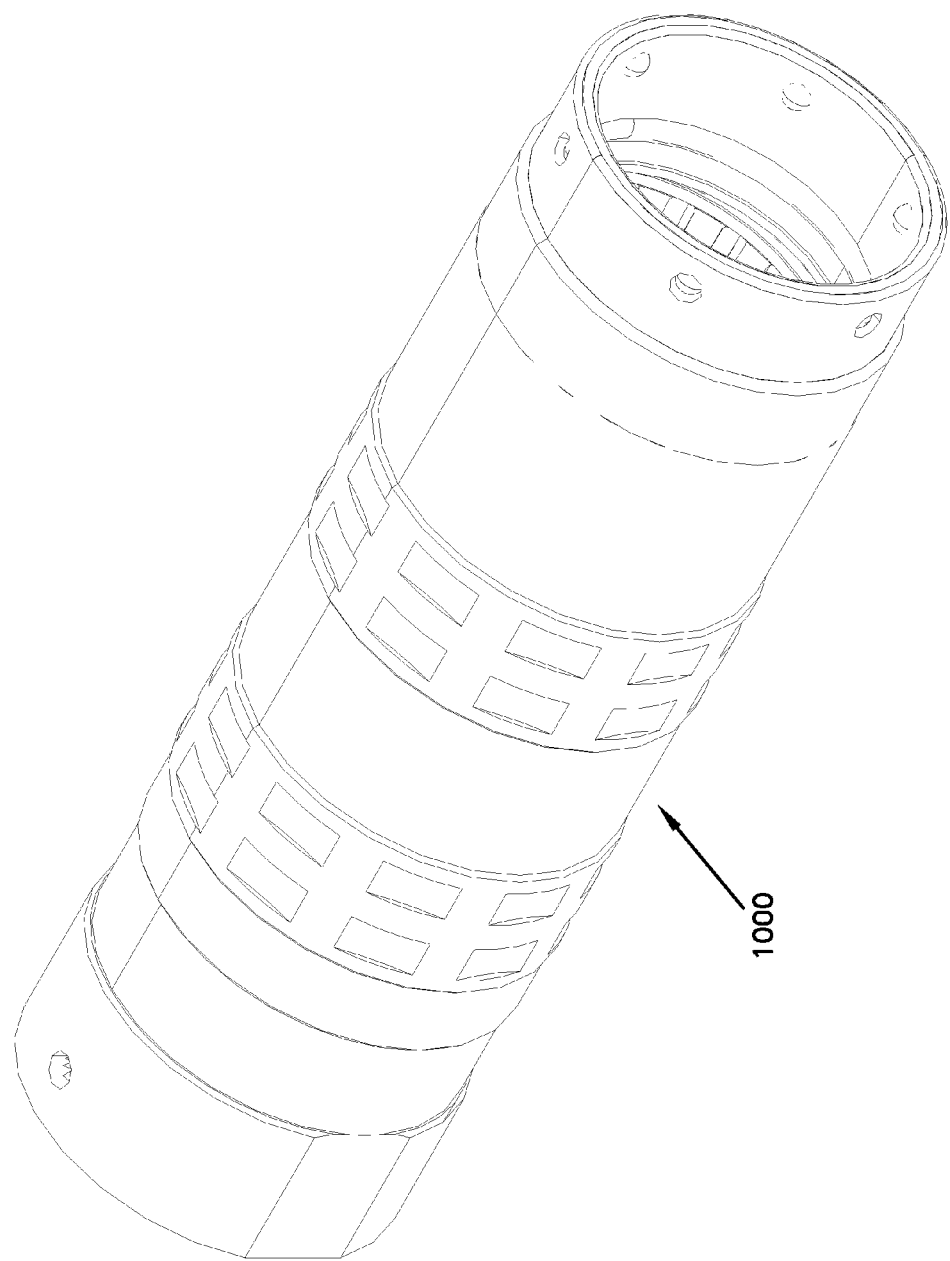
FIG. 89 is a perspective view of an outer housing of the third embodiment of the first hybrid fiber/copper connector of FIG. 78.

Referring now to FIGS. 78 and 88, a key member 1070 configured for use with a female hybrid fiber/copper connector 1000 is shown. The key member 1070 is configured such that it only fits around a female hybrid connector 1000 formed from a first inner housing half 1011 that is mated with a second inner housing half 1010. Once the internal components of the first inner housing half 1011 and the second inner housing half 1010 of the female hybrid connector 1000 are mated together, the key member 1070 is inserted over the mating ends of the first and second inner housing halves 1011, 1010. As shown in FIG. 88, the key member 1070 includes a flat portion 1072 to receive the mating end of the first inner housing half 1011. The flat portion 1072 includes a pair of grooves 1074 that match up with and receive a pair of forwardly protruding arms 1073 of the first inner housing half 1011 (see FIG. 80) of the female hybrid connector 1000. The key member 1070 also includes opposing radially inwardly protruding tabs 1076 that are configured to fit in slots 1078 formed adjacent the mating end of the first inner housing half 1011 and the second inner housing half 1010 (shown in FIG. 80).

Once the first inner housing half 1011 and the second inner housing half 1010 are mated, the key member 1070 is inserted over the housing halves in the correct orientation with the help of the alignment features. The key member that is dedicated for the female hybrid connector 1000 can only fit over the inner housing halves of the female hybrid connector 1000. Other incorrect key members cannot be placed over the inner housing halves of the female hybrid connector 1000 due to the relative features not aligning correctly.

Once the key member 1070 is correctly placed over the female hybrid connector 1000, the key member 1070 will act to guide the female hybrid connector 1000 into mating connection with a male hybrid connector 1006. The key member 1070 for the female connector 1000 includes two larger longitudinal slots 1080 that are configured to mate with two longitudinal extending arms 1082 of the key member 1084 for the male hybrid connector 1006.

Figure 96:
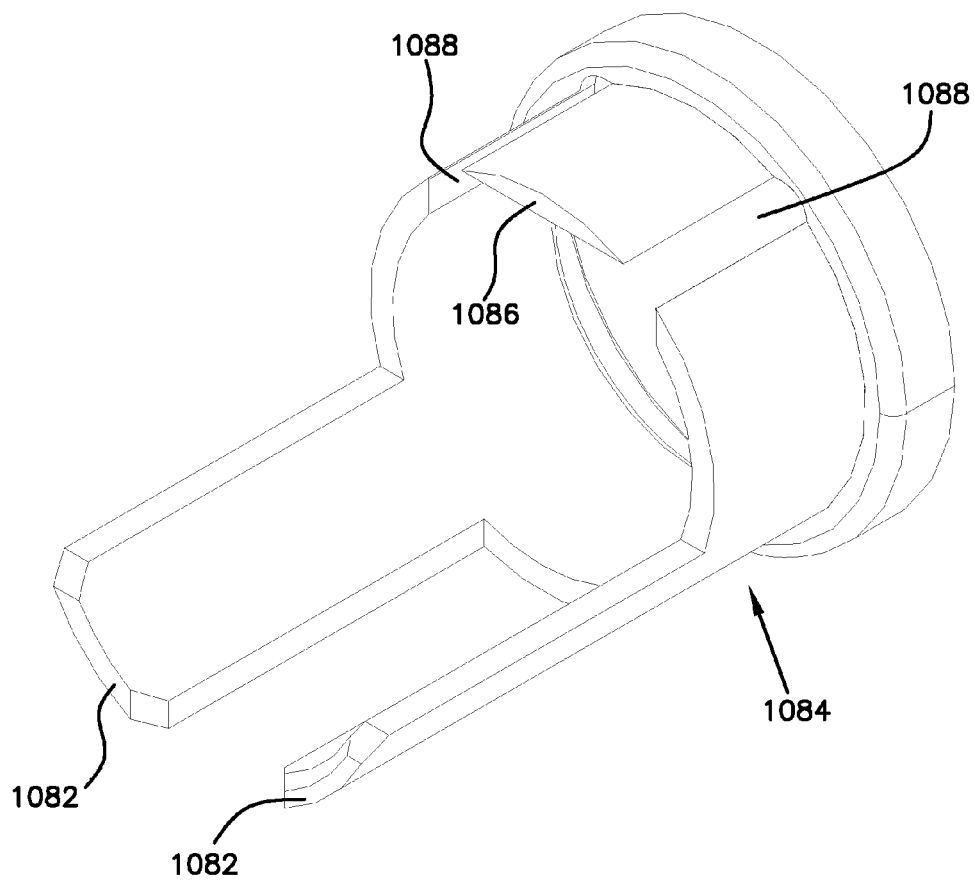
FIG. 96 is a perspective view of a key member configured for use with the third embodiment of the second hybrid fiber/copper connector of FIG. 91, the key member configured to be placed around the first and second inner housing halves shown in FIGS. 93 and 95, respectively, once the inner housing halves are assembled.
Figure 97:
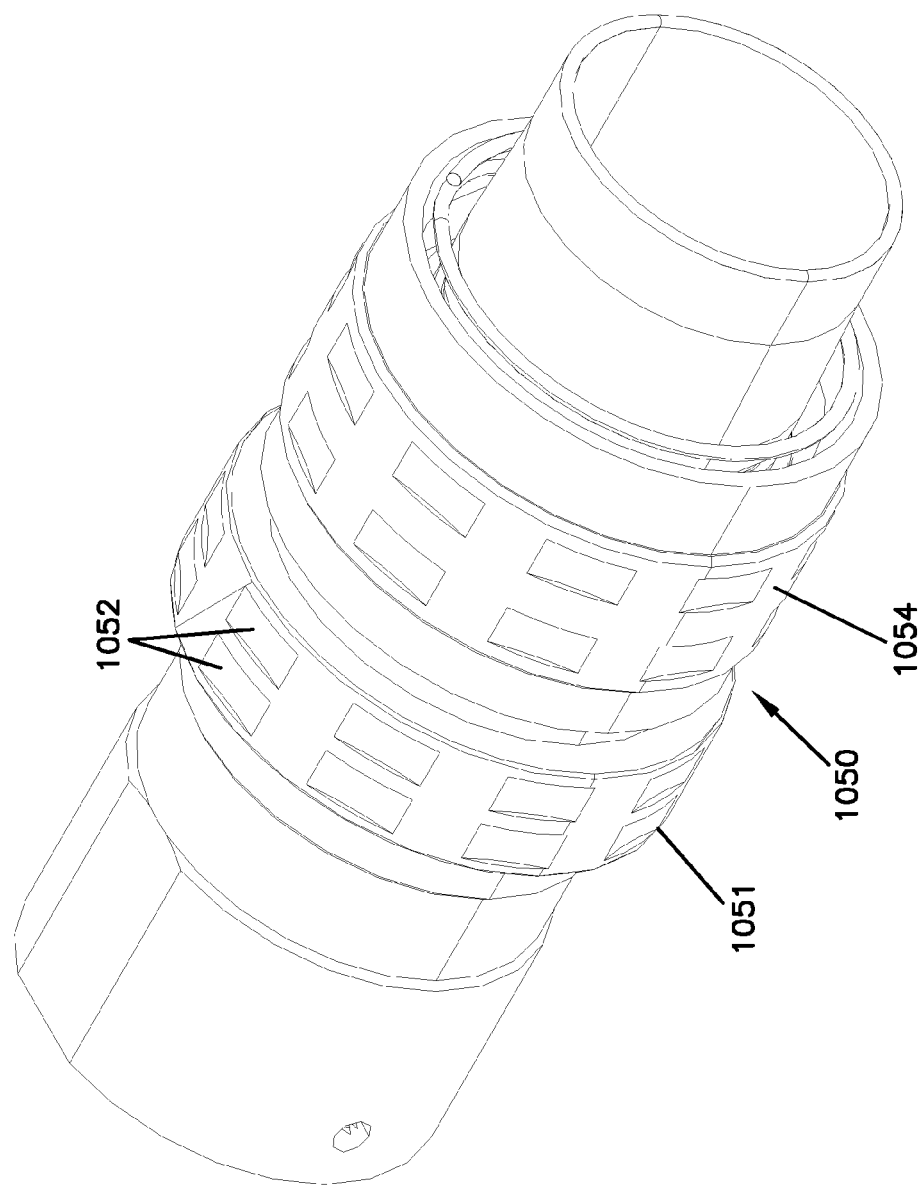
FIG. 97 is a perspective view of an outer housing of the third embodiment of the second hybrid fiber/copper connector of FIG. 91.

Referring now to FIGS. 91 and 96, the key member 1084 for the male hybrid connector 1006 is illustrated. The key member 1084 for the male hybrid connector 1006 includes a flat portion 1086 with a pair of grooves 1088 that matches up with the mating end of the first inner housing half 1061 of the male hybrid connector 1006. The grooves 1088 receive the flats 1090 formed adjacent the mating end of the first inner housing half 1061 (see FIG. 103 for the flats). As in the key member 1070 for the female hybrid connector 1000, the key member 1084 for the male hybrid connector 1006 includes radially inwardly protruding tabs 1092 that are configured to fit in slots 1094 formed adjacent the mating end of the first inner housing half 1061 and the second inner housing half 1063 of the male hybrid connector 1006 (see FIG. 91). The key member that is dedicated for the male hybrid connector 1006 can only fit over the inner housing halves of the male hybrid connector 1006. Other incorrect key members cannot be placed over the inner housing halves of the male hybrid connector 1006 due to the relative features not aligning correctly.

Once the key member 1084 is correctly placed over the male hybrid connector 1006, the key member 1084 will act to guide the male hybrid connector 1006 into mating connection with a female hybrid connector 1000, as discussed above. The key member 1084 for the male connector 1006 includes two large longitudinally extending arms 1082 that are configured to mate with the two longitudinal slots 1080 of the key member 1070 for the female hybrid connector 1000.

The key members 1070, 1084 also provide the functionality of holding the first and the second inner housing halves together once the inner housing halves are mated. In the previous embodiments, the housing halves were held together by friction before being inserted into outer housings.

The key members are also configured to make first contact with the key member of the opposing mating connector such that the fiber and the copper connections are prealigned before the two opposing hybrid connectors 1000 and 1006 mate. The key members, preferably metal, provide for a safe, robust connection, by prealigning the fiber optic connectors and the copper pins to reduce the wear and tear on the connection ends. When a male hybrid connector 1006 is being mated to a female hybrid connector 1000, the longitudinal arms 1082 and slots 1080 of the respective key members match up and meet previous to the meeting of the fiber and copper connections. The longitudinal arms 1082 and the slots 1080 of the respective key members are adjacent the mating end of the outer housings such that the outer housings do not align unless the key members 1070, 1084 align first.

Figure 101:
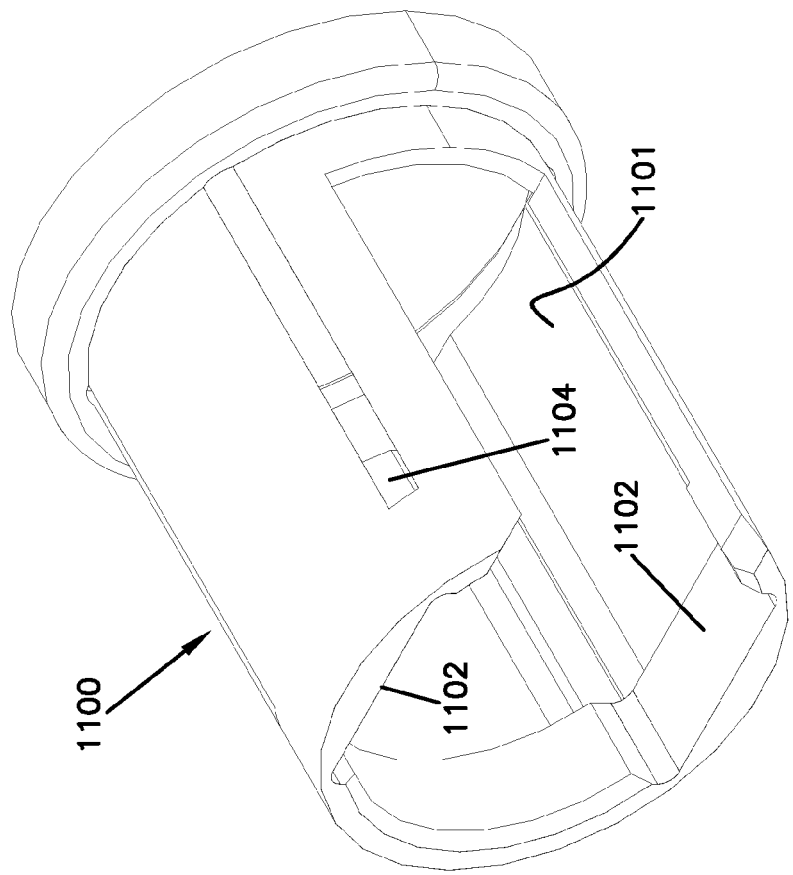
FIG. 101 is a perspective view of a key member configured for use with the first quad fiber connector of FIG. 98, the key member configured to be placed around the two first inner housing halves shown in FIG. 80 once the inner housing halves are assembled.

As discussed previously, in FIG. 98, a female quad fiber connector 1032 is shown. In the connector of FIG. 98, two first inner housing halves 1011 of the third embodiment of the female hybrid fiber/copper connector 1000 have been joined to form the female end of the quad fiber connector 1032. The key 1100 for the female quad fiber connector 1032 is shown in FIG. 101. As shown in FIG. 101, the key member 1100 includes two opposing flat portions 1102 to receive the mating ends of two first inner housing halves 1011. The flat portions 1102 each include a pair of grooves 1104 that match up with and receive a pair of forwardly protruding arms 1073 of each of the first inner housing halves 1011 (see FIG. 98) of the female quad fiber connector 1032. The key member 1100 also includes opposing radially inwardly protruding tabs 1106 that are configured to fit in slots 1078 formed adjacent the mating ends of the two first inner housing halves 1011 (shown in FIG. 98).

Once the two first inner housing halves 1011 of the female quad fiber connector 1032 are mated, the key member 1100 is inserted over the housing halves in the correct orientation with the help of the alignment features. The key member that is dedicated for the female quad fiber optic connector 1032 can only fit over the inner housing halves of the female quad fiber connector 1032. Other incorrect key members cannot be placed over the inner housing halves of the female quad fiber connector 1032 due to the relative features not aligning correctly.

Referring to FIGS. 102-105, a male quad fiber optic connector 1034 is shown. In the connector of FIGS. 102-105, two first inner housing halves 1061 of the third embodiment of the male hybrid fiber/copper connector 1034 have been joined to form the male end of the quad fiber optic connector 1034. The male quad fiber optic connector 1034 is configured to mate with the female quad fiber optic connector 1032 of FIGS. 98-100.

Figure 106:
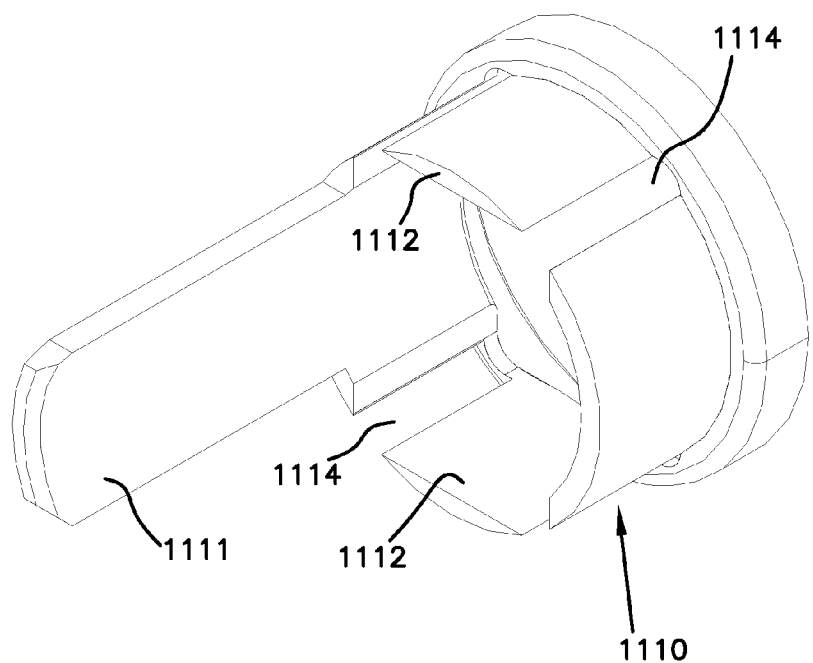
FIG. 106 is a perspective view of a key member configured for use with the second quad fiber connector of FIGS. 102-103, the key member configured to be placed around the two first inner housing halves shown in FIG. 93 once the inner housing halves are assembled.

Referring to FIGS. 102, 103 and 106, the key member 1110 for the male quad fiber optic connector 1034 is illustrated. The key member 1110 for the male quad fiber connector 1034 includes two opposing flat portions 1112 with a pair of short grooves 1114 adjacent each flat portion 1112 that matches up with the mating ends of two first inner housing halves 1061 of the male quad fiber connector 1034. The grooves 1114 receive the flats 1090 formed adjacent the mating ends of the first inner housing halves 1061 (see FIG. 103 for the flats). As in the key member 1100 for the female quad fiber connector 1032, the key member 1110 for the male quad fiber connector 1034 includes radially inwardly protruding tabs 1116 that are configured to fit in slots 1094 formed adjacent the mating ends of the first inner housing halves 1061 of the male quad fiber connector 1034 (see FIG. 102). The key member that is dedicated for the male quad fiber connector 1034 can only fit over the inner housing halves of the male quad fiber connector 1034. Other incorrect key members cannot be placed over the inner housing halves of the male quad fiber connector 1034 due to the relative features not aligning correctly.

Once the key member 1110 is correctly placed over the male quad fiber connector 1034, the key member 1110 will act to guide the male quad fiber connector 1034 into mating connection with the female quad fiber connector 1032, as discussed above for the hybrid versions. The key member 1100 for the female quad fiber connector 1032 includes a large longitudinal slot 1101 that is configured to mate with a large forwardly extending longitudinal arm 1111 of the key member 1110 for the male quad fiber connector 1034.

As in the hybrid versions, the key members for the quad fiber connectors are configured to make first contact with the key member of the opposing mating connector such that the fiber connections are prealigned before the two opposing quad connectors mate. The key members, preferably metal, provide for a safe, robust connection, by prealigning the fiber optic connectors and the fiber optic adapters to reduce the wear and tear on such connections. When a male quad fiber connector 1034 is being mated to a female quad fiber connector 1032, the longitudinal arm 1111 and slot 1101 of the respective key members 1110 and 1100 match up and meet previous to the fiber connections. The longitudinal arm 1111 and the slot 1101 of the respective key members are adjacent the mating end of the outer housings such that the outer housings do not align unless the key members align first. The key members 1100 and 1110 are configured such that they do not let the fiber optic connections touch before the key members engage.

When the connectors are being converted from, for example, male hybrid to a female hybrid, the respective keys should preferably be switched so that proper keying can be provided for further connections. As in the hybrid versions, when a quad fiber connector is being changed in gender, the respective key member should also be changed.

FIGS. 107-119 illustrate the components of a termination assembly 1200 that is used for terminating a cable 1202 to an endcap 1204 that is mounted to either the male of the female outer housing of the third embodiment of the connector assembly. Although the endcap 1204 is shown with a male quad fiber connector 1034 in FIGS. 107-108, the endcap 1204 and the termination assembly 1200 can be used with any of the female or male hybrid connectors of the third embodiment or with any of the female or male quad fiber connectors of the third embodiment.

Figure 107:
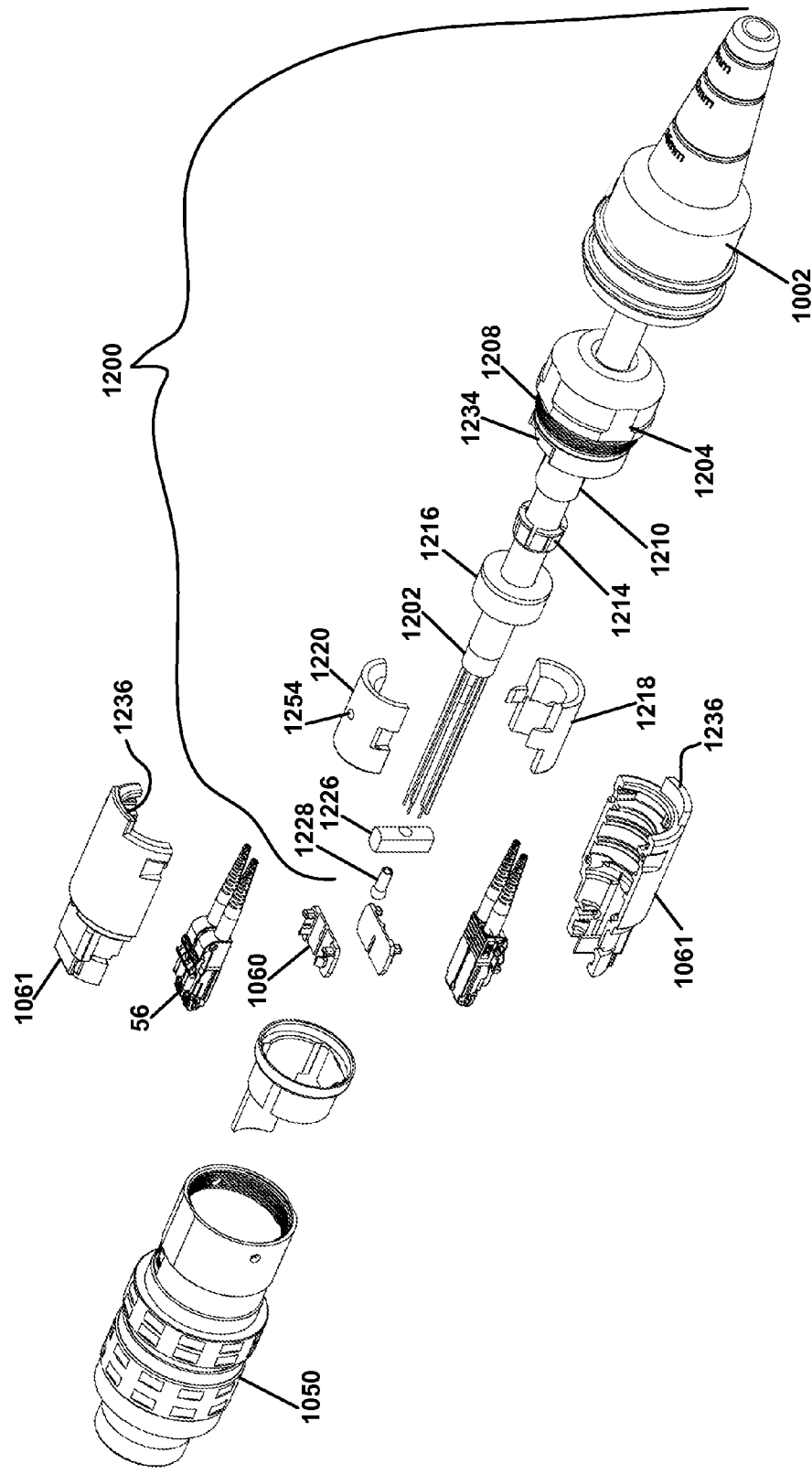
FIG. 107 illustrates an exploded view of a termination assembly used for terminating/sealing a cable to an endcap that is configured for use with the third embodiment of the hybrid fiber/copper connectors or with the quad fiber connectors, the endcap shown with the second quad fiber connector of FIGS. 102-103.

Referring to FIG. 107, the termination assembly 1200 includes (going from the cable 1202 toward the connector) the strain relief boot 1002, the endcap 1204, an O-ring 1206 configured to be placed around the threads 1208 of the endcap 1204 to seal the endcap 1204 to any of the outer housings, another O-ring 1210 configured to be placed around the cable 1202 to be terminated to the endcap 1204, a washer 1212, a collet 1214 configured to be radially crushable around the cable 1202 to terminate the cable 1202 to the endcap 1204, a metallic braid spacer 1216 configured to be slid over the collet 1214 to crush the collet 1214 against the cable 1202 for clamping the cable 1202, first and second braid clamp halves 1218, 1220 configured to mate to form the braid clamp 1222 (i.e., grounding spacer), a strength member 1224 of the cable, a strength member clamp bar 1226, and a crimp structure 1228 in the form of a crimp ball 1230 for crimping to the strength member 1224 of the cable 1202. It should be noted that the depicted termination assembly 1200 is simply one example assembly for terminating the cable 1202 to the connectors. Other termination configurations are possible.

Figure 108:
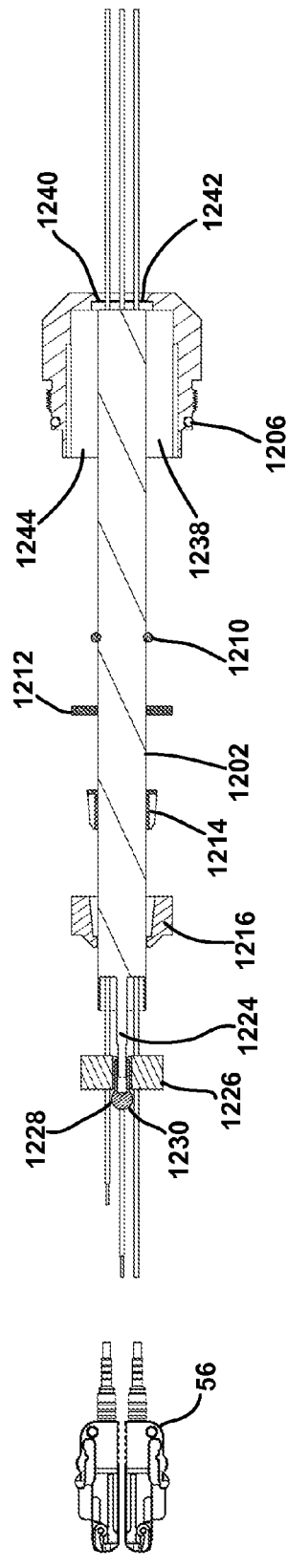
FIG. 108 illustrates a cross-sectional view of the termination assembly of FIG. 107.

FIG. 108 illustrates a cross-sectional view of the termination assembly 1200 of FIG. 107 and illustrates the assembly of the parts in terminating the cable 1202 to the endcap 1204.

Figure 109:
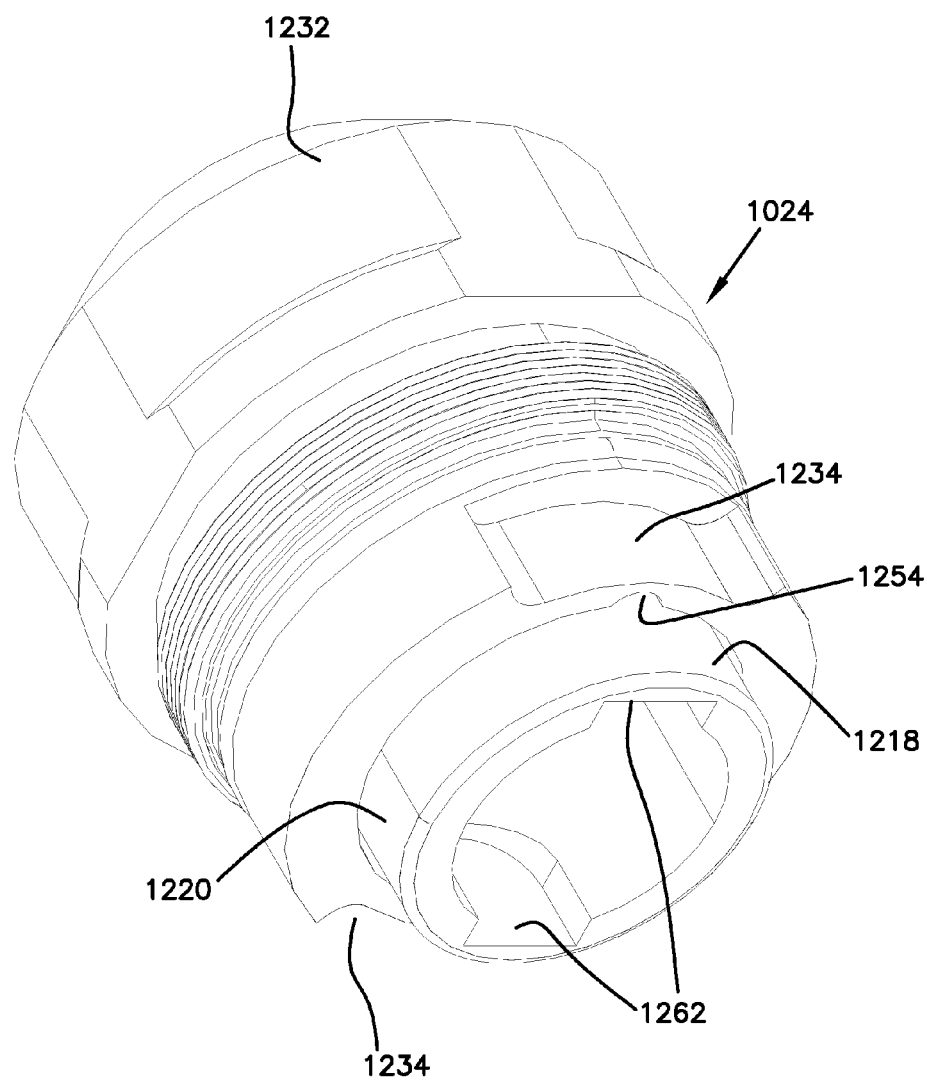
FIG. 109 is a perspective view of the endcap that is configured for use with the third embodiment of the hybrid fiber/copper connectors or with the quad fiber connectors.
Figure 113:
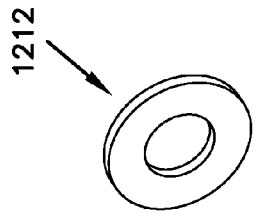
Figure 110:
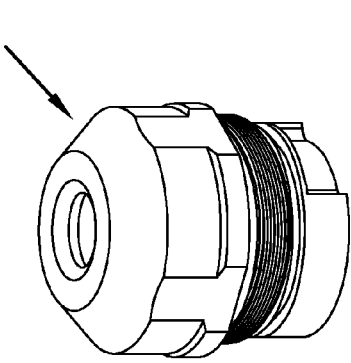
FIG. 110 is another perspective view of the endcap of FIG. 109.

FIGS. 109-110 illustrate the endcap 1204 in further detail. The endcap 1204 is preferably one-piece as opposed to a two-piece construction of the earlier embodiments. The endcap 1204 includes flats 1232 around the outer perimeter for fastening the endcap 1204 to the outer housings. The endcap 1204 includes a pair of grooves 1234 on opposite sides of the endcap 1204. The grooves 1234 are for receiving longitudinally extending tabs 1236 formed at the cable receiving ends of the inner housing pieces for aligning the inner housing pieces of all of the connectors with the endcap 1204. As such, in the third embodiment of the connector assembly, the inner housings are first mated together and then are mated to the endcap 1204 with the tabs 1236 and the grooves 1234 providing a positive lock. Once the engagement of the endcap 1204 to the inner housing halves is complete, the outer housing is threaded to the endcap 1204. In all of the versions of the connectors of the third embodiment, the outer housings can spin freely with respect to the inner housing halves. However, a fixed, non-rotational lock is provided between the inner housing halves and the endcap 1204.

Still referring to FIGS. 109-110, the endcap includes an interior cavity 1238. A first end 1240 of the cavity 1238 includes a hole 1242 sized for receiving the cable 1202. The second end 1244 of the cavity 1238 is sized to receive the individual components of the termination assembly 1200. The hole 1242 for receiving the cable 1202 can be made different sizes depending upon the size of the cable 1202 used. In one embodiment, the cable used may be 12 mm in diameter. In another embodiment, the endcap hole may be made to receive and seal a 9.2 mm diameter cable. Other than varying the cable receiving hole diameter, a similar endcap configuration can be used for all versions of the connectors discussed herein.

Figure 111:
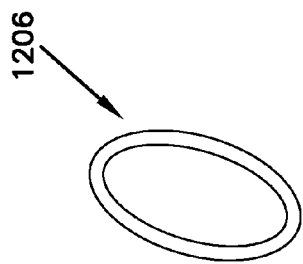
FIG. 111 is a perspective view of an O-ring configured to be placed around the threads of the endcap of FIGS. 109-110 to seal the endcap to the outer housings.

FIG. 111 illustrates the O-ring 1206 configured to be placed around the threads 1208 of the endcap 1204 of FIGS. 109-110 to seal the endcap 1204 to any of the outer housings.

Figure 112:
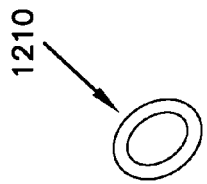
Figure 114:
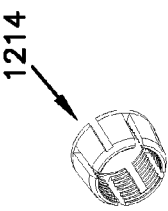

FIG. 112 illustrates the O-ring 1210 configured to be placed around the cable 1202 to be terminated to the endcap 1204. The washer 1212 (see FIG. 113) is placed after the O-ring 1210 of FIG. 112 on the cable 1202. FIG. 114 illustrates the collet 1214 that is configured to be collapsed around the cable 1202 to terminate the cable 1202 to the endcap 1204. The collet 1214 is similar in configuration and function to the collet 164 discussed above.

Figure 115:
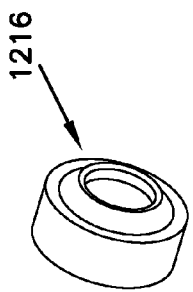

Referring to FIG. 115, the braid spacer 1216 is slid over the collet 1214 to crush the collet 1214 against the cable 1202 for clamping the cable 1202. The conductive braid of a cable may be folded back over the braid spacer 1216 once the cable 1202 is inserted through the braid spacer 1216. In this manner, the cable 1202 may be grounded through the use of the braid spacer 1216.

Figure 117:
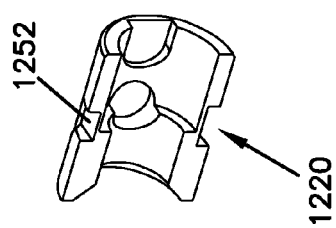
Figure 116:
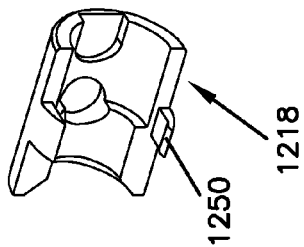

FIGS. 116-117 illustrate the first and the second braid clamp halves 1218, 1220 configured to mate to form the braid clamp 1222. The braid clamp 1222 is configured to push against the braid spacer 1216 within the interior cavity 1238 of the endcap 1204. The braid clamp 1222 abuts against the braid spacer 1216 to lock the braid of the cable 1202. The braid spacer 1216 and the braid clamp 1222 include mating tapered surfaces for a positive radial lock.

The first and second braid clamp halves 1218, 1220 include flexible tabs 1250 and slots 1252 for snap-fitting together. The braid clamp 1222 also includes radially outwardly extending tabs 1254 that provide for keying when being inserted into the interior cavity 1238 of the endcap 1204. The tabs 1254 of the braid clamp 1222 fit into grooves formed around the inner periphery of the endcap 1204 for keying.

Figure 119:
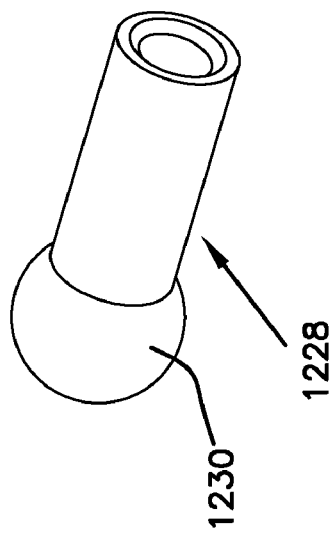
Figure 118:
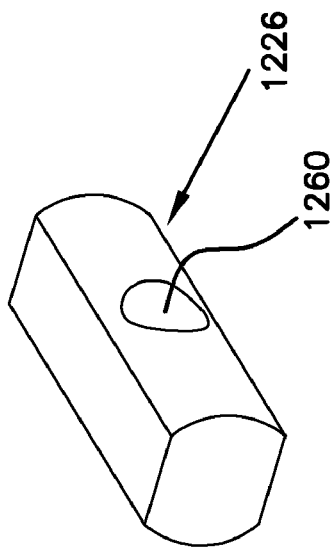

FIG. 118 illustrates the strength member clamp bar 1226 configured for use with the termination of a cable 1202 to the endcap 1204. The strength member clamp bar 1226 is similar in configuration to the bar 432 shown in FIG. 61. As in the previous embodiment, the clamp bar 1226 includes a throughhole 1260 that receives the strength member 1224 of the cable 1202. Once the strength member 1224 of a cable 1202 is inserted through the endcap 1204 toward the cable receiving end of a connector, it is inserted through the hole 1260 of the bar. It is then crimped at the opposite side of the hole 1260. The strength member 1224 may be crimped with the crimp ball 1230 as shown in FIG. 119 (e.g., made out of stainless steel in one embodiment) that is larger than the hole 1260 of the bar 1226. In this manner, removal of the strength member 1224 from the bar 1226 is prevented. Other ways of crimping the strength member 1224 to the bar 1226 are certainly possible. In certain embodiments, the bar 1226 is made from metallic materials and may provide a grounding path to the strength member 1224. In one embodiment, the bar 1226 is made from stainless steel. According to one embodiment, the strength member clamp bar 1226 depicted herein is rated to hold 225 lbs. of force for about 5 minutes.

Once the strength member 1224 is clamped to the bar 1226, the bar 1226 is inserted into a slot 1262 formed within the braid clamp 1222. All of the force of the cable is held by the strength member clamp bar 1226 within the slot 1262 of the braid clamp 1222.

The bar 1226 is oriented vertically within the endcap 1204 with respect to the fibers and the wires so that the fibers and the wires can go around the bar 1226.

Now referring to FIGS. 120-131, as noted previously, instead of being provided to connect two cable segments, the third embodiment of the female hybrid fiber/copper connector 1000 or the male hybrid fiber/copper connector 1006 can be provided as part of a bulkhead configuration such as seen in FIGS. 8-11 of U.S. Pat. Nos. 7,213,975 and 7,393,144, the entire disclosures of which have been incorporated herein by reference. In addition, the bulkhead versions of the male and the female connectors may include quad fiber connectors rather than hybrid connectors (see FIGS. 120 and 124).

The bulkhead may form part of any equipment, such as a camera, an enclosure, a cabinet, a panel, etc. Cables from within, for example, a camera or any other equipment, of which the bulkhead may form part of, enter into the cable receiving end of the connectors. A hybrid cable, for example, which will have terminated thereto fiber optic connectors and a conductor mount, is coupled to the inner housing halves of the hybrid fiber/copper connectors as described above for the female and male hybrid fiber/copper connectors.

It should be noted that the connector protruding out from the bulkhead may be a female hybrid fiber/copper connector, a male hybrid fiber/copper connector, a female quad fiber connector, or a male quad fiber connector.

Referring to FIG. 120, a bulkhead female quad fiber connector 1300 having features that are examples of inventive aspects in accordance with the principles of the present disclosure is illustrated. FIG. 121 illustrates the bulkhead female quad fiber connector 1300 in an exploded orientation. The bulkhead female quad fiber connector 1300 is assembled in a similar manner as the bulkhead female and male hybrid connectors shown in FIGS. 65-76. However, the bulkhead connector 1300 shown in FIGS. 120-121 utilizes a removable keying member 1100 that is configured for a female quad fiber connector 1032. As discussed previously, each of the female and male hybrid connectors and the female and male quad fiber connectors have dedicated keying members for properly mating with opposing connectors. Whether the connectors are cable connectors or bulkhead connectors, the same keying members dedicated for the individual type of connectors are used. For example, in the embodiment shown in FIG. 121, a keying member 1100 dedicated for a female quad fiber connector 1032 is used, even though the connector 1300 is in bulkhead form.

In the bulkhead assembly shown in FIG. 121, a dust cap 1304 configured to fit over the outer housing of the female bulkhead connector 1300 may be used.

Figure 122:
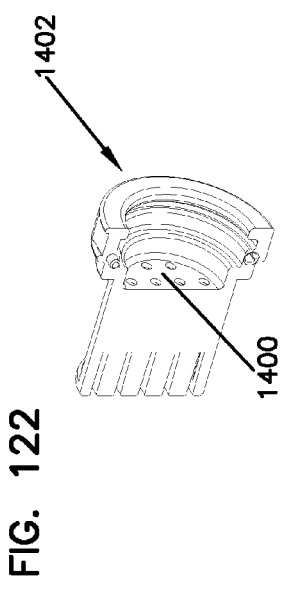
Figure 85A:
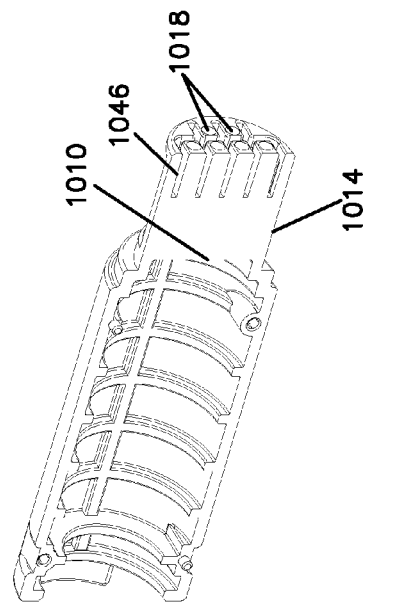
FIG. 85A is another perspective view of the second inner housing half of FIG. 85.
Figure 95B:
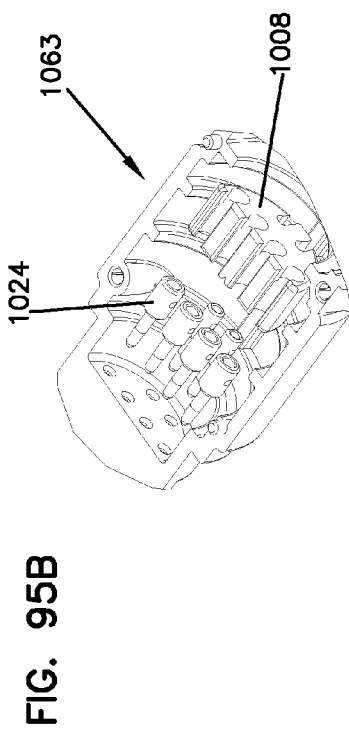
FIG. 95B illustrates the removable conductor mount of FIG. 87 within the second inner housing half of FIG. 95 in an exploded configuration.

FIG. 122 illustrates a second inner housing half 1400 of a female hybrid fiber/copper connector 1402 having features similar to that of the hybrid connector of FIG. 78. However, the illustrated second inner housing half 1400 is of a female hybrid connector 1402 of the bulkhead type that is configured to be mounted to a panel with features similar to those shown in FIG. 121.

Figure 123:
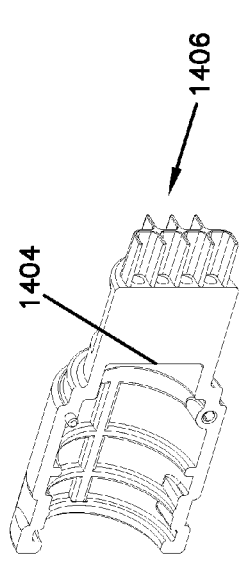

As another example, FIG. 123 illustrates a second inner housing half 1404 of a male hybrid fiber/copper connector 1406 having features similar to that of the hybrid connector of FIG. 91. However, the illustrated second inner housing half 1404 is of a male hybrid connector 1406 of the bulkhead type that is configured to be mounted to a panel with features similar to those shown in FIG. 121.

As discussed above, any of the versions of the cable terminated connectors (e.g., male hybrid, female hybrid, male quad, and female quad) may be provided in bulkhead form. Each one would include the same keying member that is associated with the cable terminated version. In a bulkhead version of the connectors, however, a strength member clamp bar 1226 may not be needed.

For example, FIG. 124 illustrates a bulkhead male quad fiber connector 1500 having features that are examples of inventive aspects in accordance with the principles of the present disclosure. In FIG. 124, the fiber optic connectors have not been shown for simplicity. FIG. 125 illustrates a bulkhead female hybrid fiber/copper connector 1600 having features that are examples of inventive aspects in accordance with the principles of the present disclosure. FIG. 126 illustrates a bulkhead male hybrid fiber/copper connector 1700 having features that are examples of inventive aspects in accordance with the principles of the present disclosure. In FIG. 126, the fiber optic connectors have not been shown for simplicity.

It should be noted that in certain embodiments, the bulkhead male or female hybrid or quad connectors may utilize field terminable fiber optic assemblies 1305 instead of using factory terminated fiber optic connectors. FIGS. 127-129 illustrate a bulkhead female hybrid fiber/copper connector utilizing a pair of field terminable fiber optic connector assemblies 1305. FIGS. 130 and 131 illustrate a bulkhead male hybrid fiber/copper connector utilizing a pair of field terminable fiber optic connector assemblies in a fully assembled configuration.

The bulkhead male or female hybrid or quad connectors using field terminable fiber optic assemblies 1305 are similar to bulkhead connectors using factory terminated fiber optic connectors except for the configuration of the end cap. As shown in FIG. 127, the bulkhead female hybrid fiber/copper connector shown includes an endcap 1860 that has an extended configuration for providing protection to the field terminable fiber optic assemblies 1305. The end cap 1860 includes a front portion 1861, a rear portion 1863 and a recessed portion 1862 that is located between the front portion 1861 and the rear portion 1863. The recessed portion 1862 is configured to intermate with the internal surface of a strain relief boot 1002 for attaching the boot 1002 to the end cap 1860. The boot 1002, when attached, covers the rear portion 1863 of the end cap 1860 and provides bend radius protection to the field terminable fiber optic assemblies 1305.

FIG. 132 illustrates the end cap 1860 configured for use with the bulkhead male and female connectors utilizing field terminable fiber optic connector assemblies 1305. It should be noted that the same end cap 1860 can be used with either bulkhead male or bulkhead female hybrid or quad connectors that utilize a field terminable fiber optic assembly. The assembly of the bulkhead connectors using field terminable fiber optic assemblies 1305 are similar to the assembly of bulkhead connectors using factory terminated fiber optic connectors, such as those shown in FIGS. 65-76 and 120-126.

As discussed above, the bulkhead may form part of any equipment, such as a camera, an enclosure, a cabinet, a panel, etc. Cables from within, for example, a camera or any other equipment, of which the bulkhead may form part of, enter into the cable receiving end of the connectors. A hybrid cable, for example, which will have terminated thereto fiber optic connectors and a conductor mount, is coupled to the inner housing halves of the hybrid fiber/copper connectors as described above for the female and male hybrid fiber/copper connectors. FIG. 133 illustrates an example of a flat panel 1800 for mounting a hybrid or quad connector of the bulkhead type, examples of which have been illustrated in FIGS. 65-76 and 120-132.

It is also contemplated that all of the connectors described herein may utilize flanges that extend radially outwardly with respect to the outer surfaces of the outer housings of the connectors for mounting the connectors to a bulkhead. Instead of utilizing, for example, a threaded outer housing that receives a nut (e.g., nut 601 in FIG. 67 of the present application) from the opposite end of the bulkhead for mounting the connector, the connectors may include flanges formed on the outer surfaces of the outer housings or other portions of the connectors. FIGS. 138-167 illustrate four different embodiments of an example bulkhead female hybrid connector that utilize mounting flanges that are formed on the outer surface of the connectors.

Referring now FIGS. 138-144, a first example embodiment of a bulkhead female hybrid fiber/copper connector 2300 that has a mounting flange formed on the outer housing is illustrated. FIG. 138 illustrates the bulkhead female hybrid connector 2300 in an exploded configuration and FIGS. 139-143 illustrate the bulkhead female hybrid connector 2300 in a fully assembled configuration. FIG. 144 illustrates the bulkhead female hybrid fiber/copper connector 2300 of FIG. 138 exploded off an example bulkhead in the form of a camera mount 2302.

As shown in the exploded view in FIG. 138, the bulkhead female hybrid connector 2300 includes an outer housing 2304, a grounding spring 2306, the female hybrid key member 1070, a fiber optic adapter 50, a first inner housing half 2308, a second inner housing half 2310 and a gasket 2312 for mounting to a bulkhead. The outer housing 2304 defines a mating end 2314 and a cable receiving end 2316. A mounting flange 2318 formed as part of the outer housing 2304 is located adjacent the cable receiving end 2316.

All of the internal features of the bulkhead female hybrid connector 2300 including the grounding spring 2306, the key member 1070, the adapter 50, and the first and second inner housing halves 2308, 2310 are inserted into the outer housing 2304 through the cable receiving end 2316. As shown in FIG. 140, the outer housing 2304 includes opposing cantilever clips 2320 adjacent the cable receiving end 2316 for capturing the internal structures once they are within the outer housing 2304. The cantilever clips 2320 protrude rearwardly from the mounting flange 2318 and abut against the rear ends of the inner housing halves 2308, 2310 to keep the internal features within the outer housing 2304. The clips 2320 may be positioned at different locations around the perimeter of the cable receiving end 2316 depending upon the shape of the bulkhead 2302 the connector 2300 is being mounted to.

It should be noted that the mounting flange 2318 may be formed integrally with the outer housing 2304 or may be a separate removable structure. The mounting flange 2318 includes openings 2322 for receiving removable fasteners such as screws which engage fastener openings 2324 of the bulkhead 2302.

Referring now to FIG. 144, the bulkhead female hybrid fiber/copper connector 2300 of FIG. 138 is shown exploded off an example bulkhead in the form of a camera mount 2302. In the example camera mount shown in FIG. 144, the camera mount 2302 defines a mounting face 2326 with an opening 2328 and an internal cavity 2330 through which a cable may extend toward the cable receiving end 2316 of the bulkhead female hybrid connector 2300. The mounting face 2326 includes openings 2324 for receiving fasteners for mounting the bulkhead female hybrid connector 2300 to the camera mount 2302. A gasket 2312 may be used when mounting the bulkhead female hybrid connector 2300 to the mounting face 2326 of the camera mount 2302. It should be noted that in the present embodiment, a portion of the cable receiving end 2316 of the bulkhead female hybrid connector 2300 extends into the cavity 2330 of the camera mount 2302.

The mounting flange 2318 of the connector 2300 of FIGS. 138-143 is shaped and sized for mating with the camera mount 2302 shown in FIG. 144. In other embodiments, the flanges of the connectors may be modified for any type of a bulkhead mounting structure.

Referring now FIGS. 145-151, a second example embodiment of a bulkhead female hybrid fiber/copper connector 2400 that has a mounting flange 2418 is illustrated. FIG. 145 illustrates the bulkhead female hybrid connector 2400 in an exploded configuration and FIGS. 146-150 illustrate the bulkhead female hybrid connector 2400 in a fully assembled configuration. FIG. 151 illustrates the bulkhead female hybrid fiber/copper connector 2400 of FIG. 145 exploded off an example bulkhead in the form of a camera mount 2302.

The embodiment of the bulkhead female hybrid fiber/copper connector 2400 of FIGS. 145-151 is similar to the connector 2300 of FIGS. 138-144 except for a number of differences. In the embodiment shown in FIGS. 145-151, the mounting flange 2418 is formed as part of the end cap 2401. The internal features of the connector 2400 are inserted into the outer housing 2404 through the cable receiving end 2416 of the outer housing 2404 and then captured by the end cap 2401, which is threaded on to the outer housing 2404. As shown in FIGS. 147 and 148, instead of utilizing cantilever clips, the connector 2400 includes an integrally mounted retainer 2420 adjacent the cable receiving end 2416. The first and second inner housing halves 2408, 2410 abut against the retainer 2420 to keep the internal features within the connector 2400. The end cap 2401 is threadingly removed from the outer housing 2404 to disassemble the connector 2400 and remove the internal features. The first and second inner housing halves 2408, 2410 may include key tabs 2409 that slidably fit into key slots 2411 formed within the end cap 2401 for correctly orienting the first and second inner housing halves 2408, 2410 within the connector 2400. Other bulkhead connectors (see e.g., connector 2500 of FIGS. 152-160) may include similar features for orientation purposes.

In FIG. 151, the bulkhead female hybrid fiber/copper connector 2400 of FIG. 145 is shown again exploded off an example bulkhead in the form of a camera mount 2302. As in the previous embodiment, a gasket 2312 may be used when mounting the bulkhead female hybrid connector 2400 to the mounting face 2326 of the camera mount 2302. In the shown embodiment, a portion of the end cap 2416 of the bulkhead female hybrid connector 2400 including the retainer structure 2420 extends into the cavity 2330 defined by the camera mount 2302.

Referring now FIGS. 152-160, a third example embodiment of a bulkhead female hybrid fiber/copper connector 2500 that has a mounting flange 2518 is illustrated. FIG. 152 illustrates the bulkhead female hybrid connector 2500 in an exploded configuration and FIGS. 153-159 illustrate the bulkhead female hybrid connector 2500 in a fully assembled configuration. FIG. 160 illustrates the bulkhead female hybrid fiber/copper connector 2500 of FIG. 152 exploded off an example bulkhead in the form of a camera mount 2302.

The embodiment of the bulkhead female hybrid fiber/copper connector 2500 of FIGS. 152-160 is similar to the connector 2400 of FIGS. 145-151 except for a number of differences. Again, as in the embodiment of the connector 2400 of FIGS. 145-151, the mounting flange 2518 is formed as part of the end cap 2501. The internal features of the connector 2500 are inserted into the outer housing 2504 through the cable receiving end 2516 of the outer housing 2504 and then captured by the end cap 2501, which is threaded on to the outer housing 2504. However, as shown in FIG. 152 and the cross-sectional views in FIGS. 158 and 159, instead of utilizing a retainer that protrudes rearwardly from the mounting flange 2518, the end cap 2501 of the connector 2500 includes an internal shoulder 2520. In the embodiment shown, the internal shoulder 2520 is configured to extend around the periphery of the rear end of the end cap 2501 and capture the first and second inner housing halves 2508, 2510 thereagainst. The first and second inner housing halves 2508, 2510 abut against the shoulder 2520 to keep the internal features within the connector 2500. The end cap 2501 is threadingly removed from the outer housing 2504 to disassemble the connector 2500 and remove the internal features.

By using a shoulder 2520, the internal features of the connector 2500 lie flush with the mounting flange 2518 and no portion of the connector 2500 extends into the cavity 2330 defined by the camera mount 2302. However, when providing a flush configuration as in the embodiment of FIGS. 152-160, the end cap 2501 includes a longer length than the end cap 2401 shown in FIG. 145 to accommodate the entirety of the first and second inner housing halves 2508, 2510 in cooperation with the outer housing 2504. As in the previous embodiments, a gasket 2312 may be used when mounting the bulkhead female hybrid connector 2500 to the mounting face 2326 of the camera mount 2302.

Referring now FIGS. 161-167, a fourth example embodiment of a bulkhead female hybrid fiber/copper connector 2600 that has a mounting flange 2618 is illustrated. FIG. 161 illustrates the bulkhead female hybrid connector 2600 in an exploded configuration and FIGS. 162-166 illustrate the bulkhead female hybrid connector 2600 in a fully assembled configuration. FIG. 167 illustrates the bulkhead female hybrid fiber/copper connector 2600 of FIG. 161 exploded off an example bulkhead in the form of a camera mount 2302.

The embodiment of the bulkhead female hybrid fiber/copper connector 2600 of FIGS. 161-167 is similar to the connector 2300 of FIGS. 138-144 except for a number of differences.

As in the embodiment of the connector 2300 shown in FIGS. 138-144, the outer housing 2604 includes the mounting flange 2618 and all of the internal features of the bulkhead female hybrid connector 2600 including the grounding spring 2306, the key member 1070, the adapter 50, and the first and second inner housing halves 2608, 2610 are inserted into the outer housing 2604 through the cable receiving end 2616.

However, as shown in FIGS. 161, 163, and 167, instead of utilizing a retaining structure such as the cantilever clips 2320 that protrude rearwardly from the mounting flange, the internal features of the connector 2600 are retained by a removable retainer structure 2620 such as a panel. The panel 2620 may be a sheetmetal part (or of other material) that includes a planar configuration. The panel 2620 may define a shape matching that of the mounting flange 2618 and the mounting face 2326 of the camera mount 2302. A central opening 2621 defined by the panel 2620 is smaller than the footprint of the first and second inner housing halves 2608, 2610 such that the panel 2620 captures the inner housing halves 2608, 2610 thereagainst a shoulder 2623 defined around the central opening 2621. As shown in FIG. 167, the panel 2620 may be mounted in between two gaskets 2312 when mounting the connector 2600 to the camera mount 2302.

Even though a retaining panel 2620 has been shown in the embodiment of the connector 2600 of FIGS. 161-167, it should be noted that in other embodiments, the first and second inner housing halves may be captured within the outer housing by the mounting face 2326 of the bulkhead 2302. If the mounting face of the bulkhead defines a shoulder large enough, the retaining panel 2620 may not need to be used and the first and second inner housing halves 2608, 2610 may abut against that shoulder.

In the embodiment of the connector 2600 of FIGS. 161-167, the internal features of the connector 2600 lie generally flush with the mounting flange 2618 and no portion of the connector 2600 extends into the cavity 2330 defined by the camera mount 2302. Thus, the embodiment of the connector 2600 of FIGS. 161-167 requires a longer outer housing 2604 than that shown in FIG. 138 to accommodate the entirety of the first and second inner housing halves 2608, 2610.

When comparing the four above embodiments, it should be noted that the embodiments utilizing the mounting flange on the end cap provide the extra advantage of being able to access and remove the internal features of the bulkhead connector without having to access the mounting flange and remove the mounting flange from the bulkhead.

Even though the above examples of bulkhead connectors 2300, 2400, 2500, 2600 utilizing mounting flanges on the outer housings have been described and shown with respect to a female hybrid type connector, it should be understood that the concept of providing a mounting flange on the outer housing can be applied to any other of the before mentioned bulkhead connectors including a male hybrid fiber/copper connector, a female quad fiber connector, or a male quad fiber connector.

It should be noted that, in certain instances, the hybrid or quad connectors that are not configured as bulkhead connectors may need to be mounted on a plate for further mounting on a panel or a rack. Such a mounting may utilize a yoke structure that is configured to be placed around the outer housing of the connector. Please see FIGS. 136 and 137 for examples of yoke structures that might be used with the hybrid or quad connectors described herein to mount the connectors to plates. For further description on mounting arrangements including mounting yokes configured to be fit about connectors and then attached to mounting plates for connection to a panel or a rack, please refer to U.S. Pat. Nos. 6,146,192; 6,231,380; and 6,811,432, the entire disclosures of which are incorporated herein by reference.

FIG. 136 illustrates a yoke half 1900 configured to form a mounting yoke for use with a female hybrid or female quad connector (examples of which have been illustrated in FIGS. 77-80, 85, 88, 89, and 98-101) for mounting the female connector to a plate. The yoke half 1900 includes an inner surface with flats 1901. The flats 1901 are configured to mate with flats 1001 defined on an exterior surface of the outer housing 1000 of the female hybrid or quad connector (see FIG. 98). The flats 1901 also enable the yoke to be able to be mounted on the end cap 1204 rather than the outer housing 1000. As seen in FIG. 98, the end cap 1204 also includes flats 1205 on the exterior surface for mating with the flats 1901 of the yoke half.

FIG. 137 illustrates a yoke half 2000 configured to form a mounting yoke for use with a male hybrid or male quad connector (examples of which have been illustrated in FIGS. 90-97 and 102-108) for mounting the male connector to a plate. The yoke half 2000, similar to yoke half 1900, includes an inner surface with flats 2001. The flats 2001 are configured to mate with flats 1055 defined on an exterior surface of the outer housing 1050 of the male hybrid or quad connector (see FIG. 102). The flats 2001 also enable the yoke to be able to be mounted on the end cap 1204 rather than the outer housing 1050. As seen in FIG. 102, the end cap 1204 also includes flats 1205 on the exterior surface for mating with the flats 2001 of the yoke half.

It should be noted that any number of flats within the interior surface of the yoke may be used as long as the number of flats on the yoke corresponds with the number of flats located on the exterior surface of the outer housings or the exterior surface of the end caps. The number of flats between the female yoke and the male yoke as well as the female outer housing and the male outer housing may differ to differentiate the genders.

FIG. 134 illustrates an example of a flat mounting plate 2100 for mounting a hybrid or quad connector (examples of which have been illustrated in FIGS. 77-119) to a panel or a rack. FIG. 135 illustrates an example of an angled mounting plate 2200 for mounting a hybrid or quad connector (examples of which have been illustrated in FIGS. 77-119) to a panel or a rack.

As noted above, use of mounting yokes and mounting plates for mounting connectors to various types of telecommunications equipment have been described in further detail in U.S. Pat. Nos. 6,146,192; 6,231,380; and 6,811,432, the entire disclosures of which have been incorporated herein by reference.

The above specification, examples and data provide a complete description of the manufacture and use of the inventive aspects of the present disclosure. Since many embodiments of the inventive aspects can be made without departing from the spirit and scope of the disclosure, the inventive aspects reside in the claims hereinafter appended.

The invention claimed is:

1. A hybrid fiber/copper connector comprising:
   a first outer housing with a mating end and a cable entry end and a first inner housing removably mounted within the first outer housing, the first outer housing removably mounted to an opening in a panel, the first inner housing formed from two inner housing halves removably mounted together,
   at least one fiber optic adapter removably mounted within one of the first inner housing halves adjacent the mating end;
   at least one electrical pin carried by a conductor mount that is removably mounted within the other of the first inner housing halves adjacent the mating end, the electrical pin of the removable conductor mount configured to make electrical contact with an electrical pin stationarily mounted within one of the first inner housing halves; and
   a removable keying member mounted to the first inner housing.

2. The connector of claim 1, wherein the cable entry end of the first outer housing includes threads and the first outer housing is mounted to the panel by inserting the cable entry end of the first outer housing through the opening of the panel and threading a nut over the cable entry end of the first outer housing.

3. The connector of claim 1, wherein the first outer housing is sealed against the opening of the panel with an o-ring.

4. The connector of claim 1, wherein the at least one fiber optic adapter is a duplex adapter.

5. A hybrid fiber/copper connector comprising:
   a first outer housing with a mating end and a cable entry end and a first inner housing removably mounted within the first outer housing, the first outer housing removably mounted to an opening in a panel, the first inner housing formed from two inner housing halves removably mounted together,
   at least one fiber optic connector removably mounted within one of the first inner housing halves adjacent the mating end;
   at least one electrical pin carried by a conductor mount that is removably mounted within the other of the first inner housing halves adjacent the mating end, the electrical pin of the removable conductor mount configured to make electrical contact with an electrical pin stationarily mounted within one of the first inner housing halves; and
   a removable keying member mounted to the first inner housing.

6. The connector of claim 5, wherein the cable entry end of the first outer housing includes threads and the first outer housing is mounted to the panel by inserting the cable entry end of the first outer housing through the opening of the panel and threading a nut over the cable entry end of the first outer housing.

7. The connector of claim 5, wherein the first outer housing is sealed against the opening of the panel with an o-ring.

8. The connector of claim 5, wherein two fiber optic connectors are removably mounted within one of the first inner housing halves.

9. A hybrid fiber/copper connector assembly comprising:
   a first hybrid fiber/copper connector including a first outer housing with a mating end and a cable entry end and a first inner housing removably mounted within the first outer housing, the first inner housing formed from two inner housing halves removably mounted together; and
   a second hybrid fiber/copper connector including a second outer housing with a mating end that is adapted to mate with the mating end of the first hybrid fiber/copper connector and a cable entry end, the second hybrid fiber/copper connector including a second inner housing removably mounted within the second outer housing, the second inner housing formed from two inner housing halves removably mounted together;
   wherein the first hybrid fiber/copper connector includes at least one fiber optic adapter removably mounted within one of the first inner housing halves adjacent the mating end and at least one electrical pin carried by a conductor mount that is removably mounted within the other of the first inner housing halves adjacent the mating end, the electrical pin of the removable conductor mount configured to make electrical contact with an electrical pin stationarily mounted within one of the first inner housing halves;
   wherein the second hybrid fiber/copper connector includes at least one fiber optic connector removably mounted within one of the second inner housing halves adjacent the mating end and at least one electrical pin conductor carried by a conductor mount that is removably mounted within the other of the second inner housing halves adjacent the mating end, the electrical pin of the removable conductor mount configured to make electrical contact with an electrical pin stationarily mounted within one of the second inner housing halves;
   wherein the first hybrid fiber/copper connector includes a removable keying member mounted to the first inner housing;
   wherein the second hybrid fiber/copper connector includes a removable keying member mounted to the second inner housing, the keying member of the first hybrid fiber/copper connector configured to mate with the keying member of the second hybrid fiber/copper connector when the first and the second hybrid fiber/copper connectors mate;

wherein the fiber optic connector of the second hybrid fiber/copper connector is configured to mate with the fiber optic adapter of the first hybrid fiber/copper connector, and the electrical pin conductor carried by the removably mounted conductor mount of the second hybrid fiber/copper connector is adapted to electrically mate with the electrical pin conductor carried by the removably mounted conductor mount of the first hybrid fiber/copper connector.

10. The connector of claim 1, further comprising a mounting flange extending in a direction radially outwardly with respect to an outer surface of the first outer housing, the mounting flange being for mounting the hybrid fiber/copper connector to the panel.

11. The connector of claim 5, further comprising a mounting flange extending in a direction radially outwardly with respect to an outer surface of the first outer housing, the mounting flange being for mounting the hybrid fiber/copper connector to the panel.

* * * * *